(12) United States Patent
Qiao et al.

(10) Patent No.: US 12,160,916 B2
(45) Date of Patent: **\*Dec. 3, 2024**

(54) WIRELESS COMMUNICATIONS FOR ASYMMETRIC SERVICES

(71) Applicant: Comcast Cable Communications, LLC, Philadelphia, PA (US)

(72) Inventors: Weihua Qiao, Herndon, VA (US); Esmael Hejazi Dinan, McLean, VA (US); Kyungmin Park, Vienna, VA (US); Jinsook Ryu, Oakton, VA (US); Peyman Talebi Fard, Vienna, VA (US)

(73) Assignee: Comcast Cable Communications, LLC, Philadelphia, PA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/495,464

(22) Filed: Oct. 26, 2023

(65) Prior Publication Data

US 2024/0179774 A1 May 30, 2024

Related U.S. Application Data

(63) Continuation of application No. 17/481,014, filed on Sep. 21, 2021, now Pat. No. 11,838,971, which is a continuation of application No. 16/868,350, filed on May 6, 2020, now Pat. No. 11,160,126, which is a continuation of application No. 16/868,255, filed on May 6, 2020, now Pat. No. 11,160,125.

(60) Provisional application No. 62/857,021, filed on Jun. 4, 2019, provisional application No. 62/843,767, filed on May 6, 2019.

(51) Int. Cl.
*H04W 76/15* (2018.01)
*H04W 40/24* (2009.01)

(52) U.S. Cl.
CPC ........ *H04W 76/15* (2018.02); *H04W 40/246* (2013.01)

(58) Field of Classification Search
None
See application file for complete search history.

(56) References Cited

U.S. PATENT DOCUMENTS

| | | | |
|---|---|---|---|
| 11,160,125 B2 | 10/2021 | Qiao et al. | |
| 11,160,126 B2 * | 10/2021 | Qiao | H04W 40/246 |
| 11,838,971 B2 * | 12/2023 | Qiao | H04W 76/12 |
| 2018/0227873 A1 | 8/2018 | Vrzic et al. | |
| 2019/0053104 A1 | 2/2019 | Qiao et al. | |
| 2019/0098547 A1 * | 3/2019 | Chong | H04W 36/00 |
| 2019/0158408 A1 | 5/2019 | Li et al. | |

(Continued)

FOREIGN PATENT DOCUMENTS

WO 2018128529 A1 7/2018

OTHER PUBLICATIONS

Tencent: "Discussion on Asymmetric Traffic for Cloud Gaming and pCR to TR 22.842", S1-190453, Revision of S1-190265, 3GPP TSG-SA WG1 Meeting #85, Tallinn, Estonia, Feb. 18-22.

(Continued)

*Primary Examiner* — Brian S Roberts
(74) *Attorney, Agent, or Firm* — Banner & Witcoff, Ltd.

(57) ABSTRACT

Wireless communications for asymmetric services are described. Asymmetric services (e.g., for downlink or uplink) may be associated with each other. Resources may be configured based on an association of asymmetric services.

30 Claims, 36 Drawing Sheets

(56) References Cited

U.S. PATENT DOCUMENTS

| | | | |
|---|---|---|---|
| 2019/0182875 A1* | 6/2019 | Talebi Fard | H04W 76/11 |
| 2019/0246370 A1* | 8/2019 | Xu | H04W 80/10 |
| 2019/0357301 A1 | 11/2019 | Li et al. | |
| 2020/0228936 A1* | 7/2020 | Talebi Fard | H04W 8/186 |
| 2020/0275510 A1* | 8/2020 | Zhang | H04W 76/11 |
| 2020/0313794 A1 | 10/2020 | Chandramouli et al. | |
| 2020/0314701 A1* | 10/2020 | Talebi Fard | H04W 36/0016 |
| 2021/0014765 A1* | 1/2021 | Shan | H04W 8/02 |
| 2022/0104292 A1 | 3/2022 | Yu et al. | |
| 2022/0141908 A1 | 5/2022 | Ianev et al. | |
| 2022/0174482 A1 | 6/2022 | Wifvesson et al. | |
| 2022/0232413 A1 | 7/2022 | Ma et al. | |

OTHER PUBLICATIONS

Aug. 21, 2020, Extended European Search Report, EP 20173283.1.
3GPP TR 22.842 V1.1.0 (Dec. 2018), 3rd Generation Partnership Project, Technical Specification, Group Services and System Aspects; Study on Network Controlled Interactive Services (Release 17).
3GPP TS 23.501 V16.0.2 (Apr. 2019), Technical Specification, 3rd Generation Partnership Project; Technical Specification Group Services and System Aspects; System Architecture for the 5G System; Stage 2 (Release 16).
3GPP TS 23.502 V16.0.2 (Apr. 2019), Technical Specification, 3rd Generation Partnership Project; Technical Specification Group Services and System Aspects; Procedures for the 5G System; Stage 2 (Release 16).
3GPP TS 23.503 V16.0.0 (Mar. 2019), Technical Specification, 3rd Generation Partnership Project; Technical Specification Group Services and System Aspects; Policy and Charging Control Framework for the 5G System; Stage 2 (Release 16).
3GPP TS 23.794 V1.0.0 (Mar. 2019), Technical Report, 3rd Generation Partnership Project; Technical Specification Group Services and System Aspects; Study on Enhanced IMS to 5GC Integration; Stage 2 (Release 16).
3GPP TR 24.890 V15.1.0 (Mar. 2018), Technical Report, 3rd Generation Partnership Project; Technical Specification Group Core Network and Terminals; 5G System—Phase 1; CT WG1 Aspects (Release 15).
3GPP TS 32.240 V15.4.0 (Dec. 2018), Technical Specification, 3rd Generation Partnership Project; Technical Specification Group Services and System Aspects; Telecommunication management; Charging management; Charging architecture and principles (Release 15).
3GPP TS 32.255 V15.0.0 (Sep. 2018), Technical Specification, 3rd Generation Partnership Project; Technical Specification Group Services and System Aspects; Telecommunication management; Charging management; 5G data connectivity domain charging; Stage 2 (Release 15).
3GPP TS 38.300 V15.5.0 (Mar. 2019), Technical Specification, 3rd Generation Partnership Project; Technical Specification Group Radio Access Network; NR; NR and NG-RAN Overall Description; Stage 2 (Release 15).
3GPP TS 38.401 V15.5.0 (Mar. 2019), Technical Specification, 3rd Generation Partnership Project; Technical Specification Group Radio Access Network; NG-RAN; Architecture description (Release 15).
S2-166452 SA WG2 Meeting #S2-118, Reno, Nevada, Nov. 14-18, 2016, Source: Samsung, Title: Extending Reflective QoS scheme to support for Asymmetric QoS.
Lee, Jicheol. "Asymmetric QoS: Extending Reflective QoS scheme to support Asymmetric Qos." 3PPG, Source: Samsung Electronics. Published Nov. 8, 2016.
S2-166912 SA WG2 Meeting #S2-118, Reno, Nevada, Nov. 14-18, 2016, Source: Samsung, Title: Extending Reflective QoS scheme to support for Asymmetric QoS.
S2-184457 SA WG2 Meeting #127, Sanya, China, Apr. 16-20, 2018, Source: Motorola Mobility, Lenovo, Huawei, Title: Update to solution 8—Routing media traffic via different 5G network slices.
S2-1904560 SA WG2 Meeting #132, Xi'an, China, Apr. 8-12, 2019, Source: Tencent, China Telecom, China Mobile, China Unicom, OPPO, ZTE, Samsung, Xiaomi, Title: New Study Item on 5G System Enhancement for Interactive Cloud Services.
S5-186290 3GPP TSG SA WG5 (Telecom Management) Meeting #121, Kochi, India, Oct. 8-12, 2018, Source: Huawei Technology, Title: New SID on Charging Aspects of Network Slicing.
S5-192096 3GPP TSG-SA5 Meeting #124, Taipei, Taiwan, Feb. 25-Mar. 1, 2019, Source: Huawei, Title: Addition of solution evaluation for solution #1.1.
S5-192097 3GPP TSG-SA5 Meeting #124, Taipei, Taiwan, Feb. 25-Mar. 1, 2019, Source: Huawei, Title: Addition of solution evaluation for solution.
S5-192098 3GPP TSG-SA5 Meeting #124, Taipei, Taiwan, Feb. 25-Mar. 1, 2019, Source: Huawei, Title: Addition of Use Case about Network Slice Subscription.
S5-192208 3GPP TSG-SA5 Meeting #124, Taipei, Taiwan, Feb. 25-Mar. 1, 2019, Source: Ericsson, Title: Solution to Performance based Charging.
3GPP TR 32.845 V0.2.0 (Jan. 2019) Technical Report, 3rd Generation Partnership Project; Technical Specification Group Services and System Aspects; Charging management; Study on Charging Aspects of Network Slicing; (Release 16).
5G Mobile Network Architecture: for diverse services, uses cases, and applications in 5G and beyond. 5G-MoNArch, Project No. 761445, Version 1.0, Published Jun. 30, 2018.

* cited by examiner

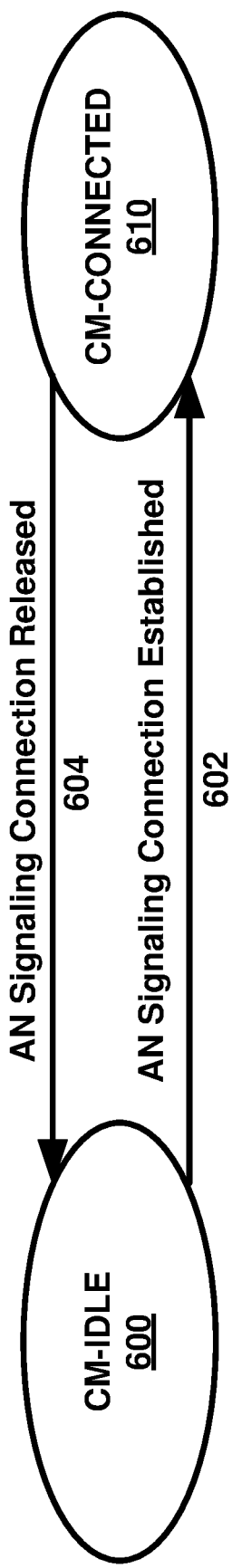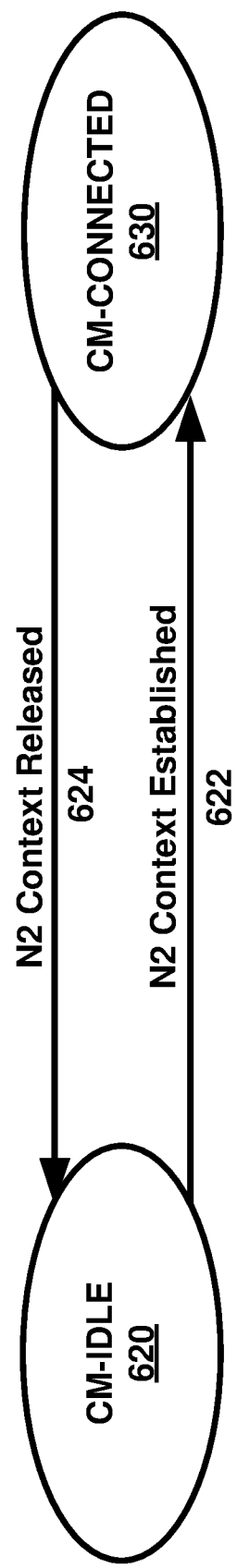
FIG. 6A CM State Transition in Wireless Device
FIG. 6B CM State Transition in AMF

WIRELESS COMMUNICATIONS FOR ASYMMETRIC SERVICES

CROSS-REFERENCE TO RELATED APPLICATIONS

This application is a continuation of and claims priority to U.S. patent application Ser. No. 17/481,014, filed Sep. 21, 2021, which is a continuation of U.S. patent application Ser. No. 16/868,350, filed May 6, 2020 (now U.S. Pat. No. 11,160,126), which is a continuation of U.S. patent application Ser. No. 16/868,255, filed May 6, 2020 (now U.S. Pat. No. 11,160,125), which claims the benefit of U.S. Provisional Application No. 62/857,021, filed Jun. 4, 2019 and U.S. Provisional Application No. 62/843,767, filed May 6, 2019, each of which is hereby incorporated by reference in its entirety.

BACKGROUND

Wireless communications involve many different types of services and different services can have various or different capabilities. Wireless devices communicate with one or more servers for these different types of services.

SUMMARY

The following summary presents a simplified summary of certain features. The summary is not an extensive overview and is not intended to identify key or critical elements.

Wireless communications may be configured for various services. A wireless device may use multiple services based on attributes and/or service requirements (e.g., bandwidth, latency, priority, etc.) associated with data to be communicated. Wireless communications may be used for asymmetric services. For example, the wireless device may use a first service for uplink transmissions associated with an application and a second service (e.g., a different service) for downlink transmissions associated with the application. An indication that uplink transmissions and downlink transmissions are associated (e.g., correspond to the same application and/or service) may be provided (e.g., sent by a wireless device). Service(s) may be configured based on the indication. Various operations may be performed, such as a handover procedure (e.g., for handover of the wireless device to another base station), downlink and/or uplink scheduling, etc., based on availability of resources for the service(s).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6A and FIG. 6B show example connection management state transitions for a wireless device and an AMF.

DETAILED DESCRIPTION

Figure 1:
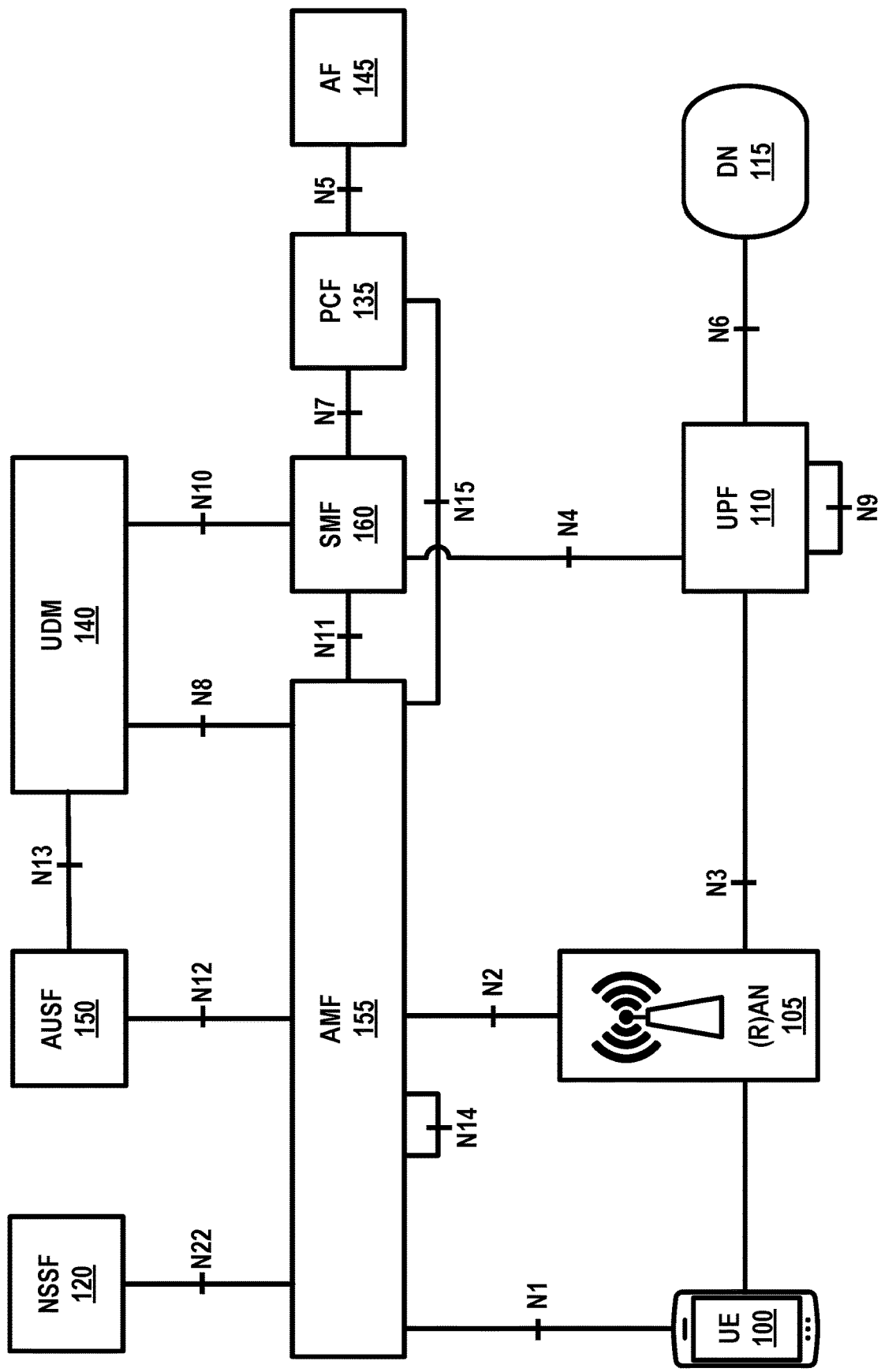
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced.

Examples of enhanced features and functionalities in networks, such as 4G networks, 5G networks, or other networks or systems are described. More particularly, the technology herein may relate to a core network (e.g., 5GC), a 5G network, 4G, 3GPP access technologies, non-3GPP access technologies, multi-SIM wireless devices, and/or other systems. The communication systems may comprise any quantity and/or type of devices, such as, for example, computing devices, wireless devices, base stations, network devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices.

The following acronyms are used throughout the present disclosure, provided below for convenience although other acronyms may be introduced in the detailed description.

| | |
|---|---|
| 5G | 5th generation mobile networks |
| 5GC | 5G Core Network |
| 5GS | 5G System |
| 5G-AN | 5G Access Network |
| 5QI | 5G QOS Indicator |
| ACK | Acknowledgment |
| AF | Application Function |
| AMBR | Aggregate Maximum Bit Rate |
| AMF | Access and Mobility Management Function |
| AN | Access Network |
| ANDSP | Access Network Discovery and Selection Policy |
| ARP | Allocation and Retention Priority |
| BD | Billing Domain |
| CCNF | Common Control Network Functions |
| CDR | Charging Data Record |
| CHF | Charging Function |
| CN | Core Network |
| CP | Control Plane |
| CSP | Communication Service Provider |
| CU | Central Unit |
| DDoS | Distributed Denial of Service |
| DL | Downlink |
| DN | Data Network |
| DNN | Data Network Name |
| DRB | Data Radio Bearers |
| DU | Distributed Unit |
| eMBB | enhanced Mobile Broadband |
| EPS | Evolved Packet System |
| FDD | Frequency Division Duplex |
| FQDN | Fully Qualified Domain Name |
| GFBR | Guaranteed Flow Bit Rate |
| GPSI | Generic Public Subscription Identifier |
| H-PCF | Home PCF |
| HPLMN | Home PLMN |
| ID | Identifier |
| IMS | IP Multimedia core network Subsystem |
| IoT | Internet of Things |
| IP | Internet Protocol |
| KPI | Key Performance Indicator |
| L2 | Layer 2 (data link layer) |
| L3 | Layer 3 (network layer) |
| LADN | Local Area Data Network |
| MAC | Media Access Control |
| MFBR | Maximum Flow Bit Rate |
| MICO | Mobile Initiated Connection Only |
| MIoT | Massive IoT |
| N3IWF | Non-3GPP InterWorking Function |
| NAS | Non Access Stratum |
| NAT | Network address translation |
| NEF | Network Exposure Function |
| NF | Network Function |
| NOP | Network Operator |
| NR | New Radio |
| NG-RAN | NR Radio Access Network |
| NQCI | Network Slice and Quality of Service (QOS) Correlation Indication |
| NRF | Network Repository Function |
| NSI | Network Slice Instance |
| NSSAI | Network Slice Selection Assistance Information |
| NSSF | Network Slice Selection Function |
| NSSP | Network Slice Selection Policy |
| NWDAF | Network Data Analytics Function |
| PCC | Policy and Charging Control |
| PCF | Policy Control Function |
| PDU | Packet Data Unit |
| PEI | Permanent Equipment Identifier |
| PLMN | Public Land Mobile Network |
| QCI | QoS Class Identifier |
| QFI | QoS Flow Identifier |
| QoS | Quality of Service |
| RA | Random Access |
| RAN | Radio Access Network |
| RAT | Radio Access Technology |
| RRC | Radio Resource Control |
| RM | Registration Management |
| SCI | Session Correlation Indication |
| SM | Session Management |
| SMF | Session Management Function |
| SMSF | SMS Function |
| SN | Sequence Number |
| S-NSSAI | Single Network Slice Selection Assistance information |
| SSC | Session and Service Continuity |
| SSCMSP | SSC Mode Selection Policy |
| SUPI | Subscriber Permanent Identifier |
| TA | Tracking Area |
| TCP | Transmission Control Protocol |
| UAV | Unmanned Aerial Vehicles |
| UAS | Unmanned Aircraft Systems |
| UDR | Unified Data Repository |
| UDM | Unified Data Management |
| UE | User Equipment |
| UL | Uplink |
| UL CL | Uplink Classifier |
| UP | User Plane |
| UPF | User Plane Function |
| URLLC | Ultra-Reliable Low Latency Communication |
| URSP | UE Route Selection Policy |
| V-PCF | Visited PCF |
| VPLMN | Visited PLMN |

Figure 2:
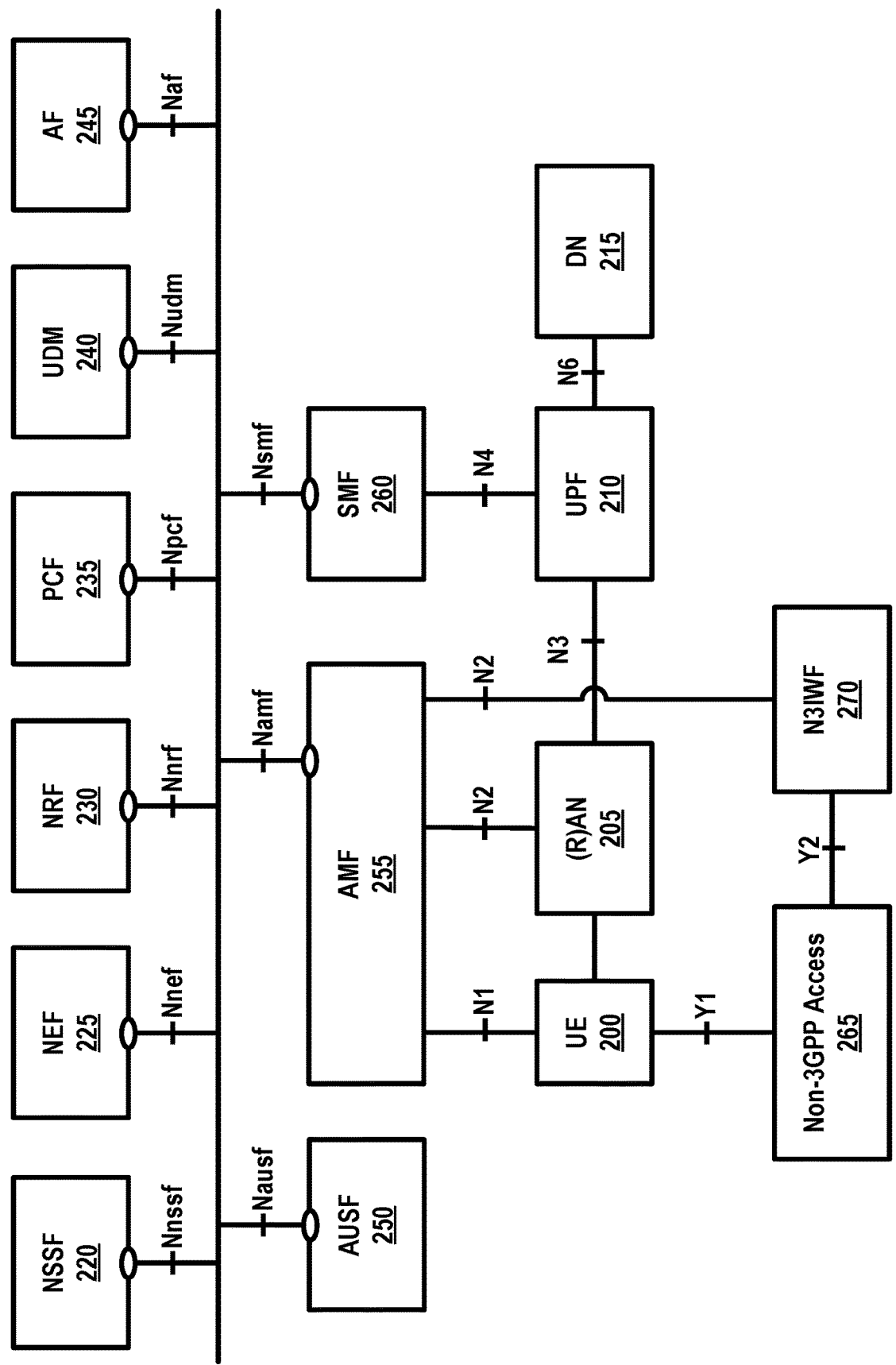
FIG. 2 shows an example 5G system.

FIG. 1 and FIG. 2 show examples of system architecture (e.g., 5G system architecture). A 5G access network may comprise an access network in communication with and/or connecting to and a core network (e.g., a 5G core network). An example access network (e.g., a 5G access network) may comprise an access network connected to a core network (e.g., 5G core network). An access network may comprise a RAN 105 (e.g., NG-RAN) and/or a non-3GPP AN. The core network (e.g., 5G core network) may communicate with one or more access networks (e.g., 5G access networks (5G-AN) and/or RANs 105. The 5GC may comprise functional elements or network functions as in example FIG. 1 and example FIG. 2, where interfaces may be employed for communication among the functional elements and/or network elements. A network function may be a processing function in a network that has a functional behavior and interfaces. A network function may be implemented as a network element on a dedicated hardware, a base station, and/or as a software instance running on a hardware, shared hardware, and/or as a virtualized function instantiated on an appropriate platform.

A wireless device 100 may communicate with the RAN 105. The RAN 105 may comprise an access network. The wireless device 100 may communicate with a first network entity/component (for example and purposes of explanation, an AMF 155) via a second network entity/component (for example and purposes of explanation, a N1 interface). The RAN 105 may communicate with the AMF 155 via a fourth network entity/component (for example and purposes of explanation, an N2 interface). The RAN 105 may communicate with a fifth network entity/component (for example and purposes of explanation, a UPF 110) via a sixth network entity/component (for example and purposes of explanation, an N3 interface). The UPF 110 may communicate with a seventh network entity/component (for example and purposes of explanation, a data network (DN) 115) via an eighth network entity/component (for example and purposes of explanation, an N6 interface). The UPF 110 may communicate with itself and/or another UPF 110 via a ninth network entity/component (for example and purposes of explanation, an N9 interface). The UPF 110 may communicate with a tenth network entity/component (for example and purposes of explanation, an SMF 160) via an eleventh network entity/component (for example and purposes of explanation, an N4 interface). The AMF 155 may communicate with itself and/or another AMF 155 via a twelfth network entity/component (for example and purposes of explanation, an N14 interface). The AMF 155 may communicate with a thirteenth network entity/component (for example and purposes of explanation, an NSSF 120) via a fourteenth network entity/component (for example and purposes of explanation, an N22 interface. The AMF 155 may communicate with a fifteenth network entity/component (for example and purposes of explanation, a UDM 140) via a sixteenth network entity/component (for example and purposes of explanation, an N8 interface). The AMF 155 may communicate with a seventeenth network entity/component (for example and purposes of explanation, an AUSF 150) via an eighteenth network entity/component (for example and purposes of explanation, an N12 interface). The AMF 155 may communicate with a nineteenth network entity/component (for example and purposes of explanation, a PCF 135) via a twentieth network entity/component (for example and purposes of explanation, an N15 interface). The AMF 155 may communicate with the SMF 160 via a twenty-first network entity/component (for example and purposes of explanation, an N11 interface). The AUSF 150 may communicate with the UDM 140 via a twenty-second network entity/component (for example and purposes of explanation, an N13 interface). The UDM 140 may communicate with the SMF 160 via a twenty-third network entity/component (for example and purposes of explanation, an N10 interface). The SMF may communicate with the PCF 135 via twenty-fourth network entity/component (for example and purposes of explanation, an N7 interface). The PCF 135 may communicate with a twenty-fifth network entity/component (for example and purposes of explanation, an application function (AF) 145 via a twenty-sixth network entity/component (for example and purposes of explanation, an N5 interface).

FIG. 2 shows an example system comprising access networks and a core network. The access network may comprise, for example, a RAN 205 and a non-3GPP access network 265 (e.g., untrusted non-3GPP access network). Elements shown in FIG. 2 may correspond to elements in FIG. 1 with like numerals.

The access and mobility management function AMF 155, 255 may comprise one or more of the following functionalities: termination of (R)AN CP interface (N2), termination of NAS (N1), NAS ciphering and integrity protection, registration management, connection management, reachability management, mobility management, lawful intercept (for AMF events and interface to LI system), transport for session management, SM messages between a wireless device 100, 200 and an SMF 160, 260, transparent proxy for routing SM messages, access authentication, access authorization, transport for short message service (SMS) messages between wireless device 100, 200 and an SMS function (SMSF), security anchor function (SEA) interaction with the AUSF 150, 250 and the wireless device 100, 200, receiving an intermediate key established as a result of the wireless device 100, 200 authentication process, security context management (SCM), and/or receiving a key from the SEA to derive access network specific keys. A variety of these functionalities may be supported in a single instance of an AMF 155, 255 and/or in multiple instances of AMF 155, 255 as appropriate.

The AMF 155, 255 may support non-3GPP access networks via an N2 interface with N3IWF 170, 270, NAS signaling with a wireless device 100, 200 over N3IWF 170, 270, authentication of wireless devices connected over N3IWF 170, 270, management of mobility, authentication, and separate security context state(s) of a wireless device 100, 200 connected via non-3GPP access 265 or connected via 3GPP access 105, 205 and non-3GPP accesses 265 simultaneously, support of a coordinated RM context valid over 3GPP access 105, 205 and non-3GPP access 265, and/or support of context management (CM) management contexts for the wireless device 100, 200 for connectivity over non-3GPP access. Some functionalities described above may be supported in an instance of a network slice. An AMF 155, 255 region may comprise of one or multiple AMF 155, 255 sets. AMF 155, 255 set may comprise of some AMFs 155, 255 that serve a given area and/or network slice(s). Multiple AMF 155, 255 sets may be per AMF 155, 255 region and/or network slice(s). Application identifiers may be mapped to one or more specific application traffic detection rules. A configured NSSAI may be a NSSAI that has been provisioned in a wireless device 100, 200. DN 115, 215 access identifier (DNAI), for a DNN, may be an identifier of a user plane access to a DN 115, 215. Initial registration may be related to a wireless device 100, 200 registration in a RM-DEREGISTERED state. N2AP wireless device 100, 200 association may be a logical per wireless device 100, 200 association between a 5G AN node and an AMF 155, 255. Wireless device 100, 200 may comprise a N2AP wireless device-TNLA-binding, which may be a binding between a N2AP wireless device 100, 200 association and a specific transport network layer (TNL) association for a given wireless device 100, 200.

The session management function (SMF) 160, 260 may comprise one or more of the following functionalities: session management (e.g., session establishment, modify and release, comprising tunnel maintain between UPF 110, 210 and an AN such as RAN 105, 205 node), wireless device IP address allocation & management (comprising optional authorization), selection and control of user plane function(s), configuration of traffic steering at UPF 110, 210 to route traffic to its proper destination, termination of interfaces towards policy control functions, control part of policy enforcement and QoS, lawful intercept (for SM events and interface to LI system), termination of SM parts of NAS messages, downlink data notification, initiation of AN specific SM information, sent via AMF 155, 255 over N2 to (R)AN 105, 205, determination of SSC mode of a session, roaming functionality, handling local enforcement to apply QoS SLAs (VPLMN), charging data collection and charging interface (VPLMN), lawful intercept (in VPLMN for SM events and interface to LI system), and/or support for interaction with external DN 115, 215 for transport of signaling for PDU session authorization/authentication by external DN 115, 215. One or more of these functionalities may be supported in a single instance of a SMF 160, 260. One or more of the SMF functionalities may be supported in a single instance of the SMF 160, 260.

The user plane function (UPF) 110, 210 may comprise one or more of the following functionalities: anchor point for Intra-/Inter-RAT mobility (if applicable), external PDU session point of interconnect to DN 115, 215, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. Some of the UPF functionalities may be supported in a single instance of a UPF 110, 210. One or more of functionalities described above may be supported in an instance of a network slice. User plane function(s) (UPF(s) 110, 210) may handle the user plane path of PDU sessions. A UPF 110, 210 that provides the interface to a data network supports the functionality of a PDU session anchor.

IP address management may comprise allocation and release of the wireless device IP address as well as renewal of the allocated IP address. The wireless device 100, 200 sets the requested PDU type during the PDU session establishment procedure based on its IP stack capabilities and configuration. The SMF 160, 260 may select PDU type of a PDU session as follows: if the SMF 160, 260 receives a request with PDU type set to IP, the SMF 160, 260 may select either PDU type IPv4 or IPv6 based on DNN configuration and/or operator policies. The SMF 160, 260 may also provide a cause value to the wireless device 100, 200 to indicate whether the other IP version (e.g., IPv6 if IPv4 is selected and vice versa) may be supported on the DNN. If the other IP versions are supported, wireless device 100, 200 may request another PDU session to the same DNN for the other IP version. If the SMF 160, 260 receives a request for PDU type IPv4 or IPv6 and the requested IP version may be supported by the DNN, the SMF 160, 260 selects the requested PDU type. The 5GC elements and wireless device 100, 200 support the following mechanisms: during PDU session establishment procedure, the SMF 160, 260 may send the IP address to the wireless device 100, 200 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140, 240 or based on the configuration on a per-subscriber, per-DNN basis.

The policy control function PCF 135, 235 may support unified policy framework to govern network behavior, provide policy rules to control plane function(s) to enforce them, and/or implement a front end to access subscription information relevant for policy decisions in a user data repository (UDR). The unified data management UDM 140, 240 may comprise an application front end (FE) that comprises the UDM-FE that may be in charge of processing credentials, location management, and/or subscription management. The PCF 135, 235 may be in charge of policy control and the user data repository (UDR) that stores data required for functionalities provided by UDM-FE, plus policy profiles required by the PCF 135, 235. The data stored in the UDR may comprise at least user subscription data, comprising at least subscription identifiers, security credentials, access and mobility related subscription data, session related subscription data, and/or policy data. The network exposure function NEF 125, 225 may provide a means to securely expose the services and capabilities provided by the 3GPP network functions, translate between information exchanged with the AF 145, 245 and information exchanged with the internal network functions, and/or receive information from other network functions.

The NF repository function NRF 130, 230 may support a service discovery function that receives NF discovery requests from a NF instance, provides the information of the discovered NF instances to the NF instance, and/or maintains the information of available NF instances and their supported services.

The functionality of non-3GPP interworking function N3IWF 170, 270 for non-3GPP access 265 may comprise at least one or more of the following: supporting of IPsec tunnel establishment with the wireless device, terminating the IKEv2/IPsec protocols with the wireless device 100, 200 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100, 200 and AMF 155, 255, handling of N2 signaling from SMF 160, 260 (which may be relayed by AMF 155, 255) related to PDU sessions and QoS, establishing of IPsec security association (IPsec SA) to support PDU session traffic, relaying uplink and downlink user-plane packets between the wireless device 100, 200 and UPF 110, 210, enforcing QoS corresponding to N3 packet marking, considering QoS requirements associated to such marking received over N2, N3 user-plane packet marking in the uplink, local mobility anchor within untrusted non-3GPP access networks 265 using MOBIKE, and/or supporting AMF 155, 255 selection.

The application function AF 145, 245 may interact with the 3GPP core network to provide a variety of services. Based on operator deployment, AF 145, 245 may be trusted by the operator to interact directly with relevant network functions. Application functions not provided by the operator to access directly the network functions may use the external exposure framework (via the NEF 125, 225) to interact with relevant network functions.

The control plane interface between the (R)AN 105, 205 and the 5GC may support connection of multiple different kinds of ANs, such as 3GPP (R)AN 105, 205 and/or N3IWF 170, 270, to the 5GC via a unique control plane protocol. A single N2 AP protocol may be employed for both the 3GPP access 105, 205 and non-3GPP access 265 and/or for decoupling between AMF 155, 255 and other functions such as SMF 160, 260 that may need to control the services supported by AN(s) (e.g., control of the UP resources in the AN 105, 205 for a PDU session). The 5GC may be able to provide policy information from the PCF 135, 235 to the wireless device 100, 200. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100, 200 via non-3GPP access networks 265. As shown in example FIG. 5, the registration management, RM may be employed to register or de-register a wireless device 100, 200 with the network, and establish the user context in the network. Connection management may be employed to establish and release the signaling connection between the wireless device 100, 200 and the AMF 155, 255.

A wireless device 100, 200 may need to register with the network to receive services that require registration. The wireless device 100, 200 may update its registration with the network, for example, periodically, after the wireless device is registered, to remain reachable (e.g., periodic registration update), on mobility (e.g., mobility registration update), and/or to update its capabilities or re-negotiate protocol parameters. An initial registration procedure, such as in the examples shown in FIG. 8 and FIG. 9, may involve execution of network access control functions (e.g., user authentication and access authorization based on subscription profiles in UDM 140, 240). As result of the registration procedure, the identity of the serving AMF 155, 255 may be registered in UDM 140, 240. The registration management (RM) procedures may be applicable over both 3GPP access 105, 205 and non-3GPP access 265.

Figure 3:
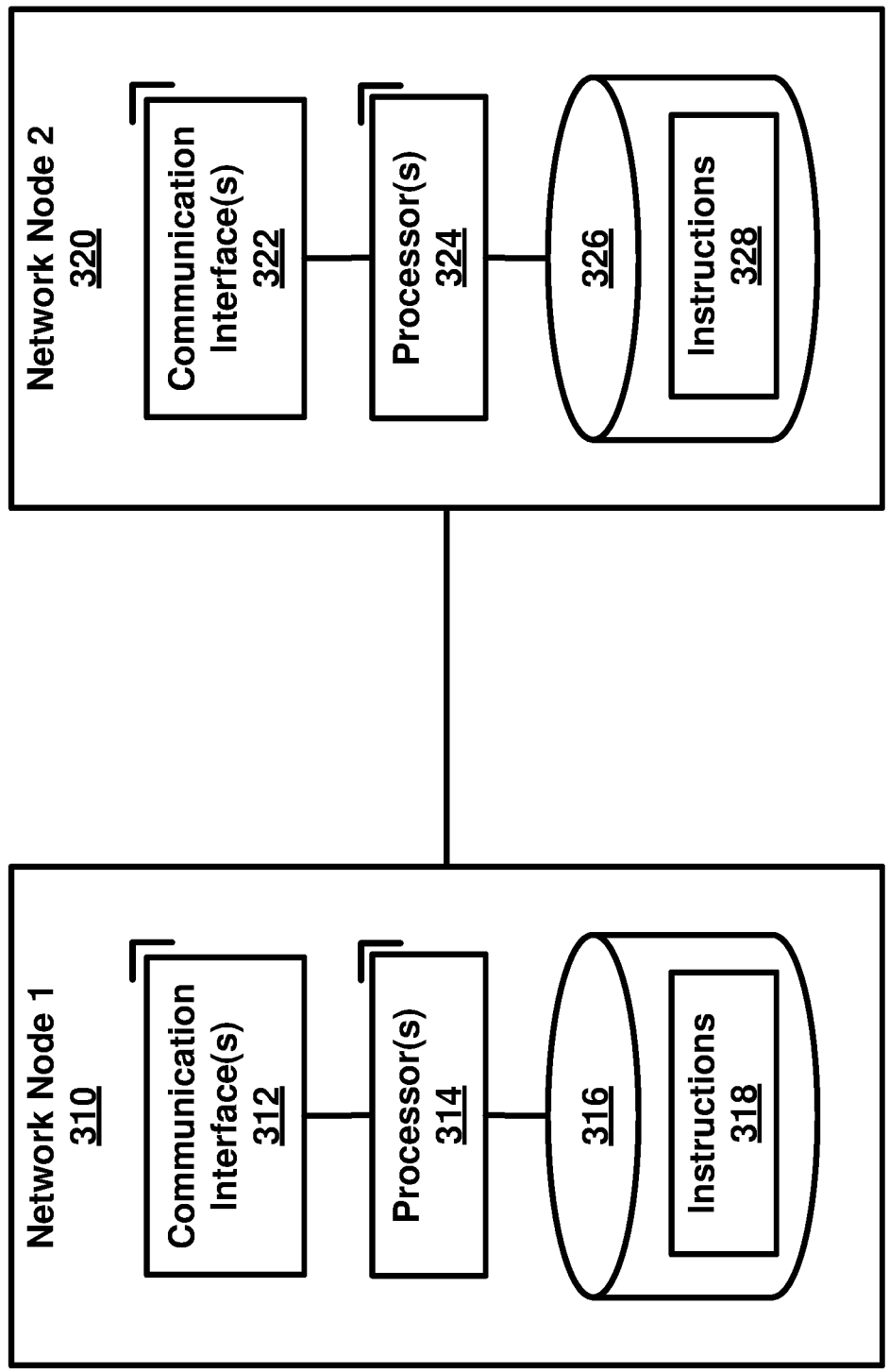
FIG. 3 shows an example of one or more network nodes.

FIG. 3 shows hardware elements of a first network node 310 (e.g., a wireless device) and a second network node 320 (e.g., a base station). A communication network may include at least one first network node 310 and at least one second network node 320. The first network node 310 may include one or more communication interface 312, one or more processors 314, and one or more sets of program code instructions 318 stored in non-transitory memory 316 and executable by the one or more processors 314. The second network node may include one or more communication interface 322, one or more processors 324, and one or more sets of program code instructions 328 stored in non-transitory memory 326 and executable by the one or more processors 324. A communication interface 312 in the first network node 310 may be configured to engage in communication with a communication interface 322 in the second network node 320, such as via a communication path that includes at least one wireless link. The wireless link may be a bi-directional link. The communication interface 322 in the second network node 320 may be configured to engage in communication with the communication interface 312 in the first network node 310. The first network node 310 and the second network node 320 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, and/or the like.

Figure 4A:
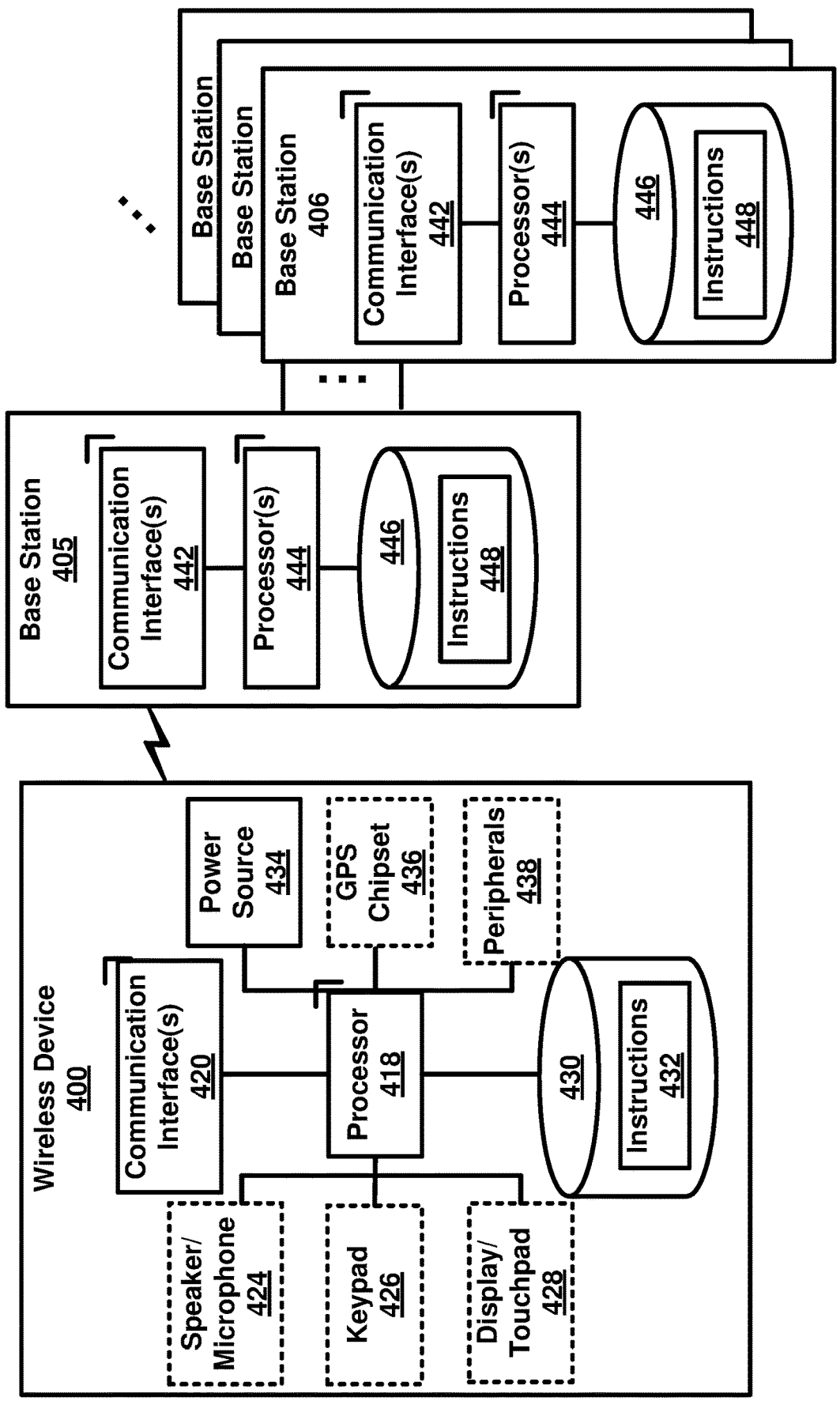
FIG. 4A shows an example of a wireless device and one or more base stations.
Figure 4B:
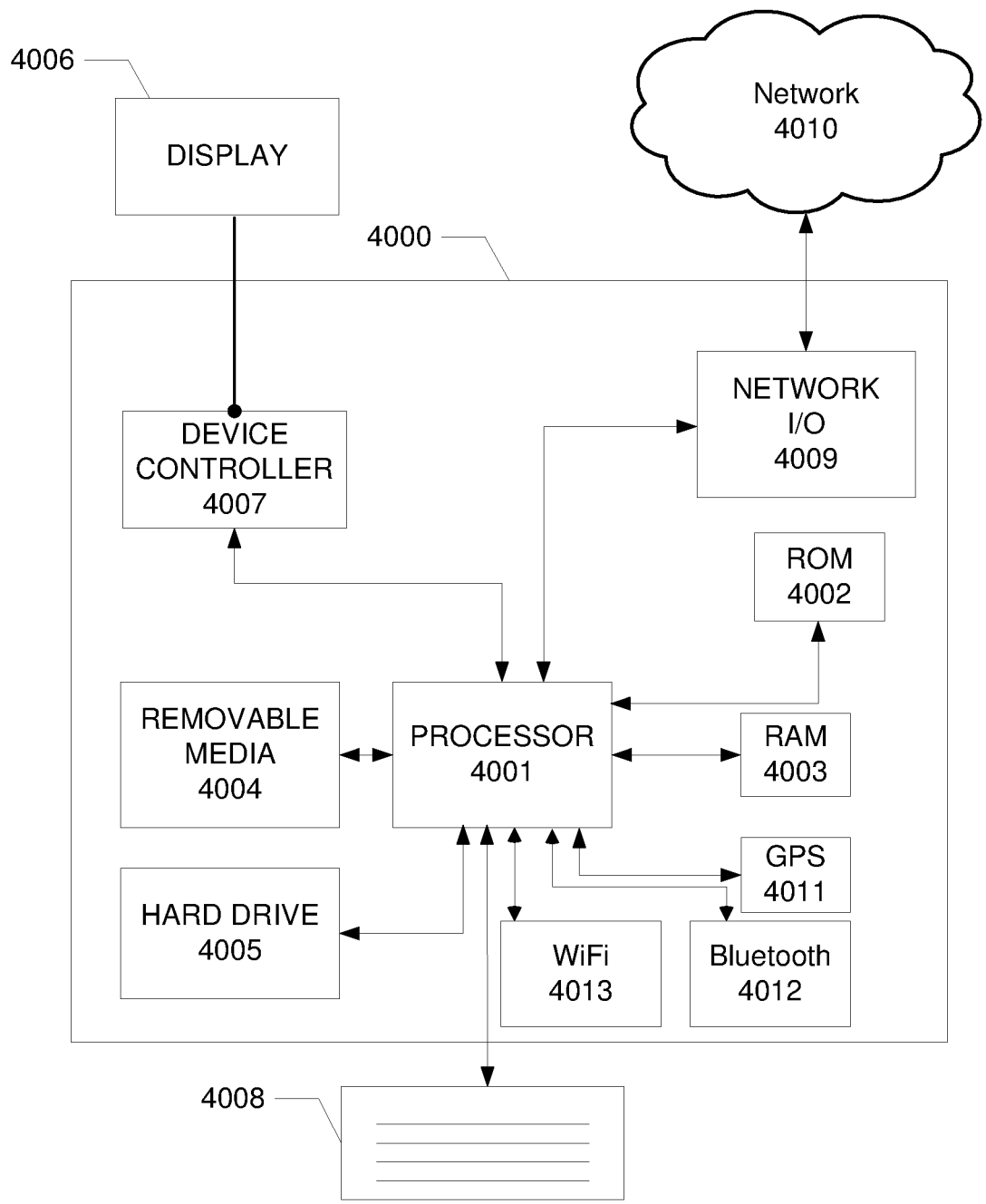
FIG. 4B shows example elements of computing devices that may be used to implement any of the various devices described herein.

Examples for radio technology implemented in the communication interfaces 312, 322 and the wireless link are shown in FIG. 3, FIGS. 4A, and 4B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals. Any reference to one or more of these terms/devices also considers use of any other term/device mentioned above.

The communications network may comprise Radio Access Network (RAN) architecture. The RAN architecture may comprise one or more RAN nodes that may be a next generation Node B (gNB) (e.g., 320) providing New Radio (NR) user plane and control plane protocol terminations towards a first network node (e.g., 310) such as a wireless device. A RAN node may be a next generation evolved Node B (ng-eNB), providing Evolved UMTS Terrestrial Radio Access (E-UTRA) user plane and control plane protocol terminations towards a second wireless device. A first network node 310 (e.g., a wireless device) may communicate with a base station (e.g., a gNB) over a Uu interface. A second wireless device may communicate with a base station (e.g., an ng-eNB) over a Uu interface. The second network node 320 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g., Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

FIG. 4A shows general hardware elements that may be used to implement any of the various computing devices discussed herein, including any base station, wireless device, or computing device. The computing device 400 (e.g., wireless device) may include one or more processors 418, which may execute instructions stored in memory, such as non-removable memory 430, removable memory 432 (such as a Universal Serial Bus (USB) drive, compact disk (CD) or digital versatile disk (DVD), or floppy disk drive), or any other desired storage medium. Instructions may also be stored in an attached (or internal) hard drive. The computing device 400 may also include a security processor (not shown), which may execute instructions of a one or more computer programs to monitor the processes executing on the processor 418 and any process that requests access to any hardware and/or software components of the computing device 400 (e.g., the non-removable memory 430, the removable memory 432, the hard drive, a device controller (e.g., a keypad 426, a display and/or touchpad 428, a speaker and/or microphone 424, and/or one or more peripherals 438), a transceiver 420, a network interface, a GPS 436 (e.g., a GPS chipset), a Bluetooth interface, a Wi-Fi interface, etc.). The computing device 400 may include one or more output devices, such as the display and/or touchpad 428 (e.g., a screen, a display device, a monitor, a television, etc.), and may include one or more output device controllers, such as a video processor. There may also be one or more user input devices, such as a remote control, keyboard, mouse, touch screen, microphone, etc., that may be configured, for example, as one or more of the peripherals 438. The computing device 400 may also include one or more network interfaces, such as a network interface, the may be a wired interface, a wireless interface such as the transceiver 420, or a combination of the two. The network interface may provide an interface for the computing device 400 to communicate (e.g., via wireless or wired communications) with a network (e.g., a RAN, or any other network). The network interface may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) chipset or microprocessor 436, which may be configured to receive and process global positioning signals and determine, with possible assistance from an external server and antenna, a geographic position of the computing device 400.

The wireless device 400 may communicate with a first base station 405 and/or one or more second base stations 406. The first base station 405 may comprise one or more of a communication interface 442, processor 444, memory 446, instructions 448, and/or any of element, including any element described above regarding the wireless device 400. The one or more second base stations 406 may comprise one or more of a communication interface 442, processor 444, memory 446, instructions 448, and/or any of element, including any element described above regarding the wireless device 400. The first base station 405 may communicate with the wireless device 400 and/or the one or more second base stations 406 via communication interface 442. The one or more second base stations 406 may communicate with the wireless device 400 and/or the first base station via communication interface 442.

FIG. 4B shows general hardware elements that may be used to implement any of the various computing devices discussed herein, including, e.g., the network node 310, the network node 320, the wireless device 400, the base station 405, the base stations 406, or any other network node, base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a Wi-Fi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The examples in FIGS. 4A and 4B are hardware configurations, although the components shown may be implemented as software as well. For example, modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 4. Some or all of the entities described herein may be software based, and may co-exist in a common physical platform (e.g., a requesting entity may be a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: abase station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 5A:
FIG. 5A and FIG. 5B show example registration management state transitions for a wireless device and an access and mobility management function (AMF).
Figure 5B:

FIG. 5A and FIG. 5B depict examples of the RM states of a wireless device, such as the wireless device 100, 200 as observed by the wireless device 100, 200 and AMF 155, 255. FIG. 5A shows RM state transition in the wireless device. Two RM states may be used in a wireless device 100, 200 (and possibly in the AMF 155, 255) that may reflect the registration status of the wireless device 100, 200 in the selected PLMN. The registration status of the wireless device 100, 200 in the selected PLMN may be RM-DEREGISTERED 500 or RM-REGISTERED 510. In the RM DEREGISTERED state 500, the wireless device 100, 200 may not be registered with a network. The wireless device 100, 200 context in AMF 155, 255 may not hold valid location or routing information for the wireless device 100, 200 so the wireless device 100, 200 may be not reachable by the AMF 155, 255. Some wireless device context may still be stored in the wireless device 100, 200 and the AMF 155, 255. In the RM REGISTERED state 510, the wireless device 100, 200 may be registered with the network. In the RM-REGISTERED 510 state, the wireless device 100, 200 may receive services that require registration with the network.

FIG. 5B shows RM state transitions in the AMF 155, 255. Two RM states may be used in the AMF 155, 255 for the wireless device 100, 200 that reflect the registration status of the wireless device 100, 200 in the selected PLMN. The two RM states that may be used in the AMF 155, 255 for the wireless device 100, 200 in the selected PLMN may be RM-DEREGISTERED 520 or RM-REGISTERED 530. The state of RM-DEREGISTERED 500 in the wireless device 100, 200 may correspond to the state of RM-DEREGISTERED 520 in the AMF 155, 255. The state of RM-REGISTERED 510 in the wireless device 100, 200 may correspond to the state of RM-REGISTERED 530 in the AMF 155, 255.

FIG. 6A and FIG. 6B depict examples of CM state transitions as observed by the wireless device 100 and AMF 155. Connection management CM may comprise the functions of establishing and releasing a signaling connection between a wireless device 100, 200 and the AMF 155, 255 over N1. This signaling connection may be used to provide NAS signaling exchange between the wireless device 100, 200 and a core network. The signaling connection may comprise both the AN signaling connection between the wireless device 100, 200 and/or the (R)AN 105, 205 (e.g., RRC connection over 3GPP access) and the N2 connection for this wireless device 100, 200 between the AN and the AMF 155, 255. FIG. 6A shows CM state transitions in the wireless device 100, 200. Two CM states may be used for the NAS signaling connectivity of the wireless device 100, 200 with the AMF 155, 255: CM-IDLE 600 and CM-CONNECTED 610. A wireless device 100, 200 in CM-IDLE 600 state may be in RM-REGISTERED 510 state that may have no NAS signaling connection established with the AMF 155, 255 over N1. The wireless device 100, 200 may perform cell selection, cell reselection, and PLMN selection. A wireless device 100, 200 in CM-CONNECTED 610 state may have a NAS signaling connection with the AMF 155, 255 over N1. RRC inactive state may apply to NG-RAN (e.g., it applies to NR and E-UTRA connected to 5G CN). The AMF 155, 255 may provide (e.g., based on network configuration) assistance information to the NG (R)AN 105, 205, for example, to assist the NG (R)AN's 105, 205 decision as to whether the wireless device 100, 200 may be sent to RRC inactive state. If a wireless device 100, 200 may be CM-CONNECTED 610 with RRC inactive state, the wireless device 100, 200 may resume the RRC connection (e.g., due to uplink data pending), may execute a mobile initiated signaling procedure (e.g., as a response to (R)AN 105, 205 paging), and/or notify the network that it has left the (R)AN 105, 205 notification area. NAS signaling connection management may comprise the functions of establishing and releasing a NAS signaling connection. NAS signaling connection establishment function may be provided by the wireless device 100, 200 and the AMF 155, 255 to establish a NAS signaling connection for a wireless device 100, 200 in CM-IDLE 600 state. The procedure of releasing a NAS signaling connection may be initiated by the 5G (R)AN 105, 205 node or the AMF 155, 255.

FIG. 6B shows CM state transitions in the AMF 155, 255. Two CM states may be used for a wireless device 100, 200 at the AMF 155, 255: CM-IDLE 620 and CM-CONNECTED 630. The state of CM-IDLE 600 in the wireless device 100, 200 may correspond to the state of CM-IDLE 620 in the AMF 155, 255. The state of CM-CONNECTED 610 in the wireless device 100, 200 may correspond to the state of CM-CONNECTED 630 in the AMF 155, 255. Reachability management of the wireless device 100, 200 may detect whether a wireless device 100, 200 may be reachable and/or provide the wireless device location (e.g., the access node in communication with the wireless device) for the network to reach the wireless device 100, 200. This may be done by paging wireless device 100, 200 and wireless device location tracking. The wireless device location tracking may comprise both wireless device registration area tracking and wireless device reachability tracking. Such functionalities may be either located at a 5GC (e.g., for a CM-IDLE 620 state) or an NG-RAN 105, 205 (e.g., for a CM-CONNECTED 630 state).

The wireless device 100, 200 and the AMF 155, 255 may negotiate wireless device 100, 200 reachability characteristics in CM-IDLE 600 and/or 620 states during registration and registration update procedures. A variety of wireless device reachability categories may be negotiated between a wireless device 100, 200 and an AMF 155, 255 for CM-IDLE 600 and/or 620 states, such as wireless device 100, 200 reachability providing mobile device terminated data. The wireless device 100, 200 may be CM-IDLE 600 mode and mobile initiated connection only (MICO) mode. The 5GC may support a PDU connectivity service that provides exchange of PDUs between a wireless device 100, 200 and a data network identified by a DNN. The PDU connectivity service may be supported via PDU sessions that may be established, for example, after request from the wireless device 100, 200.

A PDU session may support one or more PDU session types. PDU sessions may be established (e.g., after wireless device 100, 200 request), modified (e.g., after wireless device 100 and 5GC request) and released (e.g., after wireless device 100, 200 and 5GC request) using NAS SM signaling exchanged over N1 between the wireless device 100, 200 and the SMF 160, 260. The 5GC may be able to trigger a specific application in the wireless device 100 (e.g., after a request from an application server). If receiving that trigger message, the wireless device 100, 200 may pass it to the identified application in the wireless device 100, 200. The identified application in the wireless device 100, 200 may establish a PDU session to a specific DNN.

Figure 7:
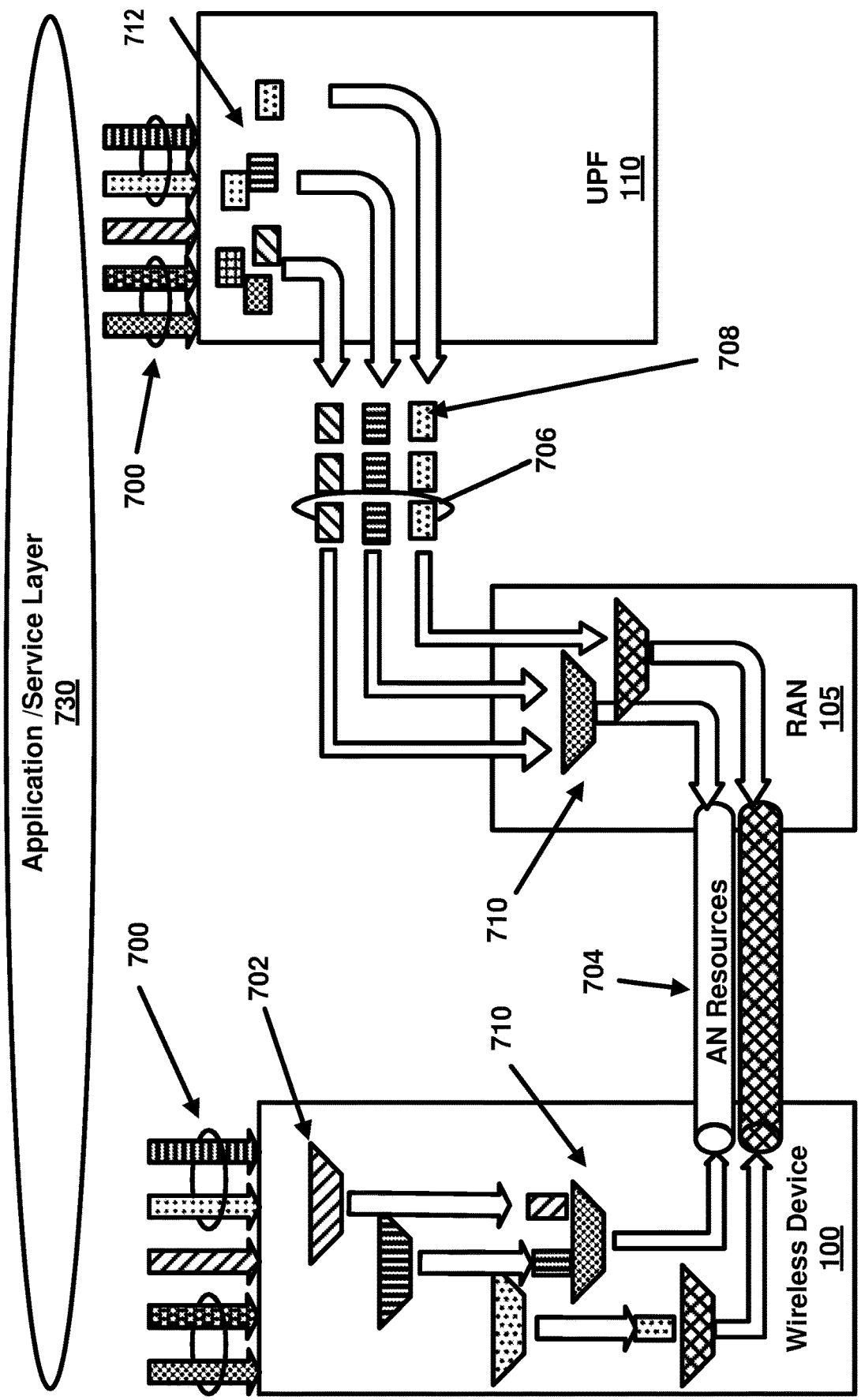
FIG. 7 shows an example for classification and marking traffic.

FIG. 7 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or an AF (e.g., the AF 145). QoS flow may be granular of QoS differentiation in a PDU session. A QoS Flow IDQFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 160, 260) may allocate the QFI for a QoS flow and may derive its QoS parameters from the information provided by the PCF. The SMF 160, 260 may provide the QFI together with the QoS profile containing the QoS parameters of a QoS flow to the (R)AN 710. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, and/or the like). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, and/or the like).

One or more devices (e.g., a 5GC) may support edge computing and may provide operators and/or third party services to be hosted close to the wireless device access point of attachment. The one or more devices (e.g., a 5GC) may select a UPF 110, 210 close to the wireless device 100, 200 and may execute the traffic steering from the UPF 110, 210 to the LADN via a N6 interface. This selecting a UPF 110, 210 close to the wireless device may be based on the wireless device subscription data, wireless device location, the information from application function AF 145, 245, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 110, 210 to route the user traffic to the LADN, traffic steering where the one or more devices (e.g., a 5GC) selects the traffic to be routed to the applications in the LADN, session and service continuity to provide wireless device 100, 200 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 105, 205, 5GC and a wireless device 100, 200, and/or the like. Provided NSSAI may be an NSSAI provided by a serving PLMN, for example, during a registration procedure, indicating the NSSAI provided by the network for the wireless device 100, 200 in the serving PLMN for the current registration area. A periodic registration update may be wireless device 100, 200 re-registration at expiry of a periodic registration timer. A requested NSSAI may be a NSSAI that the wireless device 100, 200 may provide to the network. A service-based interface may represent how a set of services may be provided/exposed by a given NF.

A PDU connectivity service may provide exchange of PDUs between a wireless device 100, 200 and a data network. PDU session may be an association between a wireless device 100 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session. For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 1 shows an example service-based representation, where network functions within the control plane may provide other authorized network functions to access their services.

This service-based representation shown in FIG. 1 may also comprise point-to-point reference points where necessary. FIG. 1 shows an example reference point representation, showing the interaction between the NF services in the network functions described by point-to-point reference point (e.g., N11) between any two network functions.

A network slice may comprise or be associated with the core network control plane and/or user plane network functions such as, for example, a 5G RAN, the N3IWF functions to the non-3GPP Access Network, and/or the like. Network slices may support differing features and/or network function implementations. An operator may deploy multiple network slice instances delivering the same features for different groups of wireless devices, to deliver different committed service, and/or because the network slice instances may be dedicated to an individual customer. The NSSF 120 may store the mapping information between a slice instance ID and an NF ID (and/or NF address).

A wireless device 100, 200 may simultaneously be served by one or more network slice instances via, for example, a 5G-AN. The wireless device 100, 200 may be served by k network slices (e.g., k=8, 16, etc.) at a time. An AMF 155, 255 instance serving the wireless device 100, 200 may belong to a network slice instance serving the wireless device 100.

A PDU session may belong to one specific network slice instance per PLMN. Different network slice instances may not share a PDU session. Different slices may have slice-specific PDU sessions using the same DNN, or different DNNs.

A Single Network Slice Selection Assistance Information (S-NSSAI) may indicate (e.g., identify) a network slice. An S-NSSAI may comprise a slice/service type (SST) and/or a slice differentiator (SD). The SST may refer to the expected network slice behavior in terms of features and services. An SD may be optional information that may complement the slice/service type(s), for example, to allow further differentiation for selecting a network slice instance from potentially multiple network slice instances that comply with the indicated slice/service type. The same network slice instance may be selected using different S-NSSAIs. The CN part of a network slice instance(s) serving a wireless 100, 200 may be selected by the CN.

Subscription data may include the S-NSSAI(s) of the network slices to which the wireless device 100, 200 may subscribe. One or more S-NSSAIs may be indicated (e.g., marked) as a default S-NSSAI. k S-NSSAI may be indicated (e.g., marked) as a default S-NSSAI (e.g., k=8, 16, etc.). The wireless device 100, 200 may subscribe to more than 8 S-NSSAIs, or up to or more than any other quantity of S-NSSAIs.

A wireless device 100, 200 may be configured, by the HPLMN, with a configured NSSAI per PLMN. The wireless device 100, 200 may obtain, from the AMF 155, an allowed NSSAI for a PLMN (which may include one or more S-NSSAIs), for example, based on or after successful completion of a wireless device's registration procedure.

The allowed NSSAI may take precedence over the configured NSSAI, for example, for a PLMN. The wireless device 100, 200 may use the S-NSSAIs in the allowed NSSAI corresponding to a network slice for the subsequent network slice selection related procedures in the serving PLMN. The establishment of user plane connectivity to a data network via a network slice instance(s) may comprise: performing an RM procedure to select an AMF 155, 255 that supports the required network slices, establishing one or more PDU sessions to the required data network via the network slice instance(s), and/or the like.

The wireless device 100, 200 may provide a requested NSSAI to the network in the RRC and NAS layer. The requested NSAAI may comprise the S-NSSAI(s) corresponding to the slice(s) to which the wireless device 100, 200 attempts to register, a temporary user ID if one was assigned to the wireless device 100, 200 and/or the like. The wireless device 100, 200 may provide the requested NSSA, for example, if the wireless device 100, 200 registers with a PLMN, and/or if the wireless device 100, 200 for the PLMN has a configured NSSAI or an allowed NSSAI. The requested NSSAI may be a configured-NSSAI, an allowed-NSSAI, and/or the like. The RAN 105, 205 may route NAS signaling to and/or from the wireless device 100, 200 to and/or from a default AMF 155, 255. The RAN 105, 205 may route NAS signaling to and/or from the wireless device 100, 200 to and/or from a default AMF 155, 255, for example, if a wireless device 100, 200 registers with a PLMN and does not have a configured NSSAI or allowed NSSAI for the PLMN.

The network may change the set of permitted network slice(s) to which the wireless device 100, 200 is registered. The network may change the set of permitted network slice(s) to which the wireless device 100, 200 is registered, for example, based on local policies, subscription changes, and/or wireless device 100, 200 mobility. The network may change the set of permitted network slice(s) for a registration procedure. The network may trigger a notification to be sent to the wireless device 100, notifying the wireless device 100 of the change of the supported network slices using an RM procedure (which may trigger a registration procedure). The network may provide the wireless device 100 with a new allowed NSSAI and tracking area list.

For a registration procedure in a PLMN, the AMF 155, 255 that first receives the registration request may redirect the registration request to another AMF 155, 255 via the RAN 105, 205 and/or via direct signaling between the initial AMF 155, 255 and the target AMF 155, 255. The AMF 155, 255 that first receives the registration request may redirect the registration request to another AMF 155, 255 via the RAN 105, 205 and/or via direct signaling between the initial AMF 155, 255 and the target AMF 155, 255, for example, if the network decides that the wireless device 100, 200 should be served by a different AMF 155, 255, for example, based on network slice(s) aspects. The network operator may provision the wireless device 100 with an NSSP. The NSSP may comprise one or more NSSP rules.

The wireless device 100, 200 may route the user data of the application in one or more of the PDU sessions. The wireless device 100, 200 may route the user data of the application in one or more of the PDU sessions, for example, if a wireless device 100, 200 has one or more established PDU sessions corresponding to a specific S-NSSAI, unless other conditions in the wireless device 100, 200 prohibit the use of the PDU sessions. The wireless device 100, 200 may consider the DNN to determine which PDU session to use if the application provides a DNN. The wireless device 100, 200 may request a new PDU session corresponding to the S-NSSAI. The wireless device 100, 200 may request a new PDU session corresponding to the S-NSSAI, for example, with the DNN that may be provided by the application, if the wireless device 100, 200 does not have a PDU session established with the specific S-NSSAI. The RAN 105, 205 may be aware of the network slices used by the wireless device 100, 200 in order for the RAN 105, 205 to select a proper resource for supporting network slicing in the RAN 105, 205.

An AMF 155, 255 may select an SMF 160, 260 in a network slice instance, for example, based on the S-NSSAI, DNN, and/or other information (e.g., wireless device 100, 200 subscription and local operator policies, and/or the like).

An AMF 155, 255 may select an SMF 160, 260 in a network slice instance based on the S-NSSAI, DNN, and/or other information, for example, if the wireless device 100, 200 triggers the establishment of a PDU session. The selected SMF 160, 260 may establish the PDU session based on the S-NSSAI and DNN.

The wireless device 100, 200 may or may not include the NSSAI in NAS signaling. The wireless device 100, 200 may not include the NSSAI in NAS signaling, for example, in order to support network-controlled privacy of slice information for the slices that the wireless device 100, 200 may access. The wireless device 100, 200 may not include the NSSAI in NAS signaling, for example, unless the wireless device 100, 200 has a NAS security context. The wireless device 100, 200 may not include NSSAI, for example, in unprotected RRC signaling. The wireless device 100, 200 may not include NSSAI, for example, if the wireless device 100, 200 is aware of or configured such that privacy considerations are used for the NSSAI.

Network slice specific network functions in VPLMN and HPLMN may be selected, for example, for a wireless device that may be roaming. The network slice specific network functions in VPLMN and HPLMN may be selected, for example, based on the S-NSSAI provided by the wireless device 100, 200 PDU connection establishment. Selection of slice specific NF instances may be performed by each PLMN or by one or more PLMNs. Selection of slice specific NF instances may be performed by a PLMN, for example, if a standardized S-NSSAI is used. Selection of slice specific NF instances may be performed by a PLMN, for example, based on the provided S-NSSAI. The VPLMN may map the S-NSSAI of HPLMN to a S-NSSAI of VPLMN, for example, based on a roaming agreement (e.g., including mapping to a default S-NSSAI of VPLMN). The selection of slice specific NF instance in a VPLMN may be, for example, based on the S-NSSAI of VPLMN. The selection of any slice specific NF instance in HPLMN may be, for example, based on the S-NSSAI of an HPLMN.

Figure 8:
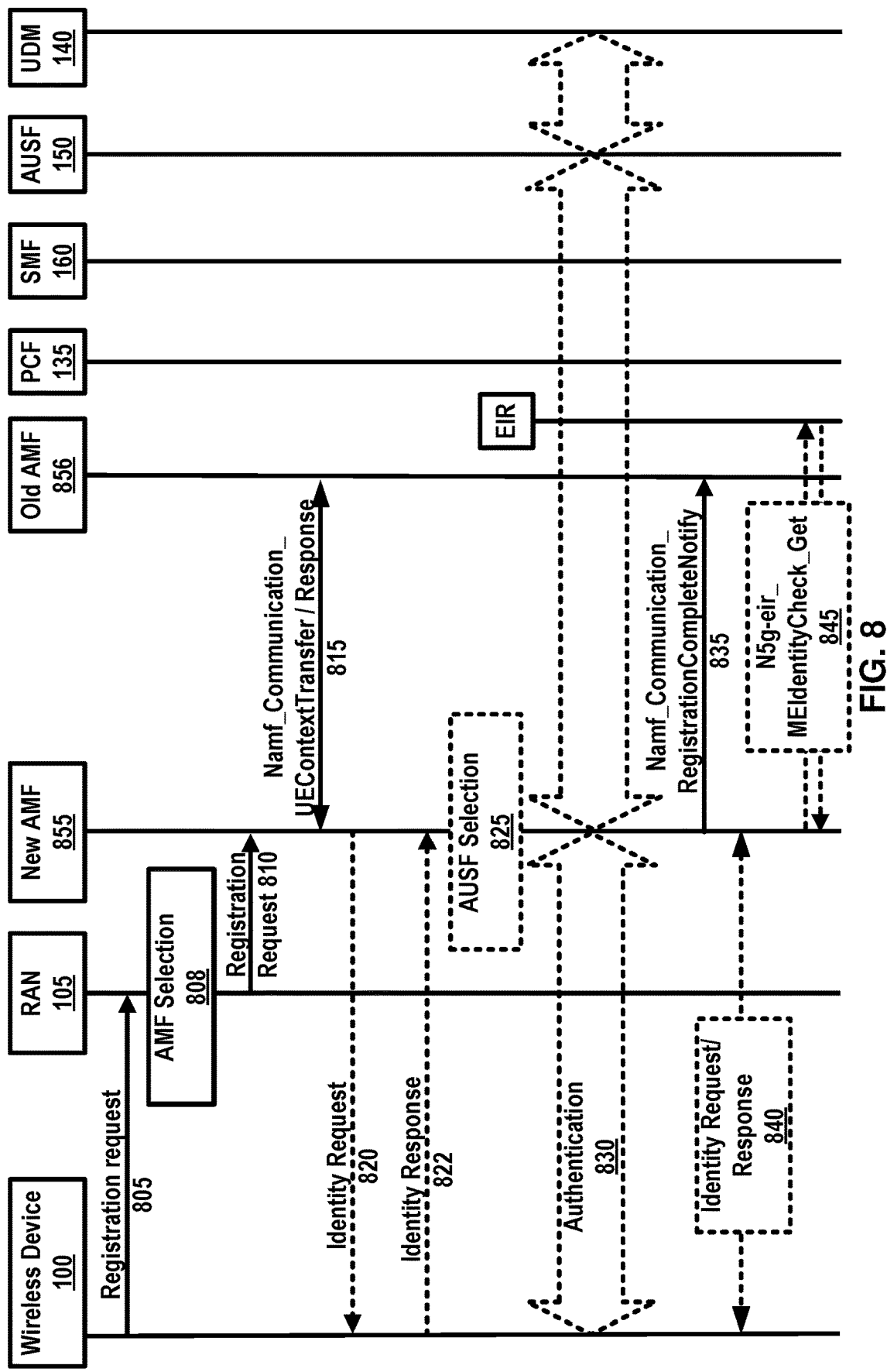
FIG. 8 shows examples of registration procedures.
Figure 9:
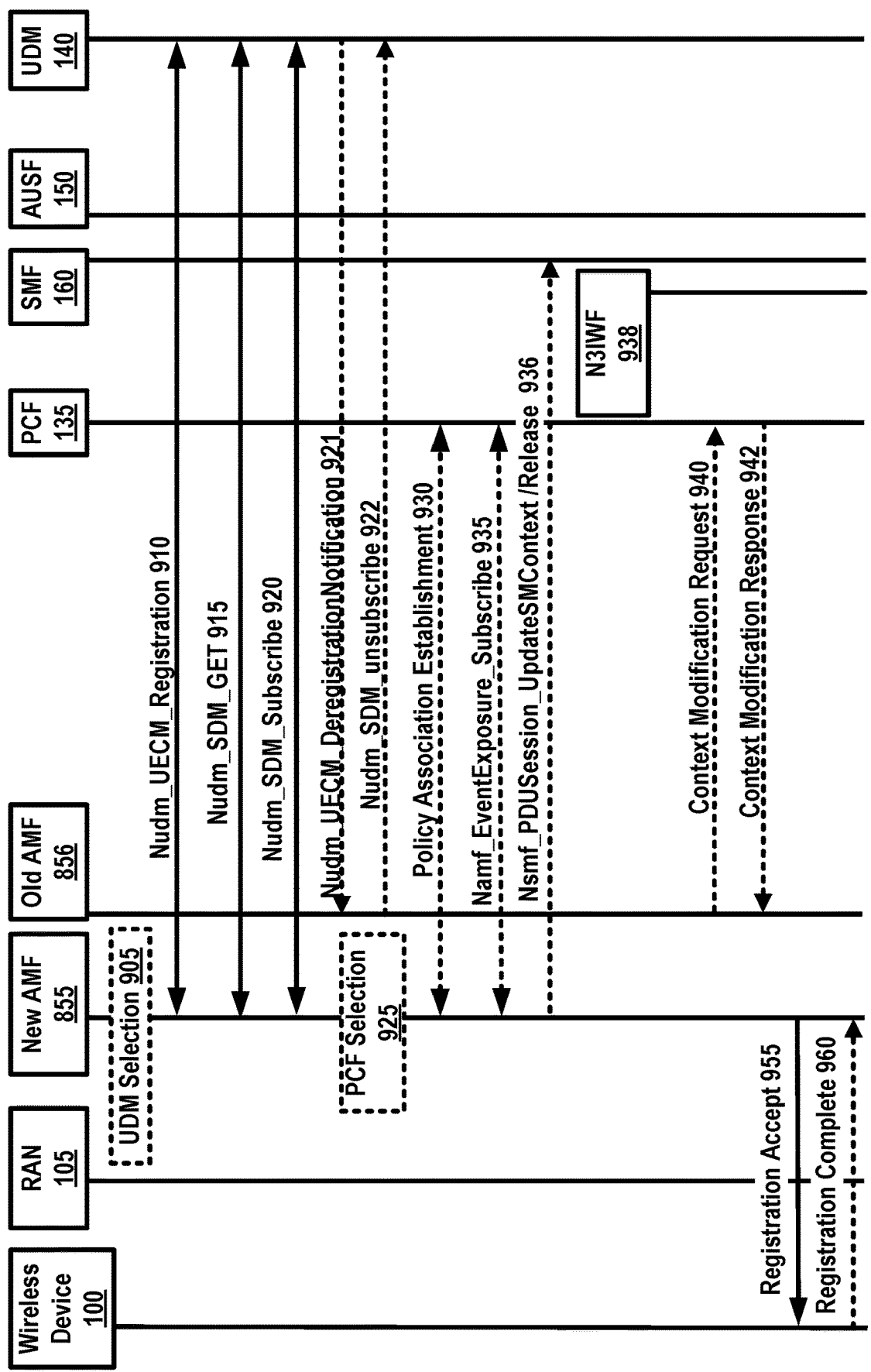
FIG. 9 shows a continuation of the example call flow for an initial registration procedure.

FIG. 8 and FIG. 9 show an example call flow for an initial registration procedure. The initial registration procedure may involve execution of network access control functions (e.g., user authentication and access authorization, which may be based on subscription profiles in UDM 140, 240). The identity of the serving AMF 155, 255 may be registered in a UDM 140, 240, for example, based on or as a result of the initial registration procedure. The RM procedures may be applicable for both a 3GPP access RAN 105, 205 and a non-3GPP access RAN 265.

As shown in FIG. 8 and FIG. 9, a registration procedure may be performed by the wireless device 100, 200. The registration procedure may be performed by the wireless device 100, 200, for example, to become authorized to receive services, to enable mobility tracking, to enable reachability, and/or the like. The wireless device 100, 200 may send a registration request message 805 to the RAN 105 (or 205). The registration request message 805 may comprise, for example, AN parameters and/or an RM-NAS registration request (e.g., registration type, SUCI or SUPI or GUTI (e.g., 5G-GUTI), last visited TAI (if available), security parameters, requested NSSAI, mapping of requested NSSAI, wireless device 5GC capability, PDU session status, PDU session(s) to be re-activated, follow on request, MICO mode preference, and/or the like), and/or the like. The AN parameters may include, for example, SUCI, SUPI, the GUTI (e.g., 5G-GUTI), the selected PLMN ID and requested NSSAI, and/or the like (e.g., for the RAN). The AN parameters may comprise an establishment cause. The establishment cause may provide a reason for requesting an establishment of an RRC connection. The registration type may indicate, for example, whether the wireless device 100 determines and/or requests to perform an initial registration (e.g., if the wireless device 100, 200 is in the RM-DEREGISTERED state), a mobility registration update (e.g., if the wireless device 100, 200 is in the RM-REGISTERED state and initiates a registration procedure, such as due to mobility), a periodic registration update (e.g., if the wireless device 100, 200 is in the RM-REGISTERED state and may initiate a registration procedure, such as due to the periodic registration update timer expiry) or an emergency registration (e.g., if the wireless device 100, 200 is in a limited service state).

The wireless device 100, 200 may include its SUCI or SUPI in the registration request. The wireless device 100, 200 may include its SUCI or SUPI in the registration request, for example, if the wireless device 100, 200 is performing an initial registration (e.g., if the wireless device 100 is in the RM-DEREGISTERED state) to a PLMN for which the wireless device 100, 200 does not already have a GUTI (e.g., 5G-GUTI). The SUCI may be included in the registration request, for example, if the home network has provisioned the public key to protect SUPI in the wireless device 100, 200. The wireless device 100, 200 may perform an initial registration. The wireless device 100, 200 may include the SUPI in a registration request message. The wireless device 100, 200 may include the SUPI in the registration request message, for example, if the wireless device 100, 200 receives a wireless device configuration update command indicating that the wireless device 100, 200 may be required to re-register and/or that the 5G-GUTI is invalid.

The SUPI may be included the registration request message, for example, for an emergency registration. The SUPI may be included for an emergency registration, for example, if the wireless device 100, 200 does not have a valid GUTI (e.g., 5G-GUTI) available. The PEI may be included for an emergency request, for example, if the wireless device 100, 20 has no SUPI and no valid GUTI (e.g., 5G-GUTI). The GUTI (e.g., 5G-GUTI) may be included and may indicate the old (e.g., last serving) AMF 856. The wireless device 100, 200 may not provide the GUTI (e.g., 5G-GUTI) allocated by the AMF 155, 255 over the 3GPP access, for example, during the registration procedure over the non-3GPP access. The wireless device 100, 200 may not provide the GUTI allocated by the AMF 155, 255, for example, if the wireless device 100 is already registered via a non-3GPP access in a PLMN different from the new PLMN (e.g., not the registered PLMN or a PLMN equivalent to the registered PLMN) of the 3GPP access. The wireless device 100, 200 may not provide access to the GUTI (e.g., 5G-GUTI) allocated by the AMF 155 over the non-3GPP during the registration procedure over the 3GPP access. The wireless device 100 may not provide access to the GUTI, for example, if the wireless device 100 is already registered via a 3GPP access in a PLMN (e.g., the registered PLMN) different from the new PLMN (e.g., not the registered PLMN or a PLMN equivalent to the registered PLMN) of the non-3GPP access. The wireless device 100, 200 may provide the wireless device's 100, 200 usage setting. The wireless device 100, 200 may provide the wireless device's 100, 200 usage setting, for example, based on its configuration.

The wireless device 100, 200 may include the mapping of requested NSSAI for initial registration or mobility registration updates. The mapping of requested NSSAI, for example, may comprise the mapping of each S-NSSAI of the requested NSSAI to the S-NSSAIs of the configured NSSAI for the HPLMN. The wireless device 100, 200 may include the mapping of requested NSSAI, for example, to ensure that the network is able to verify whether the S-NSSAI(s) in the requested NSSAI are permitted (e.g., based on the subscribed S-NSSAIs). The last visited TAI may be included in the mapping of requested NSSAI. The last visited TAI may be included in the mapping of requested NSSAI, for example, to help the AMF 155, 255 produce a registration area for the wireless device. Security parameters may be used for authentication and integrity protection. A requested NSSAI may indicate the network slice selection assistance information. The PDU session status may indicate the previously established PDU sessions in the wireless device 100, 200. The PDU session status may indicate the established PDU session of the current PLMN in the wireless device 100, 200. The PDU session status may indicate the established PDU session of the current PLMN in the wireless device 100, 200, for example, if the wireless device 100, 200 is connected to two AMF 155, 255 belonging to different PLMNs (e.g., via 3GPP access and via non-3GPP access). The PDU session(s) to be re-activated may be included, for example, to indicate the PDU session(s) for which the wireless device 100, 200 may intend to activate UP connections. A PDU session corresponding to an LADN may not be included in the PDU session(s) to be re-activated. The PDU session corresponding to a LADN may not be included in the PDU session(s) to be re-activated, for example, if the wireless device 100, 200 is outside the area of availability of the LADN. The follow-on request may be included, for example, if the wireless device 100, 200 has a pending uplink signaling that the wireless device 100, 200 does not include PDU session(s) to be re-activated, or if the registration type indicates the wireless device 100, 200 may want to perform an emergency registration.

The RAN 105, 205 may perform AMF selection 808. The RAN 105, 205 may perform AMF selection 808, for example, based on RAT and a requested NSSAI (e.g., if available). The RAN 105, 205 may perform AMF selection 808, for example, if an SUPI is included or if the GUTI (e.g., 5G-GUTI) does not indicate a valid AMF 155, 255. The RAN 105, 205 may forward the registration request message 810 to a new AMF 855. The RAN 105, 205 may forward the registration request message 810 to a new AMF 855, for example, on the N2 connection of the wireless device 100, 200 if the wireless device 100, 200 is in the CM-CONNECTED state. The RAN 105, 205 may forward the registration request 810 to the new AMF 855, which may have been configured to perform AMF selection 808. The RAN 105, 205 may forward the registration request 810 to the new AMF 855, for example, if the RAN 105, 205 does not select an appropriate new AMF 855.

The RAN 105, 205 may send an N2 registration request message 810 to the new AMF 855. The N2 registration request message 810, may comprise, for example, N2 parameters, RM-NAS registration request (e.g., registration type, SUPI or 5G-GUTI, last visited TAI (if available), security parameters, requested NSSAI, mapping of requested NSSAI, wireless device 5GC capability, PDU session status, PDU session(s) to be re-activated, follow on request, and MICO mode preference), and/or the like. The N2 parameters may comprise the selected PLMN ID, location information, cell identity, and the RAT type related to the cell in which the wireless device 100, 200 is communicating (e.g., camping on) for example, if the RAN 105, 205 is used. The N2 parameters may comprise the establishment cause. The N2 parameters may comprise the establishment cause, for example, if the RAN 105, 205 is used.

A new AMF 855 may send, to the old AMF 856, complete registration request (e.g., an Namf_Communication_UE-ContextTransfer) 815. The new AMF 855 may invoke an operation (e.g., the Namf_Communication_UEContext-Transfer 815 service operation) on the old AMF 856. The new AMF 855 may invoke an operation (e.g., the Namf_Communication_UEContextTransfer 815 service operation) on the old AMF 856 (which may include the complete registration request IE), for example, if the wireless device's GUTI (e.g., 5G-GUTI) is included in the registration request and the serving AMF 155, 255 has changed since last registration procedure. The complete registration request IE may be integrity protected. The new AMF 855 may invoke the operation (e.g., the Namf_Communication_UEContextTransfer 815 service operation) on the old AMF 856, for example, to request the wireless device's 100 SUPI and MM Context. The old AMF 856 may use the integrity protected complete registration request IE, for example, to verify whether the context transfer service operation invocation corresponds to the wireless device 100, 200 requested. The old AMF 856 may transfer the event subscriptions information by each NF consumer, for the wireless device 100, 200, to the new AMF 855. The SUPI request may or may not be skipped. The SUPI request may be skipped, for example, if the wireless device 100, 200 indicates (e.g., identifies) itself with PEI.

The old AMF 856 may send, to the new AMF 855, a response 815 to the transfer message (e.g., Namf_Communication_UEContextTransfer). The response 815 may comprise, for example, SUPI, MM context, SMF 160 information, and/or a PCF ID). The old AMF 856 may respond, to the new AMF 855, based on an operation (e.g., Namf_Communication_UEContextTransfer invocation). The old AMF 856 may respond to the new AMF 855, for example, by including the wireless device's SUPI and/or MM context. The old AMF 856 may include SMF 160, 260 information which may comprise, for example, S-NSSAI(s), SMF 160, 260 identities, and/or a PDU session ID (e.g., if the old AMF 856 has information about established PDU sessions). The old AMF 856 may have information about the NGAP wireless device-TNLA bindings. The old AMF 856 may include information about the NGAP wireless device-TNLA bindings in one or more messages, for example, if the old AMF 856 has information about active NGAP wireless device-TNLA bindings to the N3IWF 270.

The identity request procedure 820 may be initiated, for example, by the new AMF 855 sending an identity request message 820 to the wireless device 100, 200 from the SUCI. The identity request message 820 may be initiated, for example, if the SUPI has not been provided by the wireless device 100, 200 and/or if the SUPI has not been retrieved from the old AMF 856. The wireless device 100, 200 may respond, to the identity request message 820 (e.g., identity request procedure), with an identity response message 822. The identity response message 822 may include the SUCI. The wireless device 100, 200 may determine (e.g., derive) the SUCI, for example, by using the provisioned public key of the HPLMN.

The new AMF 855 may determine to initiate an AUSF selection 825. The AUSF selection 825 may be to initiate the wireless device authentication 830 (e.g., wireless device security). The new AMF 855 may initiate the AUSF selection 825, for example, by invoking an AUSF 150, 250. The new AMF 855 may select an AUSF 150, 250, for example, based on the SUPI and/or the SUCI. The new AMF 855 may perform or skip the authentication 830 and/or the security setup. The new AMF 855 may accept that the authentication 830 may fail and continue the registration procedure. The new AMF 855 may accept that the authentication 830 may fail and continue the registration procedure, for example, if the new AMF 855 is configured to support emergency registration for unauthenticated SUPIs. The new AMF 855 may accept that the authentication 830 may fail and continue the registration procedure, for example, if the wireless device 100, 200 indicates that the registration type is an emergency registration.

The authentication 830 may be performed by the Nudm_UEAuthenticate_Get operation. The AUSF 150 may discover a UDM 140, 240. The AUSF 150 may return the SUPI to the new AMF 855, for example, after the authentication 830 is successful. The AUSF 150, 250 may return the SUPI to the new AMF 855 after the authentication 830 is successful, for example, if the new AMF 855 provides a SUCI to AUSF 150, 250. The new AMF 855 may determine whether the registration request must/should be rerouted (e.g., rerouted from the AMF 155 operating as an initial AMF), for example, if network slicing is used. The new AMF 855 may initiate NAS security functions. The new AMF 855 may initiate an NGAP procedure. The initiation may, for example, enable an AN (e.g., 5G-AN) to use the NGAP procedure for securing procedures with the wireless device 100 upon completion of a NAS security function setup. The AN (e.g., 5G-AN) may store the security context. The AN may acknowledge completion of the NAS security function setup to the AMF 155, 255. The AN (e.g., 5G-AN) may use the security context, for example, to protect the messages exchanged with the wireless device 100, 200.

A new AMF 855 may send Namf_Communication_RegistrationCompleteNotify 835 to the old AMF 856. The new AMF 855 may notify the old AMF 856 that the registration of the wireless device 100, 200 in the new AMF 855 is completed. The new AMF 855 may notify the old AMF 856 that the registration of the wireless device 100, 200 in the new AMF 855 is completed (e.g., if the new AMF 855 has changed) by invoking the Namf_Communication_RegistrationCompleteNotify service operation. The registration may be rejected. The new AMF 855 may invoke the Namf_Communication_RegistrationCompleteNotify 835 service operation, for example, if the registration is rejected. The new AMF 855 may send a reject indication reason code to the old AMF 856. The old AMF 856 may continue as if the wireless device context transfer service operation was never received. The old AMF 856 may continue as if the wireless device context transfer service operation was never received, for example, if the authentication/security procedure fails. The new AMF 855 may determine which (if any) of one or more PDU sessions may not be supported in the new registration area. The new AMF 855 may determine which (if any) of one or more PDU sessions may not be supported in the new registration area, for example, if one or more of the S-NSSAIs used in the old registration area are not served in the target registration area. The new AMF 855 may invoke the Namf_Communication_RegistrationCompleteNotify 835 service operation, which may include the rejected PDU session ID and/or a reject cause (e.g., the S-NSSAI becomes no longer available) in one or more messages to the old AMF 856. The new AMF 855 may modify the PDU session status. The old AMF 856 may inform one or more SMFs (e.g., the corresponding SMF 160) to locally release the wireless device's SM context, for example, by invoking the Nsmf_PDUSession_ReleaseSMContext service operation.

The new AMF 855 may send an identity request/response 840 (e.g., PEI) to the wireless device 100, 200. An identity request procedure may be initiated by the new AMF 855. The identity request procedure may be initiated by the new AMF 855, for example, by sending an identity request message 840 to the wireless device 100 to retrieve the PEI (e.g., if the PEI was not provided by the wireless device 100, 200 and/or if the PEI was not retrieved from the old AMF 856). The PEI may be encrypted for transfer, unless, for example, the wireless device 100, 200 performs emergency registration and is not authenticated. The wireless device 100, 200 may include the PEI in the registration request for an emergency registration. The new AMF 855 may initiate ME identity check. The new AMF 855 may initiate ME identity check, for example, by invoking an N5g-eir_EquipmentIdentityCheck_Get service operation 845 (e.g., with an Equipment Identity Register (EIR)).

As shown in FIG. 9, the new AMF 855 (e.g., based on the SUPI) may perform UDM selection 905 to select a UDM 140, 240. The UDM 140, 240 may select a UDR instance. The new AMF 855 may register with the UDM 140, 240. The new AMF 855 may register with the UDM 140, for example, by using a Nudm_UECM_Registration 910. The new AMF 855 may subscribe to be notified if the UDM 140, 240 deregisters the AMF 155, 255, if the AMF 155, 255 has changed since the last registration procedure, if the wireless device 100, 200 provides a SUPI which may not refer to a valid context in the AMF 155, 255, and/or if the wireless device 100, 200 registers to the same AMF 155, 255 that it has already registered to a non-3GPP access (e.g., the wireless device 100, 200 is registered over a non-3GPP access and may initiate the registration procedure to add a 3GPP access).

The UDM 140, 240 may store the AMF 155, 255 identity associated with a first access type and may not remove the AMF 155, 255 identity associated with one or more second access types. The UDM 140, 240 may store information provided at registration in UDR with Nudr_UDM_Update. The AMF 155, 255 may retrieve the access and mobility subscription data and SMF 160, 260 selection subscription data, for example, by using Nudm_SDM_Get 915. The UDM 140, 240 may retrieve the access and mobility subscription data and SMF 160, 260 selection subscription data information from UDR, for example, with Nudr_UDM_Query. The AMF 155, 255 may subscribe to be notified based on a successful response and/or after a successful response is received. The AMF 155, 255 may subscribe to be notified based on a successful response and/or after a successful response is received, for example, if the data requested is modified using Nudm_SDM_Subscribe 920. The UDM 140, 240 may subscribe to UDR, for example, by using Nudr_UDM_Subscribe 920. The GPSI may be provided to the new AMF 855 in the subscription data from the UDM 140, 240. The GPSI may be provided in the subscription data from the UDM 140, 240, for example, if the GPSI is available in the wireless device 100, 200 subscription data. The new AMF 855 may provide the access type it serves for the wireless device 100 to the UDM 140. The access type may, for example, be set to 3GPP access. The UDM 140 may store the associated access type together with the serving AMF 155 in UDR, for example, with Nudr_UDM_Update. The new AMF 855 may create an MM context for the wireless device 100, 200. The new AMF 855 may create an MM context for the wireless device 100, 200, for example, in response to getting the mobility subscription data from the UDM 140, 240. The UDM 140, 240 may initiate Nudm_UECM_DeregistrationNotification 921 to the old AMF 856, corresponding to 3GPP, access. The UDM 140, 240 may initiate Nudm_UECM_DeregistrationNotification 921, for example, if the UDM 140, 240 stores the associated access type together with the serving AMF 155, 255. The old AMF 856 may remove the MM context of the wireless device 100, 200. The old AMF 856 may invoke a Namf_EventExposure_Notify service operation, for example, by sending one or more messages to the associated SMFs 160, 260 of the wireless device 100, 200. The old AMF 856 may invoke the service operation, for example, to notify the associated SMFs 160, 260 that the wireless device 100, 200 is deregistered from the old AMF 856. The SMF 160, 260 may release the PDU session(s). The SMF 160, 260 may release the PDU session(s), for example, based on the notification, if the serving NF removal reason indicated by the UDM 140, 240 is initial registration. The old AMF 856 may unsubscribe with the UDM 140, 240 for subscription data, for example, by using Nudm_SDM_unsubscribe 922.

The new AMF 855 may select 925 a PCF 135, 235. The new AMF 855 may select 925 a PCF 135, 235, for example, if the AMF 155, 255 determines to initiate PCF 135, 235 communication (e.g., the new AMF 855 has not yet obtained access and mobility policy for the wireless device 100, 200 and/or if the access and mobility policy in the new AMF 855 is no longer valid). The new AMF 855 may select the (V-)PCF identified by the PCF ID. The new AMF 855 may select the (V-)PCF identified by the PCF ID, for example, if the new AMF 855 receives a PCF ID from the old AMF 856 and successfully contacts the PCF 135, 235 indicated (e.g., identified) by the PCF ID. The new AMF 855 may select 925 a PCF 135, 235. The new AMF 855 may select 925 a PCF 135, 235, for example, if the PCF 135, 235 indicated (e.g., identified) by the PCF ID is not used (e.g., no response from the PCF 135 is received) and/or if there is no PCF ID received from the old AMF 856.

The new AMF 855 may perform a policy association establishment 930. The new AMF 855 may perform the policy association establishment 930, for example, during registration procedure. The new AMF 855 may include the PCF-ID in a Npcf_AMPolicyControl Get operation for the policy association establishment 930. The new AMF 855 may include the PCF-ID in the Npcf_AMPolicyControl Get operation, for example, if the new AMF 855 communicates with or contacts the PCF 135, 235 indicated (e.g., identified) by the (V-)PCF ID received, for example, during inter-AMF mobility. The PCF 135, 235 may provide the updated mobility restrictions to the new AMF 855. The PCF 135, 235 may provide the updated mobility restrictions to the new AMF 855, for example, if the AMF 155, 255 notifies the mobility restrictions (e.g., wireless device 100, 200 location) to the PCF 135, 235 for adjustment, or if the PCF 135, 235 updates the mobility restrictions itself due to some conditions (e.g., application in use, time and date). The PCF 135, 235 may invoke Namf_EventExposure_Subscribe 935 service operation for the wireless device 100, 200 event subscription.

The new AMF 855 may send, to the SMF 160, 260 an Nsmf_PDUSession_UpdateSMContext 936. The new AMF 855 may invoke the Nsmf_PDUSession_UpdateSMContext 936. The new AMF 855 may invoke the Nsmf_PDUSession_UpdateSMContext 936, for example, if the PDU session(s) to be re-activated is included in the registration request. The new AMF 855 may send the Nsmf_PDUSession_UpdateSMContext 936 request to the SMF(s) 160 associated with the PDU session(s). The new AMF 855 may send the Nsmf_PDUSession_UpdateSMContext 936 request, for example, to activate user plane connections of the PDU session(s). The SMF 160, 260 may decide to trigger (e.g., the intermediate UPF 110, 210 insertion) removal or change of PSA. The procedure may be performed without N11 and N2 interactions. The procedure may be performed without N11 and N2 interactions, for example, to update the N3 user plane between the RAN 105, 205 and the CN (e.g., 5GC) if the intermediate UPF 110, 210 insertion, removal, and/or relocation is performed for the PDU session(s) that is/are not included in PDU session(s) to be re-activated. The new AMF 855 may invoke the Nsmf_PDUSession_ReleaseSMContext 936 service operation towards the SMF 160, 260 (e.g., by sending one or more messages to the SMF 160, 260). The new AMF 855 may invoke the Nsmf_PDUSession_ReleaseSMContext 936 service operation, for example, if any PDU session status indicates that it is released at the wireless device 100, 200. The new AMF 855 may invoke the Nsmf_PDUSession_ReleaseSMContext 936 service operation towards the SMF 160, 260 (e.g., by sending one or more messages to the SMF 160, 260). The new AMF 855 may invoke the Nsmf_PDUSession_ReleaseSMContext 936 service operation, for example, in order to release any network resources related to the PDU session.

The new AMF 855 may send a wireless device Context Modification Request 940 to a N3IWF 938. The new AMF 855 may create an NGAP wireless device association, towards the N3IWF 938 to which the wireless device 100, 200 is connected (e.g., by sending one or more messages to the N3IWF 938). The new AMF 855 may create the NGAP wireless device association, for example, if the AMF 155, 255 has changed. The N3IWF 938 may respond to the new AMF 855, for example, with a wireless device Context Modification Response 942.

The new AMF 855 may send, to the wireless device 100, 200, a registration accept message 955. The registration accept message 955 may comprise, for example, GUTI (e.g., 5G-GUTI), registration area, mobility restrictions, PDU session status, allowed NSSAI (or mapping of allowed NSSAI), periodic registration update timer, LADN information and accepted MICO mode, IMS voice over PS session supported indication, emergency service support indicator, and/or the like. The new AMF 855 may send the registration accept message 955, for example, to the wireless device 100, 200. The registration accept message 955 may, for example, indicate that the registration request has been accepted. The registration accept message 955 may include GUTI (e.g., 5G-GUTI), for example, if the new AMF 855 allocates a new GUTI (e.g., 5G-GUTI). The new AMF 855 may send the registration area to the wireless device 100, 200. The new AMF 855 may send the registration area, for example, via a registration accept message 955 if, for example, the new AMF 855 allocates a new registration area. The wireless device 100, 200 may determine that the old registration area is valid or consider the old registration area to be valid. The wireless device 100, 200 may determine that the old registration area is valid (or consider the old registration area to be valid), for example, if there is no registration area included in the registration accept message. Mobility restrictions may be included in the registration accept message 955. Mobility restrictions may be included in the registration accept message 955, for example if mobility restrictions are used for the wireless device 100, 200 and if the registration type is not an emergency registration.

The new AMF 855 may indicate the established PDU sessions to the wireless device 100, 200, for example, in the PDU session status. The wireless device 100, 200 may locally remove internal resources related to PDU sessions. The wireless device 100, 200 may locally remove internal resources related to PDU sessions, for example, that are not marked as established in the received PDU session status. The wireless device 100, 200 may locally remove internal resources related to the PDU session of the current PLMN that are not marked as established in received PDU session status. The wireless device 100, 200 may locally remove internal resources related to the PDU session of the current PLMN that are not marked as established in received PDU session status, for example, if the wireless device 100, 200 is connected to the two AMFs 155, 255 belonging to different PLMN via 3GPP access and non-3GPP access. The new AMF 855 may indicate the PDU session status to the wireless device 100, 200. The new AMF 855 may indicate the PDU session status to the wireless device 100, 200, for example, if the PDU session status information is in the registration request. The mapping of the allowed NSSAI may be, for example, the mapping of each S-NSSAI of the allowed NSSAI to the S-NSSAIs of the configured NSSAI for the HPLMN. The new AMF 855 may include, in the registration accept message 955, the LADN information for LADNs that are or may be available within the registration area determined by the new AMF 855 for the wireless device 100, 200. The new AMF 855 may indicate whether MICO mode may be used. The new AMF 855 may indicate whether MICO mode may be used, for example, if the wireless device 100, 200 includes MICO mode in the request. The new AMF 855 may set the IMS voice over PS session supported indication. The new AMF 855 may perform a wireless device/RAN radio information and compatibility request procedure. The new AMF 855 may perform a wireless device/RAN radio information and compatibility request procedure, for example, to check the compatibility of the wireless device 100, 200 and RAN radio capabilities related to IMS voice over PS to set the IMS voice over PS session supported indication. The emergency service support indicator may inform the wireless device 100, 200 that emergency services are supported (e.g., the wireless device 100, 200 may request PDU session for emergency services.) The handover restriction list and wireless device-AMBR may be provided, to RAN 105, 205, by the new AMF 855.

The wireless device 100, 200 may send a registration complete message 960 to the new AMF 855. The wireless device 100, 200 may send the registration complete message 960 to the new AMF 855, for example, to acknowledge that a new GUTI (e.g., 5G-GUTI) has been assigned. The new AMF 855 may release the signaling connection with the wireless device 100, 200. The new AMF 855 may release the signaling connection with the wireless device 100, 200, for example, if information about the PDU session(s) to be re-activated is not included in the registration request. The new AMF 855 may not release the signaling connection after the completion of the registration procedure. The new AMF 855 may not release the signaling connection after the completion of the registration procedure, for example, if the follow-on request is included in the registration request. The new AMF 855 may not release the signaling connection after the completion of the registration procedure, for example, if the new AMF 855 is aware that some signaling is pending in the new AMF 855 or between the wireless device 100, 200 and the CN (e.g., 5GC).

Figure 10:
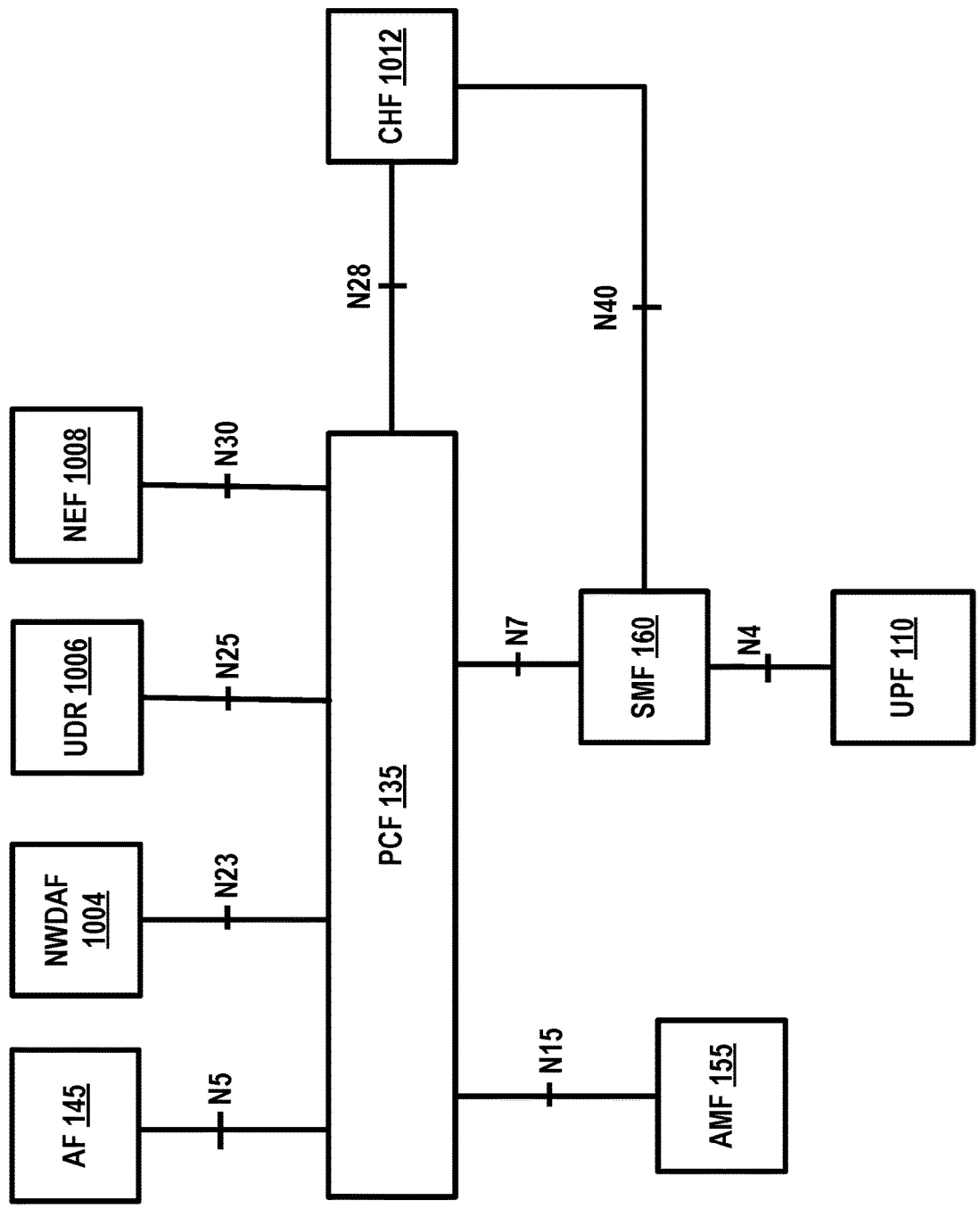
FIG. 10 shows an example policy and charging control system architecture.

FIG. 10 shows an example communication architecture. The example communication architecture may be a policy and charging control system architecture. The example communication architecture may comprise an architecture for an access technology (e.g., any 3GPP access technology, such as 5G access technology; any non-3GPP access technology; or any other access technology etc.). The architecture may comprise one or more of: PCF 135, SMF 160, UPF 110, AMF 155, NEF 1008, NWDAF 1004, CHF 1012, AF 145, and UDR 1006. The CHF 1012 may support charging methods corresponding to one or more of: offline charging, online charging, and/or converged charging. Offline charging may comprise collecting charging information for network resource usage concurrently with that resource usage. Charging data record (CDR) files may be generated by the network. CDR files may be transferred to a network operator's billing domain (BD) for subscriber billing, inter-operator accounting, collection of statistics, and/or other functions. The BD may comprise post-processing systems (e.g., operator's billing systems and/or billing mediation devices). Charging information corresponding to offline charging may (or may not) affect, in real-time (or near real-time), the services being rendered.

Online charging may comprise collecting charging information for network resource usage concurrently with the resource usage. The network may obtain/receive authorization for the network resource usage prior to actual resource usage. The charging information utilized in online charging may (or may not) be identical (or substantially identical) to the charging information utilized in offline charging. Charging information corresponding to online charging may affect, in real-time (or near real-time), the services being rendered. A charging mechanism using online charging may require direct interaction with network control functionalities. Converged charging may comprise a combination of online charging and offline charging.

Figure 11:
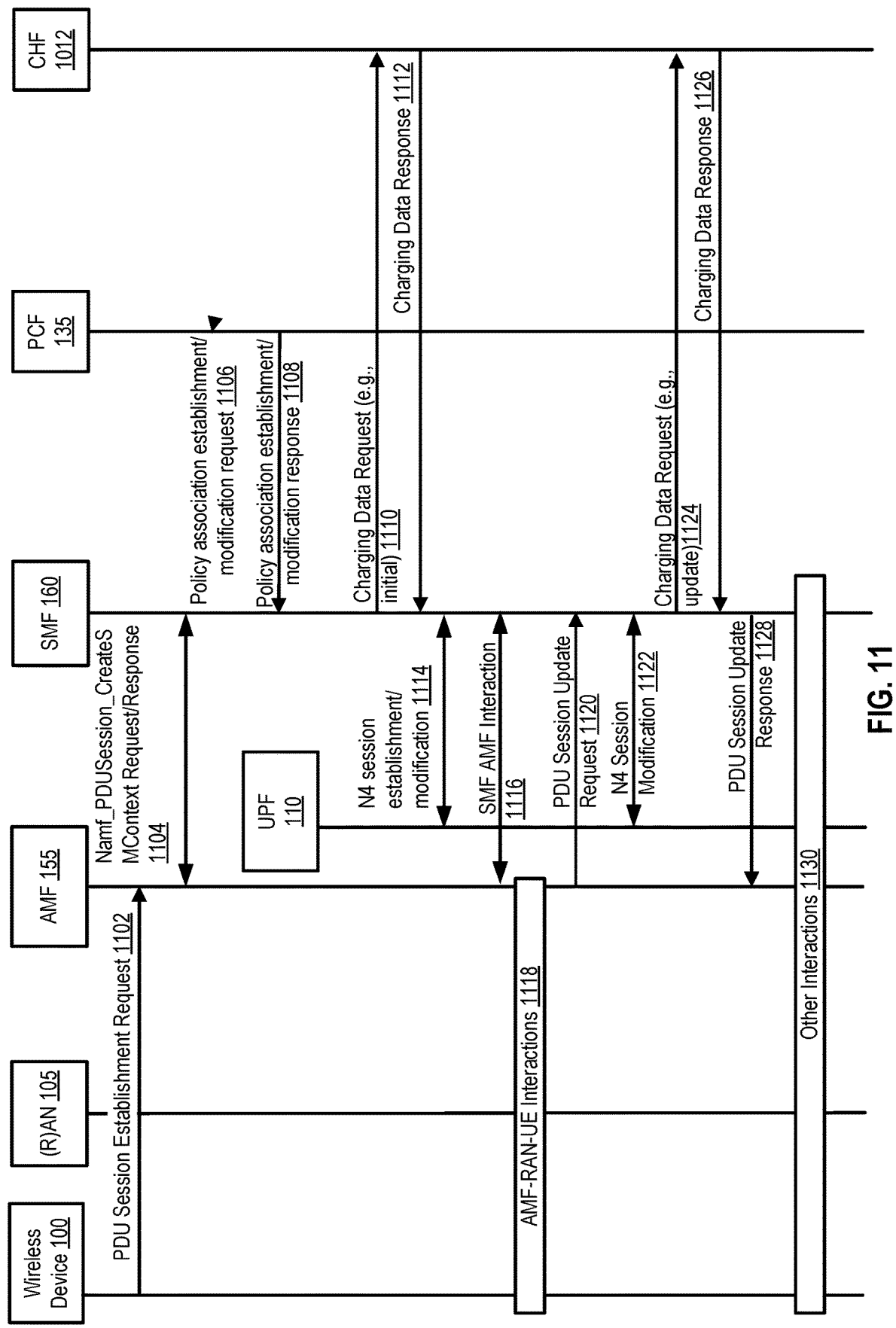
FIG. 11 shows an example call flow for packet data unit (PDU) session establishment and charging.

FIG. 11 shows an example call flow for PDU session establishment and charging. The wireless device 100 may invoke a PDU session establishment procedure, for example, by sending a PDU session establishment request message 1102 to the AMF 155, 255. The PDU session establishment request message 1102 may comprise one or more of: a PDU session indicator/ID, a PDU type, an SSC mode, user location information, and/or access technology type information.

The AMF 155 may select the SMF 160, for example, based on receiving the PDU session establishment request message 1102. The AMF 155 and the SMF 160 may exchange messages (e.g., Namf_PDUSession_CreateSMContext request/response messages 1104). The AMF 155 may send, to the selected SMF 160, a request message (e.g., an Namf_PDUSession_CreateSMContext request message) to request establishment of the PDU session. The SMF 160 may send, to the AMF 155, a response message (e.g., an Namf_PDUSession_CreateSMContext Response message). The response message may indicate whether the request from the AMF 155 is accepted (or not accepted).

The SMF 160 may select a PCF (e.g., the PCF 135). The SMF 160 may send, to the PCF 135, a request message (e.g., an SM Policy association establishment/modification request message 1106) to request PCC rules. The PCF 135 may send, to the SMF 160, a response message (e.g., SM policy association establishment/modification response message 1108). The response message may comprise PCC rules.

The SMF 160 may create a charging indicator/ID for the PDU session. The SMF 160 may send, to the CHF 1012, a request message (e.g., a charging data request [initial] message 1110) to verify authorization of a subscriber of the wireless device 100 to start the PDU session. The PDU session may be triggered by a start of a PDU session charging event. The CHF 1012 may open a CDR for the PDU session. The CHF 1012 may acknowledge the request message by sending, to the SMF 160, a response message (e.g., a charging data response message 1112).

The SMF 160 may select a UPF (e.g., the UPF 110) and may invoke an N4 session establishment/modification procedure 1114 with the selected UPF. The SMF 160 may interact (e.g., exchange one or more messages) with the AMF 155 (e.g., SMF AMF interaction 1116). The SMF 160 may send, to the AMF 155, a message (e.g., an Namf_Communication_N1N2MessageTransfer message). The message may comprise one or more of: a PDU session indicator/ID, QoS profile(s), CN tunnel information, and/or S-NSSAI from allowed NSSAI.

The AMF 155 may interact (e.g., exchange one or more messages) with the (R)AN 105 and/or the wireless device 100 (e.g., AMF-RAN-UE interactions 1118). The AMF 155 may send, to the (R)AN 105, a request message (e.g., an N2 PDU session request message). The request message may comprise information received from the SMF 160 (e.g., an indication that the PDU session establishment request is accepted).

The (R)AN 105 may send, to the AMF 155, a response message (e.g., an N2 PDU session response message). The response message may comprise one or more of: a PDU session indicator/ID and/or N2 SM information (e.g., PDU session indicator/ID, AN tunnel information, a list of accepted/rejected QFI(s), etc.). The AN tunnel information may comprise an access network address of an N3 tunnel corresponding to the PDU session.

The AMF 155 may send, to the SMF 160, a PDU session update request message 1120 (e.g., an Nsmf_PDUSession_UpdateSMContext request message). The PDU session update request message 1120 may comprise the N2 SM information (e.g., as received from the (R)AN). The SMF 160 may invoke an N4 session modification procedure 1122. The SMF 160 may send, to the UPF 110, the AN tunnel information and/or corresponding forwarding rules. The UPF 110 may send, to the SMF 160, a response message, for example, based on receiving the AN tunnel information.

The SMF 160 may request, from the CHF 1012, quota(s) (e.g., associated with one or more events). The SMF 160 may request a quota, for example, for a start of service data flow event. The SMF 160 may request a quota, for example, if an allocated quota is consumed and/or a trigger to request a quota is met. The SMF 160 may send, to the CHF 1012, a message (e.g., a charging data request message and/or charging data update message 1124) indicating the request.

The UPF 110 may send, to the SMF 160, an indication of resource usage of the PDU session. The UPF 160 may send, to the SMF 160, an indication of resource usage of the wireless device 100. The charging data request [update] message 1124 may comprise resource usage information received from the UPF 110. The CHF 1012 may update the CDR for the PDU session, for example, based on the charging data request [update] message 1124. The CHF 1012 may acknowledge reception of the charging data request [update] message 1124 by sending, to the SMF 160, a response message (e.g., a charging data response message 1126).

The SMF 160 may send, to the AMF 155, a PDU session update response message 1128 (e.g., an Nsmf_PDUSession_UpdateSMContext response message), for example, based on receiving the PDU session update request message 1120, invoking the N4 session modification procedure 1122, and/or sending the charging data request [update] message 1124. Other interactions 1130 (e.g., one or more operations, exchange of one or more messages, etc.) may be performed between the SMF 160, the AMF 155, the (R)AN 105, the wireless device 100, and/or other elements shown in FIG. 11, for the PDU session establishment procedure.

A CN (e.g., a 5GC) may provide policy information. The PCF 135, 235 may send, to the wireless device 100, 200, the policy information. The policy information may comprise an access network discovery and selection policy (ANDSP) and/or a UE Route Selection Policy (URSP). The ANDSP may be used by the wireless device 100, 200 for determining/selecting accesses (e.g., non-3GPP accesses) and/or for determining/selecting the N3IWF 270 in a PLMN. The URSP may be used by the wireless device 100, 200 to determine if a detected application: may be associated to an established PDU session, may be offloaded to an access (e.g., a non-3GPP access) outside the PDU session, and/or may trigger the establishment of a new PDU session. The URSP rules may comprise traffic descriptors that specify matching criteria and/or one or more of the following components: an SSC mode selection policy (SSCMSP), a network slice selection policy (NSSP), a DNN selection policy, a PDU session type policy, a non-seamless offload policy, and/or access type preference(s). The SSCMSP may be used by the wireless device 100, 200 to associate a matching application with SSC modes. The NSSP may be used by the wireless device 100, 200 to associate the matching application with S-NSSAI. The DNN selection policy may be used by the wireless device 100, 200 to associate the matching application with a DNN. The PDU session type policy may be used by the wireless device 100, 200 to associate the matching application with a PDU session type. The non-seamless offload policy may be used by the wireless device 100, 200 to determine that the matching application should be non-seamlessly offloaded to an access (e.g., a non-3GPP access) and/or outside of a PDU session. The access type preference may indicate the preferred access type (e.g., a 3GPP access or a non-3GPP access), for example, if the wireless device 100, 200 needs to establish a PDU session for the matching application. The ANDSP and/or the URSP may be pre-configured in the wireless device 100, 200 and/or may be configured at the wireless device 100, 200, for example, by the PCF 135, 235. The pre-configured policy may be applied by the wireless device 100, 200, for example, if the wireless device 100, 200 has not received a same type of policy from PCF 135, 235. The PCF 135, 235 may determine/select an ANDSP and a URSP applicable for the wireless device 100, 200 based on, for example, local configuration, subscribed S-NSSAIs, and/or operator policies (e.g., based on parameters such as accumulated usage, load level information per NSI, a location of the wireless device 100, 200). A visited PCF (V-PCF) may retrieve an ANDSP and a URSP from a home PCF (H-PCF) over N24/Npcf, for example, if the wireless device 100, 200 is roaming. The wireless device 100, 200 may prioritize valid ANDSP rules from a visited PLMN (VPLMN), for example, if the wireless device 100, 200 is roaming and the wireless device 100, 200 has valid rules from both a home PLMN (HPLMN) and the VPLMN.

The PCF 135, 235 may send/provide the ANDSP and the URSP to the AMF 155, 255 via an N15/Namf interface. The AMF 155, 255 may send/provide the ANDSP and the URSP to the wireless device 100, 200 via the N1 interface. The AMF 155, 255 may (or may not) change the ANDSP and the URSP provided by PCF 135, 235.

The PCF 135, 235 may send UE policy to the wireless device 100, 200. The PCF 135, 235 may subscribe the connectivity state changes (IDLE or CONNECTED) event, for example, if the PCF 135, 235 is notified of a UE policy delivery failure (e.g., the wireless device 100, 200 is unreachable). The PCF 135, 235 may retry sending the UE policy, for example, based on/after receiving a notify message indicating that the wireless device 100, 200 has entered a CM-connected state.

An operator may provide a network slice service to satisfy requirements of a communication service provider (CSP). A CSP may need multiple performance-guaranteed network slices to deliver a service and may subscribe multiple private/shared NSIs from the operator. The CSP may subscribe multiple private/shared NSIs based on performance requirements (e.g., latency) of the network slices and/or usage (e.g., volume, duration, number of connections, etc.).

The operator may create/activate multiple new NSIs and/or allocate existing NSIs, for example, based on the subscription (e.g., in an operation phase). The operator may collect, for one or more NSIs, charging information and/or enable charging information collection based on subscription and/or actual usage. The operator may collect the NSI's usage for CSP, for example, if a usage-based measurement method for the charging information is being used. The operator may collect performance data, for example, if a performance data-based measurement method for the charging information is being used. The operator may, for the CSP, record the charging information, report the charging information, and/or aggregate the charging information. A network operator (NOP) may be a network slice provider and the CSP may be a network slice customer.

A system (e.g., a 5GS and/or any other 3GPP system or non-3GPP system) may support collection of charging information related to performance metrics of private slice instances. A system (e.g., a 5GS and/or any other 3GPP system or non-3GPP system) may support collection of charging information related to CSP's usage of private slice instances. A system (e.g., a 5GS and/or any other 3GPP system or non-3GPP system) may support collection of charging information related to performance metrics of shared slice instances. A system (e.g., a 5GS and/or any other 3GPP system or non-3GPP system) may support collection of charging information related to CSP's usage of shared slice instances. A system (e.g., a 5GS and/or any other 3GPP system or non-3GPP system) may support aggregation of charging information of multiple CSP's slice instances.

Figure 12:
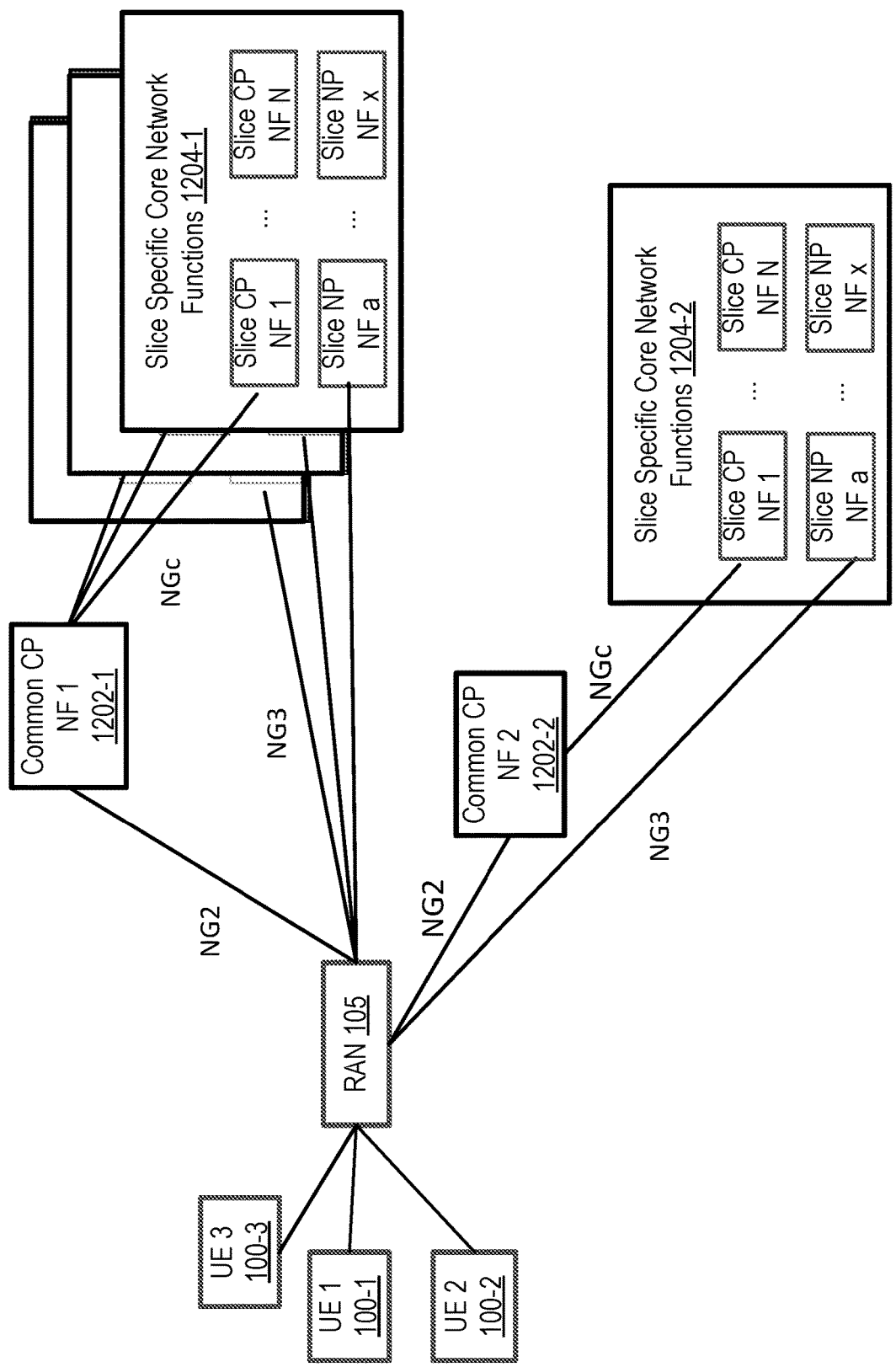
FIG. 12 shows an example of wireless devices associated with a network slice instance (NSI).

FIG. 12 shows an example of wireless devices (e.g., wireless device 100-1, wireless device 100-2, and wireless device 100-3) associated with a CN part of NSIs. The wireless device 100-1, the wireless device 100-2 and/or the wireless device 100-3 may be connected to slice specific CN functions 1204 via RAN 105. A CN part of a network slice may share some network functions (e.g., including NG1 and NG2 terminations) with other CN parts of network slices that serve the same wireless device 100 in the common control network functions (CCNF). The wireless device 100-1 and wireless device 100-3 may be assigned to a common CP NF 1 1202-1, and/or may have three slices (e.g., or any other number of slices) accessing multiple CN NSIs and/or multiple slice-specific CN functions. The wireless device 100-2 may be associated with one NSI and/or may be assigned to a different common CP NF 2 1202-2, for example, based on (e.g., after) the wireless device 100-2 has attached.

Figure 13:
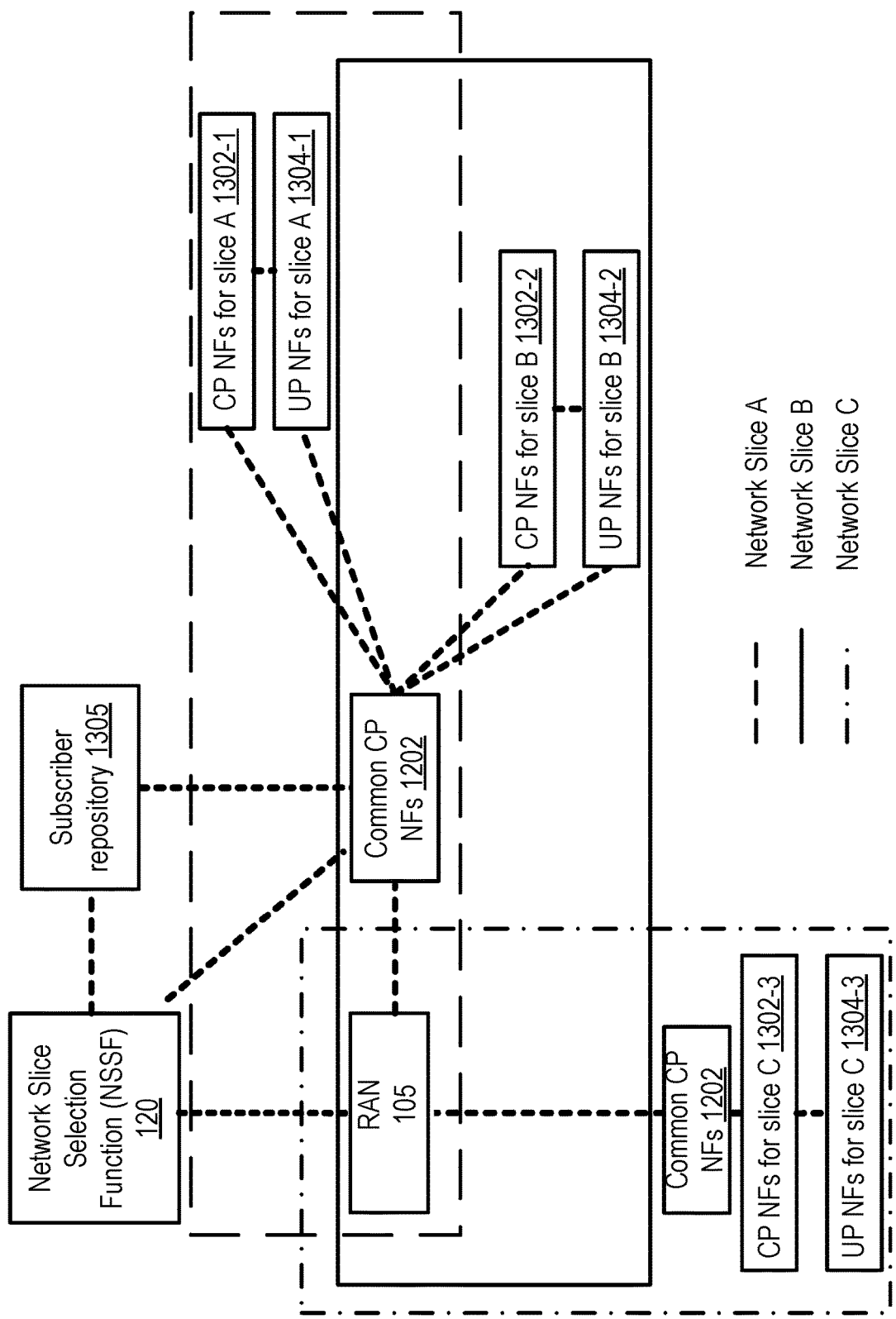
FIG. 13 shows an example network slice architecture.

FIG. 13 shows an example network slice architecture. The network slice architecture may comprise two groups of CP NFs—common CP NFs 1202 and dedicated CP NFs 1302. A network slice architecture may comprise any quantity of groups of CP NFs—common CP NFs and/or dedicated CP NFs. Core network instances may be set up to enable a wireless device to simultaneously obtain services from multiple network slices of one network operator. A set of CP NFs 1202 that are common among multiple CN instances may be shared across the multiple CN instances. UP NFs 1304 and CP NFs 1302 that are not in common may be in respective CN instances, and may be not shared with other CN instances.

A slice instance indicator (e.g., ID) may comprise an indicator/identifier of an NSI. A slice instance ID may be used as an indicator by the network to select the corresponding slice for the wireless device. A CP NF indicator (e.g., ID) may comprise an indicator/identifier of a CP NF instance. The NSSF 120 may be common to network slices in the PLMN and may realize the slice selection function for both groups.

The NSSF 120 may store mapping information between a slice instance ID and a NF ID (and/or NF address). The NSSF 120 may communicate with a subscriber repository 1305 (e.g., a UDR) to obtain the wireless device's subscribed slice instance IDs corresponding to a current PLMN. NSSF 120 may obtain an NSSP from policy function. The NSSF 120 may determine a CP NF ID (and/or address) based on a slice instance ID, wireless device's subscriber information, and/or NSSP. NSSF 120 may send, to the RAN 105, a CP NF ID corresponding to a slice instance ID. The NSSF 120 may be located in the CN. Locating the NSSF 120 in the CN may enable interaction and mapping updates between the NSSF 120 and the subscriber repository 1305. Locating the NSSF 120 in the CN may enable centralized management of mapping between slice instance ID and NF ID. The RAN 105 may act as a routing function linking the wireless device with the appropriate CN part of network slice. The RAN 105 may store mapping between slice instance IDs and NF IDs. The common CP NFs 1302 may be used for multiple slices that may be simultaneously connected with the wireless device. The wireless device may access multiple network slices at the same time. The common CP NFs 1302 may have common set of NFs which may be flexibly expanded with additional NFs, for example, based slice requirements.

A wireless device that is slice-enabled may attach without a slice instance ID. The wireless device may (or may not) have and/or be associated with some assistance parameters (e.g., a service type). The RAN 105 may forward an attach request (e.g., from the wireless device) to the NSSF 120. The NSSF 120 may check with subscription data and/or NSSP. The NSSF 120 may send a response, to the RAN 105 and/or the wireless device, comprising a pre-defined/default slice instance ID.

A wireless device that is slice-enabled may attach using a slice instance ID. The RAN 105 may be unable to determine the corresponding slice. The RAN 105 may forward an attach request to the NSSF 120. The NSSF 120 may respond by sending a CP NF ID corresponding to the slice instance ID. The RAN 105 may route the attach request to a CP NF 1302 associated with the CP NF ID.

A wireless device that is slice-enabled may attach using a slice instance ID. The RAN 105 may determine a mapping between the slice instance and a CP NF ID. The attach request may be routed to a CP NF 1302 associated with the CP NF ID.

Figure 14:
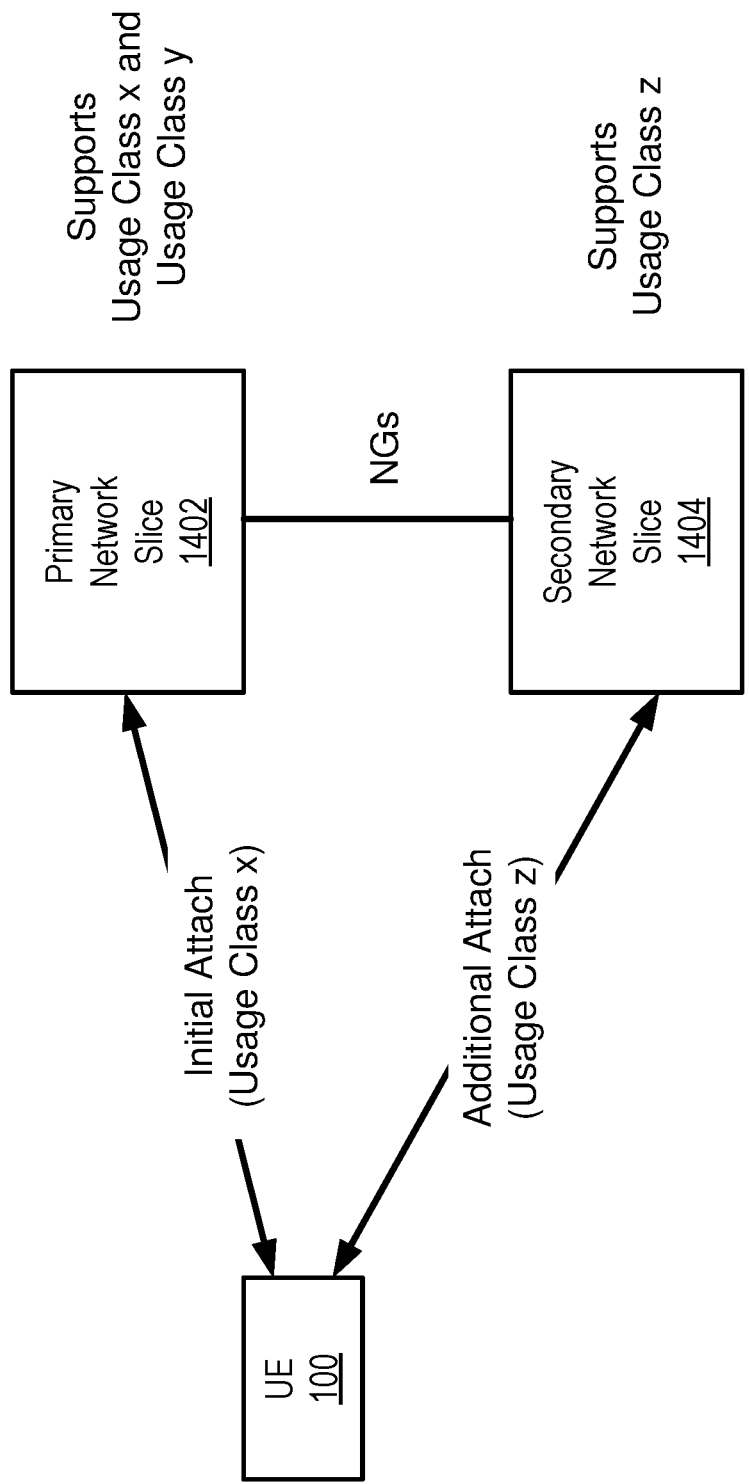
FIG. 14 shows an example of multiple network slices per wireless device.

FIG. 14 shows an example of multiple slices per wireless device 100. NSIs may be independent. The NSIs may (or may not) share any CP and/or UP functions. The NSIs may share common databases such as a subscription database and/or policy databases. The NSIs may communicate via the NGs interface. Each NSI may have and/or be associated with a unique slice identity that may be resolved to an IP address for communication via NGs. The wireless device 100 may simultaneously attach to multiple NSIs. The multiple NSIs may comprise a primary network slice 1402 and multiple secondary network slices 1404. The first attach performed by the wireless device 100 may be an initial attach. The wireless device 100 may attach to the primary network slice 1402 in the initial attach. A subsequent attach performed by the wireless device 100 may be an additional attach. and the wireless device 100 may attach to a secondary network slice 1404 in the additional attach.

A communication system (e.g., a wireless communication system; a 3GPP communication system, such as a 5G communication system or other applicable technology/standard; or any other communication system) may support different applications (e.g., cloud gaming applications, applications associated with operation of unmanned aerial vehicles (UAVs), applications associated with other vertical industries, and/or the like). Uplink traffic and downlink traffic may be associated with one or more applications. Uplink traffic and downlink traffic, and/or the one or more applications, may have different requirements (e.g., key performance indicator (KPI) requirements, QoS requirements, bandwidth requirements, latency requirements, etc.). For example, uplink traffic requirements for an application (e.g., a cloud gaming application) may require an ultra-reliable low latency communication (URLLC) service (e.g., for uplink user commands for the cloud gaming application). A system (e.g., a 5G or other system) may provide redundant resources, for example, to achieve required reliability and low packet loss rate for the uplink user commands. The downlink traffic requirements for the application may be met using a URLLC service, an enhanced mobile broadband (eMBB) service (e.g., for downlink gaming video for the cloud gaming application), and/or any other service. The URLLC service, eMBB service, and/or any other service may provide high data rates, for example, that may be required for streaming downlink gaming video with low latencies. Another application (e.g., an unmanned aerial system (UAS) application or any other application(s)) may use an eMBB service (or other service) for uplink traffic (e.g., for uplink video streaming) and a URLLCservice for downlink traffic (e.g., for downlink control commands). More generally, any one or more first applications may be associated with (e.g., require) a first service during a time that any one or more second applications may be associated with (e.g., require) a second service. However, if the second service (e.g., a downlink service) may be different from the first service (e.g., an uplink service) for the same application, configuring different services for an application may require configuring different PDU sessions for the application and/or different network slices for the application.

At least some communication systems (e.g., a wireless communication system; a 3GPP communication system, such as a 5G communication system or other applicable technology/standard; or any other communication system) may be unable to efficiently support asymmetric services (e.g., different services for uplink traffic and downlink traffic) for an application. Such communication systems may be unable to efficiently support different network slices for uplink traffic and downlink traffic associated with the same application. At least some communications systems may not be able to support different PDU sessions for uplink traffic and downlink traffic associated with the same application. For example, at least some communication systems may not be able to handle allocation of multiple IP addresses and/or may not be able to use multiple IP addresses to support different PDU sessions for uplink traffic and downlink traffic associated with a same application. At least some communication systems may not be able to efficiently perform charging to support different PDU sessions for uplink traffic and downlink traffic associated with a same application. For example, at least some communication systems may not be able to support different network slices for the uplink traffic and the downlink traffic, for the same application, associated with one PDU session. At least some communication systems may not be able to support different service types (e.g., URLLC service, MIoT service, eMBB service) for uplink traffic and downlink traffic associated with the same application on one network slice.

Various examples described herein may provide support for asymmetric services. Support for asymmetric services may be provided, for example, by configuring multiple network slices for traffic (e.g., uplink traffic and downlink traffic) associated with a single application. As described herein, support for multiple network slices may be provided, for example, by enabling multiple PDU sessions for traffic associated with the application. The multiple PDU sessions may be associated with the same IP address or may be associated with different IP addresses. Support for multiple network slices may be provided, for example, by enabling and/or configuring a PDU session that supports multiple network slices. Support for multiple network slices may be provided by enabling and/or configuring a combined network slice that comprises a plurality of child network slices. The child network slices may be used for traffic (e.g., uplink traffic and downlink traffic) associated with a single application or a plurality of applications.

Various examples described herein may enable use of different network slices for uplink traffic and downlink traffic associated with the same application(s). A PCF device may determine a URSP rule and/or a PCC rule, for example, to support different network slices for uplink traffic and downlink traffic associated with the same application(s). Various examples described herein may enable support for different PDU sessions for uplink traffic and downlink traffic associated with the same application(s). Various examples described herein may enable allocation of IP addresses to support different PDU sessions for uplink traffic and downlink traffic associated with the same application(s). Various examples described herein may enable support for charging different PDU sessions for uplink traffic and downlink traffic associated with the same application(s). Various examples described herein may enable use of different network slices for uplink traffic and downlink traffic associated with the same application(s) on one PDU session (or in a plurality of PDU sessions). Various examples described herein may enable different service types for uplink traffic and downlink traffic associated with the same application(s) on one network slice (or on more than one network slice). Various examples described herein may enable efficient support, on one or more PDU sessions and/or one or more network slices, for different services with different requirements (e.g., KPI requirements) for uplink traffic and/or downlink traffic associated with the same application(s).

Figure 15:
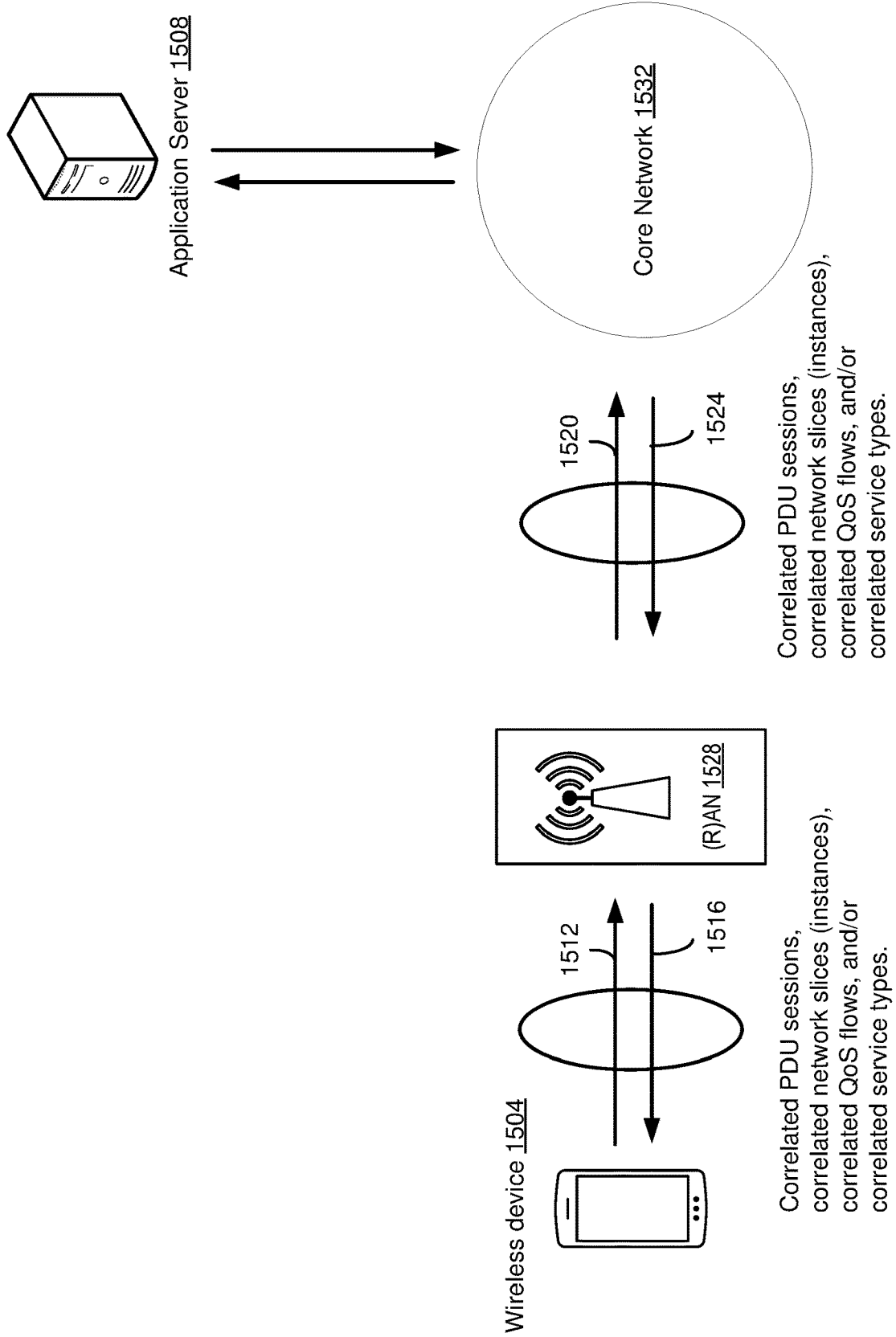
FIG. 15 shows an example communication between a wireless device and an application server.

FIG. 15 shows an example communication between a wireless device 1504 and an application server 1508. The wireless device 1504 and the application server 1508 may be associated with an application (e.g., a cloud gaming application, a UAV application, and/or any other application). The wireless device 1504 may send, to the application server 1508, and/or receive, from the application server 1508, data associated with the application. The wireless device 1504 may communicate with the application server 1508 via a (R)AN 1528 and/or a core network 1532.

The wireless device 1504 may determine that a first PDU session for uplink traffic 1512 (and/or uplink traffic 1520) may be correlated to a second PDU session for downlink traffic 1516 (and/or downlink traffic 1524), for example, if the first PDU session and the second PDU session support a same application. The wireless device 1504 may determine that a first network slice (instance) for the uplink traffic 1512 (and/or the uplink traffic 1520) may be correlated to a second network slice (instance) for the downlink traffic 1516 (and/or the downlink traffic 1524), for example, if the first network slice (instance) and the second network slice (instance) support a same application. The wireless device 1504 may determine that a first QoS flow for the uplink traffic 1512 (and/or the uplink traffic 1520) may be correlated to a second QoS flow for the downlink traffic 1516 (and/or the downlink traffic 1524), for example, if the first QoS flow and the second QoS flow support a same application. The wireless device 1504 may determine that a first service type for the uplink traffic 1512 (and/or the uplink traffic 1520) may be correlated to a second service type for the downlink traffic 1516 (and/or the downlink traffic 1524), for example, if the first service type and the second service type support a same application. While the above examples describe communications for two PDU sessions, two network slices (instances), two QoS flows, and/or two service types, any quantity of PDU sessions, network slices (instances), QoS flows, and/or service types may be correlated to any other quantity of PDU sessions, network slices (instances), QoS flows, and/or service types.

At least some communication systems (e.g., a wireless communication system; a 3GPP communication system, such as a 5G communication system or other applicable technology/standard; or any other communication system) may not support handover of asymmetric services for an application. At least some communication systems may not support handover of different correlated PDU sessions for uplink traffic and downlink traffic associated with a same application. At least some communication systems may not support handover of different correlated network slices for uplink traffic and downlink traffic associated with a same application. At least some communication systems may not support handover of different correlated QoS flows for uplink traffic and downlink traffic associated with the same application. At least some communication systems may not support handover of different correlated service types (e.g., URLLC, MIoT, eMBB, etc.) for uplink traffic and downlink traffic associated with the same application on one network slice.

Various examples described herein may provide support for handover of asymmetric services. A target base station for handover may accept (or reject) a handover request, from a source base station, based on availability of resources for the asymmetric services. The target base station for handover may accept (or reject) a handover request based on availability of resources for multiple PDU sessions, multiple network slices, and/or multiple QoS flows associated with the asymmetric services for the same application. Basing a handover decision on the above availability or availabilities of the above resources may increase the likelihood (and/or ensure or help to ensure) that asymmetric services are provided for the wireless device by the target base station during and/or after a handover.

Various examples described herein may enable handover of different PDU sessions uplink traffic and downlink traffic associated with the same application(s). Various examples described herein may enable handover of different network slices for uplink traffic and downlink traffic associated with the same application. Various examples described herein enable handover of different service types for uplink traffic and downlink traffic associated with the same application(s) on one network slice (or any other quantity of network slices). Handover of one or more PDU sessions, one or more network slices, and/or one or more QoS flows using example procedures described herein may enable a communication system to efficiently support handover of different services with different requirements (e.g., KPI requirements) for uplink traffic and downlink traffic associated with the same application. Various examples described herein provide enhanced communications between a central unit and a distributed unit of a base station. The enhanced communications may enable the communication network to establish and maintain different PDU sessions for uplink traffic and downlink traffic associated with the same application(s).

Figure 16:
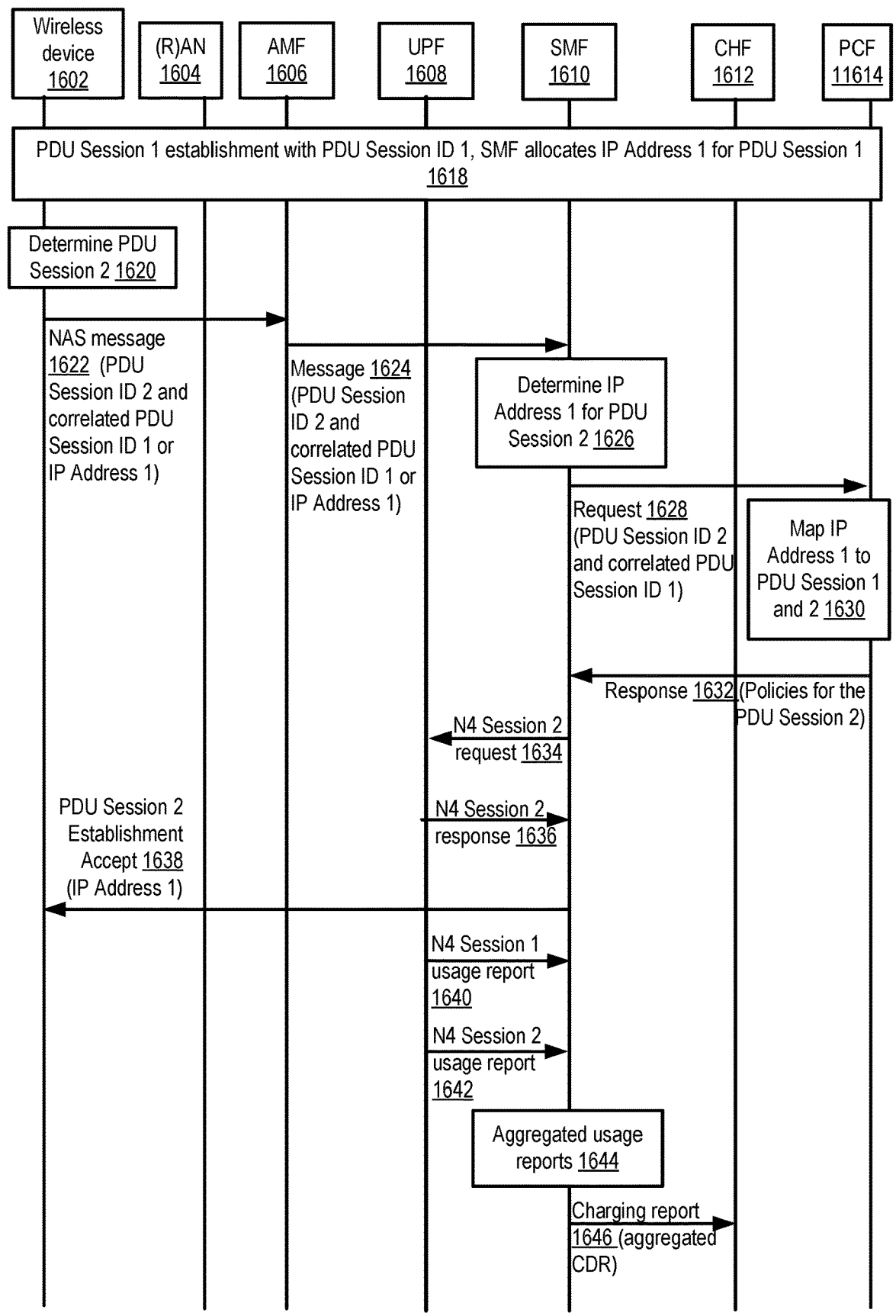
FIG. 16 shows example call flows associated with asymmetric services.

FIG. 16 shows example call flows associated with asymmetric services for an application. A wireless device 1602 (e.g., a UE) may receive a service request from an application on the wireless device 1602. The application may be a cloud gaming application, a UAV application, and/or any other application. The service request may indicate, for the same application, a first SST for a first direction and a second SST for a second direction. The service request may comprise an asymmetric service indication. The asymmetric service indication may indicate different service types for a first direction and a second direction. The service request may indicate a service direction. The first direction may be an uplink direction or may be a downlink direction. The second direction may be a downlink direction or may be an uplink direction. An uplink direction may indicate that signal/data is sent from the wireless device 1602 to an access network (e.g., (R)AN 1604), a core network and/or a data network. A downlink direction may indicate that signal/data is sent from a data network, a core network and/or an access network (e.g., (R)AN 1604) to the wireless device 1602. The service request may indicate a first SST for uplink direction and a second SST (e.g., a different SST) for downlink direction. The service request may indicate that the first SST for uplink direction corresponds to an eMBB service (or any other service) and the second SST for downlink direction corresponds to a URLLC service (or any other service). The service request may indicate that the first SST for uplink direction corresponds to a URLLC service and the second SST for downlink direction corresponds to an eMBB service.

The wireless device 1602 may determine a first network slice corresponding to the first SST of the first direction and a second network slice corresponding to the second SST of the second direction, for example, based on (e.g., in response to) the service request. The wireless device 1602 may determine that a first PDU session for the first direction may use the first network slice and a second PDU session for the second direction may use the second network slice. The wireless device 1602 may determine that the first PDU session may use the first network slice (e.g., corresponding to first S-NSSAI with an SST indicating an eMBB service, or any other service) for the uplink direction, and the second PDU session may use the second network slice (e.g., corresponding to second S-NSSAI with an SST indicating a URLLC service, or any other service) for the downlink direction. The first PDU session and/or the first network slice may support at least one of the following services in the first direction: an eMBB service, a URLLC service, an MIoT service, and/or any other service. The second PDU session and/or the second network slice may support at least one of the following services in the second direction: an eMBB service, a URLLC service, an MIoT service, and/or any other service.

The wireless device 1602 may determine that the first PDU session is correlated/associated with the second PDU session, for example, based on the first PDU session and the second PDU session supporting the same application. The wireless device 1602 may determine that the first network slice (instance) is correlated/associated with the second network slice (instance), for example, based on the first network slice (instance) and the second network slice (instance) supporting the same application. The wireless device 1602 may determine that the first (slice) service type is correlated/associated with the second (slice) service type, for example, based on the first (slice) service type and the second (slice) service type supporting the same application).

The wireless device 1602 may send, to an AMF device (e.g., an AMF device 1606), a first NAS message requesting the first PDU session. The first NAS message may comprise at least one of: the first S-NSSAI(s) and/or NSI indicator(s)/ID(s) of the first S-NSSAI(s), a first DNN, a first PDU session indicator/ID, an indicator of a request type, and/or an N1 SM container (e.g., comprising a first PDU session establishment request message). The wireless device 1602 may initiate a wireless device-requested PDU session establishment procedure by transmitting the first PDU session establishment request message within the N1 SM container of the first NAS message. The first PDU session establishment request message may comprise at least one of: the first PDU session indicator/ID, a first packet filter for the first direction (e.g., packet filter for uplink direction), requested PDU session type, and/or a requested SSC mode, etc. The AMF device 1606 may determine/select an SMF device and send, to the determined/selected SMF device, a message (e.g., a PDUSession_CreateSMContext request), for example, based on (e.g., in response to) receiving the first NAS message from the wireless device 1602. The message may comprise at least one of: a SUPI, the first DNN, the first S-NSSAI(s) and/or the NSI indicator(s)/ID(s) of the first S-NSSAI(s), the first PDU session indicator/ID, an AMF indicator/ID, the indicator of a request type, an indicator of a priority access, and/or an N1 SM container (e.g., comprising the first PDU session establishment request message).

The SMF device may perform one or more actions, for example, based on receiving the message from the AMF device 1606. The SMF device may allocate a wireless device IP address (e.g., UE IPv4 address and/or UE IPv6 network prefix). The SMF device may send, to a PCF device, a message (e.g., a first policy establishment request message). The message may comprise at least one of: the wireless device IP address; the first packet filter for the first direction; the first DNN; the first S-NSSAI(s) and/or the NSI indicator(s)/ID(s) of the S-NSSAI(s); the first PDU session indicator/ID; at least one wireless device indicator/identifier (e.g., SUPI, PEI, and/or GPSI); default 5QI; a default allocation and retention priority (ARP); type of PDU Session (e.g., IPv4, IPv6, IPv4v6, ethernet, unstructured); access type (e.g., 3GPP access); RAT Type (e.g., 3GPP-NR-FDD); a PLMN indicator/identifier; an application indicator/identifier; an allocated application instance indicator/identifier; user location information; and/or information corresponding to the SMF device (e.g., SMF indicator/identifier, IP address, or fully qualified domain name (FQDN) of the SMF device). The PCF device may determine a first PCC rule, for example, based on (e.g., in response to) receiving the first policy establishment request message. The first PCC rule may comprise the wireless device IP address and/or the first packet filter for the first direction. The first PCC rule may be applied to/used for a first service data flow of the first PDU session. The first PCC rule may be applied to/used for a first QoS flow of the first PDU session. The first PCC rule may be applied to/used for the first PDU session. The first PCC rule may be applied to/used for the first S-NSSAI. The PCF device may send, to the SMF device, a response message (e.g., a first policy establishment response message). The response message may comprise the first PCC rule.

The SMF device may send, to a CHF device 1612, a message (e.g., a charging data request [initial] message) to establish a charging session for the first PDU session of the wireless device 1602. The CHF device 1612 may send, to the SMF device, a response message, for example, based on the message.

The SMF device may determine, for example, based on the first PCC rule, a first user plane rule associated with the first PDU session. The first user plane rule may comprise at least one of: a first packet detection rule, a first forwarding action rule, a first QoS enforcement rule, and/or a first usage reporting rule. The first user plane rule may comprise the wireless device IP address and/or the first packet filter for the first direction. The first packet detection rule may comprise the wireless device IP address and/or the first packet filter for the first direction. The SMF device may determine/select a first UPF device for the first PDU session and/or the first S-NSSAI. The SMF device may send, to the first UPF device, a message (e.g., an N4 session establishment/modification request message). The message may comprise the first user plane rule. The first UPF device may (e.g., based on (e.g., in response to) receiving the message from the SMF device) install the first user plane rule, send a response message (e.g., an N4 session establishment/modification response message) to the SMF device, and/or enforce the first user plane rule received from the SMF device.

The SMF device may send, to the wireless device 1602 and via the AMF device 1606 and a base station, a message (e.g., a first PDU session establishment accept message). The first PDU session establishment accept message may comprise the wireless device IP address.

The wireless device 1602 may send, to the AMF device 1606, a second NAS message 1622 requesting the second PDU session. The second NAS message 1622 may comprise at least one of: a session/network slice correlation indication; an asymmetric service indication; session information of the first PDU session and/or network slice information of the first network slice; the second S-NSSAI(s) and/or NSI indicator(s)/ID(s) of the second S-NSSAI(s); a second DNN; a second PDU session indicator/ID; an indicator of a request type; and/or N1 SM container (e.g., comprising a second PDU session establishment request message). The second DNN may be the same as (or different from) the first DNN of the first PDU session. The wireless device 1602 may initiate a wireless device requested PDU session establishment procedure, for example, by transmitting a second PDU session establishment request message within the N1 SM container of the NAS message 1622. The second PDU session establishment request message may comprise at least one of: the session/network slice correlation indication; the asymmetric service indication; the session information of the first PDU session and/or the network slice information of the first network slice; the second PDU session indicator/ID; a second packet filter for the second direction (e.g., packet filter for downlink direction); requested PDU session type; and/or a requested SSC mode. The session information of the first PDU session and/or the network slice information of the first network slice may comprise at least one of: the first PDU session indicator/ID; the wireless device IP address; the first S-NSSAI(s) and/or the NSI indicator(s)/ID(s) of the first S-NSSAI(s); and/or the first DNN.

The session/network slice correlation indication, the asymmetric service indication, the session information of the first PDU session, and/or the network slice information of the first network slice may indicate that the first PDU session may be correlated/associated with the second PDU session (e.g., the first PDU session and the second PDU session may be associated with the same application and/or the first PDU session and the second PDU session may support the same application). The session/network slice correlation indication, the asymmetric service indication, the session information of the first PDU session, the network slice information of the first network slice may indicate that the first network slice may be correlated/associated with the second network slice (e.g., the first network slice and the second network slice may be associated with the same application and/or the first network slice and the second network slice may support the same application). The session/network slice correlation indication, the asymmetric service indication, the session information of the first PDU session, and/or the network slice information of the first network slice may indicate that the first network slice instance may be correlated/associated with the second network slice instance (e.g., the first network slice instance and the second network slice instance may be associated with the same application). The session/network slice correlation indication, the asymmetric service indication, the session information of the first PDU session, and/or the network slice information of the first network slice may indicate that a first service type (e.g., an eMBB service) may be supported by the first PDU session and/or the first network slice for a first direction (e.g., uplink direction), and a second service type (e.g., a URLLC service) may be supported by the second PDU session and/or the second network slice for a second direction (e.g., downlink direction).

The session/network slice correlation indication, the asymmetric service indication, the session information of the first PDU session, and/or network slice information of the first network slice may also be referred herein as an asymmetric slice indication, an asymmetric correlation indication, a correlated QoS, and/or the like. The wireless device 2602 may determine whether/if an application in the wireless device 2602 may require asymmetric services. Transmission of the session/network slice correlation indication, the asymmetric service indication, the session information of the first PDU session, and/or the network slice information from the wireless device 1602 to the AMF device 1606 may enhance wireless device signaling and/or may enable the wireless device 1602 to request asymmetric services for an application. Transmission of such information may enable the AMF device 1606 and/or an SMF device to determine that the wireless device requires asymmetric service.

The second packet filter for the second direction (e.g., packet filter for downlink direction) may comprise the wireless device IP address to indicate that the first PDU session is correlated/associated with the second PDU session. The second packet filter for the second direction (e.g., packet filter for downlink direction) may comprise the wireless device IP address to indicate that the first network slice (instance) is correlated/associated with the second network slice (instance).

The AMF device 1606 may determine/select an SMF device 1610 for the second PDU session and/or the second network slice. The SMF device 1610 for the second PDU session and/or the second network slice may be the same SMF device as was determined/selected for the first PDU session and/or the first network slice. The SMF device 1610 for the second PDU session and/or the second network slice may be a different SMF device as was determined/selected for the first PDU session and/or the first network slice. The AMF device 1606 may determine/select the same SMF device, for the second PDU session and/or the second network slice, as was determined/selected for the first PDU session and/or the first network slice, for example, based on receiving the second NAS message 1622, and based on the session/network slice correlation indication, the asymmetric service indication, the session information of the first PDU session, and/or the network slice information of the first network slice. The AMF device 1606 may determine/select the same SMF device for the second PDU session as was determined/selected for the first PDU session and/or the first network slice, for example, based on the wireless device IP address in the second packet filter (e.g., packet filter for downlink direction). The AMF device 1606 may send, to the SMF device 1610, a message 1624 (e.g., PDUSession_CreateSMContext request). The message 1624 may comprise at least one of: the session/network slice correlation indication; the asymmetric service indication; the session information of the first PDU session; the network slice information of the first network slice; the SUPI; the second DNN; the second S-NSSAI(s) and/or the NSI indicator(s)/ID(s) of the second S-NSSAI(s); the second PDU session indicator/ID, the AMF indicator/ID, an indicator of a request type, a priority access indicator, and/or an N1 SM container (e.g., comprising the second PDU session establishment request message).

The SMF device 1610 may perform one or more actions, for example, based on receiving the message 1624 from the AMF device 1606. At step 1626, the SMF device 1610 may determine the same wireless device IP address (e.g., IPv4 address and/or IPv6 network prefix) is used for the second PDU session and/or the second network slice as was used for the first PDU session and/or the first network slice, for example, based on the session/network slice correlation indication, the asymmetric service indication, the session information of the first PDU session, and/or the network slice information of the first network slice. The wireless device IP address may be used for more than one PDU session and/or more than one network slice.

The SMF device 1610 may determine/select a PCF device 1614 for the second PDU session and/or second network slice. The PCF device 1614 may be the same PCF device as was used for the first PDU session and/or the first network slice. The PCF device 1614 may be a PCF device that is different from the PCF device used for the first PDU session and/or the first network slice. The SMF device 1610 may determine/select the same PCF device for the second PDU session and/or second network slice as was used for the first PDU session and/or the first network slice, for example, based on the session/network slice correlation indication, the asymmetric service indication, the session information of the first PDU session, and/or the network slice information of the first network slice. The SMF device 1610 may select the same PCF device for the second PDU session as was used for the first PDU session and/or the first network slice, for example, based on the wireless device IP address in the second packet filter (e.g., packet filter for downlink direction).

The SMF device 1610 may send, to the PCF device 1614, a request message 1628 (e.g., a second policy establishment request message). The request message 1628 may comprise at least one of: the session/network slice correlation indication; the asymmetric service indication; the session information of the first PDU session; the network slice information of the first network slice; the wireless device IP address; the second packet filter for the second direction; the second DNN; the second S-NSSAI(s) and/or the NSI indicator(s)/ID(s) of the second S-NSSAI(s), the second PDU session indicator/ID, at least one wireless device indicator/ID (e.g., SUPI, PEI, and/or GPSI), a default 5QI; a default ARP, a type of PDU session (e.g., IPv4, IPv6, IPv4v6, ethernet, unstructured); an access type (e.g., 3GPP access); a RAT Type (e.g., 3GPP-NR-FDD); a PLMN indicator/identifier; an application indicator/identifier; an allocated application instance indicator/identifier; user location information, and/or information corresponding to the SMF device 1610 (e.g., SMF identifier, IP address, and/or FQDN of the SMF device 1610).

At step 1630, the PCF device 1614 may perform one or more actions, for example, based on/in response to the request message 1628. The PCF device 1614 may correlate/associate the first PDU session with the second PDU session and/or may correlate/associate the first network slice with the second network slice, for example, based on information received from the SMF device 1610 (e.g., based on the wireless device IP address, the session/network slice correlation indication, the asymmetric service indication, the session information of the first PDU session, and/or the network slice information of the first network slice). The PCF device 1614 may map the wireless device IP address to the first PDU session and the second PDU session and/or may map the wireless device IP address to the first network slice and the second network slice, for example, based on the wireless device IP address, the session/network slice correlation indication, the asymmetric service indication, the session information of the first PDU session, and/or the network slice information of the first network slice. The PCF device 1614 may determine a new first PCC rule and/or may update the existing first PCC rule. The PCF device 1614 may determine a second PCC rule. The second PCC rule may comprise the wireless device IP address and/or the second packet filter for the second direction. The second PCC rule may be applied to/used for a second service data flow of the second PDU session. The second PCC rule may be applied to/used for a second QoS flow of the second PDU session. The second PCC rule may be applied to/used for the second PDU session. The second PCC rule may be applied to/used for the second S-NSSAI.

The first PCC rule and/or the second PCC rule determined by the PCF device 1614 may comprise at least one of: at least one charging control rule, at least one policy control rule (e.g., comprising at least one QoS control rule and/or at least one gating control rule), at least one usage monitoring control rule, at least one application detection and control rule, at least one traffic steering control rule, and/or service data flow detection information (e.g., service data flow template). The charging control rule may be used for charging control. The charging control rule may comprise at least one of: an information element indicating a charging method/charging type, an information element indicating at least one charging rate, and/or an information element indicating at least one indicator/identifier or address of the CHF device 1612. The charging method/charging type may indicate at least one of: online charging, offline charging, and/or converged charging. The policy control rule may be used for policy control, wherein the at least one QoS control rule may be used for QoS control and the at least one gating control rule may be used for gating control. The QoS control rule may be used to authorize QoS on a service data flow. The gating control rule may be used to discard packets that don't match any service data flow of the gating control rule and/or associated PCC rules. The usage monitoring control rule may be used to monitor volume usage and/or time usage, and report accumulated usage of network resources. The application detection and control rule may comprise a request to detect a specified application traffic, to report, to the PCF device 1614, of a start and/or stop of the application traffic, and/or to apply a specified enforcement and charging actions. The traffic steering control rule may be used to activate/deactivate traffic steering policies for steering a subscriber's traffic to appropriate operator or third party service functions (e.g., NAT, antimalware, parental control, DDoS protection) in an (S)Gi-LAN. The service data flow detection information (e.g., service data flow template) may comprise a list of service data flow filters and/or an application identifier that references a corresponding application detection filter for detection of the service data flow. The service data flow detection information may comprise combination of traffic patterns of the ethernet PDU traffic.

The PCF device 1614 may send, to the SMF device 1610, a response message 1632 (e.g., a second policy establishment response message). The response message 1632 may comprise the second PCC rule. The PCF device 1614 may send, to the SMF device 1610, a message for the first PDU session. The message may comprise the new/updated first PCC rule.

One charging session may be used for more than one PDU session and/or more than one network slice. The SMF device 1610 may determine that the charging session determined/created for the first PDU session may be used for the second PDU session, for example, based on the wireless device IP address, the session/network slice correlation indication, the asymmetric service indication, the session information of the first PDU session, and/or the network slice information of the first network slice. The SMF device 1610 may send, to the CHF device 1612, a message (e.g., charging data request and/or charging data request update message) to update the charging session for the first PDU session and the second PDU session. The message may comprise at least one of: the session/network slice correlation indication; the asymmetric service indication; the session information of the first PDU session; the network slice information of the first network slice; the wireless device IP address; the second packet filter for the second direction; the second DNN; the second S-NSSAI(s) and/or the NSI indicator(s)/ID(s) of the second S-NSSAI(s); the second PDU session indicator/ID; at least one wireless device indicator/identifier (e.g., SUPI, PEI, and/or GPSI); a default 5QI; a default ARP; a type of PDU session (e.g., IPv4, IPv6, IPv4v6, ethernet, unstructured); an access type (e.g., 3GPP access); a RAT type (e.g., 3GPP-NR-FDD); a PLMN indicator/identifier; an application indicator/identifier; an allocated application instance indicator/identifier; user location information; and/or information of the SMF device 1610 (e.g., SMF indicator/identifier, IP address, and/or or FQDN of the SMF device 1610).

The CHF device 1612 may correlate/associate the first PDU session with the second PDU session and/or may correlate/associate the first network slice with the second network slice, for example, based on the information elements received from the SMF device 1610 (e.g., based on the wireless device IP address, the asymmetric service indication, the session/network slice correlation indication, the session information of the first PDU session, and/or the network slice information of the first network slice). The CHF device 1612 may determine quotas (e.g., same or different quotas, thresholds, limits, targets, values, etc.) for the associated PDU sessions (e.g., the first PDU session and the second PDU session). The CHF device 1612 may determine quotas (e.g., same or different quotas, thresholds, limits, targets, values, etc.) for the associated network slices (e.g., the first network slice and the second network slice). The CHF device 1612 may determine a first quota for the first PDU session and/or the first network slice. The CHF device 1612 may determine a second quota for the second PDU session and/or the second network slice. The CHF device 1612 may determine a larger quota for a PDU session and/or network slice supporting an eMBB service. The CHF device 1612 may determine a smaller quota for a PDU session and/or network slice supporting a URLLC service. The quota may comprise at least one of: a granted unit, a time quota threshold, and/or a volume quota threshold. The CHF device 1612 may send, to the SMF device 1610, a response message (e.g., a charging data response message). The response message may comprise the quotas for the first PDU session and the second PDU session, and/or the quotas for the first network slice and the second network slice.

The SMF device 1610 may determine a first user plane rule and/or a second user plane rule, for example, based on/in response to the charging data response message (e.g., the quotas for the first PDU session and the second PDU session) received from the CHF device 1612 and/or the PCC rules (e.g., the first PCC rule and/or the second PCC rule) received from the PCF device 1614. The SMF device 1610 may determine anew first user plane rule and/or update the existing first user plane rule, for example, based on the first quota and/or the first PCC rule. The SMF device 1610 may determine a second user plane rule, for example, based on the second quota and/or the second PCC rule. The first user plane rule may be associated with the first PDU session and/or the first network slice. The second user plane rule may be associated with the second PDU session and/or the second network slice. The second user plane rule may comprise at least one of: a second packet detection rule, a second forwarding action rule, a second QoS enforcement rule, and/or a second usage reporting rule. The second user plane rule may comprise the wireless device IP address and/or the second packet filter for the second direction. The wireless device IP address may be used for the first user plane rule and the second user plane rule. The SMF device 1610 may associate/correlate the first user plane rule with the second user plane rule, for example, based on the wireless device IP address, the correlation/association of the first PDU session and the second PDU session, and/or the correlation/association of the first network slice and the second network slice. The second packet detection rule may comprise the wireless device IP address and/or the second packet filter for the second direction. The SMF device 1610 may determine/select a second UPF device 1608 for the second PDU session and/or the second S-NSSAI. The second UPF device 1608 may be the same as the first UPF device or may be different from the first UPF device.

The SMF device 1610 may send, to the second UPF device 1608, a message (e.g., an N4 session establishment/modification request message 1634). The message may comprise the second user plane rule. The second UPF device 1608 may (e.g., based on/in response to receiving the message from the SMF device 1610) install the second user plane rule, send, to the SMF device 1610, a response message (e.g., an N4 session establishment/modification response message 1636), and/or enforce the second user plane rule received from the SMF device 1610. The SMF device 1610 may send to the first UPF device a message (e.g., an N4 session establishment/modification request message). The message may comprise the first user plane rule. The first UPF device may (e.g., based on/in response to receiving the message from the SMF device 1610) install the first user plane rule, send, to the SMF device 1610, a response message (e.g., an N4 session establishment/modification response message), and/or enforce the first user plane rule received from the SMF device 1610.

The SMF device 1610 may send, to the wireless device 1602, via the AMF device 1606 and the base station, a message (e.g., a second PDU session establishment accept message 1638). The second PDU session establishment accept message 1638 may comprise the wireless device IP address. The wireless device 1602 may associate/correlate the first PDU session with the second PDU session, and/or may associate/correlate the first network slice with the second network slice, for example, based on the wireless device IP address.

The wireless device 1602 may communicate with an application server using two PDU sessions and/or two network slices, for example, based on/after establishing the two PDU sessions (e.g., the first PDU session and the second PDU session). The wireless device 1602 may send user data, associated with an application on the wireless device 1602, to the application server over the first PDU session and/or the first network slice. The wireless device 1602 may use an eMBB service for uplink traffic. The wireless device 1602 may receive user data, associated with the application on the wireless device 1602, from the application server over the second PDU session and/or the second network slice. The wireless device 1602 may use a URLLC service for downlink traffic. The SMF device 1610 may determine a first user plane rule and/or a second user plane rule to process one or more acknowledgement packets (e.g., TCP ACK packets, TCP NAK packets) between the wireless device 1602 and the application server. The application server may send an acknowledgement packet (e.g., for uplink traffic using an eMBB service) via the downlink channel and/or the SMF device 1610 may determine a second user plane rule to apply an eMBB QoS or a URLLC QoS for the acknowledgement packet. The wireless device 1602 may send an acknowledgement packet (e.g., for downlink traffic using a URLLC service) via an uplink channel and the SMF device 1610 may determine a first user plane rule to apply a URLLC QoS or an eMBB QoS for the acknowledgement packet. The SMF device 1610 may send the first user plane rule and/or the second user plane rule to the first UPF device and the second UPF device 1608, respectively, for enforcing of the first user plane rule and/or the second user plane rule.

The first UPF device may enforce the first packet detection rule, for example, by matching a user data/traffic packet with service data flow template (e.g., service data flow filters and/or application identifiers). The first UPF device may apply other first user plane rules (e.g., the first forwarding action rule, the first QoS enforcement rule, and/or the first usage reporting rule) to the user data/traffic packets that are matched by the packet detection rule.

The first UPF device may enforce the first usage reporting rule by measuring usage of network resources. The usage may be measured based on traffic data volume, duration (e.g., time), and/or events. The usage may be measured according to a measurement method indicated in the first usage reporting rule. The first UPF device may determine a first network resources usage report 1640 based on the first usage reporting rule. The first UPF device may send the first network resources usage report 1640 to the SMF device 1610, for example, if the quota/threshold is reached, based on (e.g., in response to) an event, and/or based on another trigger being met.

The second UPF device 1608 may enforce the second packet detection rule, for example, by matching a user data/traffic packet with service data flow template (e.g., service data flow filters and/or application identifiers). The second UPF device 1608 may apply other second user plane rules (e.g., the second forwarding action rule, the second QoS enforcement rule, and/or the second usage reporting rule) to the user data/traffic packets that are matched by the packet detection rule.

The second UPF device 1608 may enforce the second usage reporting rule by measuring usage of network resources. The usage may be measured based on traffic data volume, duration (e.g., time) and/or events. The usage may be measured according to a measurement method indicated by the second usage reporting rule. The second UPF device 1608 may determine a second network resources usage report 1642 based on the second usage reporting rule. The second UPF device 1608 may send to the SMF device 1610, the second network resources usage report 1642, for example, if the quota/threshold is reached, based on (e.g., in response to) an event, and/or based on another trigger being met.

At step 1644, the SMF device 1610 may aggregate the first network resources usage report 1640 and the second network resources usage report 1642 into an aggregated CDR for the first PDU session and the second PDU session (and/or for the first network slice and the second network slice), for example, based on (e.g., in response to) the network resources usage reports received from the first UPF device and the second UPF device 1608 and/or based on the correlation/association of the first user plane rule and the second user plane rule. The SMF device 1610 may send, to the CHF device 1612, a message 1646 (e.g., a charging data request and/or a charging data request update message). The message 1646 may comprise the aggregated CDR. The CHF device 1612 may update the quotas based on the aggregated CDR. The CHF device 1612 may send the updated quotas to the SMF device 1610 for enforcement.

Figure 17:
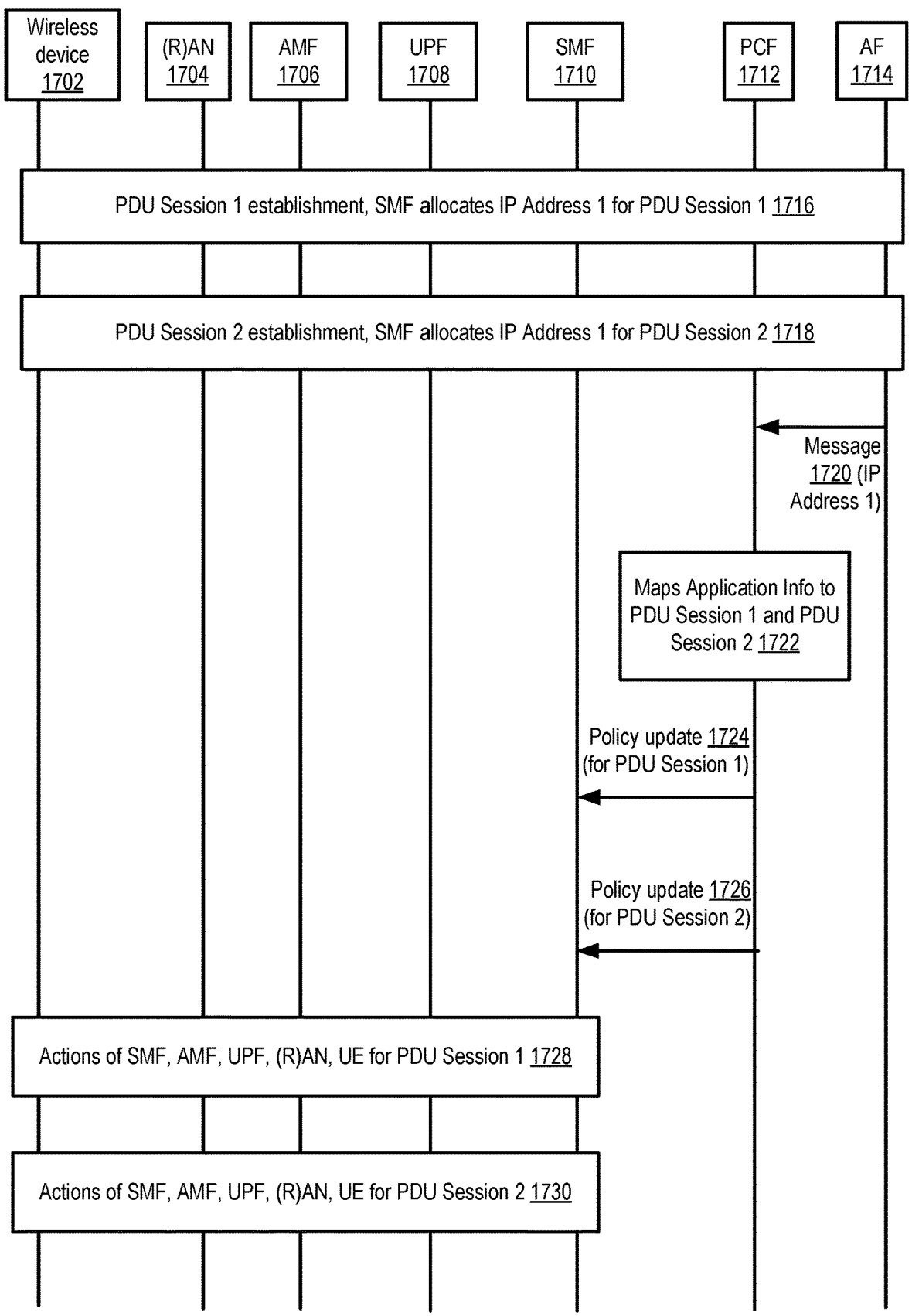
FIG. 17 shows example call flows associated with asymmetric services.

FIG. 17 shows example call flows associated with asymmetric services for an application. At steps 1716 and 1718, a wireless device 1702 may establish a first PDU session and a second PDU session (e.g., as described with reference to FIG. 16). Establishing the first PDU session and the second PDU session may comprise an SMF device 1710 allocating a same wireless device IP address for the first PDU session and the second PDU session. The wireless device 1702 may communicate with an application server via the two PDU sessions and/or via the two network slices, for example, based on the establishing the two PDU sessions. An AF device 1714 may send to, a PCF device 1712, a message 1720 (e.g., application/service information provision message) providing application/service information to the PCF device 1712. The application/service information provision message may be sent, via an NEF device, to the PCF device 1712. The application/service information provision message may comprise at least one of: a wireless device IP address (e.g., IPv4 address and/or IPv6 network prefix), at least one wireless device identity (e.g., SUPI, PEI, and/or GPSI), the first DNN and/or the second DNN, and/or application/service information. The application/service information may comprise one or more of the following information elements: IP filter information to indicate (e.g., identify) a service data flow of the application service, an application identifier, a media/application/service type, and/or requested media/application/service QoS (e.g., 5QI, ARP, and/or bandwidth). At step 1722, the PCF device 1712 may map the application information to the first PDU session and the second PDU session and/or the first network slice and the second network slice, for example, based on (e.g., in response to) the message received from the AF device 1714 and/or based on the wireless device IP address. The PCF device 1712 may map the application information to the first PDU session and the second PDU session and/or the first network slice and the second network slice, for example, if the wireless device IP address received from the AF device 1714 is the same as the wireless device IP address used for the first PDU session and the second PDU session. The PCF device 1712 may update a first PCC rule for the first PDU session and a second PCC rule for the second PDU session, for example, based on the application information received from the AF device.

The PCF device 1712 may send, to the SMF device 1710, a policy update message 1724 and/or a policy update message 1726. The policy update message 1724 may comprise the updated first PCC rule. The policy update message 1726 may comprise the updated second PCC rule. Alternatively, the PCF device 1712 may send, to the SMF device 1710, a policy update message comprising both the updated first PCC rule and the updated second PCC rule. At steps 1728 and 1730, the wireless device 1702, (R)AN 1704, AMF device 1706, UPF device 1708, and the SMF device 1710 may perform one or more actions associated with the first PDU session and the second PDU session.

Figure 18:
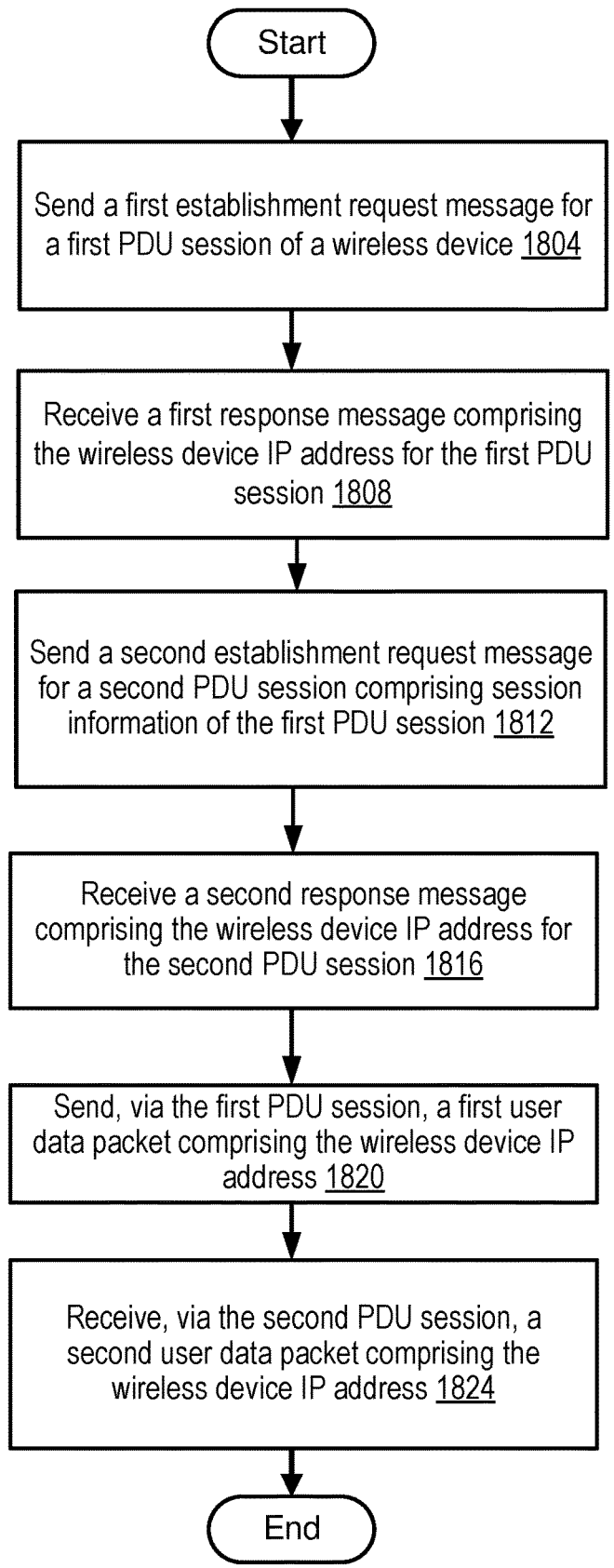
FIG. 18 shows an example method that may be performed by a wireless device for wireless communications via two PDU sessions.

FIG. 18 shows an example method at a wireless device for wireless communication via two PDU sessions. At step 1804, a wireless device may send, to an AMF device, a first establishment request message for a first PDU session of a wireless device. The wireless device may send the first establishment request to the AMF device via a base station. At step 1808, the wireless device may receive, from the AMF device (e.g., via the base station), a first response message comprising the wireless device IP address for the first PDU session. At step 1812, the wireless device may send, to the AMF device, a second establishment request message for a second PDU session. The second establishment request message may indicate that the second PDU session is associated with the first PDU session. The second establishment request message may comprise session information of the first PDU session. At step 1816, the wireless device may receive, from the AMF device, a second response message comprising the wireless device IP address for the second PDU session. At step 1820, the wireless device may send, to the base station and via the first PDU session a first user data packet (e.g., a PDU) comprising the wireless device IP address. At step 1824, the wireless device may receive, from the base station via the second PDU session, a second user data packet (e.g., a PDU) comprising the wireless device IP address.

Figure 19:
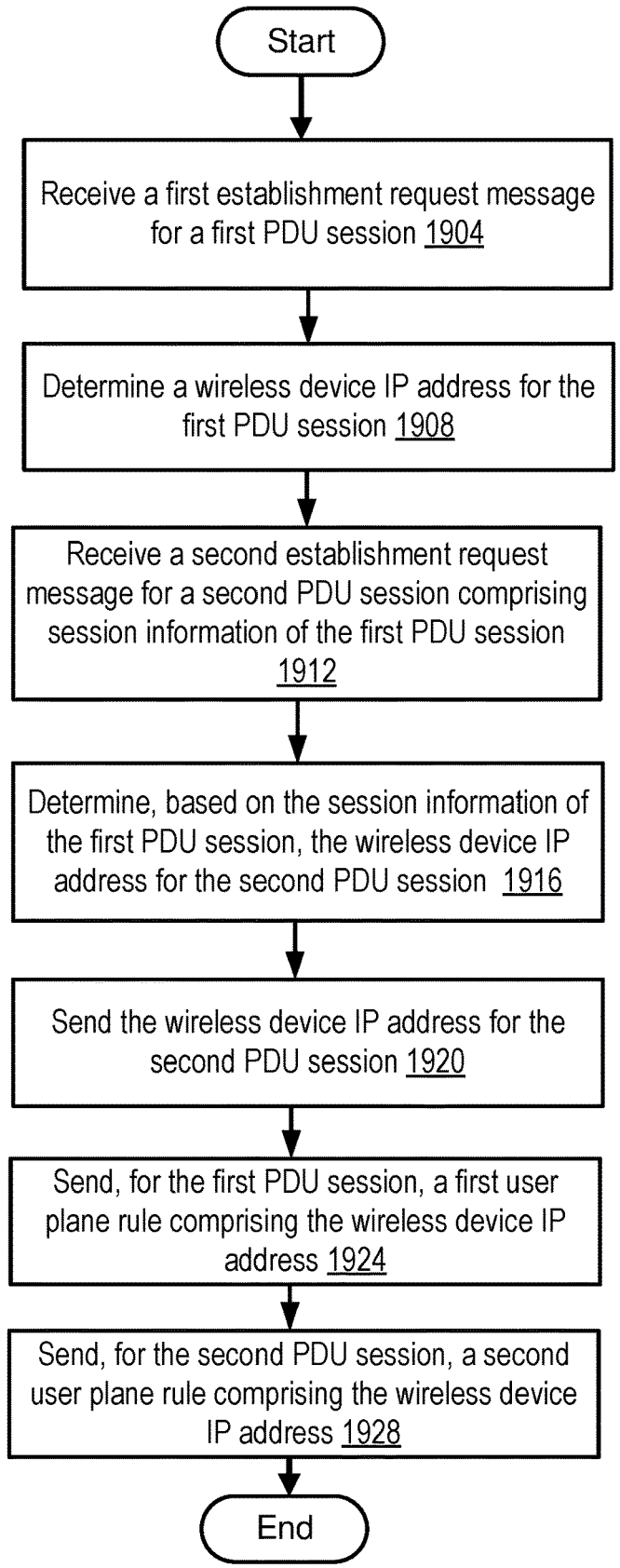
FIG. 19 shows an example method that may be performed by a session management function (SMF) device for wireless communication via two packet data unit (PDU) sessions.

FIG. 19 shows an example method at an SMF device for wireless communication via two PDU sessions. At step 1904, an SMF device may receive, from an AMF device, a first establishment request message for a first PDU session. The first PDU session may be for uplink traffic associated with an application for a wireless device. At step 1908, the SMF device may determine a wireless device Internet protocol (IP) address for the first PDU session, for example, based on the first session establishment request message. At step 1912, the SMF device may receive, from the AMF device, a second establishment request message for a second PDU session. The second establishment request message may comprise session information of the first PDU session. The second PDU session may be for downlink traffic of the application. At step 1916, the SMF device may determine, based on the session information of the first PDU session, the wireless device IP address is for the second PDU session. The SMF device may determine the same wireless device IP address for the first PDU session and the second PDU session based on the first PDU session and the second PDU session being associated with the same application. At step 1920, the SMF device may send, to the AMF device, the wireless device IP address for the second PDU session. At step 1924, the SMF device may send, to a first UPF device and for the first PDU session, a first user plane rule comprising the wireless device IP address. At step 1928, the SMF device may send, to a second UPF device and for the second PDU session, a second user plane rule comprising the wireless device IP address.

Figure 20:
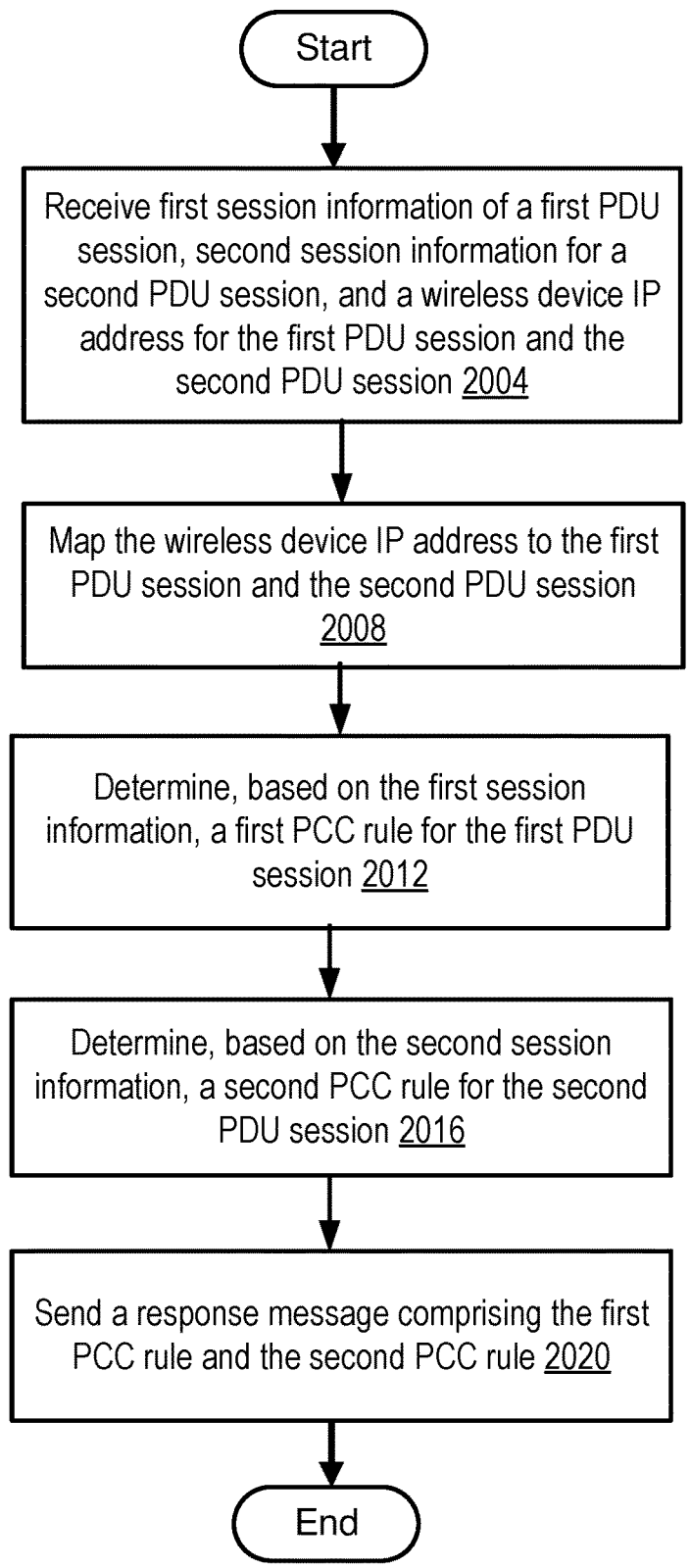
FIG. 20 shows an example method that may be performed by a policy control function (PCF) device for wireless communication via two PDU sessions.

FIG. 20 shows an example method at a PCF device for wireless communication via two PDU sessions. At step 2004, a PCF device may receive, from an SMF device, first session information of a first PDU session, second session information for a second PDU session, and/or a wireless device IP address for the first PDU session and the second PDU session. At step 2008, the PCF device may map the wireless device IP address to the first PDU session and the second PDU session. At step 2012, the wireless device may determine, based on the first session information, a first PCC rule for the first PDU session. At step 2016, the wireless device may determine, based on the second session information, a second PCC rule for the second PDU session. At step 2020, the PCF device may send, to the SMF device, a response message comprising the first PCC rule and the second PCC rule.

Figure 21:
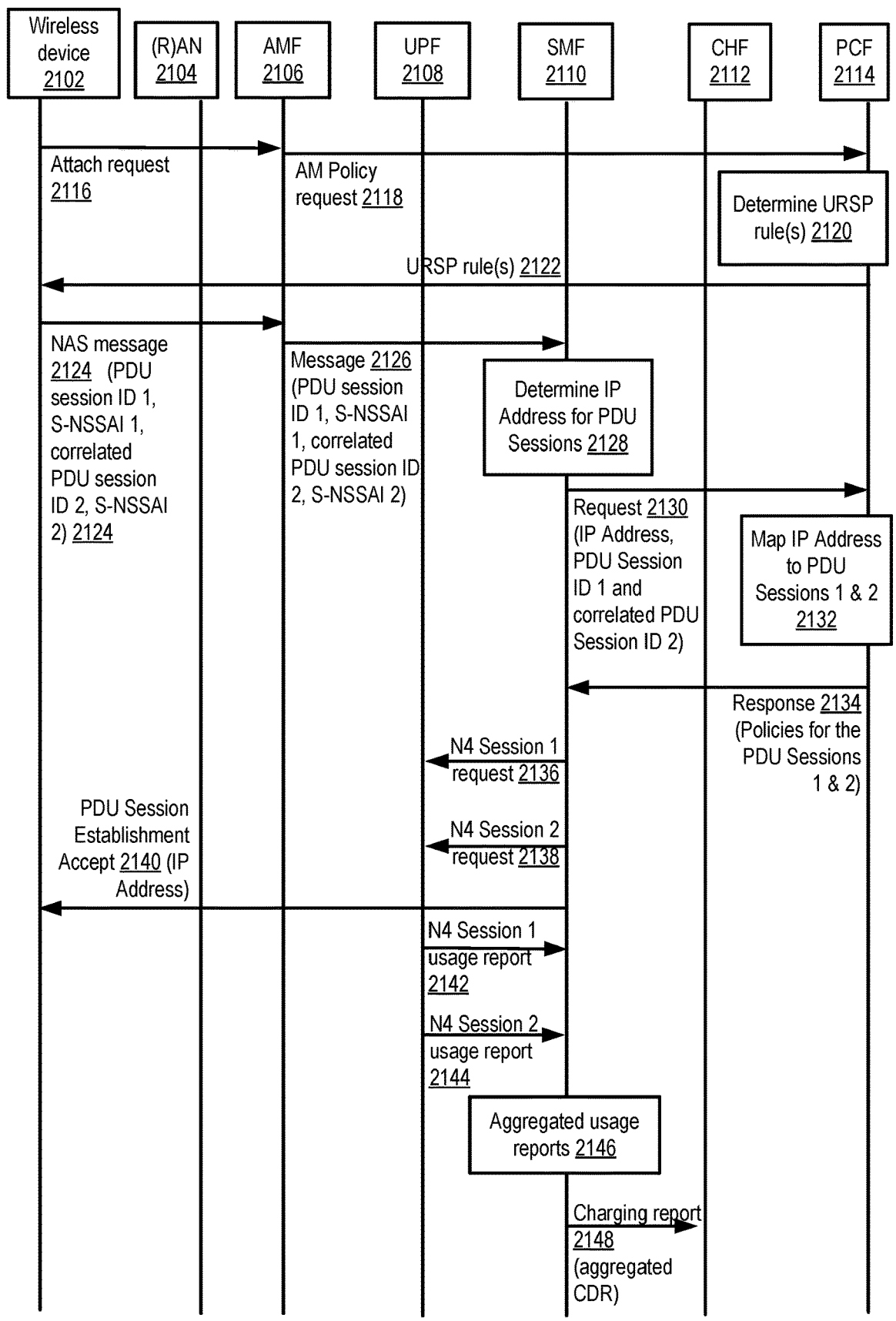
FIG. 21 shows example call flows associated with asymmetric services.

FIG. 21 shows example call flows associated with asymmetric services, for an application (or more than one application), based on URSP rules. A wireless device 2102 may attach to the network by sending, to an AMF device 2106, an attach request message 2116. The attach request message 2116 may comprise at least one wireless device indicator/identifier (e.g., SUPI, PEI, and/or GPSI). The AMF device 2106 may send, to a PCF device 2114, a message (e.g., access management policy request message 2118). The message may comprise the at least one wireless device indicator/identifier. The PCF device 2114 may determine, from a UDR, user subscription information of the wireless device 2102. At step 2120, the PCF device 2114 may determine URSP rule(s) 2122, for example, based on the at least one wireless device indicator/identifier, the user subscription information, and/or a local operator policy. The URSP rule(s) 2122 may indicate network slices to be used for uplink traffic and downlink traffic associated with one or more applications. The PCF device 2114 may send, to the wireless device 2102 via the AMF device 2106, the URSP rule(s) 2122. The wireless device 2102 may install the URSP rule(s) 2122.

The URSP rule(s) 2122 may comprise at least one of a first URSP rule and a second URSP rule. The first URSP rule may apply to a first application/traffic type (e.g., a UAV application or any other type of application/traffic type), with an uplink network slice corresponding to an eMBB service (or any other service) and a downlink network slice corresponding to a URLLC service (or any other service). The second URSP rule may apply to a second application/traffic type (e.g., a cloud gaming application or any other type of application/traffic type), with an uplink network slice corresponding to a URLLC service (or any other service) and a downlink network slice corresponding to an eMBB service (or any other service).

The wireless device 2102 may receive a service request from an application on the wireless device 2102. The service request may indicate an application type (e.g., a cloud gaming application) of the application sending the service request. The wireless device 2102 may determine that two PDU sessions and/or two network slices may be needed to support the requested application, for example, based on/in response to the service request and/or based on the URSP rule corresponding to the application as received from the PCF device 2114 (e.g., the second URSP rule). A first network slice (e.g., associated with a URLLC service) may be used/applied for uplink traffic, and a second network slice (e.g., associated with an eMBB service) may be used/applied for downlink traffic. The wireless device 2102 may determine that a first PDU session may use the first network slice for the uplink traffic and a second PDU session may use the second network slice for the downlink traffic.

The wireless device 2102 may send, to the AMF device 2106, a NAS message 2124. The NAS message 2124 may request two PDU sessions (e.g., the first PDU session and the second PDU session). The NAS message 2124 may comprise at least one of: a session/network slice correlation indication, an asymmetric service indication, first session information of the first PDU session, network slice information of the first network slice, second session information of the second PDU session, network slice information of the second network slice, and/or an N1 SM container (e.g., comprising a PDU session establishment request message). The first session information of the first PDU session and/or the network slice information of the first network slice may comprise at least one of: a first PDU session indicator/ID, first S-NSSAI(s) and/or NSI indicator(s)/ID(s) of the first S-NSSAI(s), and/or a first DNN. The second session information of the second PDU session and/or the network slice information of the second network slice may comprise at least one of: a second PDU session indicator/ID, second S-NSSAI(s) and/or NSI indicator(s)/ID(s) of the second S-NSSAI(s), and/or a second DNN. The second DNN may be the same as the first DNN. The wireless device 2102 may initiate a wireless device requested PDU session establishment procedure by sending/transmitting a PDU session establishment request message within the N1 SM container of the NAS message 2124. The PDU session establishment request message may comprise at least one of: the session/network slice correlation indication; the asymmetric service indication; the first session information of the first PDU session; the network slice information of the first network slice; the second session information of the second PDU session; the network slice information of the second network slice; a first packet filter for a first direction (e.g., a packet filter for uplink direction), a second packet filter for a second direction (e.g., a packet filter for downlink direction); requested PDU session type, and/or a requested SSC mode, etc. The session/network slice correlation indication and/or the asymmetric service indication may indicate that the first PDU session may be correlated/associated with the second PDU session (e.g., the first PDU session and the second PDU session may be associated with the same application). The session/network slice correlation indication and/or the asymmetric service indication may indicate that the first network slice may be correlated/associated with the second network slice (e.g., the first network slice and the second network slice may be associated with the same application). The asymmetric service indication may indicate different service types for uplink traffic and downlink traffic. The first session information and the second session information may indicate that the first PDU session may be correlated/associated with the second PDU session. The first session information and the second session information may indicate that the first network slice (instance) may be correlated/associated with the second network slice (instance). The first packet filter for the first direction and the second packet filter for the second direction may indicate that the first PDU session may be correlated/associated with the second PDU session. The first packet filter for the first direction and the second packet filter for the second direction may indicate the first network slice (instance) may be correlated/associated with the second network slice (instance).

The AMF device 2106 may determine/select, for the first PDU session and the second PDU session and/or for the first network slice and the second network slice, an SMF device 2110. The AMF device 2106 may determine/select the SMF device 2110, for example, based on (e.g., in response to) the NAS message 2124, based on the session/network slice correlation indication, based on the asymmetric service indication, and/or based on the first session information and the second session information. The AMF device 2106 may send, to the SMF device 2110, a message 2126 (e.g., a PDUSession_CreateSMContext request message). The message 2126 may comprise at least one of: the session/network slice correlation indication; the asymmetric service indication; the first session information of the first PDU session; the network slice information of the first network slice; the second session information of the second PDU session; network slice information of the second network slice; the first packet filter for a first direction (e.g., the packet filter for uplink direction); the second packet filter for the second direction (e.g., the packet filter for downlink direction); the requested PDU session type; the requested SSC mode; and/or an N1 SM container (e.g., comprising the PDU session establishment request message).

The SMF device 2110 may perform one or more actions, for example, based on receiving the message 2126. The SMF device 2110 may determine a wireless device IP address (e.g., IPv4 address and/or IPv6 network prefix) that may be used for the first PDU session and the second PDU session and/or the first network slice and the second network slice, for example, based on the session/network slice correlation indication, the asymmetric service indication, the first session information, and/or the second session information. The one wireless device IP address may be used for more than one PDU session and/or more than one network slice. The SMF device 2110 may determine/create a first PDU session context for the first PDU session and a second PDU session context for the second PDU session. The first PDU session context may comprise the wireless device IP address, the session/network slice correlation indication, the asymmetric service indication, and/or the first session information. The second PDU session context may comprise the wireless device IP address, the session/network slice correlation indication, and/or the second session information. The SMF device 2110 may associate/correlate the first PDU session context with the second PDU session context.

The SMF device 2110 may determine/select a PCF device 2114 for the first PDU session and the second PDU session and/or the first network slice and the second network slice. The SMF device 2110 may send, to the PCF device 2114, a request message 2130 (e.g., a policy establishment request message). The request message 2130 may comprise at least one of: the wireless device IP address, the session/network slice correlation indication, the asymmetric service indication, the first session information, and/or the second session information.

The PCF device 2114 may perform one or more actions, for example, based on/in response to the request message 2130. The PCF device 2114 may correlate/associate the first PDU session with the second PDU session and/or correlate/associate the first network slice with the second network slice, for example, based on information elements in the request message 2130 (e.g., based on the wireless device IP address, the session/network slice correlation indication, the asymmetric service indication, the first session information, and/or the second session information). At step 213, the PCF device 2114 may map the wireless device IP address to the first PDU session and/or the second PDU session, for example, based on information elements in the request message 2130. The PCF device 2114 may map the wireless device IP address to the first network slice and the second network slice, for example, based on information elements in the request message 2130 received from the SMF device 2110.

The PCF device 2114 may determine a first PCC rule. The first PCC rule may comprise the wireless device IP address and/or the first packet filter for the first direction. The first PCC rule may be applied to a first service data flow of the first PDU session. The first PCC rule may be applied to a first QoS flow of the first PDU session. The first PCC rule may be applied to the first PDU session. The first PCC rule may be applied to the first S-NSSAI. The PCF device 2114 may determine a second PCC rule. The second PCC rule may comprise the wireless device IP address and/or the second packet filter for the second direction. The second PCC rule may be applied to a second service data flow of the second PDU session. The second PCC rule may be applied to a second QoS flow of the second PDU session. The second PCC rule may be applied to the second PDU session. The second PCC rule may be applied to the second S-NSSAI.

The first PCC rule and/or the second PCC rule determined by the PCF device 2114 may comprise at least one of: at least one charging control rule, at least one policy control rule (e.g., comprising at least one QoS control rule and/or at least one gating control rule), at least one usage monitoring control rule, at least one application detection and control rule, at least one traffic steering control rule, and/or service data flow detection information (e.g., service data flow template). The charging control rule may be used for charging control. The charging control rule may comprise at least one of: an information element indicating a charging method/charging type, an information element indicating at least one charging rate, and/or an information element indicating at least one indicator/identifier or address of a CHF device 2112. The charging method/charging type may indicate at least one of: online charging, offline charging, and/or converged charging. The policy control rule may be used for policy control, wherein the at least one QoS control rule may be used for QoS control and the at least one gating control rule may be used for gating control. The QoS control rule may be used to authorize QoS on a service data flow. The gating control rule may be used to discard packets that don't match any service data flow of the gating control rule and/or associated PCC rules. The usage monitoring control rule may be used to monitor volume usage and/or time usage, and report accumulated usage of network resources. The application detection and control rule may comprise a request to detect a specified application traffic; to report, to the PCF device 2114, of a start and/or stop of the application traffic; and/or to apply a specified enforcement and charging actions. The traffic steering control rule may be used to activate/deactivate traffic steering policies for steering a subscriber's traffic to appropriate operator or third party service functions (e.g., NAT, antimalware, parental control, DDoS protection) in an (S)Gi-LAN. The service data flow detection information (e.g., service data flow template) may comprise a list of service data flow filters and/or an application identifier that references a corresponding application detection filter for detection of the service data flow. The service data flow detection information may comprise combination of traffic patterns of the ethernet PDU traffic.

The PCF device 2114 may send, to the SMF device 2110, a response message 2134 (e.g., policy establishment response message). The response message 2134 may comprise the first PCC rule and/or the second PCC rule. One charging session may be used for more than one PDU session and/or more than one network slice. The SMF device 2110 may determine a charging session used/applied for the first PDU session and the second PDU session, for example, based on the wireless device IP address, the session/network slice correlation indication, the asymmetric service indication, first session information, and/or the second session information. The SMF device 2110 may send, to the CHF device 2112, a message (e.g., a charging data request message and/or a charging data request initial message) to establish the charging session for the first PDU session and the second PDU session. The charging data request message (e.g., charging data request initial message) may comprise at least one of: the session/network slice correlation indication, the asymmetric service indication, the first session information, the second session information, the wireless device IP address, the first packet filter for the first direction (e.g., the packet filter for uplink), and/or the second packet filter for the second direction (e.g., the packet filter for downlink).

The CHF device 2112 may correlate/associate the first PDU session with the second PDU session and/or correlate/associate the first network slice with the second network slice, for example, based on information elements received from the SMF device 2110 (e.g., the wireless device IP address, the session/network slice correlation indication, the asymmetric service indication, the first session information, and/or the second session information). The CHF device 2112 may determine quotas (e.g., same or different quotas, thresholds, limits, targets, values, etc.) for the associated PDU sessions (e.g., the first PDU session and the second PDU session). The CHF device 2112 may determine quotas (e.g., same or different quotas, thresholds, limits, targets, values, etc.) for the associated network slices (e.g., first network slice and the second network slice). The CHF device 2112 may determine a first quota for the first PDU session and/or the first network slice. The CHF device 2112 may determine a second quota for the second PDU session and/or the second network slice. The CHF device 2112 may determine a larger quota for a PDU session and/or network slice supporting a particular service (e.g., an eMBB service). The CHF device 2112 may determine a smaller quota for a PDU session and/or network slice supporting a particular service (e.g., a URLLC service). The quota may comprise at least one of: a granted unit; a time quota threshold; and/or a volume quota threshold. The CHF device 2112 may send, to the SMF device 2110, a response message (e.g., a charging data response message). The response message may comprise the quotas for the first PDU session and the second PDU session and/or the quotas for the first network slice and the second network slice.

The SMF device 2110 may determine a first user plane rule and/or a second user plane rule, for example, based on (e.g., in response to) the charging data response message (e.g., the quotas for the first PDU session and the second PDU session) received from the CHF device 2112 and/or the PCC rules (e.g., the first PCC rule and/or the second PCC rule) received from the PCF device 2114. The SMF device 2110 may determine a first user plane rule, for example, based on the first quota and/or the first PCC rule. The SMF device 2110 may determine a second user plane rule, for example, based on the second quota and/or the second PCC rule. The first user plane rule may be associated with the first PDU session and/or the first network slice. The second user plane rule may be associated with the second PDU session and/or the second network slice. The first user plane rule and/or the second user plane rule may comprise at least one of: a packet detection rule; a forwarding action rule; a QoS enforcement rule; and/or a usage reporting rule. The first user plane rule may comprise the wireless device IP address and/or the first packet filter for the first direction. The second user plane rule may comprise the wireless device IP address and/or the second packet filter for the second direction. The wireless device IP address may be used to the first user plane rule and the second user plane rule. The SMF device 2110 may associate/correlate the first user plane rule with the second user plane rule, for example, based on the wireless device IP address, the correlation/association of the first PDU session and the second PDU session, and/or the correlation/association of the first network slice and the second network slice. The SMF device 2110 may determine/select a first UPF device for the first PDU session and/or the first S-NSSAI. The SMF device may select a second UPF device for the second PDU session and/or the second S-NSSAI. The second UPF device may be the same as the first UPF device or may be different from the first UPF device. The second UPF device and/or the first UPF device may be a UPF device 2108.

The SMF device 2110 may send to the first UPF device a message (e.g., a first N4 session establishment/modification request message 2136). The first N4 session establishment/modification request message 2136 may comprise the first user plane rule. The first UPF device may (e.g., based on/in response to receiving the message) install the first user plane rule; send, to the SMF device 2110, a response message (e.g., first N4 session establishment/modification response message); and/or enforce the first user plane rule received from the SMF device 2110.

The SMF device 2110 may send to the second UPF device a message (e.g., a second N4 session establishment/modification request message 2138). The second N4 session establishment/modification request message 2138 may comprise the second user plane rule. The second UPF device may (e.g., based on/in response to receiving the message) install the second user plane rule; send, to the SMF device 2110, a response message (e.g., second N4 session establishment/modification response message); and/or enforce the second user plane rule received from the SMF device 2110.

The SMF device 2110 may send, to the wireless device 2102 and via the AMF device 2106 and a base station, a message (e.g., a PDU session establishment accept message 2140). The PDU session establishment accept message 2140 may comprise the wireless device IP address for the first PDU session and the second PDU session. The wireless device 2102 may associate/correlate the first PDU session with the second PDU session and/or may associate/correlate the first network slice with the second network slice, for example, based on the wireless device IP address.

The first UPF device may enforce the first packet detection rule, for example, by matching a user data/traffic packet with service data flow template (e.g., service data flow filters and/or application identifiers). The first UPF device may apply other first user plane rules (e.g., the first forwarding action rule, the first QoS enforcement rule, and/or the first usage reporting rule) to the user data/traffic packets that are matched by the packet detection rule. The first UPF device may enforce the first usage reporting rule by measuring usage of network resources. The usage may be measured based on traffic data volume, duration (e.g., time), and/or events. The usage may be measured according to a measurement method indicated in the first usage reporting rule. The first UPF device may determine a first network resources usage report 2142 based on the first usage reporting rule. The first UPF device may send the first network resources usage report 2142 to the SMF device 2110, for example, if the quota/threshold is reached, based on (e.g., in response to) an event, and/or based on another trigger being met.

The second UPF device may enforce the second packet detection rule, for example, by matching a user data/traffic packet with service data flow template (e.g., service data flow filters and/or application identifiers). The second UPF device may apply other second user plane rules (e.g., the second forwarding action rule, the second QoS enforcement rule, and/or the second usage reporting rule) to the user data/traffic packets that are matched by the packet detection rule.

The second UPF device may enforce the second usage reporting rule by measuring usage of network resources. The usage may be measured based on traffic data volume, duration (e.g., time) and/or events. The usage may be measured according to a measurement method indicated by the second usage reporting rule. The second UPF device may determine a second network resources usage report 2144 based on the second usage reporting rule. The second UPF device may send to the SMF device 2110, the second network resources usage report 2144, for example, if the quota/threshold is reached, based on/in response to an event, and/or based on another trigger being met.

At step 2146, the SMF device 2110 may aggregate the first network resources usage report 2142 and the second network resources usage report 2144 into an aggregated CDR for the first PDU session and the second PDU session (and/or for the first network slice and the second network slice), for example, based on (e.g., in response to) the network resources usage reports received from the first UPF device and the second UPF device and/or based on the correlation/association of the first user plane rule and the second user plane rule. The SMF device 2110 may send, to the CHF device 2112, a message 2148 (e.g., a charging data request message and/or a charging data request update message). The message 2148 may comprise the aggregated CDR. The CHF device 2112 may update the quotas based on the aggregated CDR. The CHF device 2112 may send the updated quotas to the SMF device 2110 for enforcement.

Figure 22:
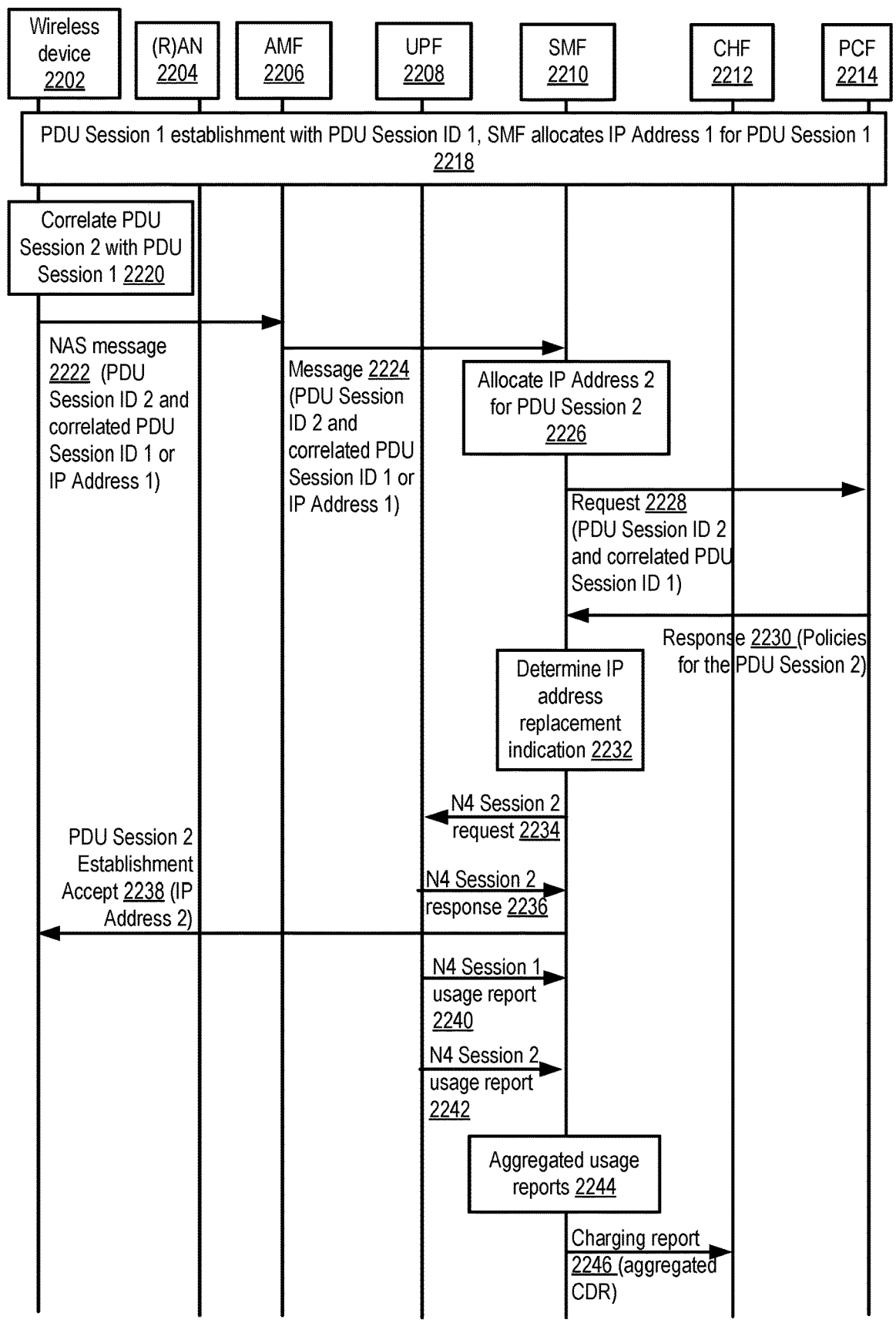
FIG. 22 shows example call flows associated with asymmetric services using different wireless device internet protocol (IP) addresses.

FIG. 22 shows example call flows associated with asymmetric services, for an application, with different wireless device IP addresses. A wireless device 2202 (e.g., UE or any other wireless device) may receive a service request from an application on the wireless device 2202. The service request may indicate, for the same application, a first slice service type (SST) for a first direction and a second SST for a second direction. The application may be a cloud gaming application, a UAV application, and/or any other application. The service request may indicate a service direction. The first direction may be an uplink direction or may be a downlink direction. The second direction may be a downlink direction or may be an uplink direction. The second direction may be different from the first direction. An uplink direction may indicate that signal/data is sent from the wireless device 2202 to an access network (e.g., (R)AN 2204) and/or a core network and/or a data network. A downlink direction may indicate that signal/data is sent from a data network and/or a core network and/or an access network (e.g., (R)AN 2204) to the wireless device 2202. The service request may indicate a first SST for uplink direction and a second (e.g., different SST) for downlink direction. The service request may indicate that the first SST for uplink direction corresponds to an eMBB service (or any other service) and the second SST downlink direction corresponds to a URLLC service (or any other service). The service request may indicate that the first SST for uplink direction corresponds to a URLLC service (or any other service) and the second SST for downlink direction corresponds to an eMBB service (or any other service). The first SST for uplink direction and the second SST for downlink direction may correspond to different service. The first SST for uplink direction and the second SST for downlink direction may correspond to the same (or similar) service.

The wireless device 2202 may determine a first network slice corresponding to the first SST for the first direction and a second network slice corresponding to the second SST for the second direction, for example, based on (e.g., in response to) the service request. The wireless device 2202 may determine that a first PDU session for the first direction may use the first network slice and a second PDU session for the second direction may use the second network slice. The wireless device 2202 may determine that the first PDU session may use the first network slice (e.g., corresponding to first S-NSSAI with an SST indicating an eMBB service, or any other service) for the uplink direction, and the second PDU session may the second network slice (e.g., corresponding to second S-NSSAI with an SST indicating a URLLC service, or any other service) for the downlink direction. The first PDU session and/or the first network slice may support at least one of the following services in the first direction: an eMBB service; a URLLC service; an MIoT service, and/or any other service. The second PDU session and/or the second network slice may support at least one of the following services in the second direction: an eMBB service; a URLLC service; an MIoT service, and/or any other service.

The wireless device 2202 may send, to an AMF device (e.g., an AMF device 2206), a first NAS message requesting the first PDU session. The first NAS message may comprise at least one of: the first S-NSSAI(s) and/or the NSI indicator(s)/ID(s) of the first S-NSSAI(s), a first DNN, a first PDU session indicator/ID, an indicator of a request type, or an N1 SM container (e.g., comprising a first PDU session establishment request message). The wireless device 2202 may initiate a wireless device-requested PDU session establishment procedure by sending/transmitting the first PDU session establishment request message within the N1 SM container of the first NAS message. The first PDU session establishment request message may comprise at least one of: the first PDU session indicator/ID, a first packet filter for the first direction (e.g., packet filter for uplink), requested PDU session type, or a requested SSC mode, etc. The AMF device 2206 may determine/select an SMF device and send, to the determined/selected SMF device, a message (e.g., a PDUSession_CreateSMContext request), for example, based on (e.g., in response to) receiving the first NAS message from the wireless device 2202. The message may comprise at least one of: a SUPI, the first DNN, the first S-NSSAI(s) and/or the NSI indicator(s)/ID(s) of the first S-NSSAI(s), the first PDU session indicator/ID, an AMF indicator/ID, an indicator of a request type, an indicator of a priority access, an N1 SM container (e.g., comprising the first PDU session establishment request message).

The SMF device may perform one or more actions, for example, based on receiving the message from the AMF device 2206. The SMF device may allocate a first wireless device IP address (e.g., IPv4 address and/or IPv6 network prefix). The SMF device may send, to a PCF device, a message (e.g., a first policy establishment request message). The message may comprise at least one of: the first wireless device IP address; the first packet filter for the first direction; the first DNN; the first S-NSSAI(s) and/or the NSI indicator(s)/ID(s) of the S-NSSAI(s); the first PDU session indicator/ID; at least one wireless device indicator/identifier (e.g., SUPI, PEI, and/or GPSI); default 5QI; default ARP; type of PDU Session (e.g., IPv4, IPv6, IPv4v6, ethernet, unstructured); access type (e.g., 3GPP access); RAT Type (e.g., 3GPP-NR-FDD); a PLMN indicator/identifier; an application indicator/identifier; an allocated application instance indicator/identifier; user location information; and/or information corresponding to the SMF device (e.g., SMF indicator/identifier, IP address or FQDN of the SMF device). The PCF device may determine a first PCC rule, for example, based on/in response to receiving the first policy establishment request message. The first PCC rule may comprise the first wireless device IP address and/or the first packet filter for the first direction. The first PCC rule may be applied to a first service data flow of the first PDU session. The first PCC rule may be applied to/used for a first QoS flow of the first PDU session. The first PCC rule may be applied to/used for the first PDU session. The first PCC rule may be applied to/used for the first S-NSSAI. The PCF device may send, to the SMF device, a response message (e.g., a first policy establishment response message). The response message may comprise the first PCC rule.

The SMF device may send, to a CHF device, a message (e.g., a charging data request message and/or a charging data request initial message) to determine/establish a charging session for the first PDU session of the wireless device 2202. The CHF device may send, to the SMF device, a response message, for example, based on the message. The SMF device may determine, for example, based on the first PCC rule, a first user plane rule associated with the first PDU session. The first user plane rule may comprise at least one of: a first packet detection rule; a first forwarding action rule; a first QoS enforcement rule; and/or a first usage reporting rule. The first user plane rule may comprise the first wireless device IP address and/or the first packet filter for the first direction. The first packet detection rule may comprise the first wireless device IP address and/or the first packet filter for the first direction. The SMF device may determine/select a first UPF device for the first PDU session and/or the first S-NSSAI. The SMF device may send, to the first UPF device, a message (e.g., an N4 session establishment/modification request message). The message may comprise the first user plane rule. The first UPF device may (e.g., based on/in response to receiving the message from the SMF device) install the first user plane rule, send a response message (e.g., an N4 session establishment/modification response message) to the SMF device, and/or enforce the first user plane rule received from the SMF device.

The SMF device may send, to the wireless device 2202 and via the AMF device 2206 and a base station, a message (e.g., a first PDU session establishment accept message). The first PDU session establishment accept message may comprise the first wireless device IP address.

The wireless device 2202 may send, to the AMF device 2206, a second NAS message 2222 requesting the second PDU session. The second NAS message 2222 may comprise at least one of: a session/network slice correlation indication; an asymmetric service indication; session information of the first PDU session and/or network slice information of the first network slice; the second S-NSSAI(s) and/or NSI indicator(s)/ID(s) of the second S-NSSAI(s); a second DNN; a second PDU session indicator/ID; an indicator of a request type, and/or N1 SM container (e.g., comprising a second PDU session establishment request). The second DNN may be the same as the first DNN of the first PDU session. The wireless device 2202 may initiate a wireless device requested PDU session establishment procedure, for example, by sending/transmitting a second PDU session establishment request message within the N1 SM container of the NAS message 2222. The second PDU session establishment request message may comprise at least one of: the session/network slice correlation indication; the asymmetric service indication; the session information of the first PDU session and/or the network slice information of the first network slice; the second PDU session indicator/ID; a second packet filter for the second direction (e.g., packet filter for downlink direction); requested PDU session type; and/or a requested SSC mode, etc. The session information of the first PDU session and/or the network slice information of the first network slice may comprise at least one of: the first PDU session indicator/ID; the wireless device IP address; the first S-NSSAI(s) and/or the NSI indicator(s)/ID(s) of the first S-NSSAI(s); and/or the first DNN. The asymmetric service indication may indicate different service types for uplink traffic and downlink traffic. The session/network slice correlation indication, the asymmetric service indication, the session information of the first PDU session, and/or the network slice information of the first network slice may indicate that the first PDU session may be correlated/associated with the second PDU session (e.g., the first PDU session and the second PDU session may be associated with the same application and/or the first PDU session and the second PDU session may support the same application). The session/network slice correlation indication, the asymmetric service indication, the session information of the first PDU session, the network slice information of the first network slice may indicate that the first network slice may be correlated/associated with the second network slice (e.g., the first network slice and the second network slice may be associated with the same application and/or the first network slice and the second network slice may support the same application). The session/network slice correlation indication, the asymmetric service indication, the session information of the first PDU session, and/or the network slice information of the first network slice may indicate that the first network slice instance may be correlated/associated with the second network slice instance (e.g., the first network slice instance and the second network slice instance may be associated with the same application).

The second packet filter for the second direction (e.g., packet filter for downlink direction) may comprise the first wireless device IP address to indicate that the first PDU session is correlated/associated with the second PDU session. The second packet filter for the second direction (e.g., packet filter for downlink direction) may comprise the first wireless device IP address to indicate that the first network slice (instance) is correlated/associated with the second network slice (instance). The NAS message 2222 may comprise other information as described above with reference to the NAS message 1622.

The AMF device 2206 may determine/select an SMF device 2210 for the second PDU session and/or the second network slice. The SMF device 2210 for the second PDU session and/or the second network slice may be the same SMF device as was determined/selected for the first PDU session and/or the first network slice. The SMF device 2210 for the second PDU session and/or the second network slice may be a different SMF device as was determined/selected for the first PDU session and/or the first network slice. The AMF device 2206 may determine/select the same SMF device, for the second PDU session and/or the second network slice, as was determined/selected for the first PDU session and/or the first network slice, for example, based on receiving the second NAS message 2222 and based on the session/network slice correlation indication, the asymmetric service indication, the session information of the first PDU session, and/or the network slice information of the first network slice. The AMF device 2206 may determine/select the same SMF device for the second PDU session, as was determined/selected for the first PDU session and/or the first network slice, for example, based on the first wireless device IP address in the second packet filter (e.g., packet filter for downlink direction). The AMF device 2206 may send, to the SMF device 2210, a message 2224 (e.g., PDUSession_CreateSMContext request). The message 2224 may comprise at least one of: the session/network slice correlation indication; the asymmetric service indication; the session information of the first PDU session; the network slice information of the first network slice; the SUPI; the second DNN; the second S-NSSAI(s) and/or the NSI indicator(s)/ID(s) of the second S-NSSAI(s); the second PDU session indicator/ID, the AMF indicator/ID, an indicator of a request type, a priority access indicator, an N1 SM container (e.g., comprising the second PDU session establishment request).

The SMF device 2210 may perform one or more actions, for example, based on receiving the message 2224 from the AMF device 2206. The SMF device 2210 may determine a second wireless device IP address (e.g., UE IPv4 address and/or UE IPv6 network prefix) is used for the second PDU session and/or the second network slice. The second wireless device IP address may be different from the first wireless device IP address or may the same as the first wireless device IP address.

The SMF device 2210 may determine/select a PCF device 2214 for the second PDU session and/or second network slice. The PCF device 2214 may be the same PCF device as was used for the first PDU session and/or the first network slice. The PCF device 2214 may be a PCF device that is different from the PCF device used for the first PDU session and/or the first network slice. The SMF device 2210 may determine/select the same PCF device for the second PDU session and/or second network slice as was used for the first PDU session and/or the first network slice, for example, based on the session/network slice correlation indication, the asymmetric service indication, the session information of the first PDU session, and/or the network slice information of the first network slice. The SMF device 2210 may select the same PCF device 2214 for the second PDU session as was used for the first PDU session and/or the first network slice, for example, based on the first wireless device IP address in the second packet filter (e.g., packet filter for downlink direction).

The SMF device 2210 may send, to the PCF device 2214, a request message 2228 (e.g., a second policy establishment request message). The request message 2228 may comprise at least one of: the session/network slice correlation indication; the asymmetric service indication; the session information of the first PDU session; the network slice information of the first network slice; the second wireless device IP address; the second packet filter for the second direction; the second DNN; the second S-NSSAI(s) and/or the NSI indicator(s)/ID(s) of the second S-NSSAI(s), the second PDU session indicator/ID, at least one wireless device indicator/identifier (e.g., SUPI, PEI, and/or GPSI), a default 5QI; a default ARP, a type of PDU Session (e.g., IPv4, IPv6, IPv4v6, ethernet, unstructured); an access type (e.g., 3GPP access); a RAT Type (e.g., 3GPP-NR-FDD); a PLMN indicator/identifier; an application indicator/identifier; an allocated application instance indicator/identifier; user location information, and/or information corresponding to the SMF device 2210 (e.g., SMF identifier, IP address, and/or FQDN of the SMF device 2210).

The PCF device 2214 may perform one or more actions, for example, based on (e.g., in response to) the request message 2228. The PCF device 2214 may correlate/associate the first PDU session with the second PDU session, and/or may correlate/associate the first network slice with the second network slice, and/or may correlate/associate the first wireless device IP address with the second wireless device IP address, for example, based on information received from the SMF device 2210 (e.g., the session/network slice correlation indication, the asymmetric service indication, session information of the first PDU session, and/or network slice information of the first network slice, etc.). The PCF device 2214 may determine a new first PCC rule and/or may update the existing first PCC rule. The PCF device 2214 may determine a second PCC rule. The second PCC rule may comprise the second wireless device IP address and/or the second packet filter for the second direction. The second PCC rule may be applied to/used for a second service data flow of the second PDU session. The second PCC rule may be applied to/used for a second QoS flow of the second PDU session. The second PCC rule may be applied to/used for the second PDU session. The second PCC rule may be applied to/used for the second S-NSSAI.

The first PCC rule and/or the second PCC rule determined by the PCF device 2214 may comprise at least one of: at least one charging control rule, at least one policy control rule (e.g., comprising at least one QoS control rule and/or at least one gating control rule), at least one usage monitoring control rule, at least one application detection and control rule, at least one traffic steering control rule, and/or service data flow detection information (e.g., service data flow template). The charging control rule may be used for charging control. The charging control rule may comprise at least one of: an information element indicating a charging method/charging type, an information element indicating at least one charging rate, and/or an information element indicating at least one indicator/identifier or address of a CHF device 2212. The charging method/charging type may indicate at least one of: online charging, offline charging, and/or converged charging. The policy control rule may be used for policy control, wherein the at least one QoS control rule may be used for QoS control and the at least one gating control rule may be used for gating control. The QoS control rule may be used to authorize QoS on a service data flow. The gating control rule may be used to discard packets that don't match any service data flow of the gating control rule and/or associated PCC rules. The usage monitoring control rule may be used to monitor volume usage and/or time usage, and report accumulated usage of network resources. The application detection and control rule may comprise a request to detect a specified application traffic; to report, to the PCF device 2214, of a start and/or stop of the application traffic; and/or to apply a specified enforcement and charging actions. The traffic steering control rule may be used to activate/deactivate traffic steering policies for steering a subscriber's traffic to appropriate operator or third party service functions (e.g., NAT, anti-malware, parental control, DDoS protection) in an (S)Gi-LAN. The service data flow detection information (e.g., service data flow template) may comprise a list of service data flow filters and/or an application identifier that references a corresponding application detection filter for detection of the service data flow. The service data flow detection information may comprise combination of traffic patterns of the ethernet PDU traffic.

The PCF device 2214 may send, to the SMF device 2210, a response message 2230 (e.g., a second policy establishment response message). The response message 2230 may comprise the second PCC rule. The PCF device 2214 may send, to the SMF device 2210, a message for the first PDU session. The message may comprise the new/updated first PCC rule.

One charging session may be used for more than one PDU session and/or more than one network slice. The SMF device 2210 may determine that the charging session determined/created for the first PDU session may be used for the second PDU session, for example, based on the session/network slice correlation indication, the asymmetric service indication, the session information of the first PDU session, and/or the network slice information of the first network slice. The SMF device 2210 may send, to the CHF device 2212, a message (e.g., a charging data request message and/or a charging data request update message) to update the charging session for the first PDU session and the second PDU session. The message may comprise at least one of: the session/network slice correlation indication; the asymmetric service indication; the session information of the first PDU session; the network slice information of the first network slice; the first wireless device IP address; the second packet filter for the second direction; the second DNN; the second S-NSSAI(s) and/or the NSI indicator(s)/ID(s) of the second S-NSSAI(s); the second PDU session indicator/ID; at least one wireless device indicator/identifier (e.g., SUPI, PEI, and/or GPSI); a default 5QI; a default ARP; a type of PDU Session (e.g., IPv4, IPv6, IPv4v6, ethernet, unstructured); an access type (e.g., 3GPP access); a RAT Type (e.g., 3GPP-NR-FDD); a PLMN indicator/identifier; an application indicator/identifier; an allocated application instance indicator/identifier; user location information, and/or information of the SMF device 2210 (e.g., SMF indicator/identifier, IP address, and/or or FQDN of the SMF device 2210).

The CHF device 2212 may correlate/associate the first PDU session with the second PDU session and/or may correlate/associate the first network slice with the second network slice, for example, based on the information elements received from the SMF device 2210 (e.g., based on the asymmetric service indication, the session/network slice correlation indication, the session information of the first PDU session, and/or the network slice information of the first network slice). The CHF device 2212 may determine quotas (e.g., same or different quotas, thresholds, limits, targets, values, etc.) for the associated PDU sessions (e.g., the first PDU session and the second PDU session). The CHF device 2212 may determine quotas (e.g., same or different quotas, thresholds, limits, targets, values, etc.) for the associated network slices (e.g., the first network slice and the second network slice). The CHF device 2212 may determine a first quota for the first PDU session and/or the first network slice. The CHF device 2212 may determine a second quota for the second PDU session and/or the second network slice. The CHF device 2212 may determine a larger quota for a PDU session and/or network slice supporting an eMBB service. The CHF device 2212 may determine a smaller quota for a PDU session and/or network slice supporting a URLLC service. The quota may comprise at least one of: a granted unit; a time quota threshold; and/or a volume quota threshold. The CHF device 2212 may send, to the SMF device 2210, a response message (e.g., a charging data response message). The response message may comprise the quotas for the first PDU session and the second PDU session, and/or the quotas for the first network slice and the second network slice.

The SMF device 2210 may determine a first user plane rule and/or a second user plane rule, for example, based on/in response to the charging data response message (e.g., the quotas for the first PDU session and the second PDU session) received from the CHF device 2212 and/or the PCC rules (e.g., the first PCC rule and/or the second PCC rule) received from the PCF device 2214. The SMF device 2210 may determine anew first user plane rule and/or update the existing first user plane rule, for example, based on the first quota and/or the first PCC rule. At step 2232, the SMF device 2210 may determine an IP address association/correlation/replacement indication. The IP address association/correlation/replacement indication may indicate that the first wireless device IP address may be correlated/associated with the second wireless device IP address and/or may indicate that the first wireless device IP address may be replaced by the second wireless device IP address. The SMF device 2210 may determine a second user plane rule, for example, based on the second quota and/or the second PCC rule. The first user plane rule may be associated with the first PDU session and/or the first network slice. The second user plane rule may be associated with the second PDU session and/or the second network slice. The second user plane rule may comprise at least one of: a second packet detection rule; a second forwarding action rule; a second QoS enforcement rule; and/or a second usage reporting rule. The second user plane rule may comprise at least one of: the second wireless device IP address, the second packet filter for the second direction, the first wireless device IP address, and/or the IP address association/correlation/replacement indication. The second forwarding action rule may comprise at least one of: the second wireless device IP address, the second packet filter for the second direction, the first wireless device IP address, and/or the IP address association/correlation/replacement indication (e.g., to indicate that the first wireless device IP address may be correlated/associated with the second wireless device IP address, and/or the first wireless device IP address in a downlink user plane data packet from a data network may be replaced with the second wireless device IP address by a UPF device receiving the downlink user plane data packet). The second packet detection rule may comprise the second wireless device IP address and/or the second packet filter for the second direction.

The SMF device 2210 may associate/correlate the first user plane rule with the second user plane rule, for example, based on the correlation/association of the first PDU session and the second PDU session, and/or based on the correlation/association of the first network slice and the second network slice. The SMF device 2210 may determine/select a second UPF device 2208 for the second PDU session and/or the second S-NSSAI. The second UPF device 2208 may be the same as the first UPF device or may be different from the first UPF device.

The SMF device 2210 may send, to the second UPF device 2208, a message (e.g., an N4 session establishment/modification request message 2234). The message may comprise the second user plane rule. The second UPF device 2208 may (e.g., based on/in response to receiving the message from the SMF device 2210) install the second user plane rule, send, to the SMF device 2210, a response message (e.g., an N4 session establishment/modification response message 2236), and/or enforce the second user plane rule received from the SMF device 2210. The SMF device 2210 may send to the first UPF device a message (e.g., an N4 session establishment/modification request message). The message may comprise the first user plane rule. The first UPF device may (e.g., based on/in response to receiving the message from the SMF device 2210) install the first user plane rule, send, to the SMF device 2210, a response message (e.g., an N4 session establishment/modification response message), and/or enforce the first user plane rule received from the SMF device 2210.

The SMF device 2210 may send, to the wireless device 2202 and via the AMF device 2206 and a base station, a second message (e.g., a second PDU session establishment accept message 2238). The second PDU session establishment accept message 2238 may comprise the second wireless device IP address.

The wireless device 2202 may communicate with an application server using two PDU sessions and/or two network slices, for example, based on/after establishing the two PDU sessions (e.g., the first PDU session and the second PDU session). The wireless device 2202 may send user data, associated with an application on the wireless device 2202, to the application server over the first PDU session and/or the first network slice. The wireless device 2202 may use an eMBB service for uplink traffic. The wireless device 2202 may receive user data, associated with the application on the wireless device 2202, from the application server over the second PDU session and/or the second network slice. The wireless device 2202 may use a URLLC service for downlink traffic. The SMF device 2210 may determine a first user plane rule and/or a second user plane rule to process one or more acknowledgement packets (e.g., TCP ACK packets, TCP NAK packets) between the wireless device 2202 and the application server. The application server may send an acknowledgement packet (e.g., for uplink traffic using an eMBB service) via the downlink channel and the SMF device 2210 may determine a second user plane rule to apply an eMBB QoS or a URLLC QoS for the acknowledgement packet. The wireless device 2202 may send an acknowledgement packet (e.g., for downlink traffic using a URLLC service) via an uplink channel and/or the SMF device may determine a first user plane rule to apply a URLLC QoS or an eMBB QoS for the acknowledgement packet. The SMF device 2210 may send the first user plane rule and/or the second user plane rule to the first UPF device and the second UPF device 2208, respectively, for enforcing of the first user plane rule and/or the second user plane rule.

The first UPF device may enforce the first packet detection rule, for example, by matching a user data/traffic packet with service data flow template (e.g., service data flow filters and/or application identifiers). The first UPF device may apply other first user plane rules (e.g., the first forwarding action rule, the first QoS enforcement rule, and/or the first usage reporting rule) to the user data/traffic packets that are matched by the packet detection rule.

The first UPF device may enforce the first usage reporting rule by measuring usage of network resources. The usage may be measured based on traffic data volume, duration (e.g., time), and/or events. The usage may be measured according to a measurement method indicated in the first usage reporting rule. The first UPF device may determine a first network resources usage report 2240 based on the first usage reporting rule. The first UPF device may send the first network resources usage report 2240 to the SMF device 2210, for example, if the quota/threshold is reached, based on (e.g., in response to) an event, and/or based on another trigger being met.

The second UPF device 2208 may enforce the second packet detection rule, for example, by matching a user data/traffic packet with service data flow template (e.g., service data flow filters and/or application identifiers). The second UPF device 2208 may apply other second user plane rules (e.g., the second forwarding action rule, the second QoS enforcement rule, and/or the second usage reporting rule) to the user data/traffic packets that are matched by the packet detection rule.

The second UPF device 2208 may enforce the second usage reporting rule by measuring usage of network resources. The usage may be measured based on traffic data volume, duration (e.g., time) and/or events. The usage may be measured according to a measurement method indicated by the second usage reporting rule. The second UPF device 2208 may determine a second network resources usage report 2242 based on the second usage reporting rule. The second UPF device 2208 may send to the SMF device 2210, the second network resources usage report 2242, for example, if the quota/threshold is reached, based on (e.g., in response to) an event, and/or based on another trigger being met.

The second UPF device 2208 may enforce the second user plane rule (e.g., the second forwarding action rule). The second UPF device 2208 may receive a downlink user plane data packet from an application server (e.g., in a data network). The downlink user plane data packet may comprise the first wireless device IP address. The second UPF device 2208 may detect the downlink user plane data packet using the second packet detection rule. The second UPF device 2208 may enforce the second user plane rule by replacing the first wireless device IP address with the second wireless device IP address and forwarding the downlink user plane data packet to the wireless device 2202.

At step 2244, the SMF device 2210 may aggregate the first network resources usage report 2240 and the second network resources usage report 2242 into an aggregated CDR for the first PDU session and the second PDU session (and/or for the first network slice and the second network slice), for example, based on (e.g., in response to) the network resources usage reports received from the first UPF device and the second UPF device 2208 and/or based on the correlation/association of the first user plane rule and the second user plane rule. The SMF device 2210 may send, to the CHF device 2212, a message 2246 (e.g., a charging data request message and/or a charging data request update message). The message 2246 may comprise the aggregated CDR. The CHF device 2212 may update the quotas based on the aggregated CDR. The CHF device 2212 may send the updated quotas to the SMF device 2210 for enforcement.

Figure 23:
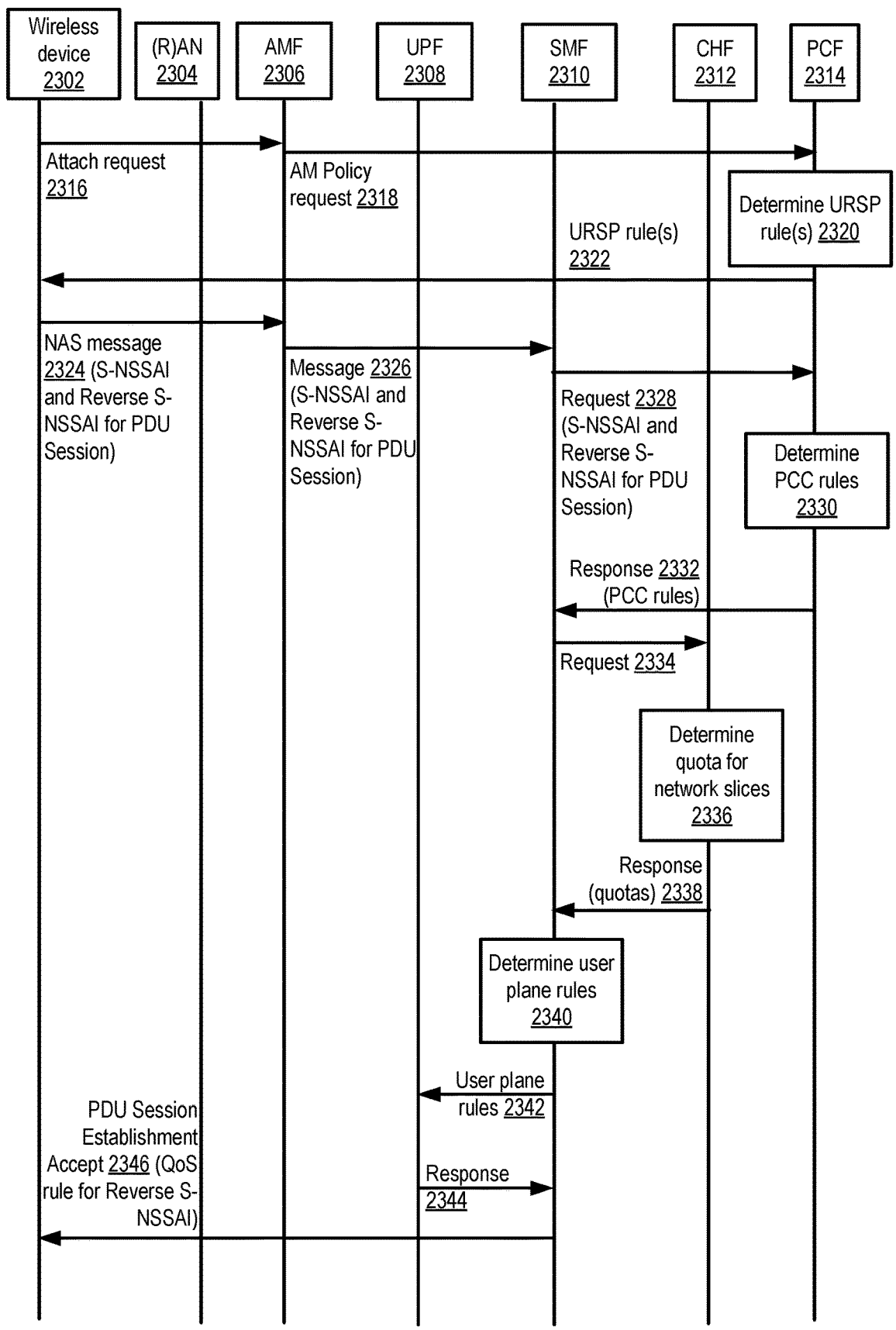
FIG. 23 shows example call flows associated with asymmetric services using a single PDU session.

FIG. 23 shows example call flows associated with asymmetric services, for an application (or any quantity of applications), using a single PDU session. A wireless device 2302 may attach to the network by sending, to an AMF device 2306, an attach request message 2316. The attach request message 2316 may comprise at least one wireless device indicator/identifier (e.g., SUPI, PEI, and/or GPSI). The AMF device 2306 may send, to a PCF device 2314, a message (e.g., access management policy request message 2318). The message may comprise the at least one wireless device indicator/identifier. The PCF device 2314 may determine, from a UDR, user subscription information of the wireless device 2302. At step 2320, the PCF device 2314 may determine URSP rule(s) 2322, for example, based on the at least one wireless device indicator/identifier, the user subscription information, and/or a local operator policy. The URSP rule(s) 2322 may indicate network slices to be used for uplink traffic and downlink traffic associated with one or more applications. The URSP rule(s) 2322 may indicate, for an application (or any quantity of applications), a first network slice for a first direction (e.g., uplink direction), and a second/reverse network slice for a second direction (e.g., downlink direction). The PCF device 2314 may send, to the wireless device 2302 via the AMF device 2306, the URSP rule(s) 2322. The wireless device 2302 may install the URSP rule(s) 2322.

The URSP rule(s) 2322 may comprise at least one of a first URSP rule and a second URSP rule. The first URSP rule may apply to a first application/traffic type (e.g., a UAV application), with a first (e.g., uplink) network slice corresponding to an eMBB service (or any other service) and a second/reverse (e.g., downlink) network slice corresponding to a URLLC service (or any other service). The second URSP rule may apply to a second application/service type (e.g., a cloud gaming application), with a first (e.g., uplink) network slice corresponding to a URLLC service (or any other service) and a second/reverse (e.g., downlink) network slice corresponding to an eMBB service (or any other service).

The wireless device 2302 may receive a service request from an application on the wireless device 2302. The service request may indicate an application type (e.g., a cloud gaming application or any other type of application) of the application sending the service request. The wireless device 2302 may determine one PDU session to support two network slices for the requested application, for example, based on/in response to the service request and based on the URSP rule(s) 2322 (e.g., the second URSP rule). A first network slice (e.g., associated with a URLLC service) may be used/applied for uplink traffic and a second network slice (e.g., associated with an eMBB service) may be used/applied for downlink traffic. Using a single PDU session with two network slices may simplify wireless device IP address allocation procedures (e.g., at an SMF device).

The wireless device 2302 may send, to the AMF device 2306, a NAS message 2324. The NAS message 2324 may request a PDU session. The NAS message 2324 may comprise at least one of: a network slice correlation indication; an asymmetric service indication; a QoS flow correlation indication; a first requested QoS for a first direction (e.g., uplink direction); a second requested QoS for a second direction (e.g., downlink direction); a PDU session indicator/ID; first S-NSSAI(s) and/or NSI indicator(s)/ID(s) of the first S-NSSAI(s) for the first direction (e.g., uplink direction); second/reverse S-NSSAI(s) and/or NSI indicator(s)/ID(s) of the second S-NSSAI(s) for the second direction (e.g., downlink direction); a DNN; and/or an N1 SM container (e.g., comprising a PDU session establishment request). The asymmetric service indication may indicate different service types for uplink traffic and downlink traffic. The QoS flow correlation indication may indicate QoS for QoS flows corresponding to uplink traffic and downlink traffic. A first QoS flow may require an eMBB QoS for uplink traffic and a second QoS flow may require a URLLC QoS flow for downlink traffic. The QoS flow correlation indication may indicate that a first QoS flow is correlated/associated with a second QoS flow (e.g., the first QoS flow and the second QoS flow may support the same application). The first requested QoS may apply to the first QoS flow. The second requested QoS may apply to the second QoS flow. The first requested QoS and/or the second requested QoS may comprise at least one of: a QoS service type (e.g., an eMBB service, a URLLC service); a 5QI; a QCI; an ARP; an uplink GFBR; a downlink GFBR; an uplink MFBR; and/or a downlink MFBR.

The network slice correlation indication, the asymmetric service indication, and/or the QoS flow correlation indication may indicate that the first network slice (instance) is associated/correlated with the second network slice (instance) (e.g., the first network slice (instance) and the second network slice (instance) may support the same application). The network slice correlation indication, the asymmetric service indication, and/or the QoS flow correlation indication may indicate that the first S-NSSAI is associated/correlated with the second S-NSSAI. The network slice correlation indication, the asymmetric service indication, and/or the QoS flow correlation indication may indicate that a first service type (e.g., a URLLC service) is supported by the first network slice for the first direction (e.g., uplink direction), and a second service type (e.g., an eMBB service) is supported by the second network slice for the second direction (e.g., downlink direction).

The wireless device 2302 may initiate a wireless device requested PDU session establishment procedure by sending/transmitting a PDU session establishment request message within the N1 SM container of the NAS message 2324. The PDU session establishment request message may comprise at least one of: the network slice correlation indication; the asymmetric service indication; the QoS flow correlation indication; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the first packet filter for the first direction (e.g., packet filter for uplink direction); the second packet filter for the second direction (e.g., packet filter for downlink direction); a requested PDU session type; and/or a requested SSC mode, etc.

The wireless device 2302 may determine that the first network slice (instance) is correlated/associated with the second network slice (instance), for example, if the first network slice (instance) and the second network slice (instance) support the same application. The wireless device 2302 may determine that the first (slice) service type is correlated/associated with the second (slice) service type, for example, if the first (slice) service type and the second (slice) service type support the same application. The wireless device 2302 may determine that the first QoS flow is correlated/associated with the second QoS flow, for example, if the first QoS flow and the second QoS flow support the same application.

The AMF device 2306 may determine/select an SMF device (e.g., SMF device 2310) to support two network slices for the same PDU session, for example, based on/in response to the NAS message received from the wireless device 2302 and/or based on the network slice correlation indication and/or the asymmetric service indication. The AMF device 2306 may send, to the SMF device 2310, a message 2326 (e.g., a PDUSession_CreateSMContext request message). The message 2326 may comprise at least one of: the network slice correlation indication; the asymmetric service indication; the QoS flow correlation indication; the first requested QoS; the second requested QoS; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the DNN; and/or an N1 SM container (e.g., comprising the PDU session establishment request message).

The SMF device 2310 may perform one or more actions, for example, based on (e.g., in response to) receiving the message 2326. The SMF device 2310 may determine/allocate a wireless device IP address (e.g., UE IPv4 address and/or UE IPv6 network prefix) for the PDU session and/or for the first network slice and the second network slice. The SMF device 2310 may determine/select a PCF device (e.g., a PCF device 2314) for the PDU session and/or for the first network slice and the second network slice. The SMF device 2310 may send, to the PCF device 2314, a request message 2328 (e.g., a policy establishment request message). The request message 2328 may comprise at least one of: the wireless device IP address, the network slice correlation indication; the asymmetric service indication; the QoS flow correlation indication; the first requested QoS; the second requested QoS; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the first packet filter for the first direction (e.g., the packet filter for uplink direction), the second packet filter for the second direction (e.g., the packet filter for downlink direction), the requested PDU session type, and/or the requested SSC mode, etc.

The PCF device 2314 may perform one or more actions, for example, based on (e.g., in response to) receiving the request message 2328. The PCF device 2314 may correlate/associate the first network slice with the second network slice, correlate/associate the first QoS flow with the second QoS flow, map the UE IP address to the PDU session, and/or map the wireless device IP address to the first network slice and the second network slice, for example, based on information elements received from the SMF device 2310 (e.g., the network slice correlation indication, the asymmetric service indication, and/or the QoS flow correlation indication).

At step 2330, the PCF device 2314 may determine PCC rules for the first network slice and the second network slice. The PCF device 2314 may determine a first PCC rule for the first network slice for the first direction, for example, based on the information received from the SMF device 2310 (e.g., the network slice correlation indication, the asymmetric service indication, and/or the QoS flow correlation indication). The PCF device 2314 may determine the first PCC rule for the first S-NSSAI for the uplink service (e.g., the URLLC service). The PCF device 2314 may determine a first PCC rule for the first QoS flow for the first direction. The PCF device 2314 may determine a second PCC rule for the second network slice for the second direction, for example, based on the information received from the SMF device 2310 (e.g., the network slice correlation indication, the asymmetric service indication, and/or the QoS flow correlation indication). The PCF device 2314 may determine the second PCC rule for the second S-NSSAI for the downlink service (e.g., the eMBB service). The PCF device 2314 may determine a first PCC rule for the first QoS flow for the first direction. The first PCC rule may comprise the wireless device IP address and/or the first packet filter for the first direction (e.g., uplink direction), and the second PCC rule may comprise the wireless device IP address and/or the second packet filter for the second direction (e.g., downlink direction).

The first PCC rule and/or the second PCC rule determined by the PCF device 2314 may comprise at least one of: at least one charging control rule, at least one policy control rule (e.g., comprising at least one QoS control rule and/or at least one gating control rule), at least one usage monitoring control rule, at least one application detection and control rule, at least one traffic steering control rule, and/or service data flow detection information (e.g., service data flow template). The charging control rule may be used for charging control. The charging control rule may comprise at least one of: an information element indicating a charging method/charging type, an information element indicating at least one charging rate, and/or an information element indicating at least one indicator/identifier or address of a CHF device 2312. The charging method/charging type may indicate at least one of: online charging, offline charging, and/or converged charging. The policy control rule may be used for policy control, wherein the at least one QoS control rule may be used for QoS control and the at least one gating control rule may be used for gating control. The QoS control rule may be used to authorize QoS on a service data flow. The gating control rule may be used to discard packets that don't match any service data flow of the gating control rule and/or associated PCC rules. The usage monitoring control rule may be used to monitor volume usage and/or time usage, and report accumulated usage of network resources. The application detection and control rule may comprise a request to detect a specified application traffic; to report, to the PCF device 2314, of a start and/or stop of the application traffic; and/or to apply a specified enforcement and charging actions. The traffic steering control rule may be used to activate/deactivate traffic steering policies for steering a subscriber's traffic to appropriate operator or third party service functions (e.g., NAT, anti-malware, parental control, DDoS protection) in an (S)Gi-LAN. The service data flow detection information (e.g., service data flow template) may comprise a list of service data flow filters and/or an application identifier that references a corresponding application detection filter for detection of the service data flow. The service data flow detection information may comprise combination of traffic patterns of the ethernet PDU traffic.

The PCF device 2314 may determine a first QoS control rule (e.g., corresponding to the first PCC rule) for the first network slice for the first direction. The PCF device 2314 may determine a first QoS control rule for the first S-NSSAI for uplink direction (e.g., QoS for the URLLC service). The PCF device 2314 may determine a first QoS control rule for the first QoS flow for uplink direction. The PCF device 2314 may determine a second QoS control rule (e.g., corresponding to the second PCC rule) for the second network slice for the second direction. The PCF device 2314 may determine a second QoS control rule for the second S-NSSAI for downlink direction (e.g., QoS for the eMBB service). The PCF device 2314 may determine a second QoS control rule for the second QoS flow for downlink direction.

The PCF device 2314 may send, to the SMF device 2310, a response message 2332 (e.g., policy establishment response message). The response message 2332 may comprise the first PCC rule and/or the second PCC rule.

One charging session may be used for more than one network slice. The SMF device may determine a charging session used/applied for the PDU session and/or the first network slice and the second network slice, for example, based on the network slice correlation indication, the asymmetric service indication, and/or the QoS flow correlation indication. The SMF device 2310 may send, to the CHF device 2312, a message 2334 (e.g., a charging data request message and/or a charging data request initial message) to establish the charging session for the PDU session and/or the first network slice and the second network slice. The charging data request message (e.g., charging data request initial message) may comprise at least one of: the network slice correlation indication; the asymmetric service indication; the QoS flow correlation indication; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the first packet filter for the first direction (e.g., the packet filter for uplink direction), the second packet filter for the second direction (e.g., the packet filter for downlink direction), the requested PDU session type, and/or the requested SSC mode, etc.

The CHF device 2312 may correlate/associate the first network slice with the second network slice, for example, based on information received from the SMF device 2310 (e.g., the network slice correlation indication, the asymmetric service indication, the QoS flow correlation indication, the first S-NSSAI(s) for the first direction and/or the second/reverse S-NSSAI(s) for a second direction). At step 2336, the CHF device may determine quotas (e.g., same or different quotas, thresholds, limits, targets, values, etc.) for the associated network slices (e.g., the first network slice and the second network slice). The CHF device 2312 may determine a first quota for the PDU session and/or the first network slice. The CHF device 2312 may determine a second quota for the PDU session and/or the second network slice. The CHF device 2312 may determine a larger quota for the PDU session and/or network slice supporting a particular service (e.g., the eMBB service). The CHF device 2312 may determine a smaller quota for the PDU session and/or network slice supporting a particular service (e.g., the URLLC service). The quota may comprise at least one of: a granted unit; a time threshold; a volume threshold; a limit; target; value; etc. The CHF device 2312 may send, to the SMF device 2310, a response message 2338 (e.g., a charging data response message). The response message 2338 may comprise the quotas for the PDU session and/or for the first network slice and the second network slice.

The SMF device 2310 may determine a first user plane rule and/or a second user plane rule, for example, based on/in response to the charging data response message (e.g., the quotas for the first PDU session and the second PDU session) received from the CHF device 2312 and/or the PCC rules (e.g., the first PCC rule and/or the second PCC rule) received from the PCF device 2314. The SMF device 2310 may determine a first user plane rule, for example, based on the first quota and/or the first PCC rule. The SMF device 2310 may determine a second user plane rule, for example, based on the second quota and/or the second PCC rule. The first user plane rule may be associated with the PDU session and/or the first network slice. The second user plane rule may be associated with the PDU session and/or the second network slice. The first user plane rule and/or the second user plane rule may comprise at least one of: a packet detection rule; a forwarding action rule; a QoS enforcement rule; and/or a usage reporting rule. The first user plane rule may comprise the wireless device IP address and/or the first packet filter for the first direction. The second user plane rule may comprise the wireless device IP address and/or the second packet filter for the second direction. The wireless device IP address may be used to the first user plane rule and the second user plane rule. The SMF device 2310 may associate/correlate the first user plane rule with the second user plane rule, for example, based on the wireless device IP address and/or the correlation/association of the first network slice and the second network slice. The SMF device 2310 may determine/select a first UPF device for the PDU session and/or the first S-NSSAI. The SMF device may select a second UPF device for the PDU session and/or the second S-NSSAI. The second UPF device may be the same as the first UPF device or may be different from the first UPF device. The second UPF device and/or the first UPF device may be a UPF device 2308.

The SMF device 2310 may send, to the UPF device 2308, user plane rules 2342 (e.g., the first user plane rule and the second user plane rule), for example, using N4 session establishment/modification request messages. The SMF device 2310 may send, to the first UPF device, a message (e.g., a first N4 session establishment/modification request message). The first N4 session establishment/modification request message may comprise the first user plane rule. The SMF device 2310 may send, to the second UPF device, a message (e.g., a second N4 session establishment/modification request message). The second N4 session establishment/modification request message may comprise the second user plane rule. The first UPF device may (e.g., based on receiving the first N4 session establishment/modification request message) install the first user plane rule; send, to the SMF device 2310, a response message (e.g., a first N4 session establishment/modification response message); and/or enforce the first user plane rule received from the SMF device 2310. The first UPF device may (e.g., based on receiving the first N4 session establishment/modification request message) install the first user plane rule; send, to the SMF device 2310, a response message (e.g., a first N4 session establishment/modification response message), and/or enforce the first user plane rule received from the SMF device 2310. The second UPF device may (e.g., based on receiving the second N4 session establishment/modification request message) install the second user plane rule; send, to the SMF device 2310, a response message (e.g., a second N4 session establishment/modification response message); and/or enforce the second user plane rule received from the SMF device 2310. The UPF device 2308 may send, to the SMF device 2310, response messages 2344. The response messages 2344 may comprise the first N4 session establishment/modification response message and the second N4 session establishment/modification response message.

The SMF device 2310 may send, to the wireless device, via the AMF device 2306 and a base station, a message (e.g., a PDU session establishment accept message 2346). The PDU session establishment accept message 2346 may comprise the wireless device IP address for the PDU session and/or for the first network slice and the second network slice. The PDU session establishment accept message 2346 may comprise the QoS control rule. The wireless device 2302 may associate/correlate the first network slice with the second network slice, for example, based on the wireless device IP address and/or the PDU session ID.

The first UPF device may enforce the first packet detection rule, for example, by matching a user data/traffic packet with service data flow template (e.g., service data flow filters and/or application identifiers). The first UPF device may apply other first user plane rules (e.g., the first forwarding action rule, the first QoS enforcement rule, and/or the first usage reporting rule) to the user data/traffic packets that are matched by the packet detection rule.

The first UPF device may enforce the first usage reporting rule by measuring usage of network resources. The usage may be measured based on traffic data volume, duration (e.g., time), and/or events. The usage may be measured according to a measurement method indicated in the first usage reporting rule. The first UPF device may determine a first network resources usage report based on the first usage reporting rule. The first UPF device may send the first network resources usage report to the SMF device 2310, for example, if the quota/threshold is reached, based on/in response to an event, and/or based on another trigger being met.

The second UPF device may enforce the second packet detection rule, for example, by matching a user data/traffic packet with service data flow template (e.g., service data flow filters and/or application identifiers). The second UPF device may apply other second user plane rules (e.g., the second forwarding action rule, the second QoS enforcement rule, and/or the second usage reporting rule) to the user data/traffic packets that are matched by the packet detection rule.

The second UPF device may enforce the second usage reporting rule by measuring usage of network resources. The usage may be measured based on traffic data volume, duration (e.g., time) and/or events. The usage may be measured according to a measurement method indicated by the second usage reporting rule. The second UPF device may determine a second network resources usage report based on the second usage reporting rule. The second UPF device may send to the SMF device 2310, the second network resources usage report, for example, if the quota/threshold is reached, based on (e.g., in response to) an event, and/or based on another trigger being met.

The SMF device 2310 may aggregate the first network resources usage report and the second network resources usage report into an aggregated CDR for the PDU session (and/or for the first network slice and the second network slice), for example, based on/in response to the network resources usage reports received from the first UPF device and the second UPF device and/or based on the correlation/association of the first user plane rule and the second user plane rule. The SMF device 2310 may send, to the CHF device 2312, a message (e.g., a charging data request message and/or a charging data request update message). The message may comprise the aggregated CDR. The CHF device 2312 may update the quotas based on the aggregated CDR. The CHF device 2312 may send the updated quotas to the SMF device 2310 for enforcement.

Figure 24:
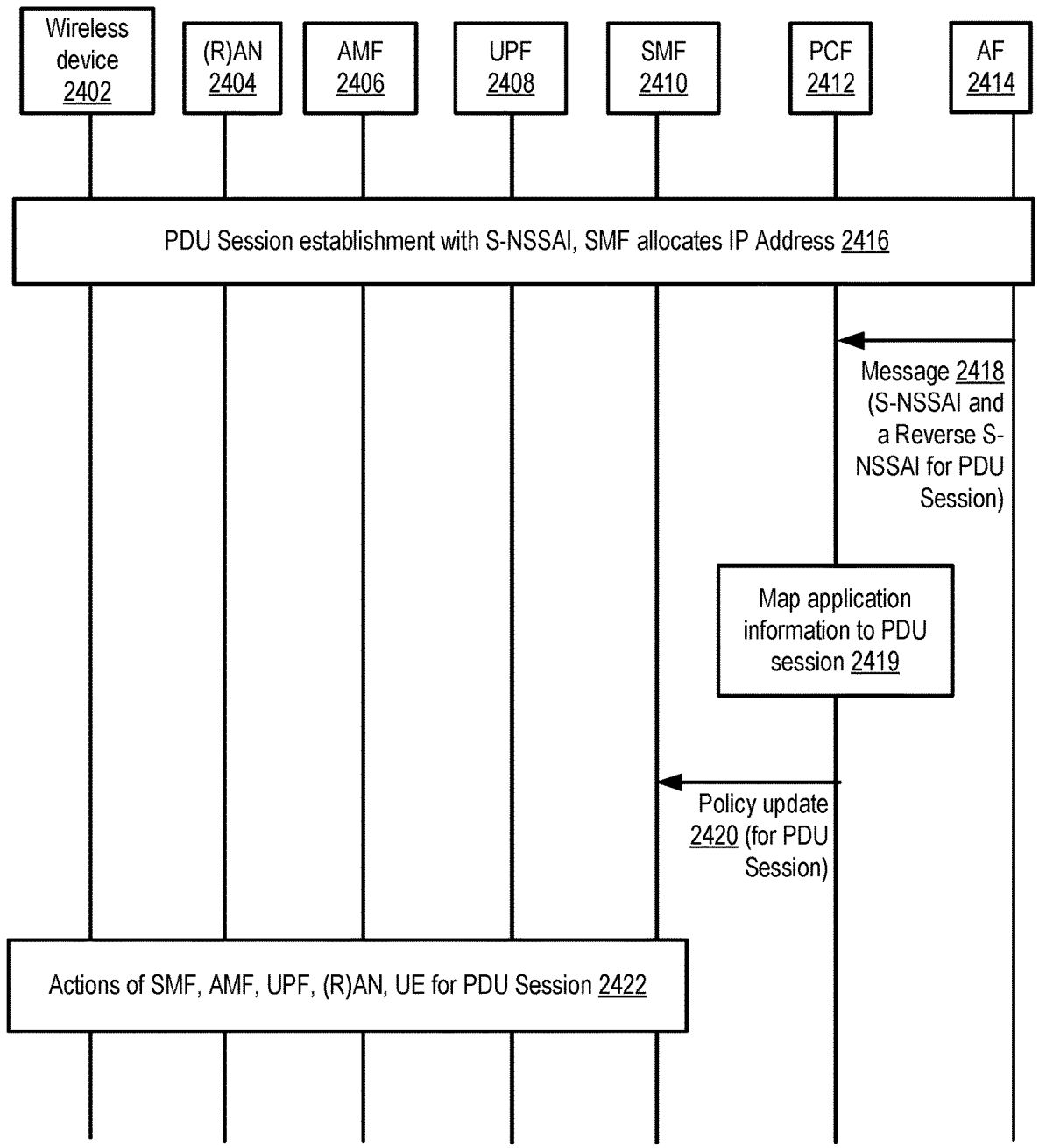
FIG. 24 shows example call flows associated with asymmetric services using a single PDU session.

FIG. 24 shows example call flows associated with asymmetric services, for an application, using a single PDU session. At step 2416, a wireless device 2402 may establish a PDU session (e.g., as described with reference to FIG. 22). Establishing the PDU session may comprise an SMF device 2410 allocating a single wireless device IP address for two network slices. The wireless device 2402 may communicate with an application server via the PDU session and/or the network slices, for example, based on the establishing the PDU session. An AF device 2414 may send, to a PCF device 2412, a message 2418 (e.g., an application/service information provision message). The application/service information provision message may comprise application/service information. The application/service information provision message may be sent to the PCF device via an NEF device. The application/service information provision message may comprise at least one of: a network slice correlation indication; an asymmetric service indication; a QoS flow correlation indication; a first requested QoS; a second requested QoS; first S-NSSAI; second/reverse S-NSSAI; a wireless device IP address (e.g., IPv4 address and/or IPv6 network prefix); at least one wireless device indicator/identifier (e.g., SUPI, PEI, and/or GPSI); a DNN; and/or application/service information. The application/service information may comprise one or more of the following information elements: IP filter information (e.g., to identify a service data flow of the application/service), an application identifier, a media/application/service type, and/or requested media/application/service QoS (e.g., 5QI, ARP, and/or bandwidth). The asymmetric service indication may indicate different service types for uplink traffic and downlink traffic. The network slice correlation indication, the asymmetric service indication, and/or the QoS flow correlation indication may indicate that a first network slice (instance) is associated/correlated with a second network slice (instance). The network slice correlation indication and/or the asymmetric service indication may indicate that the first S-NSSAI is associated/correlated with the second S-NSSAI. The QoS flow correlation indication may indicate QoS for QoS flows corresponding to uplink traffic and downlink traffic. A first QoS flow may require a URLLC QoS for uplink traffic and a second QoS flow may require an eMBB QoS for downlink traffic. The QoS flow correlation indication may indicate a first QoS flow is correlated/associated with a second QoS flow (e.g., the first QoS flow and the second QoS flow may support the same application). The first requested QoS may apply to the first QoS flow. The second requested QoS may apply to the second QoS flow. The first requested QoS and/or the second requested QoS may comprise at least one of: a QoS service type (e.g., eMBB, URLLC, or any other service type), a 5QI, a QCI, an ARP, an uplink GFBR, a downlink GFBR, an uplink MFBR, and/or a downlink MFBR.

At step 2419, the PCF device 2412 may map the application information to the PDU session, for example, based on (e.g., in response to) the message received from the AF device 2414 and/or based on information received from the AF device 2414 (e.g., the wireless device IP address, the network slice correlation indication, the asymmetric service indication, the first S-NSSAI, and/or the second/reverse S-NSSAI). The PCF device 2412 may map the application information to the PDU session, for example, if the wireless device IP address received from the AF device 2414 is the same as the one used for the PDU session.

The PCF device 2412 may determine a first PCC rule for the first network slice for a first direction (e.g., uplink direction). The PCF device 2412 may determine the first PCC rule for the first S-NSSAI for the uplink service (e.g., a URLLC service). The PCF device 2412 may determine a second PCC rule for the second network slice for the second direction (e.g., downlink direction), for example, based on the information received from the AF device 2414 (e.g., based on the network slice correlation indication and/or the asymmetric service indication). The PCF device 2412 may determine the second PCC rule for the second S-NSSAI for the downlink service (e.g., an eMBB service). The first PCC rule may comprise the wireless device IP address and/or a first packet filter for the first direction, and the second PCC rule may comprise the wireless device IP address and/or a second packet filter for the second direction.

The first PCC rule and/or the second PCC rule determined by the PCF device 2412 may comprise at least one of: at least one charging control rule, at least one policy control rule (e.g., comprising at least one QoS control rule and/or at least one gating control rule), at least one usage monitoring control rule, at least one application detection and control rule, at least one traffic steering control rule, and/or service data flow detection information (e.g., service data flow template). The charging control rule may be used for charging control. The charging control rule may comprise at least one of: an information element indicating a charging method/charging type, an information element indicating at least one charging rate, and/or an information element indicating at least one indicator/identifier or address of a CHF device. The charging method/charging type may indicate at least one of: online charging, offline charging, and/or converged charging. The policy control rule may be used for policy control, wherein the at least one QoS control rule may be used for QoS control and the at least one gating control rule may be used for gating control. The QoS control rule may be used to authorize QoS on a service data flow. The gating control rule may be used to discard packets that don't match any service data flow of the gating control rule and/or associated PCC rules. The usage monitoring control rule may be used to monitor volume usage and/or time usage, and report accumulated usage of network resources. The application detection and control rule may comprise a request to detect a specified application traffic; to report, to the PCF device 2412, of a start and/or stop of the application traffic; and/or to apply a specified enforcement and charging actions. The traffic steering control rule may be used to activate/deactivate traffic steering policies for steering a subscriber's traffic to appropriate operator or third party service functions (e.g., NAT, anti-malware, parental control, DDoS protection) in an (S)Gi-LAN. The service data flow detection information (e.g., service data flow template) may comprise a list of service data flow filters and/or an application identifier that references a corresponding application detection filter for detection of the service data flow. The service data flow detection information may comprise combination of traffic patterns of the ethernet PDU traffic.

The PCF device 2412 may determine a first QoS control rule (e.g., corresponding to the first PCC rule) for the first network slice for the first direction. The PCF device 2412 may determine a first QoS control rule for the first S-NSSAI for uplink direction (e.g., QoS for the URLLC service). The PCF device 2412 may determine a first QoS control rule for the first QoS flow for uplink direction. The PCF device 2412 may determine a second QoS control rule (e.g., corresponding to the second PCC rule) for the second network slice for the second direction. The PCF device 2412 may determine a second QoS control rule for the second S-NSSAI for downlink direction (e.g., QoS for the eMBB service). The PCF device 2412 may determine a second QoS control rule for the second QoS flow for downlink direction.

The PCF device 2412 may send, to the SMF device 2410, a message (e.g., a policy update request message 2420). The message may comprise the first PCC rule and/or the second PCC rule. At step 2422, the wireless device 2402, (R)AN 2404, AMF device 2406, UPF device 2408, and/or the SMF device 2410 may perform one or more actions associated with the PDU session.

Figure 25:
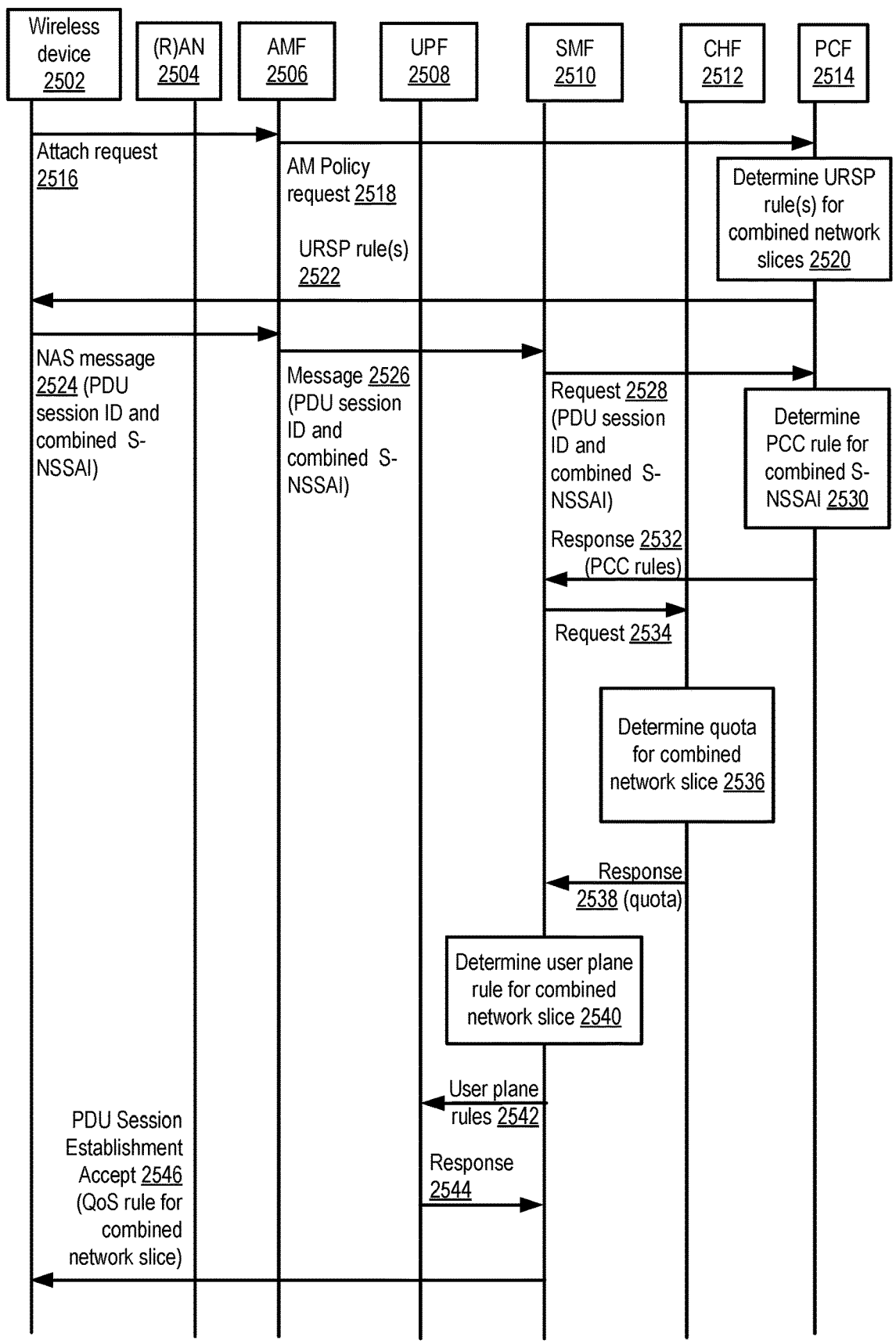
FIG. 25 shows example call flows associated with asymmetric services using a combined network slice.

FIG. 25 shows example call flows associated with asymmetric services, for an application, using a combined network slice. A wireless device 2502 may attach to the network by sending, to an AMF device 2506, an attach request message 2516. The attach request message 2516 may comprise at least one wireless device indicator/identifier (e.g., SUPI, PEI, and/or GPSI). The AMF device 2506 may send, to a PCF device 2514, a message (e.g., access management policy request message 2518). The message may comprise the at least one wireless device indicator/ identifier. The PCF device 2514 may determine, from a UDR, user subscription information of the wireless device 2502. At step 2520, the PCF device 2514 may determine URSP rule(s) 2522, for example, based on the at least one wireless device indicator/identifier, the user subscription information, and/or a local operator policy. The URSP rule(s) 2522 may indicate combined network slices for use with traffic associated with one or more applications. A combined network slice may comprise a first child network slice (e.g., corresponding to first child S-NSSAI) for a first direction, and a second/reverse child network slice (e.g., corresponding to second child S-NSSAI) for a second direction. The PCF device 2514 may send, to the wireless device via the AMF device 2506, the URSP rule(s) 2522. The wireless device 2502 may install the URSP rule(s) 2522.

The URSP rule(s) 2522 may comprise at least one of a first URSP rule and a second URSP rule. The first URSP rule may apply to a first application/traffic type (e.g., a UAV application or any other application), with a first (e.g., uplink) child network slice of a combined network slice corresponding to an eMBB service (or any other service) and a second/reverse (e.g., downlink) child network slice of the combined network slice corresponding to a URLLC service (or any other service). The second URSP rule may apply to a second application/traffic type (e.g., a cloud gaming application or any other application), with a first (e.g., uplink) child network slice of a combined network slice corresponding to a URLLC service (or any other service) and a second/reverse (e.g., downlink) child network slice of the combined network slice corresponding to an eMBB service (or any other service).

The wireless device 2502 may receive a service request from an application on the wireless device 2502. The service request may indicate an application type (e.g., a cloud gaming application) of the application sending the service request. The wireless device 2502 may determine one PDU session and/or one combined network slice with two child network slices to support the application, for example, based on (e.g., in response to) the service request and/or based on the URSP rule(s) 2522 (e.g., the second URSP rule). A first child network slice (e.g., first child S-NSSAI associated with a URLLC service, or any other service) may be used/applied for uplink traffic and a second child network slice (e.g., second child S-NSSAI associated with an eMBB service, or any other service) may be applied/used for downlink traffic.

The wireless device 2502 may send, to the AMF device 2506, a NAS message 2524. The NAS message 2524 may request a PDU session. The NAS message 2524 may comprise at least one of: a network slice correlation indication; an asymmetric service indication; a PDU session indicator/ID; a combined S-NSSAI comprising a first child S-NSSAI(s) and/or NSI indicator(s)/ID(s) of the first child S-NSSAI(s) for a first direction (e.g., uplink direction), and a second/reverse child S-NSSAI(s) and/or NSI indicator(s)/ID(s) of the second child S-NSSAI(s) for a second direction (e.g., downlink direction); a DNN; and/or an N1 SM container (e.g., comprising a PDU session establishment request message). The asymmetric service indication may indicate different service types for uplink and downlink. The network slice correlation indication and/or the asymmetric service indication may indicate that the first child network slice (instance) is associated/correlated with the second child network slice (instance). The network slice correlation indication and/or the asymmetric service indication may indicate that the first child S-NSSAI is associated/correlated with the second child S-NSSAI. The wireless device may initiate a wireless device requested PDU session establishment procedure by transmitting a PDU session establishment request message within the N1 SM container of the NAS message 2524. The PDU session establishment request message may comprise at least one of: the network slice correlation indication; the asymmetric service indication; the PDU session indicator/ID; a combined S-NSSAI (e.g., comprising the first child S-NSSAI(s) and/or NSI indicator(s)/ID(s) of the first child S-NSSAI(s) for the first direction, and the second/reverse child S-NSSAI(s) and/or NSI indicator(s)/ID(s) of the second child S-NSSAI(s) for the second direction); a first packet filter for the first direction (e.g., packet filter for uplink direction); a second packet filter for the second direction (e.g., packet filter for downlink direction), requested PDU session type, and/or a requested SSC mode, etc.

The AMF device 2506 may determine/select an SMF device (e.g., the SMF device 2510) to support two network slices for the same PDU session, for example, based on/in response to the NAS message 2524, and/or based on the network slice correlation indication and/or the asymmetric service indication. The AMF device 2506 may send, to the SMF device 2510, a message 2526 (e.g., a PDUSession_CreateSMContext request message). The message 2526 may comprise at least one of: the network slice correlation indication; the asymmetric service indication; the PDU session indicator/ID; the combined S-NSSAI (e.g., comprising the first child S-NSSAI(s) and/or NSI indicator(s) ID(s) of the first S-NSSAI(s) for the first direction, and the second/reverse S-NSSAI(s) and/or NSI indicator(s)/ID(s) of the second S-NSSAI(s) for the second direction; the DNN; and/or an N1 SM container (e.g., comprising the PDU session establishment request message).

The SMF device 2510 may perform one or more actions. The SMF device 2510 may allocate a wireless device IP address (e.g., an IPv4 address and/or an IPv6 network prefix) for the PDU session and/or the combined network slice (e.g., the combined S-NSSAI). The SMF device 2510 may determine/select a PCF device (e.g., PCF device 2514) for the PDU session and/or for the combined network slice (e.g., combined S-NSSAI). The SMF device 2510 may send, to the PCF device 2514, a request message 2528 (e.g., a policy establishment request message). The request message 2528 may comprise at least one of: the wireless device IP address; the network slice correlation indication; the asymmetric service indication; the PDU session indicator/ID; the combined S-NSSAI (e.g., comprising the first child S-NSSAI(s) and/or NSI indicator(s)/ID(s) of the first child S-NSSAI(s) for the first direction, and the second/reverse child S-NSSAI(s) and/or NSI indicator(s) ID(s) of the second child S-NSSAI(s) for the second direction); the first packet filter for the first direction (e.g., packet filter for uplink direction), the second packet filter for the second direction (e.g., packet filter for downlink direction), the requested PDU session type, and/or the requested SSC mode, etc.

The PCF device 2514 may perform one or more actions, for example, based on/in response to the request message 2528. The PCF device 2514 may correlate/associate the first child S-NSSAI with the second child S-NSSAI the PCF device 2514 may map the wireless device IP address to the PDU session, and/or the PCF device 2514 may map the wireless device IP address to the combined network slice (e.g., the combined S-NSSAI), for example, based on information received from the SMF device 2510 (e.g., based on the network slice correlation indication and/or the asymmetric service indication).

The PCF device 2514 may determine a first PCC rule for the first child network slice for the first direction, for example, based on the information received from the SMF device 2510 (e.g., based on the network slice correlation indication and/or the asymmetric service indication). The PCF device 2514 may determine the first PCC rule for the first child S-NSSAI for the uplink service (e.g., the URLLC service). The PCF device 2514 may determine a second PCC rule for the second child network slice for the second direction, for example, based on the information received from the SMF device 2510 (e.g., based on the network slice correlation indication and/or the asymmetric service indication). The PCF device 2514 may determine the second PCC rule for the second child S-NSSAI for the downlink service (e.g., the eMBB service or any other service). The first PCC rule may comprise the wireless device IP address and/or the first packet filter for the first direction (e.g., uplink direction), and the second PCC rule may comprise the wireless device IP address and/or the second packet filter for the second direction (e.g., downlink direction).

The first PCC rule and/or the second PCC rule determined by the PCF device 2514 may comprise at least one of: at least one charging control rule, at least one policy control rule (e.g., comprising at least one QoS control rule and/or at least one gating control rule), at least one usage monitoring control rule, at least one application detection and control rule, at least one traffic steering control rule, and/or service data flow detection information (e.g., service data flow template). The charging control rule may be used for charging control. The charging control rule may comprise at least one of: an information element indicating a charging method/charging type, an information element indicating at least one charging rate, and/or an information element indicating at least one indicator/identifier or address of a CHF device 2512. The charging method/charging type may indicate at least one of: online charging, offline charging, and/or converged charging. The policy control rule may be used for policy control, wherein the at least one QoS control rule may be used for QoS control and the at least one gating control rule may be used for gating control. The QoS control rule may be used to authorize QoS on a service data flow. The gating control rule may be used to discard packets that don't match any service data flow of the gating control rule and/or associated PCC rules. The usage monitoring control rule may be used to monitor volume usage and/or time usage, and report accumulated usage of network resources. The application detection and control rule may comprise a request to detect a specified application traffic; to report, to the PCF device 2514, of a start and/or stop of the application traffic; and/or to apply a specified enforcement and charging actions. The traffic steering control rule may be used to activate/deactivate traffic steering policies for steering a subscriber's traffic to appropriate operator or third party service functions (e.g., NAT, anti-malware, parental control, DDoS protection) in an (S)Gi-LAN. The service data flow detection information (e.g., service data flow template) may comprise a list of service data flow filters and/or an application identifier that references a corresponding application detection filter for detection of the service data flow. The service data flow detection information may comprise combination of traffic patterns of the ethernet PDU traffic.

The PCF device 2514 may determine a first QoS control rule (e.g., corresponding to the first PCC rule) for the first child network slice for the first direction. The PCF device 2514 may determine a first QoS control rule for the first child S-NSSAI for uplink direction (e.g., a QoS for the URLLC service. The PCF device 2514 may determine a second QoS control rule (e.g., corresponding to the second PCC rule) for the second child network slice for the second direction. The PCF device 2514 may determine a second QoS control rule for the second child S-NSSAI for downlink direction (e.g., QoS for the eMBB service).

The PCF device 2514 may send, to the SMF device 2510, a response message 2532 (e.g., policy establishment response message). The response message 2532 may comprise the first PCC rule and/or the second PCC rule. One charging session may be used for more than one network slice. The SMF device 2510 may determine a charging session used/applied for the PDU session and/or the combined network slice. The SMF device 2510 may send, to a CHF device 2512, a message 2534 (e.g., a charging data request message and/or a charging data request initial message) to establish the charging session for the first PDU session and/or the first child network slice and the second child network slice. The charging data request message (e.g., charging data request initial message) may comprise at least one of: the network slice correlation indication; the asymmetric service indication; the PDU session indicator/ID; the combined S-NSSAI (e.g., comprising the first child S-NSSAI(s) and/or NSI indicator(s)/ID(s) of the first child S-NSSAI(s) for the first direction and the second/reverse child S-NSSAI(s) and/or NSI indicator(s)/ID(s) of the second child S-NSSAI(s) for a second direction); the first packet filter for the first direction (e.g., the packet filter for uplink direction), the second packet filter for the second direction (e.g., the packet filter for downlink direction), the requested PDU session type, and/or the requested SSC mode, etc.

The CHF device 2512 may correlate/associate the first child S-NSSAI with the second child S-NSSAI, for example, based on information received from the SMF device 2510 (e.g., based on the network slice correlation indication, the asymmetric service indication, and/or the combined S-NSSAI). The CHF device 2512 may determine quotas (e.g., same or different quotas, thresholds, limits, targets, values, etc.) for the associated child network slices (e.g., the first child network slice and the second child network slice). The CHF device 2512 may determine a first quota for the PDU session and/or the first child network slice (e.g., the first child S-NSSAI). The CHF device 2512 may determine a second quota for the PDU session and/or the second child network slice (e.g., the second child S-NSSAI). The CHF device 2512 may determine a larger quota for the PDU session and/or a child network slice supporting a particular service (e.g., the eMBB service). The CHF device 2512 may determine a smaller quota for the PDU session and/or a child network slice supporting a particular service (e.g., the URLLC service). A quota may comprise at least one of: a granted unit; a time threshold; a volume threshold, a limit, a target, a value, etc. The CHF device 2512 may send, to the SMF device 2510, a response message 2538 (e.g., a charging data response message). The response message 2538 may comprise the quotas for the PDU session and/or for the first child network slice and the second child network slice.

The SMF device 2510 may determine a first user plane rule and/or a second user plane rule, for example, based on/in response to the charging data response message (e.g., the quotas for the first PDU session and the second PDU session) received from the CHF device 2512 and/or the PCC rules (e.g., the first PCC rule and/or the second PCC rule) received from the PCF device 2514. The SMF device 2510 may determine a first user plane rule, for example, based on the first quota and/or the first PCC rule. The SMF device 2510 may determine a second user plane rule, for example, based on the second quota and/or the second PCC rule. The first user plane rule may be associated with the PDU session and/or the first child network slice. The second user plane rule may be associated with the PDU session and/or the second child network slice. The first user plane rule and/or the second user plane rule may comprise at least one of: a packet detection rule; a forwarding action rule; a QoS enforcement rule; and/or a usage reporting rule. The first user plane rule may comprise the wireless device IP address and/or the first packet filter for the first direction. The second user plane rule may comprise the wireless device IP address and/or the second packet filter for the second direction. The wireless device IP address may be used to the first user plane rule and the second user plane rule. The SMF device 2510 may associate/correlate the first user plane rule with the second user plane rule, for example, based on the wireless device IP address and/or the correlation/association of the first child network slice and the second child network slice. The SMF device 2510 may determine/select a first UPF device for the PDU session and/or the first child S-NSSAI. The SMF device may select a second UPF device for the PDU session and/or the second child S-NSSAI. The second UPF device may be the same as the first UPF device or may be different from the first UPF device. The second UPF device and/or the first UPF device may be a UPF device 2508.

The SMF device 2510 may send, to the UPF device 2508, user plane rules 2542 (e.g., the first user plane rule and the second user plane rule), for example, using N4 session establishment/modification request messages. The SMF device 2510 may send, to the first UPF device, a message (e.g., a first N4 session establishment/modification request message). The first N4 session establishment/modification request message may comprise the first user plane rule. The SMF device 2510 may send, to the second UPF device, a message (e.g., a second N4 session establishment/modification request message). The second N4 session establishment/modification request message may comprise the second user plane rule. The first UPF device may (e.g., based on receiving the first N4 session establishment/modification request message) install the first user plane rule; send, to the SMF device 2510, a response message (e.g., a first N4 session establishment/modification response message); and/or enforce the first user plane rule received from the SMF device 2510. The first UPF device may (e.g., based on receiving the first N4 session establishment/modification request message) install the first user plane rule; send, to the SMF device 2510, a response message (e.g., a first N4 session establishment/modification response message), and/or enforce the first user plane rule received from the SMF device 2510. The second UPF device may (e.g., based on receiving the second N4 session establishment/modification request message) install the second user plane rule; send, to the SMF device 2510, a response message (e.g., a second N4 session establishment/modification response message); and/or enforce the second user plane rule received from the SMF device 2510. The UPF device 2508 may send, to the SMF device 2510, response messages 2544. The response messages 2544 may comprise the first N4 session establishment/modification response message and the second N4 session establishment/modification response message.

The SMF device 2510 may send, to the wireless device, via the AMF device 2506 and a base station, a message (e.g., a PDU session establishment accept message 2546). The PDU session establishment accept message 2546 may comprise the wireless device IP address for the PDU session and/or for the first child network slice and the second child network slice. The wireless device 2502 may associate/ correlate the first child network slice with the second child network slice, for example, based on the wireless device IP address and/or the PDU session ID.

The first UPF device may enforce the first packet detection rule, for example, by matching a user data/traffic packet with service data flow template (e.g., service data flow filters and/or application identifiers). The first UPF device may apply other first user plane rules (e.g., the first forwarding action rule, the first QoS enforcement rule, and/or the first usage reporting rule) to the user data/traffic packets that are matched by the packet detection rule.

The first UPF device may enforce the first usage reporting rule by measuring usage of network resources. The usage may be measured based on traffic data volume, duration (e.g., time), and/or events. The usage may be measured according to a measurement method indicated in the first usage reporting rule. The first UPF device may determine a first network resources usage report based on the first usage reporting rule. The first UPF device may send the first network resources usage report to the SMF device 2510, for example, if the quota/threshold is reached, based on/in response to an event, and/or based on another trigger being met.

The second UPF device may enforce the second packet detection rule, for example, by matching a user data/traffic packet with service data flow template (e.g., service data flow filters and/or application identifiers). The second UPF device may apply other second user plane rules (e.g., the second forwarding action rule, the second QoS enforcement rule, and/or the second usage reporting rule) to the user data/traffic packets that are matched by the packet detection rule.

The second UPF device may enforce the second usage reporting rule by measuring usage of network resources. The usage may be measured based on traffic data volume, duration (e.g., time) and/or events. The usage may be measured according to a measurement method indicated by the second usage reporting rule. The second UPF device may determine a second network resources usage report based on the second usage reporting rule. The second UPF device may send to the SMF device 2510, the second network resources usage report, for example, if the quota/ threshold is reached, based on (e.g., in response to) an event, and/or based on another trigger being met.

The SMF device 2510 may aggregate the first network resources usage report and the second network resources usage report into an aggregated CDR for the PDU session and/or for the combined network slice, for example, based on/in response to the network resources usage reports received from the first UPF device and the second UPF device and/or based on the correlation/association of the first user plane rule and the second user plane rule. The SMF device 2510 may send, to the CHF device 2512, a message (e.g., a charging data request message and/or a charging data request update message). The message may comprise the aggregated CDR. The CHF device 2512 may update the quotas based on the aggregated CDR. The CHF device 2512 may send the updated quotas to the SMF device 2510 for enforcement.

An SMF device may receive, from an AMF device, a first establishment request message for a first PDU session of a wireless device. The SMF device may determine a wireless device IP address for the first PDU session. The SMF device may receive, from the AMF device a second establishment request message for a second PDU session. The second session establishment message may comprise session information indicating the first PDU session. The SMF device may determine that the wireless device IP address is for the second PDU session, for example, based on the session information. The SMF device may send, to the AMF device, the wireless device IP address for the second PDU session. The SMF device may send, to a first UPF device, a first user plane rule for the first PDU session. The first user plane rule may comprise the wireless device IP address. The SMF device may send, to a second UPF device, a second user plane rule for the second PDU session. The second user plane rule may comprise the wireless device IP address.

The session information may comprise at least one of: a PDU session identifier of the first PDU session; an IP address of the first PDU session; first S-NSSAI of the first PDU session; and/or a first network slice instance identifier for the first S-NSSAI. The second establishment request message may further comprise at least one of: a session or network slice correlation indication; and/or an asymmetric service indication. The session or network slice correlation indication may indicate that the first PDU session is associated with the second PDU session, and/or that a first network slice is associated with a second network slice. The asymmetric service indication may indicate that a first service type may be supported by the first PDU session and/or a first network slice for a first direction, and a second service type may be supported by the second PDU session and/or a second network slice for a second direction. The first direction and/or the second direction may comprise at least one of: an uplink direction; or a downlink direction. The SMF device may determine/select a first UPF device for the first PDU session. The SMF device may determine/select a second UPF device for the second PDU session. The second UPF device may be same as or different from the first UPF device. The SMF device may associate the first user plane rule with the second user plane rule, for example, based on the wireless device IP address. The SMF device may receive, from the first UPF device, a first user data usage report for the first PDU session. The SMF device may receive, from the second UPF device, a second user data usage report for the second PDU session. The SMF device may aggregate the first user data usage report and the second user data usage report in one aggregated CDR. In an example, the SMF device may send to a charging function, a charging message comprising the aggregated CDR. The aggregating is based on the association of the first user plane rule and the second user plane rule. The wireless device may receive, from an application on the wireless device, a service request indicating: a first SST for a first direction; and/or a second SST for a second direction. The wireless device may, based on (e.g., in response to) the service request, determine: the first PDU session for the first SST; and/or the second PDU session for the second SST. The wireless device may send, to a base station, a first user data packet, via the first PDU session, comprising the first IP address. The wireless device may receive, from the base station, a second user data packet, via the second PDU session, comprising the first IP address. A PCF device may receive, from the SMF device, a session policy request message. The session policy request message may comprise at least one of: session information of the first PDU session; session information of the second PDU session; a network slice correlation indication; an asymmetric service indication; and/or the wireless device IP address for the first PDU session and the second PDU session. The session information for the second PDU session may indicate that the second PDU session is correlated with the first PDU session. The PCF device may map the IP address to the first PDU session and the second PDU session based on at least one of: the session information of the second PDU session; the network slice correlation indication; the asymmetric service indication; and/or the wireless device IP address for the first PDU session and the second PDU session.

An SMF device may receive, from an AMF device, an establishment request message for two PDU sessions of a wireless device. The establishment request message may comprise: session information of a first PDU session; and/or session information that indicates a second PDU session may be correlated with the first PDU session. The SMF device may determine an IP address for the first PDU session and the second PDU session, for example, based on the session information. The SMF device may send, to the AMF device, the IP address for the first PDU session and the second PDU session. The session information may comprise at least one of: a PDU session identifier for the second PDU session; a single S-NSSAI for the second PDU session; and/or a network slice instance identifier for the S-NSSAI. The establishment request message may comprise at least one of: a session/network slice correlation indication; and/or an asymmetric service indication.

An SMF device may receive, from an AMF device, a first establishment request message for a first PDU session of a wireless device. The SMF device may determine a first wireless device IP address for the first PDU session. The SMF device may receive, from the AMF device, a second establishment request message for a second PDU session. The second establishment request message may comprise session information indicating the first PDU session. The SMF device may determine a second wireless device IP address for the second PDU session. The SMF device may determine a user plane rule for the second PDU session, for example, based on the session information. The user plane rule may comprise an indication that the second wireless device IP address is correlated with first wireless device IP address. The SMF device may send, to a UPF device, the user plane rule for the second PDU session. The session information may comprise at least one of: a PDU session identifier of the first PDU session; an IP address of the first PDU session; first S-NSSAI of the first PDU session; and/or a first network slice instance identifier for the first S-NSSAI. The UPF device may receive a user data packet from a data network. The UPF device may replace the first IP address in the user data packet with the second IP address. The UPF device may send, to the base station, the user data packet with the second IP address.

A PCF device may receive, from an SMF device, a policy establishment request message. The policy establishment request message may comprise: a single S-NSSAI for a PDU session of a wireless device; and/or a reverse S-NSSAI correlated with the S-NSSAI for the PDU session. The PCF device may determine a PCC rule for the PDU session based on the S-NSSAI and the reverse S-NSSAI. The PCF device may send, to the SMF device, a response message comprising the PCC rule.

A PCF device may receive, from an AF device, a service information provisional message. The service information provisional message may comprise: a single S-NSSAI for a wireless device; a reverse S-NSSAI correlated with the S-NSSAI for the wireless device; an identifier of the wireless device; and/or service information for the wireless device. The PCF device may map the reverse S-NSSAI and the service information to a PDU session, for example, based on the identifier of the wireless device. The PCF device may determine a PCC rule for the PDU session based on the S-NSSAI and the reverse S-NSSAI. The PCF device may send, to the SMF device, a response message. The response message may comprise the PCC rule.

A PCF device may receive, from an SMF device, a policy establishment request message. The policy establishment request message may comprise a combined S-NSSAI for a PDU session of a wireless device. The combined S-NSSAI may indicate: an uplink slice service type for the PDU session and/or a downlink slice service type for the PDU session. The PCF device may determine a PCC rule for the PDU session, for example, based on the combined S-NSSAI. The PCF device may send, to the SMF device, a response message. The response message may comprise the PCC rule.

A wireless device may receive from an application on the wireless device, a service request. The service request may indicate: an SST for uplink and/or a second SST for downlink. The wireless device may determine: a first PDU session for the first SST for uplink and/or a second PDU session for the second SST for downlink. The wireless device may send, to an AMF device, a first establishment request message for the first PDU session of a wireless device. The wireless device may receive, from the AMF device, a first response message. The first response message may comprise a wireless device IP address for the first PDU session. The wireless device may send, to the AMF device, a second establishment request message for a second PDU session. The second establishment request message may comprise session information of the first PDU session. The wireless device may receive, from the AMF device, a second response message. The second response message may comprise the wireless device IP address for the second PDU session. The wireless device may send, to a base station, a first user data packet, via the first PDU session, comprising the wireless device IP address. The wireless device may receive, from the base station, a second user data packet, via the second PDU session, comprising the wireless device IP address.

A PCF device may receive, from an AMF device, an access policy request message for a wireless device. The access policy request message may comprise an identifier of the wireless device. The PCF device may determine a wireless device URSP rule. The URSP rule may comprise: an uplink SST for a PDU session and/or a downlink SST for the PDU session. The PCF device may send, to the wireless device via the AMF device, the URSP rule. The PCF device may receive, from an SMF device, a session policy request message. The session policy request message may comprise: session information of a first PDU session; session information for a second PDU session; and IP address for the first PDU session and the second PDU session. The session information for the second PDU session may indicate that the second PDU session is correlated with the first PDU session, The PCF device may map the IP address to the first PDU session and the second PDU session. The PCF device may determine a first PCC rule for the first PDU session, for example, based on the session information. The PCF device may determine a second PCC for the second PDU session, for example, based on the session information. The PCF device may send, to the SMF device, a response message. The response message may comprise the first PCC rule and the second PCC rule.

Figure 26:
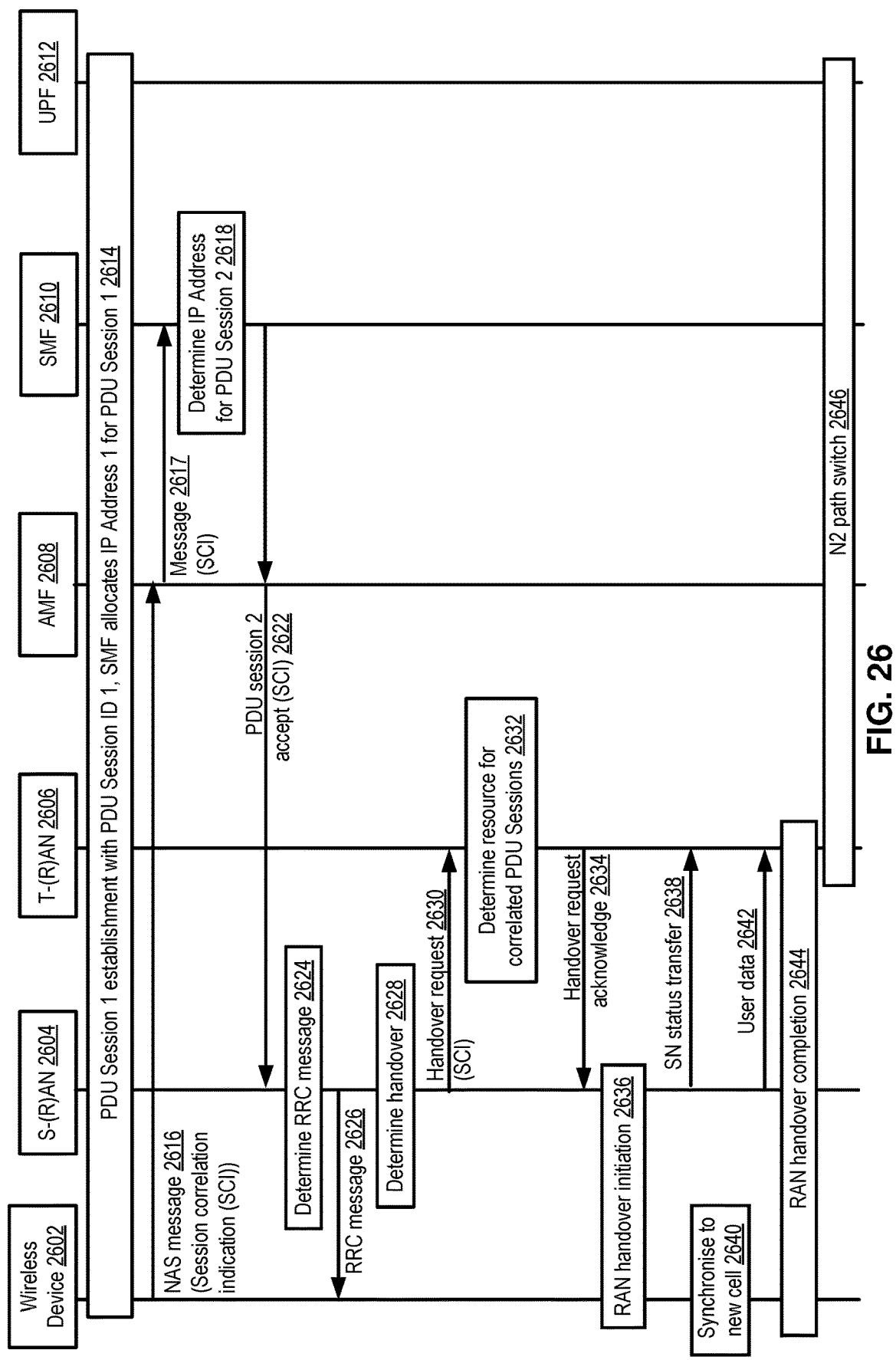
FIG. 26 shows example call flows for a handover procedure.

FIG. 26 shows example call flows for a handover procedure. A wireless device 2602 may determine a first network slice used for/applied to a first service (e.g., an eMBB service, or any other service) of the application for a first direction (e.g., uplink direction), and a second network slice used for/applied to the second service (e.g., a URLLC service, or any other service) of the application for a second direction (e.g., downlink direction). The wireless device 2602 may determine that a first PDU session may use the first network slice and, a second PDU session may use the second network slice. The wireless device 2602 may determine that a first PDU session may use the first network slice (e.g., corresponding to first S-NSSAI with an SST indicating an eMBB service, or any other service) for the uplink direction, and a second PDU session may use a second network slice (e.g., corresponding to second S-NSSAI with an SST indicating a URLLC service, or any other service) for the downlink direction.

At step 2614, a first PDU session may be established. The wireless device 2602 may initiate the first PDU session by sending, to an AMF device 2608, a first NAS message. The first NAS message may comprise at least one of: the first S-NSSAI(s) and/or NSI indicator(s)/ID(s) of the first S-NSSAI(s), a first DNN, a first PDU session indicator/ID, an indicator of a request type, and/or an N1 SM container (e.g., comprising a first PDU session establishment request). The wireless device 2602 may initiate a wireless device requested PDU session establishment procedure by sending/transmitting the first PDU session establishment request message within the N1 SM container of the first NAS message. The first PDU session establishment request message may comprise at least one of: the first PDU session ID, a first packet filter for the first direction (e.g., a packet filter for uplink direction), a requested PDU session type, and/or a requested SSC mode, etc. The AMF device 2608 may determine/select an SMF device and send, to the selected SMF device, a message (e.g., a PDUSession_CreateSMContext request message). The message may comprise at least one of: a SUPI, the first DNN, the first S-NSSAI(s) and/or the NSI indicator(s)/ID(s) of the first S-NSSAI(s), the first PDU session indicator/ID, an AMF indicator/ID, an indicator of a request type, an indicator of a priority access, and/or an N1 SM container (e.g., comprising the first PDU session establishment request message).

The SMF device may perform one or more actions. The SMF device may allocate a wireless device IP address (e.g., a IPv4 address and/or a IPv6 network prefix). The SMF device may send, to the wireless device 2602 via the AMF device 2608 and a source base station (e.g., source-(R)AN or S-(R)AN 2604), a message (e.g., a first PDU session establishment accept message). The first message may comprise the wireless device IP address.

The wireless device 2602 may send, to the AMF device 2608, a second NAS message 2616 requesting the second PDU session. The second NAS message 2616 may comprise at least one of: a session/network slice correlation indication; an asymmetric service indication; session information of the first PDU session and/or network slice information of the first network slice; the second S-NSSAI(s) and/or NSI indicator(s)/ID(s) of the second S-NSSAI(s); a second DNN; a second PDU session indicator/ID; an indicator of a request type, and/or N1 SM container (e.g., comprising a second PDU session establishment request message). The second DNN may be the same as the first DNN of the first PDU session. The wireless device 2602 may initiate a wireless device requested PDU session establishment procedure, for example, by transmitting a second PDU session establishment request message within the N1 SM container of the second NAS message 2616. The second PDU session establishment request message may comprise at least one of: the session/network slice correlation indication; the asymmetric service indication; the session information of the first PDU session and/or the network slice information of the first network slice; the second PDU session indicator/ID; a second packet filter for the second direction (e.g., packet filter for downlink direction); requested PDU session type;

and/or a requested SSC mode, etc. The session information of the first PDU session and/or the network slice information of the first network slice may comprise at least one of: the first PDU session indicator/ID; the wireless device IP address; the first S-NSSAI(s) and/or the NSI indicator(s)/ID(s) of the first S-NSSAI(s); and/or the first DNN.

The session/network slice correlation indication, the asymmetric service indication, the session information of the first PDU session, and/or the network slice information of the first network slice may indicate that the first PDU session may be correlated/associated with the second PDU session (e.g., the first PDU session and the second PDU session may be associated with the same application and/or the first PDU session and the second PDU session may support the same application). The session/network slice correlation indication, the asymmetric service indication, the session information of the first PDU session, and/or the network slice information of the first network slice may indicate that the first network slice may be correlated/associated with the second network slice (e.g., the first network slice and the second network slice may be associated with the same application and/or the first network slice and the second network slice may support the same application). The session/network slice correlation indication, the asymmetric service indication, the session information of the first PDU session, and/or the network slice information of the first network slice may indicate that the first network slice instance may be correlated/associated with the second network slice instance (e.g., the first network slice instance and the second network slice instance may be associated with the same application and/or the first network slice and the second network slice may support the same application). The session/network slice correlation indication, the asymmetric service indication, the session information of the first PDU session, and/or the network slice information of the first network slice may indicate that a first service type (e.g., an eMBB service) may be supported by the first PDU session and/or the first network slice for a first direction (e.g., uplink direction), and a second service type (e.g., a URLLC service) may be supported by the second PDU session and/or the second network slice for a second direction (e.g., downlink direction).

The second packet filter for the second direction (e.g., packet filter for downlink direction) may comprise the wireless device IP address to indicate that the first PDU session is correlated/associated with the second PDU session. The second packet filter for the second direction (e.g., packet filter for downlink direction) may comprise the wireless device IP address to indicate that the first network slice (instance) is correlated/associated with the second network slice (instance).

The AMF device 2608 may determine/select an SMF device 2610 for the second PDU session and/or the second network slice. The SMF device 2610 for the second PDU session and/or the second network slice may be the same SMF device as was determined/selected for the first PDU session and/or the first network slice. The SMF device 2610 for the second PDU session and/or the second network slice may be a different SMF device as was determined/selected for the first PDU session and/or the first network slice. The AMF device 2608 may determine/select the same SMF device, for the second PDU session and/or the second network slice, as was determined/selected for the first PDU session and/or the first network slice, for example, based on receiving the second NAS message 2616 and based on the session/network slice correlation indication, the asymmetric service indication, the session information of the first PDU session, and/or the network slice information of the first network slice. The AMF device 2608 may send, to the SMF device 2610, a message 2617 (e.g., a PDUSession_CreateSMContext request message). The message 2617 may comprise at least one of: the session/network slice correlation indication; the asymmetric service indication; the session information of the first PDU session; the network slice information of the first network slice; the SUPI; the second DNN; the second S-NSSAI(s) and/or the NSI indicator(s)/ID(s) of the second S-NSSAI(s); the second PDU session indicator/ID, the AMF indicator/ID, an indicator of a request type, an indicator of a priority access, and/or an N1 SM container (e.g., comprising the second PDU session establishment request message).

The SMF device 2610 may perform one or more actions, for example, based on receiving the message 2617 from the AMF device 2608. At step 2618, the SMF device 2610 may determine the same wireless device IP address (e.g., IPv4 address and/or IPv6 network prefix) is used for the second PDU session and/or the second network slice as was used for the first PDU session and/or the first network slice, for example, based on the session/network slice correlation indication, the asymmetric service indication, the session information of the first PDU session, and/or the network slice information of the first network slice. The wireless device IP address may be used for more than one PDU session and/or more than one network slice. The SMF device 2610 may determine a different wireless device IP address for the second PDU session and/or the second network slice.

The SMF device 2610 may send, to the wireless device 2602, via the AMF device 2608 and the S-(R)AN 2604, a message (e.g., a PDU session accept message 2622). The PDU session accept message 2622 may comprise the session/network slice correlation indication, the asymmetric service indication, the session information of the first PDU session, and/or the network slice information of the first network slice. The wireless device 2602, the S-(R)AN 2604, the AMF device 2608, the SMF device 2610, and/or the UPF device 2612 may perform one or more actions described with reference to corresponding elements in FIGS. 16-25.

The SMF device 2610 may send, to the AMF device 2608, a message (e.g., an Namf_Communication_N1N2MessageTransfer message). The message may comprise at least one of: the second PDU Session ID, an N2 SM information message, and/or a N1 SM container message. The N2 SM information message may comprise information elements used for the source base station (e.g., the S-(R)AN 2604). The N2 SM information message may comprise at least one of: the session/network slice correlation indication, the asymmetric service indication, the first PDU session ID, and/or session information of the second PDU session. The session information of the second PDU session may comprise at least one of the following information elements for the second PDU session: the second PDU Session indicator/ID, QFI(s), QoS profile(s), CN tunnel information, the second S-NSSAI(s) and/or the NSI indicator(s)/ID(s) of the second S-NSSAI(s), a session AMBR, and/or a PDU session type. The N1 SM container message may comprise information elements used for the wireless device. The N1 SM container message may comprise a second PDU session establishment accept message, wherein the second PDU session establishment accept message may comprise at least one of the following information elements for the second PDU session: QoS rule(s) and QoS flow level QoS parameters (e.g., if needed) for the QoS flow(s) associated with the QoS rule(s), selected SSC mode, the second S-NSSAI(s), the DNN, the wireless device IP address, and/or a selected PDU session type.

The AMF device 2608 may send, to the S-(R)AN 2604, a message (e.g., an N2 PDU session request message) based on receiving the Namf_Communication_N1N2MessageTransfer message from the SMF device 2610. The N2 PDU session request message may comprise the N2 SM information message and/or a NAS message. The NAS message may comprise the second PDU session indicator/ID and/or the N1 SM container message.

The S-(R)AN 2604 may perform one or more actions, for example, based on receiving the message from the AMF device 2608. The S-(R)AN 2604 may determine data radio bearers (DRBs) based on the session/network slice correlation indication, the asymmetric service indication, the session information of the first PDU session, and/or the session information of the second PDU session. The S-(R)AN 2604 may determine a first DRB used for/applied to the first service (e.g., an eMBB service) of the application for the first PDU session (e.g., for uplink direction), and/or a second DRB used for/applied to the second service (e.g., a URLLC service) of the application for the second PDU session (e.g., for downlink direction). The S-(R)AN 2604 may correlate/associate the first PDU session with the second PDU session, the first network slice (instance) with the second network slice (instance), and/or the first DRB with the second DRB, for example, based on the session/network slice correlation indication, the asymmetric service indication, the session information of the first PDU session, and/or the session information of the second PDU session. Correlating/associating the first PDU session with the second PDU session may comprise determining that the first PDU session and the second PDU session are associated with/support the same application. Correlating/associating the first network slice (instance) with the second network slice (instance) may comprise determining that the first network slice (instance) and the second network slice (instance) are associated with/support the same application. Correlating/associating the first DRB with the second DRB may comprise determining that the first DRB and the second DRB are associated with/support the same application.

At step 2624, the S-(R)AN 2604 may determine an RRC message 2626 (e.g., an RRCSetup message) based on information received from the AMF device 2608. The S-(R)AN 2604 may determine the RRC message 2626 based on the session/network slice correlation indication, the asymmetric service indication, the session information of the first PDU session, and/or the session information of the second PDU session. The S-(R)AN 2604 may determine the RRC message 2626 based on the determining the first DRB and the second DRB. The S-(R)AN 2604 may determine available resources for the correlated PDU sessions, the correlated network slices, and/or the correlated DRBs. The RRC message 2626 may indicate the available resource for the correlated PDU sessions, the correlated network slices, and/or the correlated DRBs. The S-(R)AN 2604 may send, to the wireless device 2602, the RRC message 2626.

At step 2628, the S-(R)AN 2604 may determine to perform a handover (e.g., using an Xn based handover procedure) the wireless device 2602 based on a measurement report (e.g., received from the wireless device 2602) and/or radio resource management (RRM) information. The S-(R)AN 2604 may send to a target base station (e.g., a target (R)AN or T-(R)AN 2606) a message (e.g., a handover request message 2630) to request a handover. The handover request message 2630 may comprise at least one of: the session/network slice correlation indication; the asymmetric service indication; the session information of the first PDU session; the session information of the second PDU session; a target cell indicator/ID, RRM configuration information (e.g., wireless device inactivity time), current QoS flows to DRBs mapping rules applied to the UE, SIB1 from source base station, wireless device capabilities associated with different RATs, etc.

The T-(R)AN 2606 may perform one or more actions, for example, based on receiving the handover request message 2630. The T-(R)AN 2606 may determine resources for the correlated PDU sessions (e.g., the first PDU session and the second PDU session), the correlated network slices (e.g., the first S-NSSAI and the second S-NSSAI), and/or the correlated DRBs (e.g., the first DRB and the second DRB), for example, based on the session/network slice correlation indication, the asymmetric service indication, the session information of the first PDU session, and/or the session information of the second PDU session. The T-(R)AN 2606 may determine if resources are available (e.g., at the T-(R)AN 2606) for both the first PDU session and the second PDU session; both the first S-NSSAI and the second S-NSSAI; and/or both the first DRB and the second DRB. At step 2632, the T-(R)AN 2606 may determine a third DRB and a fourth DRB, for example, based on the session/network slice correlation indication, the asymmetric service indication, the session information of the first PDU session, and/or the session information of the second PDU session. The T-(R)AN 2606 may map the first DRB to the third DRB and/or map the second DRB to the fourth DRB. The T-(R)AN 2606 may determine the third DRB used for the first service (e.g., an eMBB service) of the application (e.g., for the first PDU session, the first network slice, and/or the first S-NSSAI), and/or the fourth DRB used for the second service (e.g., a URLLC service) of the application (e.g., for the second PDU session, the second network slice, and/or the second S-NSSAI). The T-(R)AN 2606 may correlate/associate the first PDU session with the second PDU session, the first network slice (instance) with the second network slice (instance), and/or the third DRB with the fourth DRB, for example, based on the session/network slice correlation indication, the asymmetric service indication, and/or the session information of the first PDU session and/or the session information of the second PDU session.

The T-(R)AN 2606 may send, to the S-(R)AN 2604, a message (e.g., a handover request acknowledgement message 2634), for example, based on the determining resources for the correlated PDU sessions (e.g., the first PDU session and the second PDU session), the correlated network slices (e.g., the first S-NSSAI and the second S-NSSAI), and/or the correlated DRBs (e.g., the first DRB and the second DRB). The handover request acknowledgement message 2634 may indicate that the handover is successful, for example, if resources are available for the correlated PDU sessions, the correlated network slices, and/or the correlated DRBs. The handover request acknowledgement message 2634 may indicate that the first PDU session and the second PDU session are jointly accepted, for example, if resources are available for the first PDU session and the second PDU session. The handover request acknowledgement message 2634 may the handover is unsuccessful, for example, if resources are not available for the correlated PDU sessions, the correlated network slices, and/or the correlated DRBs. The handover request acknowledgement message 2634 may indicate that the first PDU session and the second PDU session are jointly rejected, for example, if resources are not available for one or both the first PDU session and the second PDU session.

The S-(R)AN 2604 and/or the T-(R)AN 2606 (and/or other elements shown in FIG. 26) may perform one or more other actions to complete the handover procedure, for example, if the handover request acknowledgement message 2634 indicates that the handover is successful (e.g., the first PDU session and the second PDU session are jointly accepted). At step 2636, the wireless device 2602 and the S-(R)AN 2604 may perform various operations related to a RAN handover initiation procedure. The S-(R)AN 2604 may send a handover command to the wireless device 2602, for example, if the handover request acknowledgement message 2634 indicates that the first PDU session and the second PDU session are jointly accepted. The S-(R)AN 2604 may send a sequence number (SN) status transfer message to the T-(R)AN 2638. At step 2640, the wireless device 2602 may synchronize to a new cell associated with the T-(R)AN 2606. At step 2642, the S-(R)AN may send user data 2642 to the T-(R)AN 2606.

Figure 27:
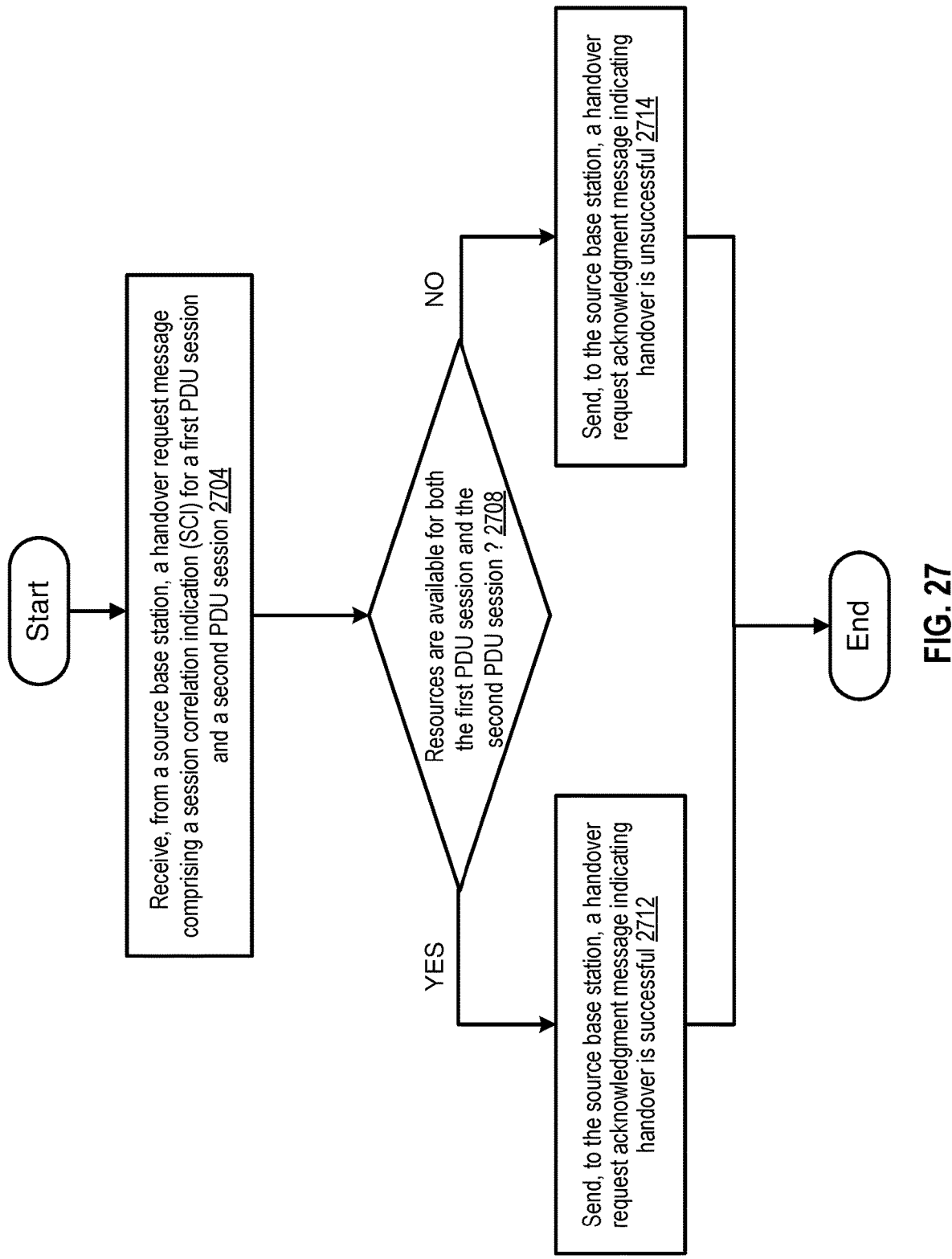
FIG. 27 shows an example method for a handover procedure at a target base station.

FIG. 27 shows an example method for a handover procedure at a target base station. At step 2704, the target base station may receive, from a source base station, a handover request. The handover request may comprise a session correlation indication (SCI) for a first PDU session and a second PDU session. At step 2708, the target base station may determine, based on the handover request message, whether resources are available for both the first PDU session and the second PDU session. At step 2712, the target base station may send, to the source base station, a handover request acknowledgment message indicating handover is successful, for example, if resources are available for both the first PDU session and the second PDU session. The handover request acknowledgement message may indicate that the first PDU session and the second PDU session are jointly accepted, for example, if resources are available for the first PDU session and the second PDU session. At step 2714, the target base station may send, to the source base station, a handover request acknowledgment message indicating handover is unsuccessful, for example, if resources are not available for one or both the first PDU session and the second PDU session. The handover request acknowledgement message may indicate that the first PDU session and the second PDU session are jointly rejected, for example, if resources are not available for one or both the first PDU session and the second PDU session.

Figure 28:
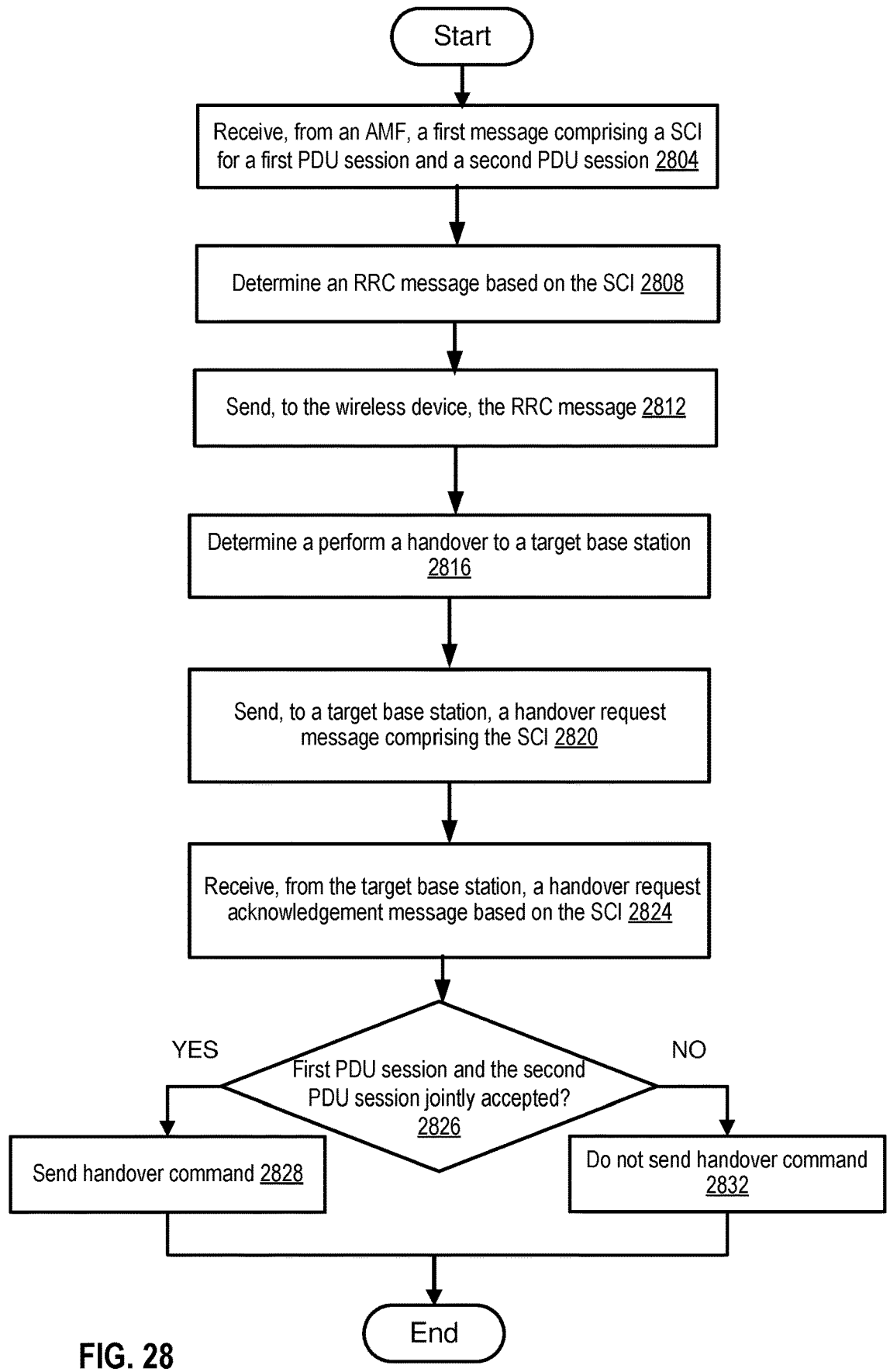
FIG. 28 is an example method for handover procedure at a source base station.

FIG. 28 is an example method for handover procedure at a source base station. At step 2804, the source base station may receive, from an AMF device, a first message comprising a SCI for a first PDU session and a second PDU session. At step 2808, the source base station may determine, based on the SCI, the RRC message. At step 2812, the source base station may send the RRC message to the wireless device. At step 2816, the source base station may determine to perform a handover to a target base station. At step 2820, the source base station may send, to a target base station, a handover request message comprising the SCI. At step 2824, the source base station may receive, from the target base station, a handover request acknowledgment message. The handover request acknowledgment message may be based on the SCI. At step 2826, the source base station may determine, based on the handover request acknowledge message, whether the first PDU session and the second PDU session are jointly accepted. At step 2828, the source base station may send a handover command, for example, if the handover request acknowledgment message indicates that the first PDU session and the second PDU session are jointly accepted. At step 2832, the source base station may not send (e.g., refrain from sending) a handover command, for example, if the handover request acknowledgment message indicates that the first PDU session and the second PDU session are jointly rejected.

Figure 29:
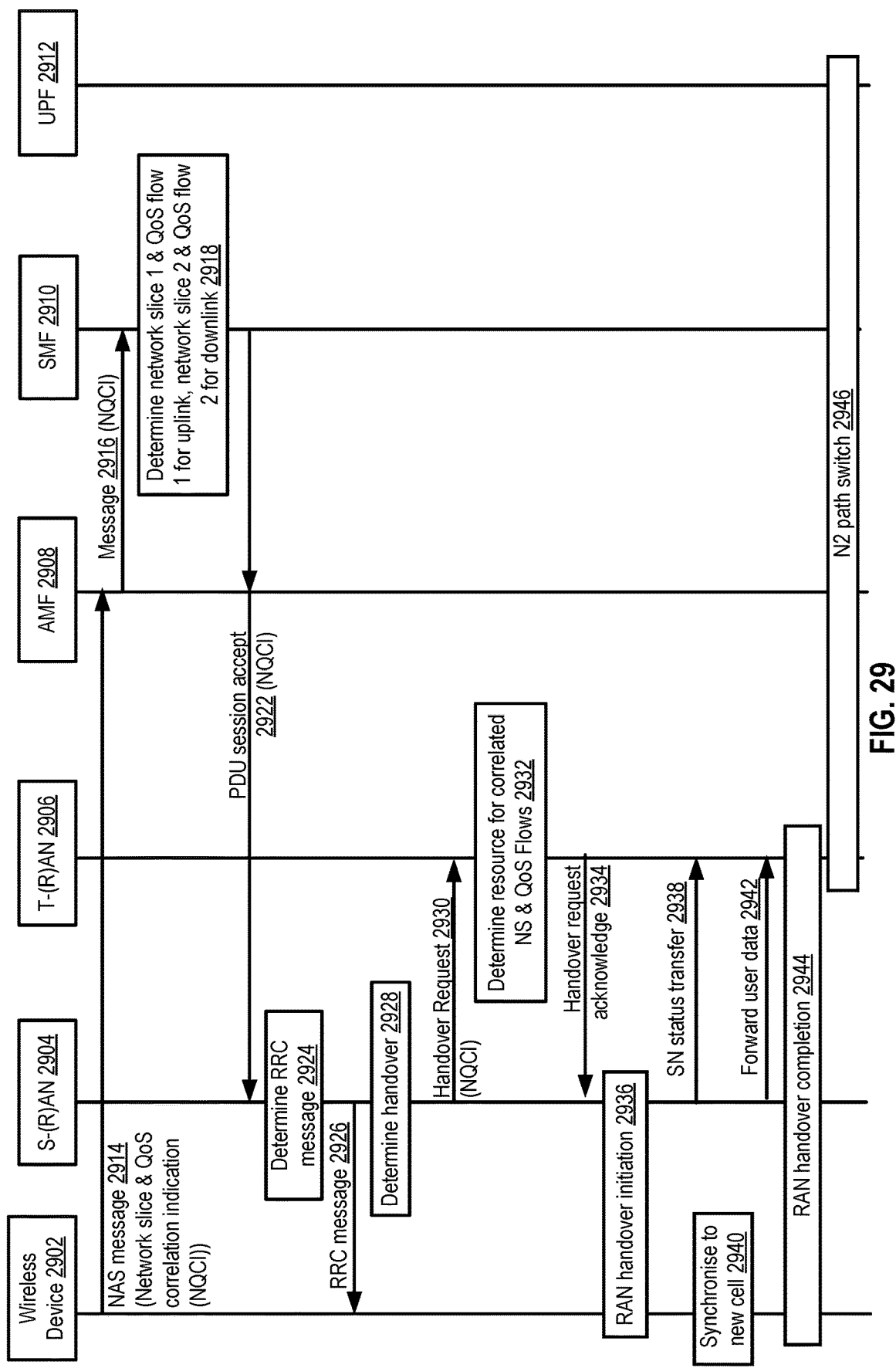
FIG. 29 shows example call flows for a handover procedure.

FIG. 29 shows example call flows for a handover procedure. A wireless device 2902 may receive a service request from an application on the wireless device 2902. The service request may indicate an application type (e.g., a cloud gaming application, a UAV application, and/or any other type of application) of the application sending the service request. The wireless device 2902 may determine one PDU session to support two network slices for the application, for example, based on (e.g., in response to) the service request and based on the URSP rule. A first network slice (e.g., associated with a URLLC service or any other service) may be applied/used for uplink traffic, and a second/reverse network slice (e.g., associated with an eMBB service or any other service) may be applied/used for downlink traffic.

The wireless device 2902 may send, to an AMF device 2908, a NAS message 2914. The NAS message 2914 may request a PDU session. The NAS message 2914 may comprise at least one of: a network slice correlation indication; an asymmetric service indication; a QoS flow correlation indication; a first requested QoS for a first direction (e.g., uplink direction); a second requested QoS for a second direction (e.g., downlink direction); a PDU session indicator/ID; first S-NSSAI(s) and/or NSI indicator(s)/ID(s) of the first S-NSSAI(s) for the first direction (e.g., uplink direction); second/reverse S-NSSAI(s) and/or NSI indicator(s)/ID(s) of the second S-NSSAI(s) for the second direction (e.g., downlink direction); a DNN; and/or an N1 SM container (e.g., comprising a PDU session establishment request). The asymmetric service indication may indicate different service types for uplink traffic and downlink traffic. The QoS flow correlation indication may indicate QoS for QoS flows corresponding to uplink traffic and downlink traffic. A first QoS flow may require an eMBB QoS for uplink traffic and a second QoS flow may require a URLLC QoS flow for downlink traffic. The QoS flow correlation indication may indicate that a first QoS flow is correlated/associated with a second QoS flow (e.g., the first QoS flow and the second QoS flow may support the same application). The first requested QoS may apply to the first QoS flow. The second requested QoS may apply to the second QoS flow. The first requested QoS and/or the second requested QoS may comprise at least one of: a QoS service type (e.g., an eMBB service, a URLLC service); a 5QI; a QCI; an ARP; an uplink GFBR; a downlink GFBR; an uplink MFBR; and/or a downlink MFBR.

The network slice correlation indication, the asymmetric service indication, and/or the QoS flow correlation indication may indicate that the first network slice (instance) is associated/correlated with the second network slice (instance) (e.g., the first network slice (instance) and the second network slice (instance) may support the same application). The network slice correlation indication, the asymmetric service indication, and/or the QoS flow correlation indication may indicate that the first S-NSSAI is associated/correlated with the second S-NSSAI. The network slice correlation indication, the asymmetric service indication, and/or the QoS flow correlation indication may indicate that a first service type (e.g., a URLLC service or any other service) is supported by the first network slice for the first direction (e.g., uplink direction), and a second service type (e.g., an eMBB service or any other service) is supported by the second network slice for the second direction (e.g., downlink direction).

The wireless device 2902 may initiate a wireless device requested PDU session establishment procedure by sending/transmitting a PDU session establishment request message within the N1 SM container of the NAS message 2914. The PDU session establishment request message may comprise at least one of: the network slice correlation indication; the asymmetric service indication; the QoS flow correlation indication; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the first packet filter for the first direction (e.g., packet filter for uplink direction); the second packet filter for the second direction (e.g., packet filter for downlink direction); a requested PDU session type; and/or a requested SSC mode, etc.

The AMF device 2908 may determine/select an SMF device (e.g., SMF device 2910) to support two network slices for the same PDU session, for example, based on/in response to the NAS message received from the wireless device 2902 and/or based on the network slice correlation indication, the asymmetric service indication, and/or the QoS flow correlation indication. The AMF device 2908 may send, to the SMF device 2910, a message 2916 (e.g., a PDUSession_CreateSMContext request message). The message 2916 may comprise at least one of: the network slice correlation indication; the asymmetric service indication; the QoS flow correlation indication; the first requested QoS; the second requested QoS; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the DNN; and/or an N1 SM container (e.g., comprising the PDU session establishment request message).

The SMF device 2910 may perform one or more actions, for example, based on receiving the message 2916. The SMF device 2910 may determine/allocate a wireless device IP address (e.g., an IPv4 address and/or an IPv6 network prefix) for the PDU session and/or the first network slice and the second network slice. The SMF device 2910 may determine a first QoS flow and/or a first network slice are used for/apply to a first direction, and/or a second QoS flow and/or a second network slice are used for/apply to a second direction, for example, based on information received from the AMF device (e.g., network slice correlation indication, the asymmetric service indication, and/or the QoS flow correlation indication). At step 2918, the SMF device 2910 may determine QoS flow 1 and/or a network slice indicated by the first S-NSSAI are used for/apply for uplink traffic and/or QoS flow 2 and/or a network slice indicated by the second S-NSSAI are used for/apply for downlink traffic. The SMF device 2910 may determine that the first QoS flow is correlated/associated with the second QoS flow (e.g., the first QoS flow and the second QoS flow may support the same application) and/or the first network slice is correlated/associated with the second network slice (e.g., the first network slice and the second network slice may support the same application), for example, based on the network slice correlation indication and/or the asymmetric service indication and/or the QoS flow correlation indication. The first QoS flow and/or the second QoS flow may comprise corresponding at least one of: a QoS service type (e.g., an eMBB service, a URLLC service, or any other type of service), a 5QI, a QCI, an ARP, an uplink GFBR, a downlink GFBR, an uplink MFBR, and/or a downlink MFBR. The SMF device 2910 may determine that a first QoS rule applies to the first QoS flow for the first direction (e.g., uplink direction) and/or a second QoS rule applies to the second QoS flow for the second direction (e.g., downlink direction), for example, based on the network slice correlation indication, the asymmetric service indication and/or the QoS flow correlation indication. The first QoS rule and/or the second QoS rule may comprise corresponding at least one of: a QoS rule indicator/identifier, a QFI of the associated/applied QoS flow (e.g., the first QoS flow), a QoS service type (e.g., an eMBB service, a URLLC service, or any other service type), a 5QI, a QCI, an ARP, an uplink GFBR, a downlink GFBR; an uplink MFBR, and/or a downlink MFBR.

The SMF device 2910 may send, to the wireless device 2902, via the AMF device 2908 and the S-(R)AN 2904, a message (e.g., a PDU session accept message 2922). The PDU session accept message 2922 may comprise the network slice correlation indication, the asymmetric service indication and/or the QoS flow correlation indication. The wireless device 2902, the S-(R)AN 2904, the AMF device 2908, the SMF device 2910, and/or the UPF device 2912 may perform one or more actions described with reference to corresponding elements in FIGS. 16-25.

The SMF device 2910 may send, to the AMF device 2908, a message (e.g., an Namf_Communication_N1N2MessageTransfer message). The message may comprise at least one of: the PDU Session indicator/ID, an N2 SM information message, and/or an N1 SM container message. The N2 SM information message may comprise information elements used for a source base station (e.g., an S-(R)AN 2904). The N2 SM information may comprise at least one of: the network slice correlation indication, the asymmetric service indication, the QoS flow correlation indication, and/or the session information of the PDU session. The session information of the PDU session may comprise at least one of the following information elements for the PDU session: the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the DNN, QFI(s), QoS profile(s), CN tunnel information, session AMBR, and/or PDU session type. The QoS profile(s) may comprise the first QoS rule and/or the second QoS rule. The QoS profile(s) may comprise the first QoS flow and/or the second QoS flow.

The N1 SM container message may comprise information elements used for the wireless device. The N1 SM container message may comprise a PDU session establishment accept message, wherein the PDU session establishment accept message may comprise at least one of the following information elements for the second PDU session: QoS rule(s) and QoS flow level QoS parameters (e.g., if needed) for the QoS flow(s) (e.g., the first QoS flow and/or the second QoS flow) associated with the QoS rule(s) (e.g., the first QoS rule and/or the second QoS rule), selected SSC mode, the second S-NSSAI(s), the DNN, the wireless device IP address, and/or a selected PDU session type.

The AMF device 2908 may send, to the S-(R)AN 2904, a message (e.g., an N2 PDU session request message), for example, based on receiving the Namf_Communication_N1N2MessageTransfer message. The N2 PDU session request message may comprise the N2 SM information message and/or a NAS message. The NAS message may comprise the second PDU session indicator/ID and/or the N1 SM container message.

The S-(R)AN 2904 may perform one or more actions, for example, based on receiving the message from the AMF device 2908. The S-(R)AN 2904 may determine DRBs based on the information received from the AMF device (e.g., based on the network slice correlation indication, the asymmetric service indication, and/or the QoS flow correlation indication). The S-(R)AN 2904 may determine a first DRB used for/applied to the first QoS flow for the first service (e.g., an eMBB service or any other service) of the application for the first direction (e.g., uplink direction), and/or a second DRB used for/applied to the second QoS flow for the second service (e.g., a URLLC service or any other service) of the application for the second direction (e.g., downlink direction). The S-(R)AN 2904 may correlate/associate the first network slice (instance) with the second network slice (instance), the first QoS flow with the second QoS flow, the first DRB with the second DRB, for example, based on the network slice correlation indication, the asymmetric service indication, and/or the QoS flow correlation indication. Correlating/associating the first network slice (instance) with the second network slice (instance) may comprise determining that the first network slice (instance) and the second network slice (instance) are associated with/support the same application. Correlating/associating the first QoS flow with the second QoS flow may comprise determining that the first QoS flow and the second QoS flow are associated with/support the same application. Correlating/associating the first DRB with the second DRB may comprise determining that the first DRB and the second DRB are associated with/support the same application.

The S-(R)AN 2904 may determine an RRC message 2926 (e.g., an RRCSetup message), for example, based on information received from the AMF device 2908. The S-(R)AN may determine the RRC message 2926, for example, based on the network slice correlation indication, the asymmetric service indication, and/or the QoS flow correlation indication. The S-(R)AN 2904 may determine the RRC message 2926, for example, based on the determining the first DRB and the second DRB. The S-(R)AN 2904 may determine available resources for the correlated QoS flows, the correlated network slices, and/or the correlated DRBs. The RRC message 2926 may indicate the available resources for the correlated QoS flows, the correlated network slices, and/or the correlated DRBs. The S-(R)AN 2904 may send, to the wireless device 2902, the RRC message 2926.

At step 2928, the S-(R)AN 2904 may determine to perform handover (e.g., using an Xn based handover procedure) the wireless device 2902 based on a measurement report (e.g., received from the wireless device 2902) and/or radio resource management (RRM) information. The S-(R)AN 2904 may send to a target base station (e.g., a target (R)AN or T-(R)AN 2906) a message (e.g., a handover request message 2930) to request a handover. The handover request message may comprise at least one of: the network slice correlation indication; the asymmetric service indication; the session information of the PDU session; the QoS flow correlation indication; a target cell indicator/ID, RRM configuration information (e.g., wireless device inactivity time), current QoS flows to DRBs mapping rules applied to the UE, SIB1 from source base station, and/or wireless device capabilities associated with different RATs.

The T-(R)AN 2906 may perform one or more actions, for example, based on receiving the handover request message 2930. The T-(R)AN 2906 may determine resources for the correlated network slices (e.g., the first S-NSSAI and the second S-NSSAI), the correlated QoS flows (e.g., the first QoS flow and the second QoS flow), and/or correlated DRBs (e.g., the first DRB and the second DRB), for example, based on the network slice correlation indication, the asymmetric service indication, and/or the QoS flow correlation indication. The T-(R)AN 2906 may determine if resources are available (e.g., at the T-(R)AN 2906) for both the first S-NSSAI and the second S-NSSAI; both the first QoS flow and the second QoS flow; and/or both the first DRB and the second DRB. At step 2932, the T-(R)AN 2906 may determine a third DRB and a fourth DRB, for example, based on the network slice correlation indication, the asymmetric service indication, and/or the QoS flow correlation indication. The T-(R)AN 2906 may map the first DRB to the third DRB and/or map the second DRB to the fourth DRB. The T-(R)AN 2906 may map the first QoS flow to the third DRB and/or map the second QoS flow to the fourth DRB. The T-(R)AN may determine the third DRB used for the first QoS flow for the first service (e.g., an eMBB service) of the application for the first network slice (e.g. the first S-NSSAI) for the first direction (e.g. uplink), and/or the fourth DRB used for the second QoS flow for the second service (e.g., a URLLC service) of the application for the second network slice (e.g. the second S-NSSAI) for the second direction (e.g. downlink). The T-(R)AN 2906 may correlate/associate the first QoS flow with the second QoS flow, the first network slice (instance) with the second network slice (instance), and/or the third DRB with the fourth DRB, for example, based on the network slice correlation indication, the asymmetric service indication, and/or the QoS flow correlation indication.

The T-(R)AN 2906 may send, to the S-(R)AN 2904, a message (e.g., a handover request acknowledgement message 2934), for example, based on determining resources for the correlated QoS flows (e.g., the first QoS flow and the second QoS flow), correlated network slices (e.g., the first S-NSSAI and the second S-NSSAI), and/or correlated DRBs (e.g., the first DRB and the second DRB, and/or the third DRB and the fourth DRB). The handover request acknowledgement message 2934 may indicate that the handover is successful, for example, if resources are available for the correlated QoS flows, the correlated network slices, and/or the correlated DRBs. The handover request acknowledgement message 2934 may indicate that the handover is unsuccessful, for example, if resources are not available for the correlated QoS flows, the correlated network slices, and/or the correlated DRBs.

The S-(R)AN 2904 and/or the T-(R)AN 2906 (and/or other elements shown in FIG. 29) may perform one or more other actions to complete the handover procedure, for example, if the handover request acknowledgement message 2934 indicates that the handover is successful. At step 2936, the wireless device 2902 and the S-(R)AN 2904 may perform various operations related to a RAN handover initiation procedure. The S-(R)AN 2904 may send a handover command to the wireless device 2902, for example, if the handover request acknowledgement message 2934 indicates that the handover is successful. The S-(R)AN 2904 may send a sequence number (SN) status transfer message to the T-(R)AN 2938. At step 2940, the wireless device 2902 may synchronize to a new cell associated with the T-(R)AN 2906. At step 2942, the S-(R)AN may send user data 2942 to the T-(R)AN 2906.

Figure 30:
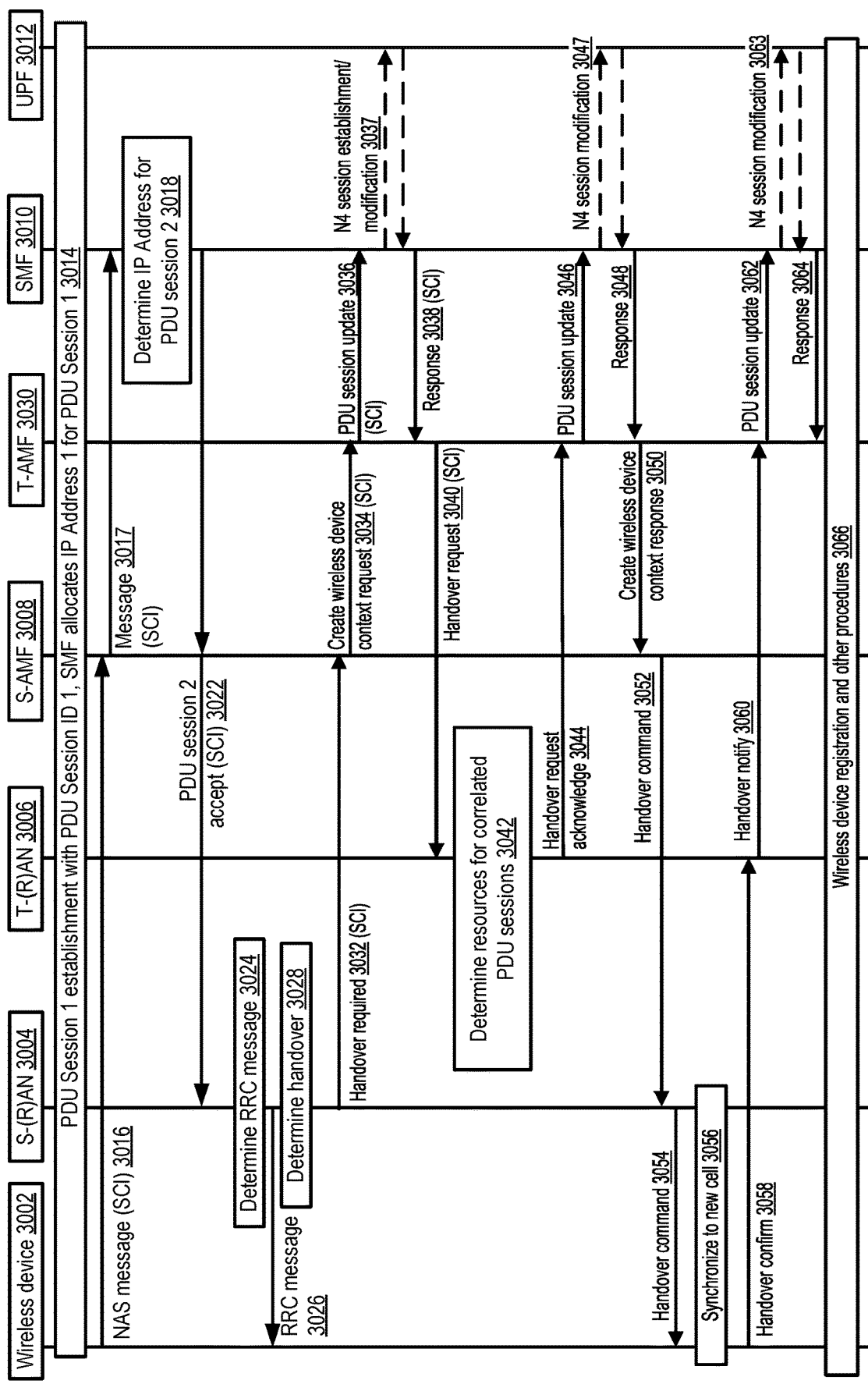
FIG. 30 shows example call flows for a handover procedure via a source AMF device, a target AMF device, and an SMF device.

FIG. 30 shows example call flows for a handover procedure via an SMF device. A handover procedure of FIG. 30 may be used, for example, if there is no interface for direct communications between an S-(R)AN and a T-(R)AN. As described herein, an SMF device may be used to forward messages between the S-(R)AN and the T-(R)AN.

A wireless device 3002 may determine a first network slice used for/applied to a first service (e.g., an eMBB service, or any other service) of the application for a first direction (e.g., uplink direction), and a second network slice used for/applied to the second service (e.g., a URLLC service, or any other service) of the application for a second direction (e.g., downlink direction). The wireless device 3002 may determine that a first PDU session may use the first network slice and, a second PDU session may use the second network slice. The wireless device 3002 may determine that a first PDU session may use the first network slice (e.g., corresponding to first S-NSSAI with an SST indicating an eMBB service, or any other service) for the uplink direction, and a second PDU session may use a second network slice (e.g., corresponding to second S-NSSAI with an SST indicating a URLLC service, or any other service) for the downlink direction.

The wireless device 3002 may initiate a first PDU session by sending, to a source-AMF device (S-AMF device) 3008, a first NAS message. The first NAS message may comprise at least one of: the first S-NSSAI(s) and/or NSI indicator(s)/ID(s) of the first S-NSSAI(s), a first DNN, a first PDU session indicator/ID, an indicator of a request type, and/or an N1 SM container (e.g., comprising a first PDU session establishment request). The wireless device 3002 may initiate a wireless device requested PDU session establishment procedure by sending/transmitting the first PDU session establishment request message within the N1 SM container of the first NAS message. The first PDU session establishment request message may comprise at least one of: the first PDU session ID, a first packet filter for the first direction (e.g., a packet filter for uplink direction), a requested PDU session type, and/or a requested SSC mode, etc. The S-AMF device 3008 may determine/select an SMF device and send, to the selected SMF device, a message (e.g., a PDUSession_CreateSMContext request message). The message may comprise at least one of: a SUPI, the first DNN, the first S-NSSAI(s) and/or the NSI indicator(s)/ID(s) of the first S-NSSAI(s), the first PDU session indicator/ID, an AMF indicator/ID, an indicator of a request type, an indicator of a priority access, and/or an N1 SM container (e.g., comprising the first PDU session establishment request message).

The SMF device may perform one or more actions. The SMF device may allocate a wireless device IP address (e.g., a IPv4 address and/or a IPv6 network prefix). The SMF device may send, to the wireless device 3002 via the S-AMF device 3008 and a source base station (e.g., source-(R)AN or S-(R)AN 3004), a message (e.g., a first PDU session establishment accept message). The first message may comprise the wireless device IP address.

The wireless device 3002 may send, to the S-AMF device 3008, a second NAS message 3016 requesting the second PDU session. The second NAS message 3016 may comprise at least one of: a session/network slice correlation indication; an asymmetric service indication; session information of the first PDU session and/or network slice information of the first network slice; the second S-NSSAI(s) and/or NSI indicator(s)/ID(s) of the second S-NSSAI(s); a second DNN; a second PDU session indicator/ID; an indicator of a request type, and/or N1 SM container (e.g., comprising a second PDU session establishment request message). The second DNN may be the same as the first DNN of the first PDU session. The wireless device 3002 may initiate a wireless device requested PDU session establishment procedure, for example, by transmitting a second PDU session establishment request message within the N1 SM container of the NAS message 3016. The second PDU session establishment request message may comprise at least one of: the session/network slice correlation indication; the asymmetric service indication; the session information of the first PDU session and/or the network slice information of the first network slice; the second PDU session indicator/ID; a second packet filter for the second direction (e.g., packet filter for downlink direction); requested PDU session type; and/or a requested SSC mode, etc. The session information of the first PDU session and/or the network slice information of the first network slice may comprise at least one of: the first PDU session indicator/ID; the wireless device IP address; the first S-NSSAI(s) and/or the NSI indicator(s)/ID(s) of the first S-NSSAI(s); and/or the first DNN.

The session/network slice correlation indication, the asymmetric service indication, the session information of the first PDU session, and/or the network slice information of the first network slice may indicate that the first PDU session may be correlated/associated with the second PDU session (e.g., the first PDU session and the second PDU session may be associated with the same application and/or the first PDU session and the second PDU session may support the same application). The session/network slice correlation indication, the asymmetric service indication, the session information of the first PDU session, and/or the network slice information of the first network slice may indicate that the first network slice may be correlated/associated with the second network slice (e.g., the first network slice and the second network slice may be associated with the same application and/or the first network slice and the second network slice may support the same application). The session/network slice correlation indication, the asymmetric service indication, the session information of the first PDU session, and/or the network slice information of the first network slice may indicate that the first network slice instance may be correlated/associated with the second network slice instance (e.g., the first network slice instance and the second network slice instance may be associated with the same application and/or the first network slice and the second network slice may support the same application). The session/network slice correlation indication, the asymmetric service indication, the session information of the first PDU session, and/or the network slice information of the first network slice may indicate that a first service type (e.g., an eMBB service or any other service) may be supported by the first PDU session and/or the first network slice for a first direction (e.g., uplink direction), and a second service type (e.g., a URLLC service or any other service) may be supported by the second PDU session and/or the second network slice for a second direction (e.g., downlink direction).

The second packet filter for the second direction (e.g., packet filter for downlink direction) may comprise the wireless device IP address to indicate that the first PDU session is correlated/associated with the second PDU session. The second packet filter for the second direction (e.g., packet filter for downlink direction) may comprise the wireless device IP address to indicate that the first network slice (instance) is correlated/associated with the second network slice (instance).

The S-AMF device 3008 may determine/select an SMF device 3010 for the second PDU session and/or the second network slice. The SMF device 3010 for the second PDU session and/or the second network slice may be the same SMF device as was determined/selected for the first PDU session and/or the first network slice. The SMF device 3010 for the second PDU session and/or the second network slice may be a different SMF device as was determined/selected for the first PDU session and/or the first network slice. The S-AMF device 3008 may determine/select the same SMF device, for the second PDU session and/or the second network slice, as was determined/selected for the first PDU session and/or the first network slice, for example, based on receiving the second NAS message 3016 and based on the session/network slice correlation indication, the asymmetric service indication, the session information of the first PDU session, and/or the network slice information of the first network slice. The S-AMF device 3008 may send, to the SMF device 3010, a message 3017 (e.g., a PDUSession_CreateSMContext request message). The message 3017 may comprise at least one of: the session/network slice correlation indication; the asymmetric service indication; the session information of the first PDU session; the network slice information of the first network slice; the SUPI; the second DNN; the second S-NSSAI(s) and/or the NSI indicator(s)/ID(s) of the second S-NSSAI(s); the second PDU session indicator/ID, the S-AMF indicator/ID, an indicator of a request type, an indicator of a priority access, an N1 SM container (e.g., comprising the second PDU session establishment request message).

The SMF device 3010 may perform one or more actions, for example, based on receiving the message 3017 from the S-AMF device 3008. At step 3018, the SMF device 3010 may determine the same wireless device IP address (e.g., IPv4 address and/or IPv6 network prefix) is used for the second PDU session and/or the second network slice as was used for the first PDU session and/or the first network slice, for example, based on the session/network slice correlation indication, the asymmetric service indication, the session information of the first PDU session, and/or the network slice information of the first network slice. The wireless device IP address may be used for more than one PDU session and/or more than one network slice. The SMF device 3010 may determine a different wireless device IP address for the second PDU session and/or the second network slice.

The SMF device 3010 may send, to the wireless device 3002, via the S-AMF device 3008 and the S-(R)AN 3004, a message (e.g., a PDU session accept message 3022). The PDU session accept message 3022 may comprise the session/network slice correlation indication, the asymmetric service indication, the session information of the first PDU session, and/or the network slice information of the first network slice. The wireless device 3002, the S-(R)AN 3004, the AMF device 3008, the S-SMF device 3010, and/or the UPF device 3012 may perform one or more actions described with reference to corresponding elements in FIGS. 16-25.

The SMF device 3010 may send, to the S-AMF device 3008, a message (e.g., an Namf_Communication_N1N2MessageTransfer message). The message may comprise at least one of: the second PDU Session ID, an N2 SM information message, and/or a N1 SM container message. The N2 SM information message may comprise information elements used for the source base station (e.g., the S-(R)AN 3004). The N2 SM information may comprise at least one of: the session/network slice correlation indication, the asymmetric service indication, the first PDU session ID, and/or session information of the second PDU session. The session information of the second PDU session may comprise at least one of the following information elements for the second PDU session: the second PDU Session indicator/ID, QFI(s), QoS profile(s), CN tunnel information, the second S-NSSAI(s) and/or the NSI indicator(s)/ID(s) of the second S-NSSAI(s), a session AMBR, and/or a PDU session type. The N1 SM container message may comprise information elements used for the wireless device. The N1 SM container message may comprise a second PDU session establishment accept message, wherein the second PDU session establishment accept message may comprise at least one of the following information elements for the second PDU session: QoS rule(s) and QoS flow level QoS parameters (e.g., if needed) for the QoS flow(s) associated with the QoS rule(s), selected SSC mode, the second S-NSSAI(s), the DNN, the wireless device IP address, and/or a selected PDU session type.

The S-AMF device 3008 may send, to the S-(R)AN 3004, a message (e.g., an N2 PDU session request message), for example, based on receiving the Namf_Communication_N1N2MessageTransfer message from the SMF device 3010. The N2 PDU session request message may comprise the N2 SM information message and/or a NAS message. The NAS message may comprise the second PDU session indicator/ID and/or the N1 SM container message.

The S-(R)AN 3004 may perform one or more actions, for example, based on receiving the message from the S-AMF device 3008. The S-(R)AN 3004 may determine an RRC message (e.g., an RRCSetup message), for example, based on information received from the S-AMF device 3008. The S-(R)AN 3004 may determine an RRC message, for example, based on the session/network slice correlation indication, the asymmetric service indication, the session information of the first PDU session, and/or the session information of the second PDU session. The S-(R)AN 3004 may determine dedicated radio bearers (DRBs) based on the session/network slice correlation indication, the asymmetric service indication, the session information of the first PDU session, and/or the session information of the second PDU session. The S-(R)AN 3004 may determine a first DRB used for/applied to the first service (e.g., an eMBB service) of the application for the first PDU session (e.g., for uplink direction), and/or a second DRB used for/applied to the second service (e.g., a URLLC service) of the application for the second PDU session (e.g., for downlink direction). The S-(R)AN 3004 may correlate/associate the first PDU session with the second PDU session, the first network slice (instance) with the second network slice (instance), and/or the first DRB with the second DRB, for example, based on the session/network slice correlation indication, the asymmetric service indication, the session information of the first PDU session, and/or the session information of the second PDU session.

At step 3028, the S-(R)AN 3004 may determine to perform handover (e.g., using an N2 based handover procedure) the wireless device 3002 based on a measurement report (e.g., received from the wireless device 3002) and/or RRM information. The S-(R)AN 3004 may send to a target base station (e.g., a target (R)AN or T-(R)AN 3006) a message (e.g., a handover request message) to request a handover. The message (e.g., handover request message) may comprise at least one of: the session/network slice correlation indication; the asymmetric service indication; the session information of the first PDU session; the session information of the second PDU session; a target cell indicator/ID, RRM configuration information (e.g., wireless device inactivity time), current QoS flows to DRBs mapping rules applied to the UE, SIB1 from source base station, wireless device capabilities associated with different RATs, etc.

The handover request message may be sent, by the S-(R)AN 3004 to the T-(R)AN 3004, via the S-AMF device 3008 and a target AMF device (T-AMF device) 3030. The S-(R)AN 3004 may send, to the S-AMF device 3008, a handover required message 3032. The handover required message 3032 may comprise one or more information elements of the handover request message. The S-AMF device 3008 may send, to the T-AMF device 3030, a create wireless device context request message 3034. The create wireless device context request message 3034 may comprise one or more information elements of the handover required message 3032. The T-AMF device 3030 may send, to the SMF device 3010, a PDU session update message 3036, for example, based on receiving the create wireless device context request message 3034. The PDU session update message 3036 may comprise one or more information elements of the create wireless device context request message 3034. The SMF device 3010 and the UPF device 3012 may perform an N4 session establishment/modification procedure 3037, for example, based on (e.g., in response to) the PDU session update message 3036. The SMF device 3010 may send, to the T-AMF device 3030, a PDU session update response message 3038, for example, based on receiving the PDU session update message 3036. The PDU session update response message 3038 may comprise one or more information elements of the PDU session update message 3036 (e.g., the session/network slice correlation indication, the asymmetric service indication, the session information of the first PDU session, and/or the session information of the second PDU session). The T-AMF device 3030 may, send to the T-(R)AN 3006, a handover request message 3040, for example, based on receiving the PDU session update response message 3038. The handover request message 3040 may comprise one or more information elements of the PDU session update response message 3038.

The T-(R)AN 3006 may perform one or more actions, for example, based on receiving the handover request message 3040. At step 3042, the T-(R)AN 3006 may determine resources for the correlated PDU sessions (e.g., the first PDU session and the second PDU session), correlated network slices (e.g., the first S-NSSAI and the second S-NSSAI), and/or correlated DRBs (e.g., the first DRB and the second DRB), for example, based on the session/network slice correlation indication, the asymmetric service indication, the session information of the first PDU session, and/or the session information of the second PDU session. The T-(R)AN 3006 may determine if resources are available (e.g., at the T-(R)AN 3006) for both the first PDU session and the second PDU session; both the first S-NSSAI and the second S-NSSAI; and/or both the first DRB and the second DRB. The T-(R)AN 3006 may determine a third DRB and a fourth DRB, for example, based on the session/network slice correlation indication, the asymmetric service indication, the session information of the first PDU session, and/or the session information of the second PDU session. The T-(R)AN 3006 may map the first DRB to the third DRB and/or map the second DRB to the fourth DRB. The T-(R)AN 3006 may determine the third DRB used for the first service (e.g., an eMBB service) of the application (e.g., for the first PDU session, the first network slice, and/or the first S-NSSAI), and/or the fourth DRB used for the second service (e.g., a URLLC service) of the application (e.g., for the second PDU session, for the second network slice, and/or the second S-NSSAI). The T-(R)AN 3006 may correlate/associate the first PDU session with the second PDU session, the first network slice (instance) with the second network slice (instance), and/or the third DRB with the fourth DRB, for example, based on the session/network slice correlation indication, the asymmetric service indication, and/or the session information of the first PDU session and/or the session information of the second PDU session.

The T-(R)AN 3006 may send, to the S-(R)AN 3004, a message (e.g., a handover request acknowledgement message), for example, based on the determining resources for the correlated PDU sessions (e.g., the first PDU session and the second PDU session), the correlated network slices (e.g., the first S-NSSAI and the second S-NSSAI), and/or the correlated DRBs (e.g., the first DRB and the second DRB). The handover request acknowledgement message may indicate that the handover is successful, for example, if resources are available for the correlated PDU sessions, the correlated network slices, and/or the correlated DRBs. The handover request acknowledgement message may the handover is unsuccessful, for example, if resources are not available for the correlated PDU sessions, the correlated network slices, and/or the correlated DRBs.

The T-(R)AN 3006 may send, to the S-(R)AN 3008, the handover request acknowledgement message via the T-AMF device 3030, the SMF device 3010, and the S-AMF device 3008. The T-(R)AN 3006 may send, to the T-AMF device 3030, a handover request acknowledgement message 3044. The handover request acknowledgment message 3044 may comprise an indication that the handover is successful (unsuccessful), for example, if resources are available (not available) for the correlated PDU sessions, the correlated network slices, and/or the correlated DRBs. The T-AMF device 3030 may send, to the SMF device 3010, a PDU session update message 3046 comprising the indication, for example, based on receiving the handover request acknowledgement message 3044. The SMF device 3010 and the UPF device 3012 may perform an N4 session establishment/modification procedure 3047, for example, based on (e.g., in response to) the PDU session update message 3046. The SMF device 3010 may send, to the T-AMF device 3030, a PDU session update response message 3048 comprising the indication, for example, based on receiving the PDU session update message 3046. The T-AMF device 3030 may send, to the S-AMF device 3008, a create wireless device context response message 3050 comprising the indication. The S-AMF device 3008 may send, to the S-(R)AN 3004, a handover command message 3052 comprising the indication. The S-(R)AN 3004 may send, to the wireless device 3002, a handover command message 3054 comprising the indication.

The S-(R)AN 3004 and/or the T-(R)AN 3006 (and/or other elements shown in FIG. 30) may perform one or more other actions to complete the handover procedure, for example, if the handover request acknowledgement message 3044 indicates that the handover is successful. At step 3056, the wireless device 3002 and the S-(R)AN 3004 may synchronize to a new cell associated with the T-(R)AN 3006. The wireless device 3002 may send, to the S-(R)AN 3004, a handover confirm message 3058 indicating confirmation of the handover. The T-(R)AN 3006 may send a handover notify message 3060 to the T-AMF device 3030 based on receiving the handover confirm message 3058. The T-AMF device 3030 may send, to the SMF device 3010, a PDU session update message 3062 indicating confirmation of the handover. The SMF device 3010 and the UPF device 3012 may perform an N4 session establishment/modification procedure 3063, for example, based on (e.g., in response to) the PDU session update message 3062. The SMF device 3010 may send, to the T-AMF device 3030, a PDU session update response message 3064 based on receiving the PDU session update message 3062. The SMF device 3010 and the UPF device 3012 may exchange one or more N4 session establishment/modification messages at various stages in the handover procedure of FIG. 30. Wireless device registration and/or other procedures may be performed 3066 (e.g., including those described elsewhere herein), for example, after the above procedures.

Figure 31:
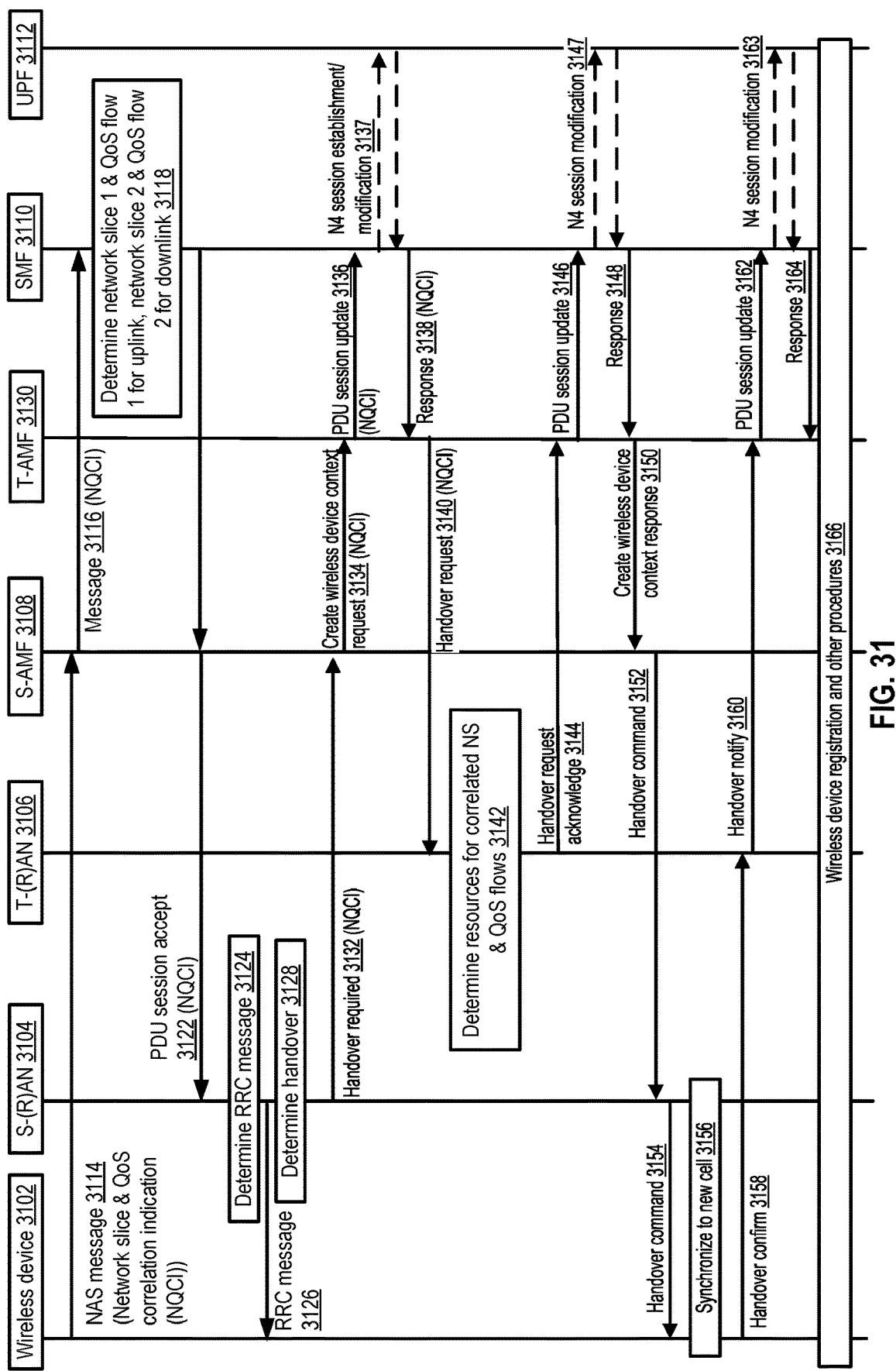
FIG. 31 shows example call flows for a handover procedure via a source AMF device, a target AMF device, and SMF device.

FIG. 31 shows example call flows for a handover procedure via an SMF device. A handover procedure of FIG. 31 may be used, for example, if there is no interface for direct communications between an S-(R)AN and a T-(R)AN. As described herein, an SMF device may be used to forward messages between the S-(R)AN and the T-(R)AN.

A wireless device 3102 may receive a service request from an application on the wireless device 3102. The service request may indicate an application type (e.g., a cloud gaming application, a UAV application) of the application sending the service request. The wireless device 3102 may determine one PDU session to support two (or more) network slices for the application, for example, based on (e.g., in response to) the service request and based on the URSP rule. A first network slice (e.g., associated with a URLLC service or any other service) may be applied/used for uplink traffic, and a second/reverse network slice (e.g., associated with an eMBB service or any other service) may be applied/used for downlink traffic.

The wireless device 3102 may send, to an S-AMF device 3108, a NAS message 3114. The NAS message 3114 may request a PDU session. The NAS message 3114 may comprise at least one of: a network slice correlation indication; an asymmetric service indication; a QoS flow correlation indication; a first requested QoS for a first direction (e.g., uplink direction); a second requested QoS for a second direction (e.g., downlink direction); a PDU session indicator/ID; first S-NSSAI(s) and/or NSI indicator(s)/ID(s) of the first S-NSSAI(s) for the first direction (e.g., uplink direction); second/reverse S-NSSAI(s) and/or NSI indicator(s)/ID(s) of the second S-NSSAI(s) for the second direction (e.g., downlink direction); a DNN; and/or an N1 SM container (e.g., comprising a PDU session establishment request). The asymmetric service indication may indicate different service types for uplink traffic and downlink traffic. The QoS flow correlation indication may indicate QoS for QoS flows corresponding to uplink traffic and downlink traffic. A first QoS flow may require an eMBB QoS for uplink traffic and a second QoS flow may require a URLLC QoS flow for downlink traffic. The QoS flow correlation indication may indicate that a first QoS flow is correlated/associated with a second QoS flow (e.g., the first QoS flow and the second QoS flow may support the same application). The first requested QoS may apply to the first QoS flow. The second requested QoS may apply to the second QoS flow. The first requested QoS and/or the second requested QoS may comprise at least one of: a QoS service type (e.g., an eMBB service, a URLLC service); a 5QI; a QCI; an ARP; an uplink GFBR; a downlink GFBR; an uplink MFBR; and/or a downlink MFBR.

The network slice correlation indication, the asymmetric service indication, and/or the QoS flow correlation indication may indicate that the first network slice (instance) is associated/correlated with the second network slice (instance) (e.g., the first network slice (instance) and the second network slice (instance) may support the same application). The network slice correlation indication, the asymmetric service indication, and/or the QoS flow correlation indication may indicate that the first S-NSSAI is associated/correlated with the second S-NSSAI. The network slice correlation indication, the asymmetric service indication, and/or the QoS flow correlation indication may indicate that a first service type (e.g., a URLLC service) is supported by the first network slice for the first direction (e.g., uplink direction), and a second service type (e.g., an eMBB service) is supported by the second network slice for the second direction (e.g., downlink direction).

The wireless device 3102 may initiate a wireless device requested PDU session establishment procedure by sending/transmitting a PDU session establishment request message within the N1 SM container of the NAS message 3114. The PDU session establishment request message may comprise at least one of: the network slice correlation indication; the asymmetric service indication; the QoS flow correlation indication; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the first packet filter for the first direction (e.g., packet filter for uplink direction); the second packet filter for the second direction (e.g., packet filter for downlink direction); a requested PDU session type; and/or a requested SSC mode, etc.

The S-AMF device 3108 may determine/select an SMF device (e.g., SMF device 3110) to support two network slices for the same PDU session, for example, based on (e.g., in response to) the NAS message received from the wireless device 3102 and/or based on the network slice correlation indication, the asymmetric service indication, and/or the QoS flow correlation indication. The S-AMF device 3108 may send, to the SMF device 3110, a message 3116 (e.g., a PDUSession_CreateSMContext request message). The message 3116 may comprise at least one of: the network slice correlation indication; the asymmetric service indication; the QoS flow correlation indication; the first requested QoS; the second requested QoS; the PDU session indicator/ID; the first S-NSSAI(s) and/or NSI indicator(s)/ID(s) of the first S-NSSAI(s) for the first direction; the second/reverse S-NSSAI(s) and/or NSI indicator(s)/ID(s) of the second S-NSSAI(s) for the second direction; the DNN; and/or an N1 SM container (e.g., comprising the PDU session establishment request message).

The SMF device 3110 may perform one or more actions, for example, based on receiving the message 3116. The SMF device 3110 may determine/allocate a wireless device IP address (e.g., a IPv4 address and/or a IPv6 network prefix) for the PDU session and/or the first network slice and the second network slice. The SMF device 3110 may determine a first QoS flow and/or a first network slice are used for/apply to a first direction, and/or a second QoS flow and/or a second network slice are used for/apply to a second direction, for example, based on information received from the S-AMF device (e.g., network slice correlation indication, the asymmetric service indication, and/or the QoS flow correlation indication). The SMF device 3110 may determine QoS flow 1 and/or a network slice indicated by the first S-NSSAI are used for/apply for uplink traffic and/or QoS flow 2 and/or a network slice indicated by the second S-NSSAI are used for/apply for downlink traffic. The SMF device 3110 may determine that the first QoS flow is correlated/associated with the second QoS flow (e.g., the first QoS flow and the second QoS flow may support the same application) and/or the first network slice is correlated/associated with the second network slice (e.g., the first network slice and the second network slice may support the same application), for example, based on the network slice correlation indication and/or the asymmetric service indication and/or the QoS flow correlation indication. The first QoS flow and/or the second QoS flow may comprise corresponding at least one of: a QoS service type (e.g., an eMBB service, a URLLC service, or any other service), a 5QI, a QCI, an ARP, an uplink GFBR, a downlink GFBR, an uplink MFBR, and/or a downlink MFBR. The SMF device 3110 may determine that a first QoS rule applies to the first QoS flow for the first direction (e.g., uplink direction) and/or a second QoS rule applies to the second QoS flow for the second direction (e.g., downlink direction), for example, based on the network slice correlation indication, the asymmetric service indication and/or the QoS flow correlation indication. The first QoS rule and/or the second QoS rule may comprise corresponding at least one of: a QoS rule indicator/identifier, a QFI of the associated/applied QoS flow (e.g., the first QoS flow), a QoS service type (e.g., an eMBB service, a URLLC service, or any other service), a 5QI, a QCI, an ARP, an uplink GFBR, a downlink GFBR; an uplink MFBR, and/or a downlink MFBR.

The SMF device 3110 may send, to the wireless device 3102, via the S-AMF device 3108 and the S-(R)AN 3104, a message (e.g., a PDU session accept message 3122). The PDU session accept message 3122 may comprise the network slice correlation indication, the asymmetric service indication, and/or the QoS flow correlation indication. The wireless device 3102, the S-(R)AN 3104, the AMF device 3108, the S-SMF device 3110, and/or the UPF device 3112 may perform one or more actions described with reference to corresponding elements in FIGS. 16-25.

The SMF device 3110 may send, to the S-AMF device 3108, a message (e.g., an Namf_Communication_N1N2MessageTransfer message). The message may comprise at least one of: the PDU Session indicator/ID, an N2 SM information message, and/or an N1 SM container message. The N2 SM information message may comprise information elements used for a source base station (e.g., an S-(R)AN 3104). The N2 SM information may comprise at least one of: the network slice correlation indication, the asymmetric service indication, the QoS flow correlation indication, and/or the session information of the PDU session. The session information of the PDU session may comprise at least one of the following information elements for the PDU session: the PDU session indicator/ID; the first S-NSSAI(s) and/or NSI indicator(s)/ID(s) of the first S-NSSAI(s) for the first direction; the second/reverse S-NS-SAI(s) and/or NSI indicator(s)/ID(s) of the second S-NSSAI(s) for the second direction; the DNN, QFI(s), QoS profile(s), CN tunnel information, session AMBR, and/or PDU session type. The QoS profile(s) may comprise the first QoS rule and/or the second QoS rule. The QoS profile(s) may comprise the first QoS flow and/or the second QoS flow.

The N1 SM container message may comprise information elements used for the wireless device. The N1 SM container message may comprise a PDU session establishment accept message, wherein the PDU session establishment accept message may comprise at least one of the following information elements for the second PDU session: QoS rule(s) and QoS flow level QoS parameters (e.g., if needed) for the QoS flow(s) (e.g., the first QoS flow and/or the second QoS flow) associated with the QoS rule(s) (e.g., the first QoS rule and/or the second QoS rule), selected SSC mode, the second S-NSSAI(s), the DNN, the wireless device IP address, and/or a selected PDU session type. The SMF device 3110 (and/or other elements in FIG. 31) may perform one or more actions described with reference to the SMF devices (and/or other elements) in FIGS. 16-25.

The S-AMF device 3108 may send, to the S-(R)AN 3104, a message (e.g., an N2 PDU session request message), for example, based on receiving the Namf_Communication_N1N2MessageTransfer message. The N2 PDU session request message may comprise the N2 SM information message and/or a NAS message. The NAS message may comprise the second PDU session indicator/ID and/or the N1 SM container message.

The S-(R)AN 3114 may perform one or more actions, for example, based on receiving the message from the S-AMF device 3108. The S-(R)AN 3106 may determine an RRC message (e.g., RRCSetup message) based on information received from the S-AMF device 3108. The S-(R)AN 3106 may determine an RRC message based on the network slice correlation indication, the asymmetric service indication, and/or the QoS flow correlation indication. The S-(R)AN may determine DRBs based on the information received from the S-AMF device 3108 (e.g., based on the network slice correlation indication, the asymmetric service indication, and/or the QoS flow correlation indication). The S-(R)AN 3104 may determine a first DRB used for/applied to the first QoS flow for the first service (e.g., an eMBB service or any other service) of the application for the first direction (e.g., uplink direction), and/or a second DRB used for/applied to the second QoS flow for the second service (e.g., a URLLC service or any other service) of the application for the second direction (e.g., downlink direction). The S-(R)AN 3104 may correlate/associate the first network slice (instance) with the second network slice (instance), the first QoS flow with the second QoS flow, the first DRB with the second DRB, for example, based on the network slice correlation indication, the asymmetric service indication, and/or the QoS flow correlation indication.

At step 3128, the S-(R)AN 3104 may determine to perform a handover (e.g., using an N2 based handover procedure) the wireless device 3102 based on a measurement report (e.g., received from the wireless device 3102) and/or radio resource management (RRM) information. The S-(R)AN 3104 may send to a target base station (e.g., a target (R)AN or T-(R)AN 3106) a message (e.g., a handover request message 3130) to request a handover. The handover request message may comprise at least one of: the network slice correlation indication; the asymmetric service indication; the session information of the PDU session; the QoS flow correlation indication; a target cell indicator/ID, RRM configuration information (e.g., wireless device inactivity time), current QoS flows to DRBs mapping rules applied to the UE, SIB1 from source base station, and/or wireless device capabilities associated with different RATs.

The handover request message may be sent, by the S-(R)AN 3104 to the T-(R)AN 3104, via the S-AMF device 3108 and a target AMF device (T-AMF device) 3130. The S-(R)AN 3104 may send, to the S-AMF device 3108, a handover required message 3132. The handover required message 3132 may comprise one or more information elements of the handover request message. The S-AMF device 3108 may send, to the T-AMF device 3130, a create wireless device context request message 3134. The create wireless device context request message 3134 may comprise one or more information elements of the handover required message 3132. The T-AMF device 3130 may send, to the SMF device 3110, a PDU session update message 3136, for example, based on receiving the create wireless device context request message 3134. The PDU session update message 3136 may comprise one or more information elements of the create wireless device context request message 3134. The SMF device 3110 and the UPF device 3112 may perform an N4 session establishment/modification procedure 3137, for example, based on (e.g., in response to) the PDU session update message 3136. The SMF device 3110 may send, to the T-AMF device 3130, a PDU session update response message 3138, for example, based on receiving the PDU session update message 3136. The PDU session update response message 3138 may comprise one or more information elements of the PDU session update message 3136 (e.g., the session/network slice correlation indication, the asymmetric service indication, the session information of the first PDU session, and/or the session information of the second PDU session). The T-AMF device 3130 may, send to the T-(R)AN 3106, a handover request message 3140, for example, based on receiving the PDU session update response message 3138. The handover request message 3140 may comprise one or more information elements of the PDU session update response message 3138.

The T-(R)AN 3106 may perform one or more actions, for example, based on receiving the handover request message 3130. The T-(R)AN 3106 may determine resources for the correlated network slices (e.g., the first S-NSSAI and the second S-NSSAI), the correlated QoS flows (e.g., the first QoS flow and the second QoS flow), and/or correlated DRBs (e.g., the first DRB and the second DRB), for example, based on the network slice correlation indication, the asymmetric service indication, and/or the QoS flow correlation indication. The T-(R)AN 3106 may determine if resources are available (e.g., at the T-(R)AN 3106) for both the first S-NSSAI and the second S-NSSAI; both the first QoS flow and the second QoS flow; and/or both the first DRB and the second DRB. At step 3132, the T-(R)AN 3106 may determine a third DRB and a fourth DRB, for example, based on the network slice correlation indication, the asymmetric service indication, and/or the QoS flow correlation indication. The T-(R)AN 3106 may map the first DRB to the third DRB and/or map the second DRB to the fourth DRB. The T-(R)AN 3106 may map the first QoS flow to the third DRB and/or map the second QoS flow to the fourth DRB. The T-(R)AN may determine the third DRB used for the first QoS flow for the first service (e.g., an eMBB service) of the application for the first network slice (e.g. the first S-NSSAI) for the first direction (e.g. uplink), and/or the fourth DRB used for the second QoS flow for the second service (e.g., a URLLC service) of the application for the second network slice (e.g. the second S-NSSAI) for the second direction (e.g. downlink). The T-(R)AN 3106 may correlate/associate the first QoS flow with the second QoS flow, the first network slice (instance) with the second network slice (instance), and/or the third DRB with the fourth DRB, for example, based on the network slice correlation indication, the asymmetric service indication, and/or the QoS flow correlation indication.

The T-(R)AN 3106 may send, to the S-(R)AN 3104, a message (e.g., a handover request acknowledgement message), for example, based on determining resources for the correlated QoS flows (e.g., the first QoS flow and the second QoS flow), correlated network slices (e.g., the first S-NSSAI and the second S-NSSAI), and/or correlated DRBs (e.g., the first DRB and the second DRB, and/or the third DRB and the fourth DRB). The handover request acknowledgement message may indicate that the handover is successful, for example, if resources are available for the correlated QoS flows, the correlated network slices, and/or the correlated DRBs. The handover request acknowledgement message may indicate that the handover is unsuccessful, for example, if resources are not available for the correlated QoS flows, the correlated network slices, and/or the correlated DRBs.

The T-(R)AN 3106 may send, to the S-(R)AN 3108, the handover request acknowledgement message via the T-AMF device 3130, the SMF device 3110, and the S-AMF device 3108. The T-(R)AN 3106 may send, to the T-AMF device 3130, a handover request acknowledgement message 3144. The handover request acknowledgment message 3144 may comprise an indication that the handover is successful (unsuccessful), for example, if resources are available (not available) for the correlated PDU sessions, the correlated network slices, and/or the correlated DRBs. The T-AMF device 3130 may send, to the SMF device 3110, a PDU session update message 3146 comprising the indication, for example, based on receiving the handover request acknowledgement message 3144. The SMF device 3110 and the UPF device 3112 may perform an N4 session establishment/modification procedure 3147, for example, based on (e.g., in response to) the PDU session update message 3146. The SMF device 3110 may send, to the T-AMF device 3130, a PDU session update response message 3148 comprising the indication, for example, based on receiving the PDU session update message 3146. The T-AMF device 3130 may send, to the S-AMF device 3108, a create wireless device context response message 3150 comprising the indication. The S-AMF device 3108 may send, to the S-(R)AN 3104, a handover command message 3152 comprising the indication. The S-(R)AN 3104 may send, to the wireless device 3102, a handover command message 3154 comprising the indication.

The S-(R)AN 3104 and/or the T-(R)AN 3106 (and/or other elements shown in FIG. 31) may perform one or more other actions to complete the handover procedure, for example, if the handover request acknowledgement message 3144 indicates that the handover is successful. At step 3156, the wireless device 3102 and the S-(R)AN 3104 may synchronize to a new cell associated with the T-(R)AN 3106. The wireless device 3102 may send, to the S-(R)AN 3104, a handover confirm message 3158 indicating confirmation of the handover. The T-(R)AN 3106 may send a handover notify message 3160 to the T-AMF device 3130 based on receiving the handover confirm message 3158. The T-AMF device 3130 may send, to the SMF device 3110, a PDU session update message 3162 indicating confirmation of the handover. The SMF device 3110 and the UPF device 3112 may perform an N4 session establishment/modification procedure 3163, for example, based on (e.g., in response to) the PDU session update message 3162. The SMF device 3110 may send, to the T-AMF device 3130, a PDU session update response message 3164 based on receiving the PDU session update message 3162. The SMF device 3110 and the UPF device 3112 may exchange one or more N4 session establishment/modification messages at various stages in the handover procedure of FIG. 31. Wireless device registration and/or other procedures may be performed 3166 (e.g., including those described elsewhere herein), for example, after the above procedures.

Figure 32:
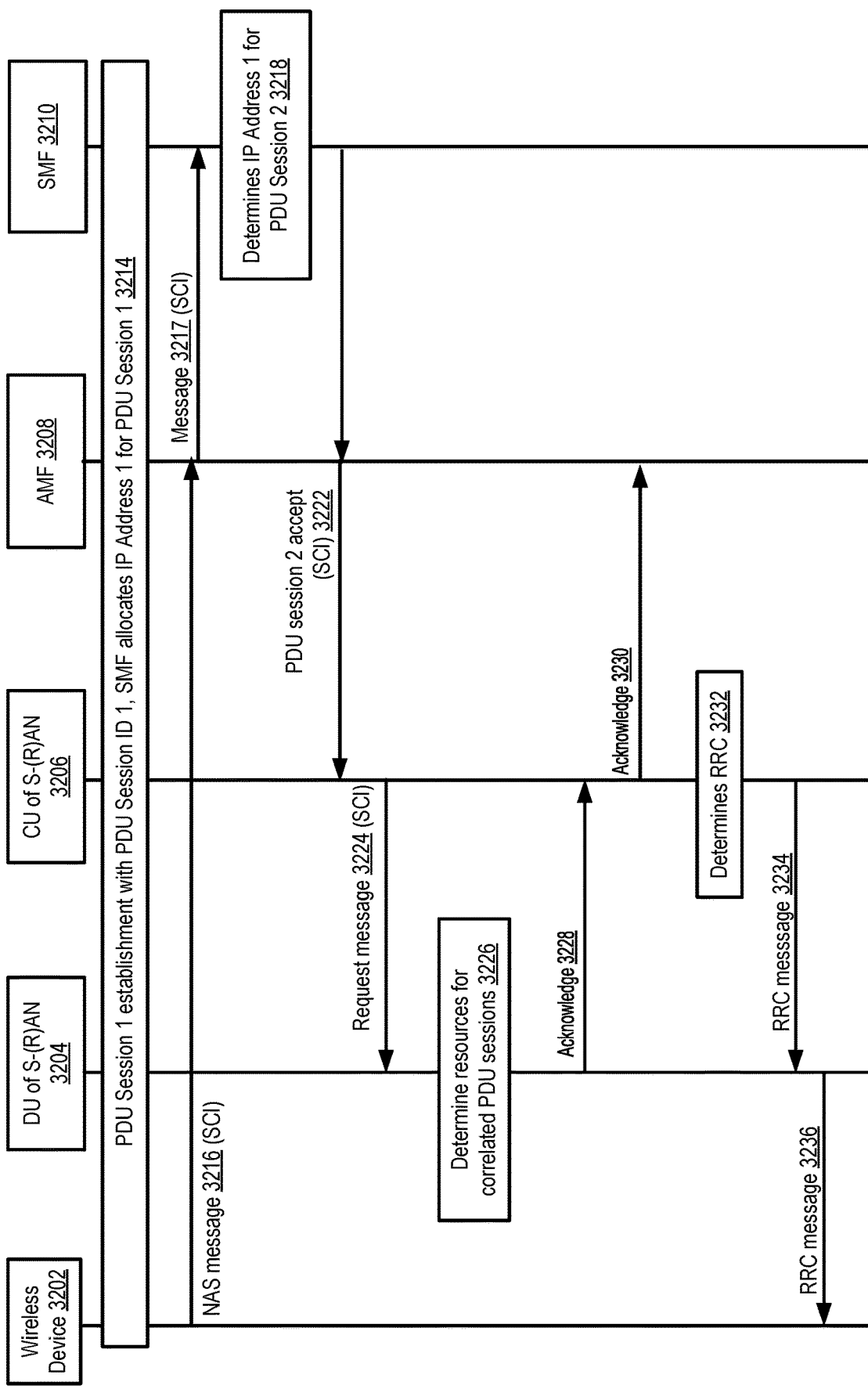
FIG. 32 shows example call flows for correlated PDU sessions.

FIG. 32 shows example call flows for correlated PDU sessions. Various operations described in FIG. 32 may be used to maintain correlated PDU sessions across a CU-DU split. A wireless device 3202, an S-(R)AN (e.g., a CU of the S-(R)AN 3206), an AMF device 3208, and an SMF device 3210 may perform one or more operations as described with reference to the wireless device 2602, the S-(R)AN 2604, the AMF device 2608, and the SMF device 2610. Messages 3216, 3217, and 3222 may be similar (or substantially similar) to messages 2616, 2617, and 2622 of FIG. 26.

The AMF device 3208 may send, to the S-(R)AN (e.g., the CU of the S-(R)AN 3206) the message (e.g., an N2 PDU session request message). The N2 PDU session request message may comprise the N2 SM information message and/or a NAS message. The NAS message may comprise the second PDU session ID and/or the N1 SM container message. The N2 SM information message and/or the NAS message may comprise the session/network slice correlation indication, the asymmetric service indication, the session information of the first PDU session, and/or the session information of the second PDU session.

The CU of the S-(R)AN 3206 may perform one or more actions, for example, based on receiving the message from the AMF device 3208. The CU of the S-(R)AN 3206 may send to a DU of the S-(R)AN 3204 a request message 3224 (e.g., a wireless device context setup request message). The request message 3224 may be for requesting resources at the DU of the S-(R)AN 3204. The request message 3224 may comprise one or more information elements of the N2 PDU session request message (e.g., the session/network slice correlation indication, the asymmetric service indication, the session information of the first PDU session, and/or the session information of the second PDU session). At step 3226, the DU of the S-(R)AN may determine resources for the correlated PDU sessions (e.g., the first PDU session and the second PDU session), the correlated network slices (e.g., the first S-NSSAI and the second S-NSSAI), and/or the correlated DRBs (e.g., the first DRB and the second DRB), for example, based on the information in the request message 3224. The DU of the S-(R)AN 3204 may determine if resources are available for both the first PDU session and the second PDU session, both the first S-NSSAI and the second S-NSSAI, and/or both the first DRB and the second DRB. The DU of the S-(R)AN 3204 may determine a third DRB and a fourth DRB, for example, based on the session/network slice correlation indication, the asymmetric service indication, the session information of the first PDU session, the session information of the second PDU session. The DU of the S-(R)AN 3204 may map the first DRB to the third DRB and/or map the second DRB to the fourth DRB. The DU of the S-(R)AN 3204 may determine the third DRB that is used for/applied to the first service (e.g., an eMBB service or any other service) of the application (e.g., for the first PDU session, the first direction, the first S-NSSAI, and/or the first network slice), and/or the fourth DRB that is used for/applied to the second service (e.g., a URLLC service or any other service) of the application (e.g., for the second PDU session, the second direction, the second S-NSSAI, and/or the second network slice). The DU of the S-(R)AN 3204 may correlate/associate the first PDU session with the second PDU session, the first network slice (instance) with the second network slice (instance), and/or the third DRB with the fourth DRB, for example, based on the session/network slice correlation indication, the asymmetric service indication, the session information of the first PDU session, and/or the session information of the second PDU session.

The DU of the S-(R)AN may send to the CU of the S-(R)AN an acknowledgement message 3228 (e.g., a wireless device context setup response message), for example, based on determining resources for the correlated PDU sessions, the correlated network slices, and/or the correlated DRBs. The wireless device context setup response message may comprise an indication that the request (e.g., resource request) is successful, for example, if resources are available for the correlated PDU sessions, the correlated network slices, and/or the correlated DRBs. The wireless device context setup response message may comprise an indication that the request (e.g., resource request) is unsuccessful, for example, if resources are not available for the correlated PDU sessions, the correlated network slices, and/or the correlated DRBs.

The CU of the S-(R)AN 3206 may send, to the AMF device 3208, an acknowledgment message 3230, for example, based on receiving the acknowledgement message 3228. The acknowledgment message 3230 may comprise the indication of whether the request (e.g., resource request) is successful or unsuccessful. At step 3232, the CU of the S-(R)AN 3206 may determine an RRC message 3234, for example, based on the indication. The CU of the S-(R)AN 3206 send the RRC message 3234, 3236, to the wireless device 3202, via the DU of the S-(R)AN 3204. The RRC message 3234, 3236 may comprise the indication of whether the request (e.g., resource request) is successful or unsuccessful.

Figure 33:
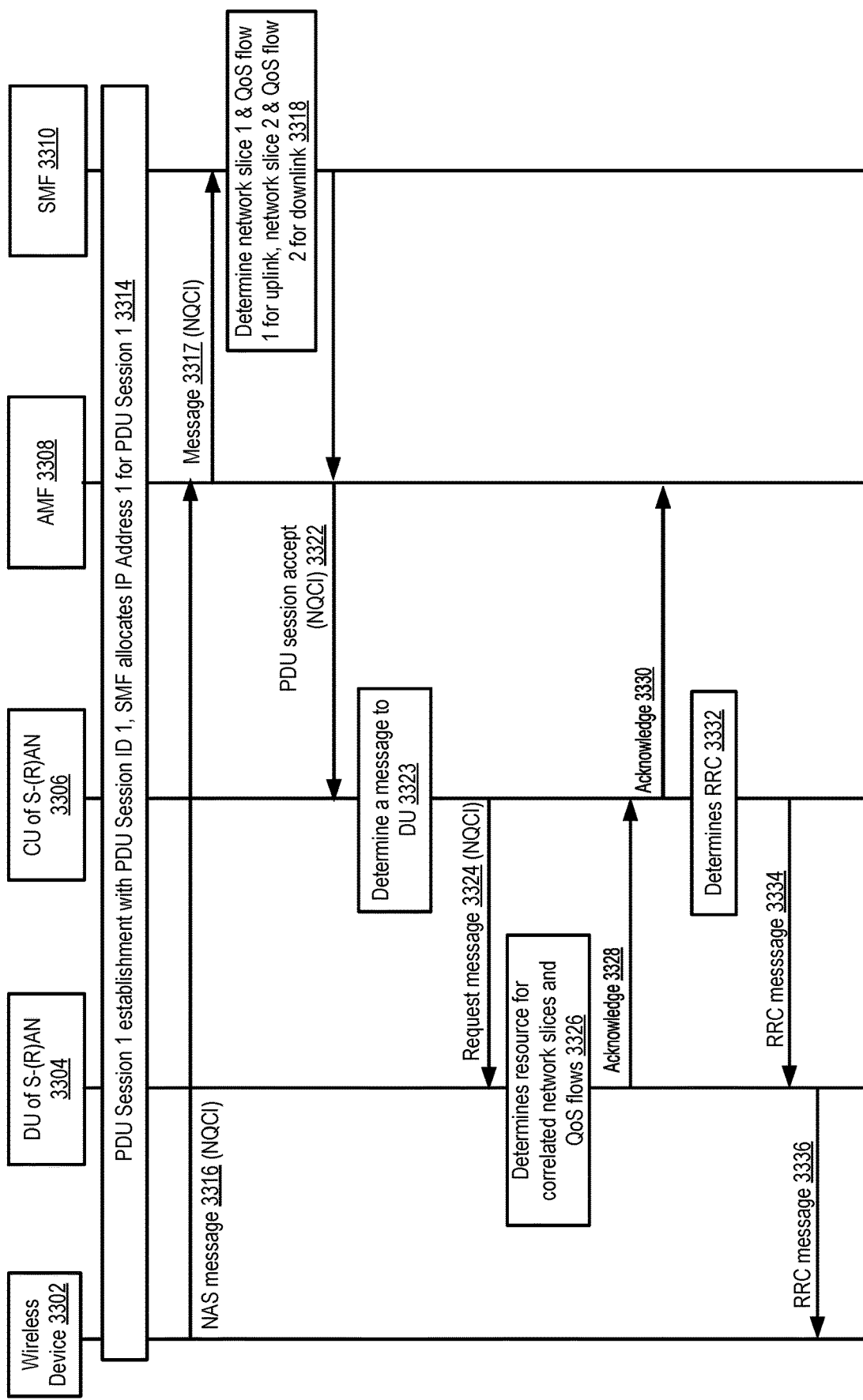
FIG. 33 shows example call flows for correlated QoS flows.

FIG. 33 shows example call flows for correlated QoS flows. Various operations described in FIG. 33 may be used to maintain correlated QoS flows across a CU-DU split. A wireless device 3302, an S-(R)AN (e.g., a CU of the S-(R)AN 3306), an AMF device 3308, and an SMF device 3310 may perform one or more operations as described with reference to the wireless device 2902, the S-(R)AN 2904, the AMF device 2908, and the SMF device 2910. Messages 3316, 3317, and 3322 may be similar (or substantially similar) to messages 2916, 2917, and 2922 of FIG. 29.

The AMF device 3308 may send to the S-(R)AN (e.g., the CU of the S-(R)AN 3306) a message (e.g., N2 PDU session request message). The N2 PDU session request message may comprise the N2 SM information message and/or a NAS message. The NAS message may comprise the PDU session indicator/ID and/or the N1 SM container message. The N2 PDU session request message may comprise the network slice correlation indication, the asymmetric service indication, and/or the QoS flow correlation indication.

At step 3323, the CU of the S-(R)AN 3306 may determine a request message 3324 (e.g., wireless device context setup request message) for a DU of the S-(R)AN 3304. The CU of the S-(R)AN 3306 may send, to a DU of the S-(R)AN 3304, the request message 3324, for example, based on receiving the message from the AMF device 3308. The request message 3324 may be for requesting resources at the DU of the S-(R)AN 3304. The request message 3324 may comprise one or more information elements of the N2 PDU session request message (e.g., the network slice correlation indication, the asymmetric service indication, and/or the QoS flow correlation indication). The DU of the S-(R)AN 3304 may perform one or more actions, for example, based on receiving the request message 3324. The DU of the S-(R)AN 3304 may determine resources for the correlated network slices (e.g., the first S-NSSAI and the second S-NSSAI), the correlated QoS flows (e.g., the first QoS flow and the second QoS flow), and/or the correlated DRBs (e.g., the first DRB and the second DRB), for example, based on the network slice correlation indication, the asymmetric service indication, and/or the QoS flow correlation indication. The DU of the S-(R)AN 3304 may determine if resources are available for both the first S-NSSAI and the second S-NSSAI, both the first QoS flow and the second QoS flow, and/or both the first DRB and the second DRB. The DU of the S-(R)AN 3304 may determine a third DRB and a fourth DRB, for example, based on the network slice correlation indication, the asymmetric service indication and/or the QoS flow correlation indication. The DU of the S-(R)AN 3304 may map the first DRB to the third DRB and/or map the second DRB to the fourth DRB. The DU of the S-(R)AN 3304 may map the first QoS flow to the third DRB and/or map the second QoS flow to the fourth DRB. The DU of the S-(R)AN 3304 may determine the third DRB is used for/applied to the QoS flow for the first service (e.g., an eMBB service or any other service) of the application (e.g., for the first network slice, the first S-NSSAI, and/or the first direction), and/or fourth DRB is used for/applied to the second QoS flow for the second service (e.g., an URLLC service or any other service) of the application (e.g., for the second network slice, the second S-NSSAI, and/or the second direction). The DU of the S-(R)AN 3304 may correlate the first QoS flow with the second QoS flow, the first network slice (instance) with the second network slice (instance), and/or the third DRB with the fourth DRB, for example, based on the network slice correlation indication, the asymmetric service indication, and/or QoS flow correlation indication.

The DU of the S-(R)AN 3304 may send, to the CU of the S-(R)AN 3306, an acknowledgment message 3328 (e.g., a wireless device context setup response), for example, based on determining resources for the correlated QoS flows (e.g., the first QoS flow and the second QoS flow), the correlated network slices (e.g., the first S-NSSAI and the second S-NSSAI) and/or the correlated DRBs (e.g., the first DRB and the second DRB, the third DRB and the fourth DRB). The wireless device context setup response message may comprise an indication that the request (e.g., the resource request) is successful, for example, if resources are available for the correlated QoS flows, the correlated network slices, and/or the and/or correlated DRBs. The wireless device context setup response message may comprise an indication that the request (e.g., the resource request) is unsuccessful, for example, if resources are not available for the correlated QoS flows, the correlated network slices, and/or the correlated DRBs.

The CU of the S-(R)AN 3306 may send, to the AMF device 3308, an acknowledgment message 3330, for example, based on receiving the acknowledgment message 3328. The acknowledgment message 3330 may comprise indication of whether the request (e.g., resource request) is successful or unsuccessful. The CU of the S-(R)AN 3306 may determine an RRC message 3334, for example, based on the indication. The CU of the S-(R)AN 3306 may send to the RRC message 3334, 3336, to the wireless device 3303, via the DU of the S-(R)AN 3304. The RRC message 3334, 3336 may comprise the indication of whether the request (e.g., resource request) is success or unsuccessful.

Figure 34:
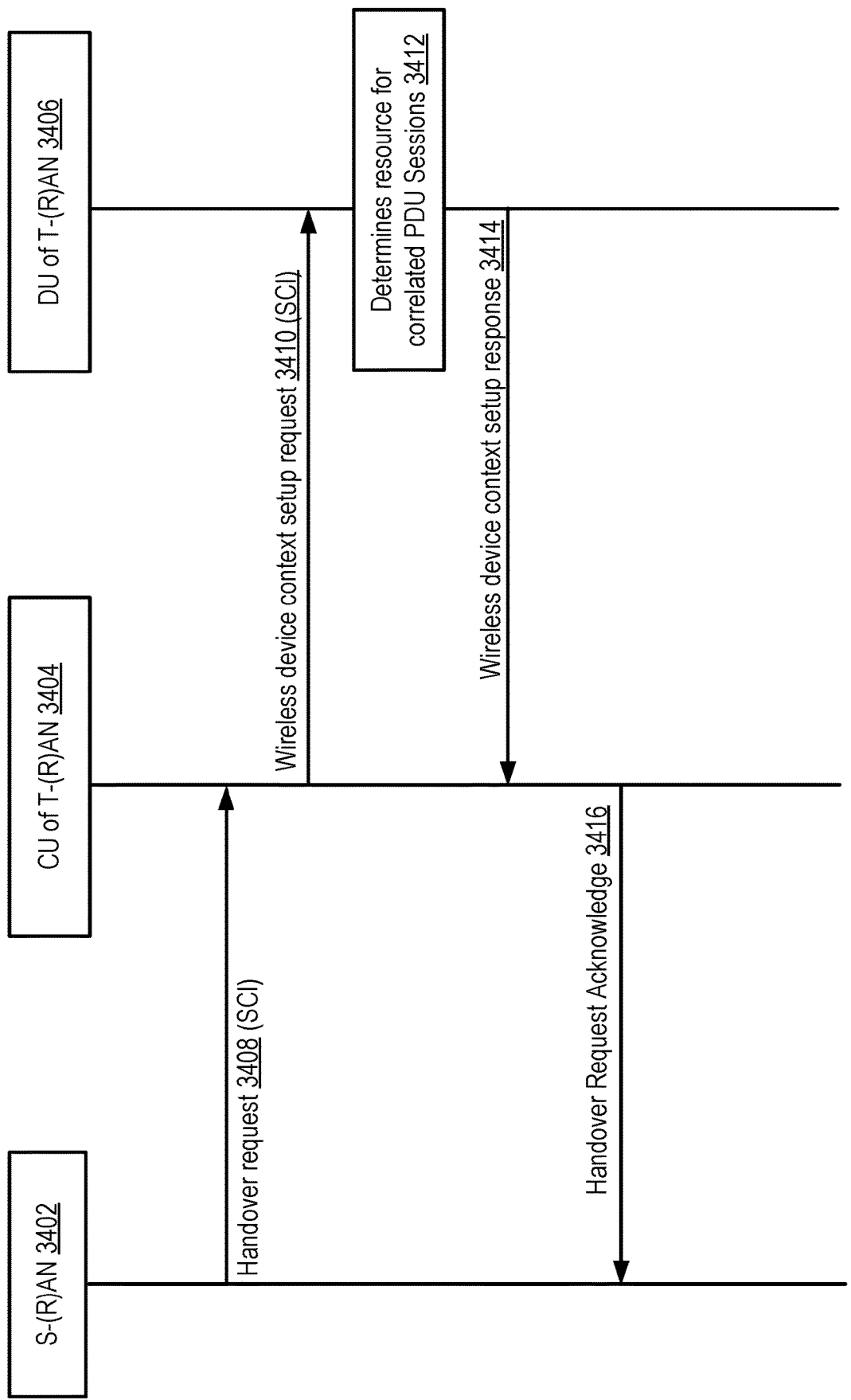
FIG. 34 shows example call flows for correlated PDU sessions in a handover procedure.

FIG. 34 shows example call flows for correlated PDU sessions in a handover procedure. A T-(R)AN (e.g., a CU of the T-(R)AN 3404) may perform one or more operations of FIG. 34, for example, at step 3042 of FIG. 30. The T-(R)AN (e.g., the CU of the T-(R)AN 3404) may receive from, an S-(R)AN 3402, a message (e.g., a handover request message 3408) via an S-AMF device (e.g., the S-AMF device 3008, a T-AMF device (e.g., the T-AMF device 3030), and/or an (e.g., the SMF device 3010). The handover request message 3408 may comprise at least one of: the session/network slice correlation indication, the asymmetric service indication, the session information of the first PDU session, the session information of the second PDU session, a target cell indicator/ID, RRM configuration including wireless device inactive time, current QoS flows to DRBs mapping rules applied to the wireless device, SIB1 from source base station, and/or the wireless capabilities for different RATs.

The CU of the T-(R)AN 3404 may perform one or more actions, for example, based on receiving the handover request message 3408. The CU of the T-(R)AN 3404 may send, to a DU of the T-(R)AN 3406, a message (e.g., a wireless device context setup request message 3410). The wireless device context setup request message may comprise one or more information elements of the handover request message 3408 (e.g., the session/network slice correlation indication, the asymmetric service indication, the session information of the first PDU session, and/or the session information of the second PDU session). At step 3412, the DU of the T-(R)AN 3406 may determine resources for the correlated PDU sessions (e.g., the first PDU session and the second PDU session), the correlated network slices (e.g., the first S-NSSAI and the second S-NSSAI) and/or the correlated DRBs (e.g., the first DRB and the second DRB), for example, based on the on the information of the wireless device context setup request message 3410 (e.g., the session/network slice correlation indication, the asymmetric service indication, the session information of the first PDU session, the session information of the second PDU session). The DU of the T-(R)AN 3406 may determine if resources are available for both the first PDU session and the second PDU session, both the first S-NSSAI and the second S-NSSAI, and/or both the first DRB and the second DRB. The DU of the T-(R)AN 3406 may determine a third DRB and a fourth DRB, for example, based on the session/network slice correlation indication, the asymmetric service indication, the session information of the first PDU session, and/or the session information of the second PDU session. The DU of the T-(R)AN 3406 may map the first DRB to the third DRB and/or map the second DRB to the fourth DRB. The DU of the T-(R)AN 3406 may determine that the third DRB is used for/applied to the first service (e.g., an eMBB service or any other service) of the application (e.g., for the first PDU session, the first network slice, the first S-NSSAI, and/or the first direction), and/or that the fourth DRB is used for/applied to the second service (e.g., a URLLC service or any other service) of the application (e.g., for the second PDU session, the second network slice, the second S-NSSAI, and/or the second direction). The DU of the T-(R)AN 3406 may correlate/associate the first PDU session with the second PDU session, the first network slice (instance) with the second network slice (instance), and/or correlate/associate the third DRB with the fourth DRB, for example, based on the session/network slice correlation indication, the asymmetric service indication, the session information of the first PDU session, the session information of the second PDU session.

The DU of the T-(R)AN 3406 may send, to the CU of the T-(R)AN 3404 a message (e.g., a wireless device context setup response message 3414), for example, based on determining resources for the correlated PDU sessions (e.g., the first PDU session and the second PDU session), the correlated network slices (e.g., the first S-NSSAI and the second S-NSSAI), and/or the correlated DRBs (e.g., the first DRB and the second DRB). The wireless device context setup response message 3414 may comprise an indication that the request (e.g., resource request) is successful, for example, if resources are available for the correlated PDU sessions, the correlated network slices, and/or the correlated DRBs. The wireless device context setup response message 3414 may comprise an indication that the request (e.g., resource request) is unsuccessful, for example, if resources are not available for the correlated PDU sessions, the correlated network slices, and/or the correlated DRBs. The CU of the T-(R)AN 3404 may send, to the S-(R)AN 3402, a message (e.g., a handover request acknowledgement message 3416), for example, based on receiving the wireless device context setup response message 3414. The handover request acknowledgement message 3416 may comprise the indication of whether the request (e.g., resource request) is successful or unsuccessful. The S-(R)AN 3402 may determine an RRC message and send the RRC message to a wireless device, for example, based on the indication. The RRC message may comprise the indication of whether the request (e.g., resource request) is successful or unsuccessful. The CU of the T-(R)AN 3404 may send, to the S-(R)AN 3402, the handover request acknowledgement message 3416 via the T-AMF device, the SMF device, and/or the S-AMF device.

Figure 35:
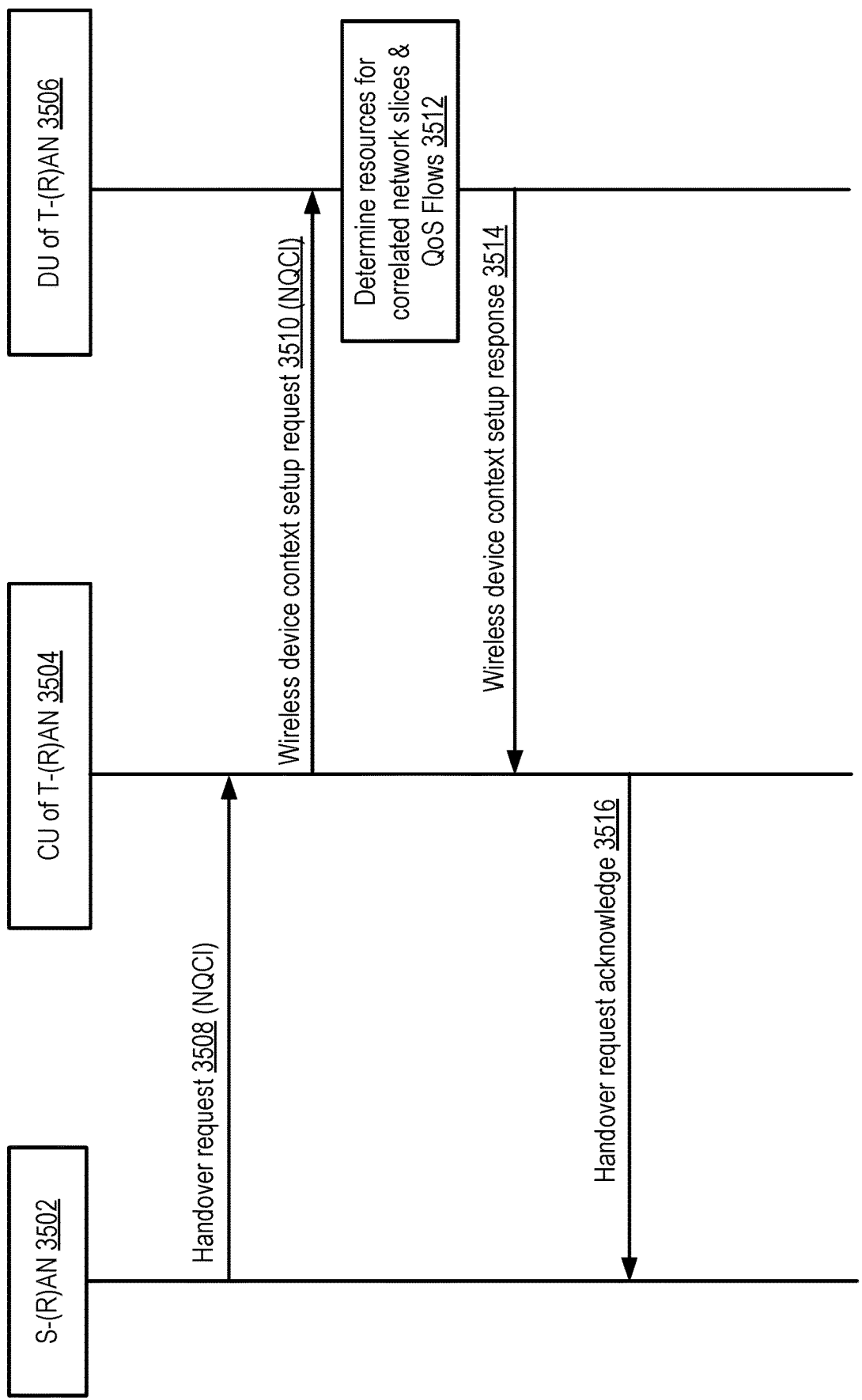
FIG. 35 shows example call flows for correlated QoS flows in a handover procedure.

FIG. 35 shows example call flows for correlated QoS flows in a handover procedure. A T-(R)AN (e.g., a CU of the T-(R)AN 3504) may perform one or more operations of FIG. 35, for example, at step 3142 of FIG. 31. The T-(R)AN (e.g., the CU of the T-(R)AN 3504) may receive from, an S-(R) AN 3502 a message (e.g., a handover request message 3508) via an S-AMF device (e.g., the S-AMF device 3108), a T-AMF device (e.g., the T-AMF device 3130), and/or an SMF device (e.g., the SMF device 3110). The handover request message 3508 may comprise at least one of: the network slice correlation indication, the asymmetric service indication, the QoS flow correlation indication, session information of the PDU session, a target cell indicator/ID, RRM configuration including wireless device inactive time, current QoS flows to DRBs, mapping rules applied to the wireless device, SIB1 from source base station, and/or wireless device capabilities for different RATs.

The CU of the T-(R)AN 3504 may send, to a DU of the T-(R)AN 3506, a message (e.g., a wireless device context setup request message 3510), for example, based on receiving the handover request 3508. The wireless device context setup request message may comprise one or more information elements of the handover request message 3508 (e.g., the network slice correlation indication, the asymmetric service indication, and/or the QoS flow correlation indication). The DU of the T-(R)AN 3506 may perform one or more actions, for example, based on receiving the message from the CU of the T-(R)AN 3504. At step 3512, the DU of the T-(R)AN 3506 may determine resources for the correlated network slices (e.g., the first S-NSSAI and the second S-NSSAI), the correlated QoS flows (e.g., the first QoS flow and the second QoS flow), and/or the correlated DRBs (e.g., the first DRB and the second DRB), for example, based on the network slice correlation indication, the asymmetric service indication, and/or the QoS flow correlation indication. The DU of the T-(R)AN 3506 may determine if resources are available for both the first S-NSSAI and the second S-NSSAI, both the first QoS flow and the second QoS flow, and/or both the first DRB and the second DRB. The DU of the T-(R)AN 3506 may determine a third DRB and a fourth DRB, for example, based on the network slice correlation indication, the asymmetric service indication, and/or the QoS flow correlation indication. The DU of the T-(R)AN 3506 may map the first DRB to the third DRB and/or map the second DRB to the fourth DRB. The DU of the T-(R)AN 3506 may map the first QoS flow to the third DRB and/or map the second QoS flow to the fourth DRB. The DU of the T-(R)AN 3506 may determine that the third DRB is used for/applied to the QoS flow for the first service (e.g., an eMBB service or any other service) of the application (e.g., for the first network slice, the first S-NSSAI, and/or the first direction), and/or the fourth DRB is used for/applied to the second QoS flow for the second service (e.g., a URLLC service or any other service) of the application (e.g., for the second network slice, the second S-NSSAI, and/or the second direction). The DU of the T-(R)AN 3506 may correlate the first QoS flow with the second QoS flow, the first network slice (instance) with the second network slice (instance), and/or the third DRB with the fourth DRB, for example, based on the network slice correlation indication, the asymmetric service indication, and/or the QoS flow correlation indication.

The DU of the T-(R)AN 3506 may send, to the CU of the T-(R)AN 3504, a message (e.g., a wireless device context setup response message 3514), for example, based on determining resources for the correlated QoS flows (e.g., the first QoS flow and the second QoS flow), the correlated network slices (e.g., the first S-NSSAI and the second S-NSSAI) and/or the correlated DRBs (e.g., the first DRB and the second DRB; and/or the third DRB and the fourth DRB). The wireless device context setup response message 3514 may comprise an indication that the request (e.g., resource request) is successful, for example, if resources are available for the correlated QoS flows, the correlated network slices, and/or the correlated DRBs. The wireless device context setup response message 3514 may comprise an indication that the request (e.g., resource request) is unsuccessful, for example, if resources are not available for the correlated QoS flows, the correlated network slices, and/or the correlated DRBs.

The CU of the T-(R)AN 3504 may send, to the S-(R)AN 3502, a message (e.g., a handover request acknowledgement message 3516), for example, based on receiving the message from the DU of the T-(R)AN 3506. The handover request acknowledgement message 3516 may comprise the indication of whether the request (e.g., resource request) is successful or unsuccessful. The S-(R)AN 3502 may determine an RRC message and send to the RRC message to the wireless device, for example, based on the indication. The RRC message may comprise the indication of whether the request (e.g., resource request) is successful or unsuccessful. The CU of the T-(R)AN 3504 may send, to the S-(R)AN 3502, the handover request acknowledgement message 3516, via the T-AMF device, the SMF device, and/or the S-AMF device.

A target base station (T-BS) may receive, from a source base station (S-BS), a handover request message. The handover request message may comprise a session correlation indication (SCI) for a first PDU session and a second PDU session. The T-BS may determine, based on the SCI, whether resources are available for both the first PDU session and the second PDU session. The T-BS may send, to the S-BS a handover request acknowledgement message based on the determining. The handover request acknowledgement message may comprise an indication (e.g., a cause value) indicating that the resources are not available. The cause value may indicate the result of the handover procedure. The handover request message may further comprise a network slice correlation indication. The handover request message may further comprise an asymmetric service indication. The S-BS may determine, based on a measurement report received from a wireless device, to perform a handover to the T-BS. The S-BS may receive from, an AMF device, a PDU session accept message comprising the SCI. The S-BS may determine, based on the SCI, an RRC message. The S-BS may send, to the wireless device, the RRC message. The AMF device may receive, from an SMF device, the PDU session accept message comprising the SCI. The S-BS may determine, based on the SCI, a first DRB applied to a first service of an application (e.g., for the first PDU session and/or for a first direction), and a second DRB applied to a second service of the application (e.g., for the second PDU session and/or for the second direction). The SCI may indicate that the first PDU session and the second PDU session support the same application. The SCI may indicate that a first network slice and a second network slice support the same application. The SCI may indicate that a first network slice instance and a second network slice instance support the same application. The SCI may indicate that a first DRB and a second DRB support the same application. The T-BS may determine, based on the SCI, if resources are available for both the first network slice and the second network slice. The T-BS may determine, based on the SCI, if resources are available for both the first DRB and a second DRB.

An S-BS may receive, from an AMF device, a first message comprising a SCI for a first PDU session and a second PDU session. The S-BS may send, to a T-BS, a handover request message comprising the SCI. The S-BS may receive, from the T-BS, a handover request acknowledgement message based on the SCI. The S-BS may determine an RRC) message based on the SCI. The S-BS may send, to the wireless device, the RRC message. The S-BS may determine a handover to a T-BS.

A T-BS may receive, from an S-BS, a handover request message comprising a network slice & quality of service (QoS) correlation indication (NQCI) for a first QoS flow and a second QoS flow. The T-BS may determine, based on the NQCI, if resources are available for both the first QoS flow and the second QoS flow. The T-BS may send, to the S-BS, a handover request acknowledgement message based on the determining. The determining may determine whether the resources are available or not available. The handover request acknowledgement message may comprise a cause value indicating whether the resources are available or not available. The NQCI may indicate that the first QoS flow and the second QoS flow support a same application. The handover request message may further comprise a network slice correlation indication. The handover request message may further comprise an asymmetric service indication.

A T-BS may receive, from an S-BS, a handover request message comprising a SCI for a first PDU session and a second PDU session. The T-BS may determine, based on the SCI, if resources are available for both the first PDU session and the second PDU session. The T-BS may send, to the S-BS, a handover request acknowledgement message based on the determining. The handover request message may be sent from the S-BS to the T-BS via an S-AMF device and a T-AMF device. The handover request acknowledgement message may be sent from the T-BS to the S-BS via the T-AMF device and the S-AMF device. The determining may determines whether the resources are available or not available. The handover request acknowledgement message may comprise a cause value indicating whether the resources are available or not available. The SCI may indicate that the first PDU session and the second PDU session support a same application. The handover request message may further comprise a network slice correlation indication. The handover request message may further comprise an asymmetric service indication.

A T-BS may receive, from an S-BS, a handover request message comprising an NQCI for a first QoS flow and a second QoS flow. The T-BS may determine, based on the NQCI, whether resources are available for both the first QoS flow and the second QoS flow. The T-BS may send to the S-BS a handover request acknowledgement message based on the determining. The handover request message may be transferred from the S-BS to the T-BS via a source access and mobility management function (AMF device) and a target AMF device. The handover request acknowledgement message may be transferred from the T-BS to the S-BS via the target AMF device and the source AMF device. The determining may determine whether the resources are available or not available. The handover request acknowledgement message may comprise a cause value indicating whether the resources are available or not available. The NQCI may indicate that the first QoS flow and the second QoS flow support a same application. The handover request message may further comprise a network slice correlation indication. The handover request message may further comprise an asymmetric service indication.

A CU of a base station may receive from an AMF device, a first message comprising a SCI for a first PDU session and the second PDU session of a wireless device. The CU may send, to a DU of the base station, a request message comprising the SCI. The CU may receive from the DU, a request acknowledgement message based on the SCI. The CU may determine an RRC message based on the request acknowledgement message. The CU may send, to the wireless device via the DU, the RRC message. The DU may determine resources for the first PDU session and the second PDU session based on the SCI, wherein the SCI may indicate that the first PDU session and the second PDU session support a same application. The first message may further comprise a network slice correlation indication. The first message may further comprise an asymmetric service indication.

A CU of a base station may receive from, an AMF device, a first message comprising an NQCI for a first QoS flow and a second QoS flow of a wireless device. The CU may send to a DU of the base station, a request message comprising the NQCI. The CU may receive from the DU, a request acknowledgement message based on the NQCI. The CU may determine an RRC message based on the request acknowledgement message. The CU may send, to the wireless device via the DU, the RRC message. The DU may determine resources for the first QoS flow and the second QoS flow based on the NQCI. The NQCI may indicate that the first QoS flow and the second QoS flow support a same application. The first message may further comprise an asymmetric service indication.

A DU of a T-BS may receive, from a CU of the T-BS, a wireless device context setup request message comprising a SCI for a first PDU session and a second PDU session. The DU may determine, based on the SCI, whether resources are available for both the first PDU session and the second PDU session. The DU may send, to the CU, a wireless device context setup response message based on the determining.

A DU of a T-BS may receive, from a CU of the T-BS, a wireless device context setup request message comprising an NQCI for a first QoS flow and a second QoS flow. The DU may determine, based on the NQCI, whether resources are available for both the first QoS flow and the second QoS flow. The DU may send to the CU, a wireless device context setup response message based on the determining.

A wireless device may perform a method comprising multiple operations. The wireless device may determine a service request indicating: a first slice service type (SST) for uplink traffic of the application; and a second SST for downlink traffic of the application. The wireless device may send, to a base station, a first establishment request message for a first packet data unit (PDU) session associated with the first SST. The wireless device may receive, from the base station, a first response message indicating, for the first PDU session, an internet protocol (IP) address. The wireless device may send, to the base station, a second establishment request message for a second PDU session associated with the second SST, wherein the second establishment request message indicates that the second PDU session is associated with the first PDU session. The wireless device may receive, from the base station, a second response message indicating, for the second PDU session, the IP address.

The wireless device may also perform one or more additional operations. The wireless device may send, to the base station via the first PDU session, a first user data packet comprising the IP address. The wireless device may receive, from the base station via the second PDU session, a second user data packet comprising the IP address. The second establishment request message may comprise a session correlation indication indicating that the second PDU session is associated with the first PDU session. The second establishment request message may indicate that a first network slice for the first PDU session is associated with a second network slice for the second PDU session. The first PDU session may be for the uplink traffic and the second PDU session may be for the downlink traffic. The second establishment request message may indicate that the first PDU session is associated with a first service type and the second PDU session is associated with a second service type different from the first service type. The second establishment request message may comprise at least one of: a PDU session identifier of the first PDU session; the IP address; first single network slice selection assistance information (S-NSSAI) of the first PDU session; or a first network slice instance identifier for the first S-NSSAI. The wireless device may send the first establishment request message and the second establishment request message to an access and mobility management functions (AMF) device via the base station. The wireless device may receive the second response message from the AMF via the base station. The second establishment request message may further indicate that the second SST is associated with the first SST. A first user plane rule associated with the first PDU session may be associated with the IP address. A second user plane rule associated with the second PDU session may be associated with the IP address. The first user plane rule and the second use plane rule may be associated with a same user plane function (UPF) device. The first user plane rule may comprise at least one of: a first packet detection rule; a first forwarding action rule; a first QoS enforcement rule; a first usage reporting rule; or a first packet filter. The second user plane rule may comprise at least one of: a second packet detection rule; a second forwarding action rule; a second QoS enforcement rule; a second usage reporting rule; or a second packet filter. The wireless device may receive, from the base station, a handover command indicating that the first PDU session and the second PDU session are jointly accepted for a handover to a second base station.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the second response message. A computer-readable medium may store instructions that, when executed, cause performance of the described method, additional operations and/or include the additional elements.

A session management function (SMF) device may perform a method comprising multiple operations. The SMF device may receive, from an access and mobility management function (AMF) device, a first establishment request message for a first packet data unit (PDU) session, associated with a first slice service type (SST), for uplink traffic of an application. The SMF device may determine, for the first PDU session, an internet protocol (IP) address. The SMF device may receive, from the AMF device, a second establishment request message for a second PDU session, associated with a second SST, wherein the second establishment request message indicates that the second PDU session is for downlink traffic of the application. The SMF device may determine, based on the first PDU session and the second PDU session being for a same application, that the IP address is used for the second PDU session. The SMF device may send, to the AMF device and for the second PDU session, the IP address.

The SMF device may also perform one or more additional operations. The SMF device may send, to a first user plane function (UPF) device for the first PDU session, a first user plane rule comprising the IP address. The SMF device may send, to a second UPF device for the second PDU session, a second user plane rule comprising the IP address. The second establishment request message may comprise at least one of: a PDU session identifier of the first PDU session; the IP address; first single network slice selection assistance information (S-NSSAI) of the first PDU session; or a first network slice instance identifier for the first S-NSSAI. The second establishment request message may indicate that a first network slice for the uplink traffic is associated with a second network slice for the downlink traffic. The second establishment request message may indicate that the first PDU session is associated with a first service type and the second PDU session is associated with a second service type different from the first service type. The second establishment request message may indicate that the first PDU session is associated with the second PDU session.

Systems, devices and media may be configured with the method. An SMF device may comprise one or more processors; and memory storing instructions that, when executed, cause the SMF device to perform the described method, additional operations and/or include the additional elements. A system may comprise an SMF device configured to perform the described method, additional operations and/or include the additional elements; and an AMF device configured to send the first establishment request message. A computer-readable medium may store instructions that, when executed, cause performance of the described method, additional operations and/or include the additional elements.

A policy control function (PCF) device may perform a method comprising multiple operations. The PCF device may receive, from a session management function (SMF) device, a message comprising: first session information of a first packet data unit (PDU) session; second session information of a second PDU session, wherein the second session information indicates the second PDU session is associated with the first PDU session; and an internet protocol (IP) address for the first PDU session and the second PDU session. The PCF device may map the IP address to the first PDU session and the second PDU session. The PCF device may determine, based on the first session information, a first policy and charging control (PCC) rule for the first PDU session. The PCF device may determine, based on the second session information, a second PCC rule for the second PDU session. The PCF device may send, to the SMF device, a response message comprising the first PCC rule and the second PCC rule.

The PCF device may also perform one or more additional operations. The PCF device may receive, from an access and mobility management function (AMF) device, a second message comprising an identifier of a wireless device. The PCF device may determine, a rule comprising an uplink slice service type (SST) and a downlink SST. The PCF device may send, to the wireless device, the rule. The first session information may be based on the uplink SST and the second session information is based on the downlink SST. The second PDU session being associated with the first PDU session may comprise that the second PDU session and the first PDU session support a same application. The second PDU session being associated with the first PDU session may comprise that a network slice for the first PDU session and a network slice for the second PDU session support a same application. The first PDU session may be associated with a first service type and the second PDU session may be associated with a second service type. The first PDU session may be for uplink traffic associated with an application and the second PDU session may be for downlink traffic associated with the application.

Systems, devices and media may be configured with the method. A PCF device may comprise one or more processors; and memory storing instructions that, when executed, cause the PCF device to perform the described method, additional operations and/or include the additional elements. A system may comprise a PCF device configured to perform the described method, additional operations and/or include the additional elements; and an SMF device configured to send the message. A computer-readable medium may store instructions that, when executed, cause performance of the described method, additional operations and/or include the additional elements.

A wireless device may perform a method comprising multiple operations. The wireless device may determine a service request indicating: a first slice service type (SST) for uplink direction; and a second SST for downlink direction. The wireless device may determine, based on the service request: a first packet data unit (PDU) session for the uplink direction; and a second PDU session for the downlink direction. The wireless device may send, to an access and mobility management function (AMF) device, a first establishment request message for the first PDU session. The wireless device may receive, from the AMF device, a first response message comprising, for the first PDU session, an internet protocol (IP) address. The wireless device may send, to the AMF device, a second establishment request message for the second PDU session, wherein the second establishment request message indicates that the second PDU session is associated with the first PDU session. The wireless device may receive, from the AMF device, a second response message comprising, for the second PDU session, the IP address. The wireless device may send, to a base station via the first PDU session, a first user data packet, comprising the IP address. The wireless device may receive, from the base station via the second PDU session, a second user data packet comprising the IP address.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and an AMF device configured to send the first response message. A computer-readable medium may store instructions that, when executed, cause performance of the described method, additional operations and/or include the additional elements.

A session management function (SMF) device may perform a method comprising multiple operations. The SMF device may receive, from an access and mobility management function (AMF) device, an establishment request message for two packet data unit (PDU) sessions of a wireless device. The establishment request message may comprise: session information of a first PDU session; and session information that indicates that a second PDU session is correlated with the first PDU session. The SMF device may determine, based on the session information, an internet protocol (IP) address for the first PDU session and the second PDU session. The SMF device may send, to the AMF device, the IP address for the first PDU session and the second PDU session.

The session information may comprise at least one of: a PDU session identifier for the second PDU session; a single network slice selection assistance information (S-NSSAI) for the second PDU session; or a network slice instance identifier for the S-NSSAI. The establishment request message may comprise at least one of: a session/network slice correlation indication; or an asymmetric service indication.

Systems, devices and media may be configured with the method. An SMF device may comprise one or more processors; and memory storing instructions that, when executed, cause the SMF device to perform the described method, additional operations and/or include the additional elements. A system may comprise an SMF device configured to perform the described method, additional operations and/or include the additional elements; and an AMF device configured to send the establishment request message. A computer-readable medium may store instructions that, when executed, cause performance of the described method, additional operations and/or include the additional elements.

A session management function (SMF) device may perform a method comprising multiple operations. The SMF device may receive, from an access and mobility management function (AMF) device, a first establishment request message for a first packet data unit (PDU) session of a wireless device. The SMF device may determine a first internet protocol (IP) address for the first PDU session. The SMF device may receive, from the AMF device, a second establishment request message for a second PDU session. The second establishment request message may comprise session information indicating the first PDU session. The SMF device may determine a second IP address for the second PDU session. The SMF device may determine, based on the session information, a user plane rule for the second PDU session. The user plane rule may comprise an indication that the second IP address is correlated with first IP address. The SMF device may send, to a UPF device, the user plane rule for the second PDU session.

The SMF device may also perform one or more additional operations. The session information may comprise at least one of: a PDU session identifier of the first PDU session; the first IP address; a first single network slice selection assistance information (S-NSSAI) of the first PDU session; or a first network slice instance identifier for the first S-NSSAI.

Systems, devices and media may be configured with the method. An SMF device may comprise one or more processors; and memory storing instructions that, when executed, cause the SMF device to perform the described method, additional operations and/or include the additional elements. A system may comprise an SMF device configured to perform the described method, additional operations and/or include the additional elements; and an AMF device configured to send the first establishment request message. A computer-readable medium may store instructions that, when executed, cause performance of the described method, additional operations and/or include the additional elements.

A policy control function (PCF) device may perform a method comprising multiple operations. The PCF device may receive, from a session management function (SMF) device, a policy establishment request message comprising a single network slice selection assistance information (S-NSSAI) for a packet data unit (PDU) session of a wireless device; and a reverse S-NSSAI correlated with the S-NSSAI for the PDU session. The PCF device may determine, based on the S-NSSAI and the reverse S-NSSAI, a policy and charging control (PCC) rule for the PDU session. The PCF device may send, to the SMF device, a response message comprising the PCC rule.

Systems, devices and media may be configured with the method. A PCF device may comprise one or more processors; and memory storing instructions that, when executed, cause the PCF device to perform the described method, additional operations and/or include the additional elements. A system may comprise a PCF device configured to perform the described method, additional operations and/or include the additional elements; and an SMF device configured to send the policy establishment request message. A computer-readable medium may store instructions that, when executed, cause performance of the described method, additional operations and/or include the additional elements.

A policy control function (PCF) device may perform a method comprising multiple operations. The PCF device may receive, from an application function (AF) device, a service information provisional message comprising: a single network slice selection assistance information (S-NSSAI) for a wireless device; a reverse S-NSSAI correlated with the S-NSSAI for the wireless device; an identifier of the wireless device; and service information for the wireless device. The PCF device may map, based on the identifier of the wireless device, the reverse S-NSSAI and the service information to a packet data unit (PDU) session. The PCF device may determine, based on the S-NSSAI and the reverse S-NSSAI, a policy and charging control (PCC) rule for the PDU session. The PCF device may send, to the SMF device, a response message comprising the PCC rule.

Systems, devices and media may be configured with the method. A PCF device may comprise one or more processors; and memory storing instructions that, when executed, cause the PCF device to perform the described method, additional operations and/or include the additional elements. A system may comprise a PCF device configured to perform the described method, additional operations and/or include the additional elements; and an AF device configured to send the service information provisional message. A computer-readable medium may store instructions that, when executed, cause performance of the described method, additional operations and/or include the additional elements.

A policy control function (PCF) device may perform a method comprising multiple operations. The PCF device may receive, from a session management function (SMF) device, a policy establishment request message comprising a combined single network slice selection assistance information (S-NSSAI) for a packet data unit (PDU) session of a wireless device, wherein the combined S-NSSAI indicates: an uplink slice service type for the PDU session; and a downlink slice service type for the PDU session. The PCF device may determine, based on the combined S-NSSAI, a policy and charging control (PCC) rule for the PDU session. The PCF device may send, to the SMF device, a response message comprising the PCC rule.

Systems, devices and media may be configured with the method. A PCF device may comprise one or more processors; and memory storing instructions that, when executed, cause the PCF device to perform the described method, additional operations and/or include the additional elements.

A system may comprise a PCF device configured to perform the described method, additional operations and/or include the additional elements; and an SMF device configured to send the policy establishment request message. A computer-readable medium may store instructions that, when executed, cause performance of the described method, additional operations and/or include the additional elements.

A first base station may perform a method comprising multiple operations. The first base station may receive, from a wireless device, a first message indicating that a first packet data unit (PDU) session for uplink traffic of an application is associated with a second PDU session for downlink traffic of the application. The first base station may send, to the wireless device, one or more response messages indicating that a same internet protocol (IP) address is associated with the first PDU session and the second PDU session. The first base station may send, to a second base station, a handover request comprising: session information of the first PDU session; session information of the second PDU session; and at least one parameter indicating that the first PDU session and the second PDU session are for a same application. The first base station may receive, from the second base station, a handover request acknowledgement message for the first PDU session and the second PDU session, wherein the handover request acknowledgement message indicates that the first PDU session and the second PDU session are jointly accepted. The first base station may send, to the wireless device based on the handover request acknowledgement message indicating that the first PDU session and the second PDU session are jointly accepted, a handover command.

The first base station may also perform one or more additional operations. The first PDU session may be associated with a first slice service type (SST) for uplink traffic of the application. The second PDU session may be associated with a second SST for downlink traffic of the application. The first message may comprise the session information of the first PDU session. The at least one parameter may comprise a session correlation indication indicating that the second PDU session is associated with the first PDU session. The at least one parameter may comprise a network slice correlation indication indicating that a first network slice for the first PDU session is associated with a second network slice for the second PDU session. The at least one parameter may comprise an asymmetric service indication, wherein the asymmetric service indication indicates that: a first service type is supported by the first PDU session for a first direction; and a second service type is supported by the second PDU session for a second direction, different than the first direction. The handover request acknowledgement message may comprise an indication that resources are available for the first PDU session and the second PDU session. The first base station may receive, from an access and mobility management function (AMF) device, a PDU session accept message comprising the at least one parameter. The first base station may determine, based on the at least one parameter, a radio resource control (RRC) message. Sending the handover command to the wireless device may comprise sending, to the wireless device, the RRC message. The first base station may determine, based on the at least one parameter, a first data radio bearer (DRB) applied to a first service of the application for the first PDU session for a first direction. The first base station may determine, based on the at least one parameter, a second DRB applied to a second service of the application for the second PDU session for a second direction. The first base station may receive, from the wireless device, a first establishment request message for the first PDU session, wherein the first PDU session is associated with a first SST. The first base station may send, to the wireless device, a first response message comprising the IP address for the first PDU session. The first base station may receive, from the wireless device, a second establishment request message for the second PDU session, wherein the second PDU session may be associated with a second SST. The second establishment request message may indicate that the second PDU session is associated with the first PDU session. The first base station may send, to the wireless device, a second response message comprising the IP address for the second PDU session. The at least one parameter may comprise an asymmetric service indication, wherein the asymmetric service indication indicates that: a first service type is supported by a first network slice for a first direction; a second service type is supported by a second network slice for a second direction, different than the first direction. The first message may indicate that a first SST of the first PDU session is associated with a second SST of the second PDU session. The at least one parameter may further indicate that a first data radio bearer (DRB) of the first PDU session is associated with a second DRB of the second PDU session. The first base station may determine, based on a measurement report received from the wireless device, to handover to the second base station. The session information of the first PDU session may comprises at least one of: a PDU session identifier of the first PDU session; the IP address; a first single network slice selection assistance information (S-NSSAI) of the first PDU session; or a first network slice instance identifier for the first S-NSSAI. The session information of the second PDU session may comprise at least one of: a PDU session identifier of the second PDU session; the IP address; a second single network slice selection assistance information (S-NSSAI) of the second PDU session; or a second network slice instance identifier for the second S-NSSAI. The first base station may determine, based on the at least one parameter, if resources are available for both a first network slice for the first PDU session and a second network slice for the second PDU session. The first base station may determine, based on the at least one parameter, if resources are available for both a first DRB of the first PDU session and a second DRB of the second PDU session.

Systems, devices and media may be configured with the method. A base station may comprise one or more processors; and memory storing instructions that, when executed, cause the first base station to perform the described method, additional operations and/or include the additional elements. A system may comprise a first base station configured to perform the described method, additional operations and/or include the additional elements; and a second base station configured to send the handover request acknowledgement message. A computer-readable medium may store instructions that, when executed, cause performance of the described method, additional operations and/or include the additional elements.

A first base station may perform a method comprising multiple operations. The first base station may receive, from a second base station, a handover request comprising: session information of a first packet data unit (PDU) session; session information of a second PDU session; and at least one parameter indicating the first PDU session and the second PDU session are for a same application. The first base station may send, to the second base station, a handover request acknowledgement message for the first PDU session and the second PDU session, wherein the handover request acknowledgement message indicates that the first PDU session and the second PDU session are jointly accepted or jointly rejected.

The first base station may also perform one or more additional operations. The first base station may determine to jointly accept or jointly reject the handover request based on determining whether resources are available for both the first PDU session and the second PDU session. The handover request acknowledgement message may comprise an indication that resources are available for the first PDU session and the second PDU session. The first PDU session may be associated with a first slice service type (SST) for uplink traffic of an application. The second PDU session may be associated with a second SST for downlink traffic of the application. The at least one parameter may comprise a session correlation indication indicating that the second PDU session is associated with the first PDU session. The at least one parameter may comprise a network slice correlation indication indicating that a first network slice for the first PDU session is associated with a second network slice for the second PDU session. The session information of the first PDU session may comprise at least one of: a PDU session identifier of the first PDU session; an internet protocol (IP) address of the first PDU session; a first single network slice selection assistance information (S-NSSAI) of the first PDU session; or a first network slice instance identifier for the first S-NSSAI. The session information of the second PDU session may comprise at least one of: a PDU session identifier of the second PDU session; an internet protocol (IP) address of the second PDU session; a second single network slice selection assistance information (S-NSSAI) of the second PDU session; or a second network slice instance identifier for the second S-NSSAI. The at least one parameter may comprise an asymmetric service indication, wherein the asymmetric service indication indicates that: a first service type is supported by the first PDU session for a first direction; and a second service type is supported by the second PDU session for a second direction, different than the first direction. The at least one parameter may further indicate that a first data radio bearer (DRB) of the first PDU session is associated with a second DRB of the second PDU session. The first base station may determine, based on the at least one parameter, if resources are available for both a first DRB of the first PDU session and a second DRB of the second PDU session.

Systems, devices and media may be configured with the method. A base station may comprise one or more processors; and memory storing instructions that, when executed, cause the first base station to perform the described method, additional operations and/or include the additional elements. A system may comprise a first base station configured to perform the described method, additional operations and/or include the additional elements; and a second base station configured to send the handover request. A computer-readable medium may store instructions that, when executed, cause performance of the described method, additional operations and/or include the additional elements.

A first base station may perform a method comprising multiple operations. The first base station may receive, from a wireless device, a first message indicating that a first network slice for a packet data unit (PDU) session is associated with a second network slice for the PDU session, wherein the first network slice is for uplink traffic of an application and the second network slice is for downlink traffic of the application. The first base station may send, by the first base station and to the wireless device, one or more response messages indicating that a same wireless device internet protocol (IP) address is associated with the first network slice and the second network slice. The first base station may send, to a second base station, a handover request comprising: session information of the PDU session; and at least one parameter indicating that the first network slice and the second network slice are for a same application. The first base station may receive, from the second base station, a handover request acknowledgement message for the PDU session, wherein the handover request acknowledgement message indicates that resources are available for both the first network slice and the second network slice. The first base station may send, to the wireless device based on the handover request acknowledgement message indicating that resources are available for both the first network slice and the second network slice, a handover command.

The first base station may also perform one or more additional operations. The first network slice may be associated with a first slice service type (SST) for uplink traffic of the application. The second network slice may be associated with a second SST for downlink traffic of the application. The at least one parameter may comprise a network slice correlation indication indicating that the first network slice is associated with the second network slice. The session information of the PDU session may comprise at least one of: a PDU session identifier of the PDU session; first single network slice selection assistance information (S-NSSAI) for the uplink traffic; or second S-NSSAI for the downlink traffic. The first base station may determine, based on the at least one parameter, a radio resource control (RRC) message. The sending the handover command to the wireless device may comprise sending, by the first base station to the wireless device, the RRC message. The at least one parameter may comprise an asymmetric service indication, wherein the asymmetric service indication indicates that: a first service type is supported by the first network slice for a first direction; and a second service type is supported by the second network slice for a second direction, different from the first direction.

Systems, devices and media may be configured with the method. A base station may comprise one or more processors; and memory storing instructions that, when executed, cause the first base station to perform the described method, additional operations and/or include the additional elements. A system may comprise a first base station configured to perform the described method, additional operations and/or include the additional elements; and a second base station configured to send the handover request acknowledgement message. A computer-readable medium may store instructions that, when executed, cause performance of the described method, additional operations and/or include the additional elements.

A first base station may perform a method comprising multiple operations. The first base station may receive, from a second base station, a handover request indicating that a first packet data unit (PDU) session and a second PDU session are for a same application. The first base station may determine, based on the handover request indicating that the first PDU session and the second PDU session are for the same application, to jointly accept or jointly reject the handover request for the first PDU session and the second PDU session. The first base station may send, to the second base station, a handover request acknowledgement message for the first PDU session and the second PDU session based on the determining.

Systems, devices and media may be configured with the method. A base station may comprise one or more processors; and memory storing instructions that, when executed, cause the first base station to perform the described method, additional operations and/or include the additional elements. A system may comprise a first base station configured to perform the described method, additional operations and/or include the additional elements; and a second base station configured to send the handover request. A computer-readable medium may store instructions that, when executed, cause performance of the described method, additional operations and/or include the additional elements.

A first base station may perform a method comprising multiple operations. The first base station may receive, from a second base station, a handover request indicating to jointly accept or jointly reject the handover request for a first packet data unit (PDU) session and a second PDU session. The first base station may determine, based on the handover request message, whether to accept the handover request for the first PDU session and the second PDU session. The first base station may send, to the second base station, a handover request acknowledgement message for the first PDU session and the second PDU session based on the determining.

Systems, devices and media may be configured with the method. A base station may comprise one or more processors; and memory storing instructions that, when executed, cause the first base station to perform the described method, additional operations and/or include the additional elements. A system may comprise a first base station configured to perform the described method, additional operations and/or include the additional elements; and a second base station configured to send the handover request. A computer-readable medium may store instructions that, when executed, cause performance of the described method, additional operations and/or include the additional elements.

A target base station may perform a method comprising multiple operations. The target base station may receive, from a source base station, a handover request message comprising a session correlation indication (SCI) for a first PDU session and a second PDU session. The target base station may determine, based on the SCI, whether resources are available for both the first PDU session and the second PDU session. The target base station may send, to the source base station, a handover request acknowledgement message based on the determining.

The handover request message may be received, from the source base station, via a source access and mobility management function (AMF) and a target AMF. The handover request acknowledgement message may be sent, to the source base station, via the target AMF and the source AMF. The SCI may indicate that the first PDU session and the second PDU session support a same application. The handover request message may further comprise at least one of: a network slice correlation indication; or an asymmetric service indication.

Systems, devices and media may be configured with the method. A base station may comprise one or more processors; and memory storing instructions that, when executed, cause the first base station to perform the described method, additional operations and/or include the additional elements. A system may comprise a target base station configured to perform the described method, additional operations and/or include the additional elements; and a source base station configured to send the handover request message. A computer-readable medium may store instructions that, when executed, cause performance of the described method, additional operations and/or include the additional elements.

A source base station may perform a method comprising multiple operations. The source base station may receive, from an access and mobility management function (AMF)

device, a first message comprising a session correlation indication (SCI) for a first packet data unit (PDU) session and a second PDU session. The source base station may send, to a target base station, a handover request message comprising the SCI. The source base station may receive, from the target base station, a handover request acknowledgement message based on the SCI.

The source base station may also perform one or more additional operations. The source base station may determine a radio resource control (RRC) message based on the SCI. The source base station may send, to the wireless device, the RRC message. The source base station may determine a handover to a target base station.

Systems, devices and media may be configured with the method. A base station may comprise one or more processors; and memory storing instructions that, when executed, cause the first base station to perform the described method, additional operations and/or include the additional elements. A system may comprise a source base station configured to perform the described method, additional operations and/or include the additional elements; and a target base station configured to send the handover request acknowledgement message. A computer-readable medium may store instructions that, when executed, cause performance of the described method, additional operations and/or include the additional elements.

A target base station may perform a method comprising multiple operations. The target base station may receive, from a source base station, a handover request message comprising a network slice and quality of service (QoS) correlation indication (NQCI) for a first QoS flow and a second QoS flow. The target base station may determine, based on the NQCI, whether resources are available for both the first QoS flow and the second QoS flow. The target base station may send, to the source base station, a handover request acknowledgement message based on the determining.

The handover request acknowledgement message may indicate that the resources are not available. The handover request message may be received, from the source base station, via a source access and mobility management function (AMF) and a target AMF. The handover request acknowledgement message may be sent, to the source base station, via the target AMF and the source AMF. The NQCI may indicate that the first QoS flow and the second QoS flow support a same application. The handover request message may further comprise at least one of: a network slice correlation indication; or an asymmetric service indication.

Systems, devices and media may be configured with the method. A base station may comprise one or more processors; and memory storing instructions that, when executed, cause the first base station to perform the described method, additional operations and/or include the additional elements. A system may comprise a target base station configured to perform the described method, additional operations and/or include the additional elements; and a source base station configured to send the handover request message. A computer-readable medium may store instructions that, when executed, cause performance of the described method, additional operations and/or include the additional elements.

A central unit (CU) of a base station may perform a method comprising multiple operations. The CU of the base station may receive, from an access and mobility management function (AMF) device, a first message comprising a session correlation indication (SCI) for a first PDU session and the second PDU session of a wireless device.

The CU may send, to a distributed unit (DU) of the base station, a request message comprising the SCI. The CU may receive, from the DU, a request acknowledgement message based on the SCI. The CU may determine a radio resource control (RRC) message based on the request acknowledgement message. The CU may send, to the wireless device via the DU, the RRC message.

The SCI may indicate that the first PDU session and the second PDU session support a same application. The first message may further comprise at least one of: a network slice correlation indication; or an asymmetric service indication.

Systems, devices and media may be configured with the method. A central unit (CU) of a base station may comprise one or more processors; and memory storing instructions that, when executed, cause the CU to perform the described method, additional operations and/or include the additional elements. A system may comprise a central unit (CU) of a base station configured to perform the described method, additional operations and/or include the additional elements; and an access and mobility management function (AMF) device configured to send the first message. A computer-readable medium may store instructions that, when executed, cause performance of the described method, additional operations and/or include the additional elements.

A central unit (CU) of a base station may perform a method comprising multiple operations. The CU of the base station may receive, from an access and mobility management function (AMF), a first message comprising a network slice & quality of service (QoS) correlation indication (NQCI) for a first QoS flow and a second QoS flow of a wireless device. The CU may send, to a distributed unit (DU) of the base station, a request message comprising the NQCI. The CU may receive, from the DU, a request acknowledgement message based on the NQCI. The CU may determine a radio resource control (RRC) message based on the request acknowledgement message. The CU may send, to the wireless device via the DU, the RRC message.

The NQCI may indicate that the first QoS flow and the second QoS flow support a same application. The first message may further comprise an asymmetric service indication.

Systems, devices and media may be configured with the method. A central unit (CU) of a base station may comprise one or more processors; and memory storing instructions that, when executed, cause the CU to perform the described method, additional operations and/or include the additional elements. A system may comprise a central unit (CU) of a base station configured to perform the described method, additional operations and/or include the additional elements; and an access and mobility management function (AMF) device configured to send the first message. A computer-readable medium may store instructions that, when executed, cause performance of the described method, additional operations and/or include the additional elements.

A distributed unit (DU) of a target base station may perform a method comprising multiple operations. The DU of the target base station may receive, from a central unit (CU) of the target base station, a wireless device context setup request message comprising a session correlation indication (SCI) for a first PDU session and a second PDU session. The DU of the target base station may determine, based on the SCI, whether resources are available for both the first PDU session and the second PDU session. The DU of the target base station may send, to the CU, a wireless device context setup response message based on the determining.

Systems, devices and media may be configured with the method. A distributed unit (DU) of a target base station may comprise one or more processors; and memory storing instructions that, when executed, cause the DU to perform the described method, additional operations and/or include the additional elements. A system may comprise a distributed unit (DU) of a target base station configured to perform the described method, additional operations and/or include the additional elements; and a central unit (CU) of the target base station configured to send the wireless device context setup request message. A computer-readable medium may store instructions that, when executed, cause performance of the described method, additional operations and/or include the additional elements.

A distributed unit (DU) of a target base station may perform a method comprising multiple operations. The DU of the target base station may receive from a central unit (CU) of the target base station, a wireless device context setup request message comprising a network slice & quality of service (QoS) correlation indication (NQCI) for a first QoS flow and a second QoS flow. The DU of the target base station may determine, based on the NQCI, whether resources are available for both the first QoS flow and the second QoS flow. The DU of the target base station may send, to the CU, a wireless device context setup response message based on the determining.

Systems, devices and media may be configured with the method. A distributed unit (DU) of a target base station may comprise one or more processors; and memory storing instructions that, when executed, cause the DU to perform the described method, additional operations and/or include the additional elements. A system may comprise a distributed unit (DU) of a target base station configured to perform the described method, additional operations and/or include the additional elements; and a central unit (CU) of the target base station configured to send the wireless device context setup request message. A computer-readable medium may store instructions that, when executed, cause performance of the described method, additional operations and/or include the additional elements.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, Wi-Fi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps. Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
sending, by a first base station and to a second base station, a handover request indicating that a first communication session and a second communication session are associated;
receiving, from the second base station, a handover request acknowledgement message indicating that the first communication session and the second communication session are jointly accepted; and
sending, to a wireless device and based on the handover request acknowledgement message indicating that the first communication session and the second communication session are jointly accepted, a handover command.

2. The method of claim 1, wherein:
the first communication session is for uplink traffic of a wireless device application; and
the second communication session is for downlink traffic of the wireless device application.

3. The method of claim 1, wherein:
the first communication session is associated with a first slice service type (SST) for uplink traffic of a wireless device application; and
the second communication session is associated with a second SST for downlink traffic of the wireless device application.

4. The method of claim 1, wherein the handover request comprises an asymmetric service indication, wherein the asymmetric service indication indicates that:
a first service type is supported by the first communication session for a first direction; and
a second service type is supported by the second communication session for a second direction, different from the first direction.

5. The method of claim 1, wherein the handover request acknowledgement message comprises an indication that resources are available for the first communication session and the second communication session.

6. The method of claim 1, further comprising:
receiving, from the wireless device, a first message indicating that the first communication session is associated with the second communication session; and
sending, to the wireless device, one or more response messages indicating that a same internet protocol (IP) address is associated with the first communication session and the second communication session.

7. The method of claim 1, wherein at least one of the first communication session or the second communication session is associated with at least one of:
a corresponding packet data unit (PDU) session;
a corresponding quality of service (QOS) flow; or
a corresponding network slice.

8. The method of claim 1, wherein the first communication session and the second communication session are for a same wireless device application.

9. A method comprising:
receiving, by a second base station and from a first base station, a handover request indicating that a first communication session and a second communication session are associated; and
sending, to the first base station, a handover request acknowledgement message indicating that the first communication session and the second communication session are jointly accepted or jointly rejected.

10. The method of claim 9, further comprising determining to jointly accept or jointly reject the handover request based on determining whether resources are available for both the first communication session and the second communication session.

11. The method of claim 9, wherein the handover request acknowledgement message comprises an indication that resources are available for the first communication session and the second communication session.

12. The method of claim 9, wherein the handover request comprises an asymmetric service indication, wherein the asymmetric service indication indicates that:
a first service type is supported by the first communication session for a first direction; and
a second service type is supported by the second communication session for a second direction, different from the first direction.

13. The method of claim 9, wherein:
the first communication session is for uplink traffic of a wireless device application; and
the second communication session is for downlink traffic of the wireless device application.

14. The method of claim 9, wherein at least one of the first communication session or the second communication session is associated with at least one of:
a corresponding packet data unit (PDU) session;
a corresponding quality of service (QOS) flow; or
a corresponding network slice.

15. The method of claim 9, wherein the first communication session and the second communication session are for a same wireless device application.

16. A first base station comprising:
one or more processors; and
memory storing instructions that, when executed by the one or more processors, cause the first base station to:
send, to a second base station, a handover request indicating that a first communication session and a second communication session are associated;
receive, from the second base station, a handover request acknowledgement message indicating that the first communication session and the second communication session are jointly accepted; and
send, to a wireless device and based on the handover request acknowledgement message indicating that the first communication session and the second communication session are jointly accepted, a handover command.

17. The first base station of claim 16, wherein:
the first communication session is for uplink traffic of a wireless device application; and
the second communication session is for downlink traffic of the wireless device application.

18. The first base station of claim 16, wherein:
the first communication session is associated with a first slice service type (SST) for uplink traffic of a wireless device application; and
the second communication session is associated with a second SST for downlink traffic of the wireless device application.

19. The first base station of claim 16, wherein the handover request comprises an asymmetric service indication, wherein the asymmetric service indication indicates that:
 a first service type is supported by the first communication session for a first direction; and
 a second service type is supported by the second communication session for a second direction, different from the first direction.

20. The first base station of claim 16, wherein the handover request acknowledgement message comprises an indication that resources are available for the first communication session and the second communication session.

21. The first base station of claim 16, wherein the instructions, when executed by the one or more processors, cause the first base station to:
 receive, from the wireless device, a first message indicating that the first communication session is associated with the second communication session; and
 send, to the wireless device, one or more response messages indicating that a same internet protocol (IP) address is associated with the first communication session and the second communication session.

22. The first base station of claim 16, wherein at least one of the first communication session or the second communication session is associated with at least one of:
 a corresponding packet data unit (PDU) session;
 a corresponding quality of service (QOS) flow; or
 a corresponding network slice.

23. The first base station of claim 16, wherein the first communication session and the second communication session are for a same wireless device application.

24. A second base station comprising:
one or more processors; and
memory storing instructions that, when executed by the one or more processors, cause the second base station to:
 receive, from a first base station, a handover request indicating that a first communication session and a second communication session are associated; and
 send, to the first base station, a handover request acknowledgement message indicating that the first communication session and the second communication session are jointly accepted or jointly rejected.

25. The second base station of claim 24, wherein the instructions, when executed by the one or more processors, cause the second base station to determine to jointly accept or jointly reject the handover request based on causing determining whether resources are available for both the first communication session and the second communication session.

26. The second base station of claim 24, wherein the handover request acknowledgement message comprises an indication that resources are available for the first communication session and the second communication session.

27. The second base station of claim 24, wherein the handover request comprises an asymmetric service indication, and wherein the asymmetric service indication indicates that:
 a first service type is supported by the first communication session for a first direction; and
 a second service type is supported by the second communication session for a second direction, different from the first direction.

28. The second base station of claim 24, wherein:
the first communication session is for uplink traffic of a wireless device application; and
the second communication session is for downlink traffic of the wireless device application.

29. The second base station of claim 24, wherein at least one of the first communication session or the second communication session is associated with at least one of:
 a corresponding packet data unit (PDU) session;
 a corresponding quality of service (QOS) flow; or
 a corresponding network slice.

30. The second base station of claim 24, wherein the first communication session and the second communication session are for a same wireless device application.

\* \* \* \* \*